United States Patent
Kang et al.

(10) Patent No.: US 11,237,973 B2
(45) Date of Patent: Feb. 1, 2022

(54) MEMORY SYSTEM FOR UTILIZING A MEMORY INCLUDED IN AN EXTERNAL DEVICE

(71) Applicant: SK hynix Inc., Gyeonggi-do (KR)

(72) Inventors: Hye-Mi Kang, Gyeonggi-do (KR);
Eu-Joon Byun, Gyeonggi-do (KR);
Byung-Jun Kim, Gyeonggi-do (KR);
Seok-Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/844,652

(22) Filed: Apr. 9, 2020

(65) Prior Publication Data

US 2020/0327063 A1 Oct. 15, 2020

Related U.S. Application Data

(63) Continuation-in-part of application No. 16/842,416, filed on Apr. 7, 2020, and a continuation-in-part of
(Continued)

(30) Foreign Application Priority Data

Apr. 9, 2019 (KR) .................... 10-2019-0041418
May 15, 2019 (KR) .................... 10-2019-0056868
(Continued)

(51) Int. Cl.
*G06F 12/0873* (2016.01)
*G06F 12/02* (2006.01)
(Continued)

(52) U.S. Cl.
CPC ...... *G06F 12/0873* (2013.01); *G06F 11/3037* (2013.01); *G06F 11/3058* (2013.01);
(Continued)

(58) Field of Classification Search
CPC ......... G06F 12/12–128; G06F 12/0877; G06F 12/0246; G06F 12/0835; G06F 12/873;
(Continued)

(56) References Cited

U.S. PATENT DOCUMENTS 7,856,530 B1 * 12/2010 Mu ..................... G06F 12/0888
711/119
9,104,599 B2    8/2015 Atkisson et al.
(Continued)

OTHER PUBLICATIONS

Cai, Yu, et al. "Error characterization, mitigation, and recovery in flash-memory-based solid-state drives." Proceedings of the IEEE 105.9 (Aug. 18, 2017): 1666-1704. (Year: 2017).*
(Continued)

*Primary Examiner* — Charles Rones
*Assistant Examiner* — Hewy H Li
(74) *Attorney, Agent, or Firm* — IP & T Group LLP

(57) ABSTRACT

A memory system includes a memory device and a controller. The memory device stores a piece of data in a location which is distinguished by a physical address. The controller generates map data, each piece of map data associating a logical address, inputted along with a request from an external device, with the physical address, selects a piece of map data among the map data based on a status regarding the piece of map data, and transfers selected map data to the external device.

20 Claims, 87 Drawing Sheets

Related U.S. Application Data application No. 16/837,764, filed on Apr. 1, 2020, and a continuation-in-part of application No. 16/837,727, filed on Apr. 1, 2020, and a continuation-in-part of application No. 16/797,773, filed on Feb. 21, 2020, and a continuation-in-part of application No. 16/717,144, filed on Dec. 17, 2019, and a continuation-in-part of application No. 16/709,702, filed on Dec. 10, 2019.

(30) Foreign Application Priority Data

| | | |
|---|---|---|
| Jul. 22, 2019 | (KR) | 10-2019-0088266 |
| Jul. 22, 2019 | (KR) | 10-2019-0088353 |
| Jul. 22, 2019 | (KR) | 10-2019-0088385 |
| Jul. 30, 2019 | (KR) | 10-2019-0092255 |

(51) Int. Cl.
  *G06F 12/0864* (2016.01)
  *G06F 11/30* (2006.01)
  *G06F 13/16* (2006.01)

(52) U.S. Cl.
  CPC ...... *G06F 12/0246* (2013.01); *G06F 12/0864* (2013.01); *G06F 13/1668* (2013.01); *G06F 2212/7201* (2013.01); *G06F 2212/7209* (2013.01)

(58) Field of Classification Search
  CPC ............ G06F 12/123; G06F 13/1668; G06F 2212/7201; G06F 11/3037; G06F 11/3058; G06F 12/0864; G06F 2212/7209
  See application file for complete search history.

(56) References Cited

U.S. PATENT DOCUMENTS

| | | | |
|---|---|---|---|
| 9,329,846 B1* | 5/2016 | August | G06F 9/45525 |
| 9,703,664 B1 | 7/2017 | Alshawabkeh et al. | |
| 10,783,071 B2 | 9/2020 | Wang et al. | |
| 2003/0041212 A1* | 2/2003 | C. Creta | G06F 12/0848 711/118 |
| 2005/0102297 A1 | 5/2005 | Lloyd et al. | |
| 2007/0118695 A1* | 5/2007 | Lowe | G06F 12/127 711/136 |
| 2007/0220201 A1 | 9/2007 | Gill et al. | |
| 2009/0125548 A1 | 5/2009 | Moir et al. | |
| 2011/0093648 A1 | 4/2011 | Belluomini et al. | |
| 2012/0096225 A1* | 4/2012 | Khawand | G06F 12/0848 711/119 |
| 2012/0124294 A1 | 5/2012 | Atkisson et al. | |
| 2013/0124794 A1 | 5/2013 | Bux et al. | |
| 2013/0151777 A1 | 6/2013 | Daly et al. | |
| 2013/0151778 A1 | 6/2013 | Daly et al. | |
| 2013/0151780 A1 | 6/2013 | Daly et al. | |
| 2014/0047170 A1 | 2/2014 | Cohen et al. | |
| 2014/0173234 A1 | 6/2014 | Jung et al. | |
| 2014/0258638 A1 | 9/2014 | Traut et al. | |
| 2015/0301744 A1* | 10/2015 | Kim | G06F 3/0616 711/103 |
| 2015/0347028 A1 | 12/2015 | Kotte et al. | |
| 2015/0356020 A1 | 12/2015 | Desai et al. | |
| 2015/0378925 A1 | 12/2015 | Misra | |
| 2016/0147654 A1 | 5/2016 | Zhao et al. | |
| 2016/0267018 A1 | 9/2016 | Shimizu et al. | |
| 2016/0274797 A1* | 9/2016 | Hahn | G06F 3/061 |
| 2016/0378359 A1 | 12/2016 | Jang et al. | |
| 2017/0060202 A1 | 3/2017 | Sundaram et al. | |
| 2017/0109089 A1* | 4/2017 | Huang | G06F 3/0688 |
| 2017/0192902 A1 | 7/2017 | Hwang et al. | |
| 2017/0351452 A1* | 12/2017 | Boyd | G06F 12/02 |
| 2018/0067678 A1 | 3/2018 | Jeong et al. | |
| 2018/0088812 A1 | 3/2018 | Lee | |
| 2018/0101477 A1 | 4/2018 | Kan et al. | |
| 2019/0004591 A1 | 1/2019 | Park et al. | |
| 2019/0004944 A1* | 1/2019 | Widder | G06F 12/0292 |
| 2019/0042464 A1 | 2/2019 | Genshaft et al. | |
| 2019/0171575 A1 | 6/2019 | Chen et al. | |
| 2019/0265976 A1 | 8/2019 | Goryavskiy et al. | |
| 2019/0272104 A1 | 9/2019 | Durnov et al. | |
| 2019/0294546 A1 | 9/2019 | Agarwal et al. | |
| 2020/0278797 A1 | 9/2020 | Bavishi | |
| 2020/0327063 A1 | 10/2020 | Kang et al. | |
| 2020/0334138 A1 | 10/2020 | Byun | |
| 2020/0334166 A1 | 10/2020 | Byun et al. | |

OTHER PUBLICATIONS

Office Action issued by the USPTO for U.S. Appl. No. 16/842,416 dated May 3, 2021.

Differences between disk cache write-through and write-back, Huawei Enterprise Support Community, Jun. 6, 2016 <https://forum.huawei.com/enterprise/en/differences-between-disk-cache-write-through-and-write-back/thread/203781-891>.

Office Action issued by the USPTO for U.S. Appl. No. 16/709,702 dated Apr. 6, 2021.

Office Action issued by the USPTO for U.S. Appl. No. 16/837,764 dated Aug. 18, 2021.

Notice of Allowance issued by the USPTO for U.S. Appl. No. 16/717,144 dated Jun. 10, 2021.

Notice of Allowance issued by the USPTO for U.S. Appl. No. 16/717,144 dated Mar. 19, 2021.

Office Action issued by the USPTO for U.S. Appl. No. 16/837,727 dated Oct. 7, 2021.

Office Action issued by the USPTO for U.S. Appl. No. 16/709,702 dated Oct. 14, 2021.

* cited by examiner

FIG. 22A

|  | H_SEG | RD_CNT |
|---|---|---|
| H_SEGMENT01 | 0 | 0 |
| H_SEGMENT02 | 1 | 1000 |
| H_SEGMENT03 | 0 | 20 |
| H_SEGMENT04 | 0 | 900 |
| ⋮ | ⋮ | ⋮ |

| RC_TH | 1000 |
|---|---|
| MISS_CNT | 1500 |
| PROVIDE_CNT | 10 |

FIG. 22B

|  | H_SEG | RD_CNT |
|---|---|---|
| H_SEGMENT01 | 0 | 10 |
| H_SEGMENT02 | 1 | 900 |
| H_SEGMENT03 | 0 | 19 |
| H_SEGMENT04 | 0 | 1004 |
| ⋮ | ⋮ | ⋮ |

→ REMOVE H_SEGMENT
→ PROVIDE M_SEGMENT

| RC_TH | 1000 |
|---|---|
| MISS_CNT | 300 |
| PROVIDE_CNT | 1 |

FIG. 31B

| | LA | PA | nCPA | |
|---|---|---|---|---|
| LA_REF | 1 | 5 | +9 | |
| LA_1 | 2 | 6 | +8 | |
| | 3 | 7 | +7 | |
| | 4 | 8 | +6 | |
| | 5 | 9 | +5 | PA_1 : 10 PIECES |
| | 6 | 10 | +4 | |
| | 7 | 11 | +3 | |
| | 8 | 12 | +2 | |
| | 9 | 13 | +1 | |
| | 10 | 14 | +0 | |
| | 11 | 101 | Null | |
| | 12 | 98 | Null | |
| | 13 | 56 | Null | |
| | 14 | 23 | +1 | |
| | 15 | 24 | +0 | |
| | ⋮ | ⋮ | ⋮ | |

PA_REF points to PA column. RD_PR : 3 PIECES (Consecutive)

FIG. 32B

| LA | PA | nCPA |
|---|---|---|
| 1 | 5 | +9 |
| 2 | 6 | +8 |
| 3 | 7 | +7 |
| 4 | 8 | +6 |
| 5 | 9 | +5 |
| 6 | 10 | +4 |
| 7 | 11 | +3 |
| 8 | 12 | +2 |
| 9 | 13 | +1 |
| 10 | 14 | +0 |
| 11 | 101 | Null |
| 12 | 98 | Null |
| 13 | 56 | Null |
| 14 | 23 | +1 |
| 15 | 24 | +0 |
| ⋮ | ⋮ | ⋮ |

PA_REF

RD_PR : Inconsecutive

LA_REF → 9, 13

| LA | PA | nCPA |
|---|---|---|
| 1 | 5 | +9 |
| 2 | 6 | +8 |
| 3 | 7 | +7 |
| 4 | 8 | +6 |
| 5 | 9 | +5 |
| 6 | 10 | +4 |
| 7 | 11 | +3 |
| 8 | 12 | +2 |
| 9 | 13 | +1 |
| 10 | 14 | +0 |
| 11 | 101 | Null |
| 12 | 98 | Null |
| 13 | 56 | Null |
| 14 | 23 | +1 |
| 15 | 24 | +0 |

L2P_M_C

RD_PR : Consecutive
PF_PR
PA_1

FIG. 35B

| | MAP_C | | STATE_INF |
|---|---|---|---|
| MS#0 | MS#0_SUB#0 | LA0~LA4 | 0 |
| | MS#0_SUB#1 | LA5~LA19 | 0 |
| | MS#0_SUB#2 | LA10~LA14 | 0 |
| | MS#0_SUB#3 | LA15~LA19 | 0 |
| MS#1 | MS#1_SUB#0 | LA20~LA24 | 0 |
| | MS#1_SUB#1 | LA25~LA29 | 0 |
| | MS#1_SUB#2 | LA30~LA34 | 0 |
| | MS#1_SUB#3 | LA35~LA39 | 0 |
| MS#2 | MS#2_SUB#0 | LA40~LA44 | 0 |
| | MS#2_SUB#1 | LA45~LA49 | 0 |
| | MS#2_SUB#2 | LA50~LA54 | 0 |
| | MS#2_SUB#3 | LA55~LA59 | 0 |
| MS#3 | MS#3_SUB#0 | LA60~LA64 | 0 |
| | MS#3_SUB#1 | LA65~LA69 | 0 |
| | MS#3_SUB#2 | LA70~LA74 | 0 |
| | MS#3_SUB#3 | LA75~LA79 | 0 |

FIG. 38B

| L2P_MAP_C | | | before D_INF | after D_INF |
|---|---|---|---|---|
| L2P_MS#0 | L2P_MS#0_SUB#0 | LA0~LA4 | 0 | 0 |
| | L2P_MS#0_SUB#1 | LA5~LA19 | 0 | 0 |
| | L2P_MS#0_SUB#2 | LA10~LA14 | 0 | 0 |
| | L2P_MS#0_SUB#3 | LA15~LA19 | 1 | 1 |
| L2P_MS#1 | L2P_MS#1_SUB#0 | LA20~LA24 | 1 | 1 |
| | L2P_MS#1_SUB#1 | LA25~LA29 | 0 | 1 |
| | L2P_MS#1_SUB#2 | LA30~LA34 | 1 | 1 |
| | L2P_MS#1_SUB#3 | LA35~LA39 | 1 | 1 |
| L2P_MS#2 | L2P_MS#2_SUB#0 | LA40~LA44 | 1 | 1 |
| | L2P_MS#2_SUB#1 | LA45~LA49 | 1 | 1 |
| | L2P_MS#2_SUB#2 | LA50~LA54 | 1 | 1 |
| | L2P_MS#2_SUB#3 | LA55~LA59 | 1 | 1 |
| L2P_MS#3 | L2P_MS#3_SUB#0 | LA60~LA64 | 1 | 1 |
| | L2P_MS#3_SUB#1 | LA65~LA69 | 0 | 0 |
| | L2P_MS#3_SUB#2 | LA70~LA74 | 0 | 0 |
| | L2P_MS#3_SUB#3 | LA75~LA79 | 1 | 1 |

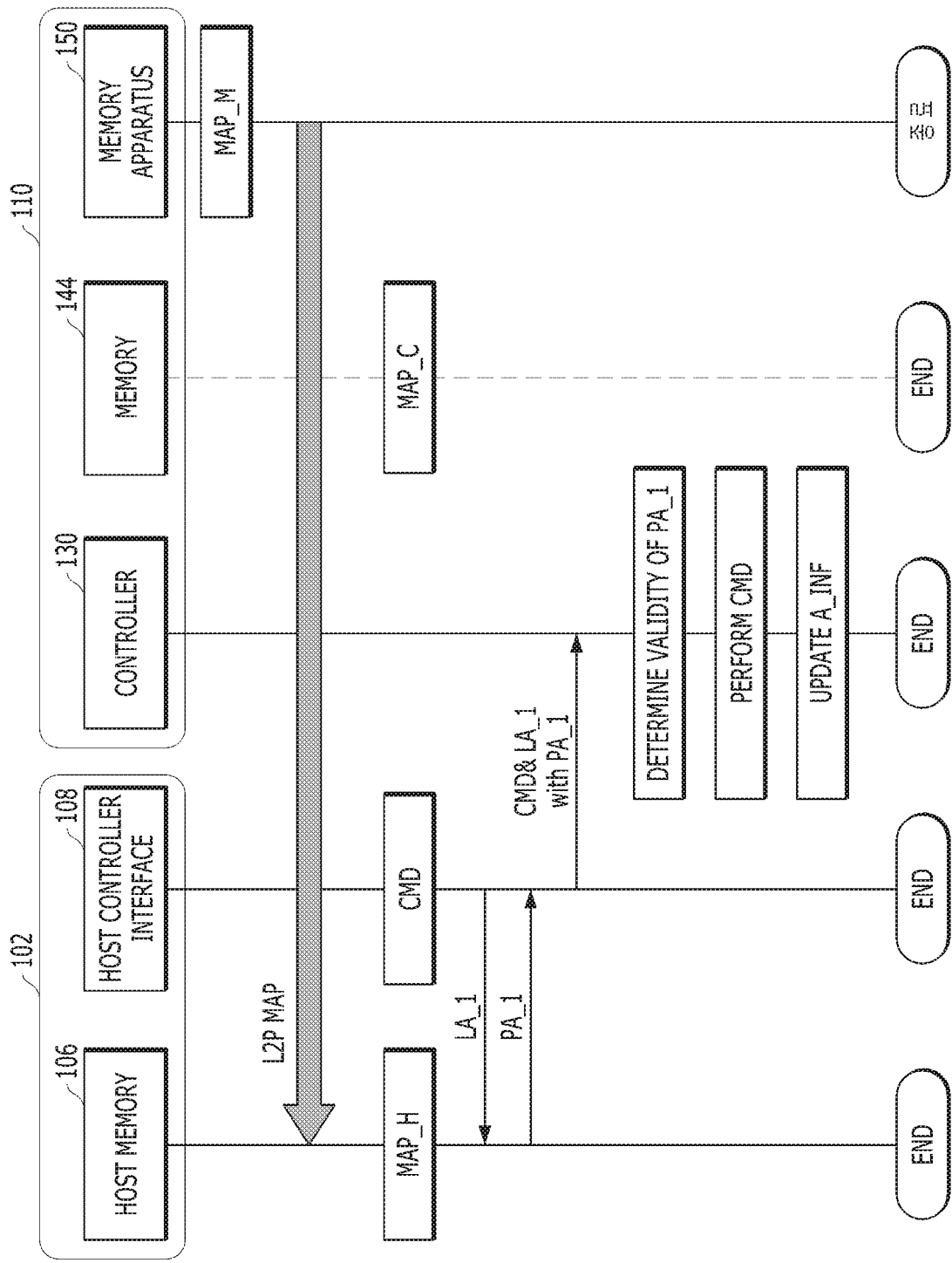

FIG. 40

| Bit<br>Byte | 7 | 6 | 5 | 4 | 3 | 2 | 1 | 0 |
|---|---|---|---|---|---|---|---|---|
| 0 | OPERATION CADE (88h) ||||||||
| 1 | RDPROTECT = 000b ||| DPO | FUA | Reserved | FUA_NV | Reserved |
| 2 | (MSB) |||||||| 
| ... | LOGICAL ADDRESS<br>PHYSICAL ADDRESS ||||||||
| 9 | |||||||(LSB) |
| 10 | (MSB) ||||||||
| ... | TRANSFER LENGTH ||||||||
| 13 | |||||||(LSB) |
| 14 | Ignore | Reserved || GROUP NUMBER |||||
| 15 | CONTROL = 00h ||||||||

FIG. 42B

| L2P_MAP_C | | | before A_INF | after A_INF |
|---|---|---|---|---|
| L2P_MS#0 | L2P_MS#0_SUB#0 | LA0~LA4 | 0 | 0 |
| | L2P_MS#0_SUB#1 | LA5~LA19 | 0 | 0 |
| | L2P_MS#0_SUB#2 | LA10~LA14 | 0 | 0 |
| | L2P_MS#0_SUB#3 | LA15~LA19 | 1 | 1 |
| L2P_MS#1 | L2P_MS#1_SUB#0 | LA20~LA24 | 1 | 1 |
| | L2P_MS#1_SUB#1 | LA25~LA29 | 0 | 1 |
| | L2P_MS#1_SUB#2 | LA30~LA34 | 1 | 1 |
| | L2P_MS#1_SUB#3 | LA35~LA39 | 1 | 1 |
| L2P_MS#2 | L2P_MS#2_SUB#0 | LA40~LA44 | 1 | 1 |
| | L2P_MS#2_SUB#1 | LA45~LA49 | 1 | 1 |
| | L2P_MS#2_SUB#2 | LA50~LA54 | 1 | 1 |
| | L2P_MS#2_SUB#3 | LA55~LA59 | 1 | 1 |
| L2P_MS#3 | L2P_MS#3_SUB#0 | LA60~LA64 | 1 | 1 |
| | L2P_MS#3_SUB#1 | LA65~LA69 | 0 | 0 |
| | L2P_MS#3_SUB#2 | LA70~LA74 | 0 | 0 |
| | L2P_MS#3_SUB#3 | LA75~LA79 | 1 | 1 |

FIG. 43B

| L2P_MAP_C | | | before A_INF | after A_INF |
|---|---|---|---|---|
| L2P_MS#0 | L2P_MS#0_SUB#0 | LA0~LA4 | 0 | 0 |
| | L2P_MS#0_SUB#1 | LA5~LA19 | 0 | 0 |
| | L2P_MS#0_SUB#2 | LA10~LA14 | 0 | 0 |
| | L2P_MS#0_SUB#3 | LA15~LA19 | 20 | 20 |
| L2P_MS#1 | L2P_MS#1_SUB#0 | LA20~LA24 | 6 | 7 |
| | L2P_MS#1_SUB#1 | LA25~LA29 | 3 | 3 |
| | L2P_MS#1_SUB#2 | LA30~LA34 | 4 | 4 |
| | L2P_MS#1_SUB#3 | LA35~LA39 | 0 | 0 |
| L2P_MS#2 | L2P_MS#2_SUB#0 | LA40~LA44 | 6 | 6 |
| | L2P_MS#2_SUB#1 | LA45~LA49 | 3 | 3 |
| | L2P_MS#2_SUB#2 | LA50~LA54 | 5 | 5 |
| | L2P_MS#2_SUB#3 | LA55~LA59 | 2 | 2 |
| L2P_MS#3 | L2P_MS#3_SUB#0 | LA60~LA64 | 0 | 1 |
| | L2P_MS#3_SUB#1 | LA65~LA69 | 0 | 0 |
| | L2P_MS#3_SUB#2 | LA70~LA74 | 0 | 0 |
| | L2P_MS#3_SUB#3 | LA75~LA79 | 1 | 1 |

FIG. 45

| L2P_MAP_C | | | D_INF | SUM | P_INF_D |
|---|---|---|---|---|---|
| L2P_MS#0 | L2P_MS#0_SUB#0 | LA0~LA4 | 0 | 1 | 4 |
| | L2P_MS#0_SUB#1 | LA5~LA19 | 0 | | |
| | L2P_MS#0_SUB#2 | LA10~LA14 | 0 | | |
| | L2P_MS#0_SUB#3 | LA15~LA19 | 1 | | |
| L2P_MS#1 | L2P_MS#1_SUB#0 | LA20~LA24 | 1 | 3 | 2 |
| | L2P_MS#1_SUB#1 | LA25~LA29 | 1 | | |
| | L2P_MS#1_SUB#2 | LA30~LA34 | 0 | | |
| | L2P_MS#1_SUB#3 | LA35~LA39 | 1 | | |
| L2P_MS#2 | L2P_MS#2_SUB#0 | LA40~LA44 | 1 | 4 | 1 |
| | L2P_MS#2_SUB#1 | LA45~LA49 | 1 | | |
| | L2P_MS#2_SUB#2 | LA50~LA54 | 1 | | |
| | L2P_MS#2_SUB#3 | LA55~LA59 | 1 | | |
| L2P_MS#3 | L2P_MS#3_SUB#0 | LA60~LA64 | 1 | 2 | 3 |
| | L2P_MS#3_SUB#1 | LA65~LA69 | 0 | | |
| | L2P_MS#3_SUB#2 | LA70~LA74 | 0 | | |
| | L2P_MS#3_SUB#3 | LA75~LA79 | 1 | | |

FIG. 46

| L2P_MAP_C | | A_INF | SUM | P_INF_A |
|---|---|---|---|---|
| L2P_MS#0 | L2P_MS#0_SUB#0 | LA0~LA4 | 0 | 1 | 4 |
| | L2P_MS#0_SUB#1 | LA5~LA19 | 0 | | |
| | L2P_MS#0_SUB#2 | LA10~LA14 | 0 | | |
| | L2P_MS#0_SUB#3 | LA15~LA19 | 1 | | |
| L2P_MS#1 | L2P_MS#1_SUB#0 | LA20~LA24 | 1 | 3 | 2 |
| | L2P_MS#1_SUB#1 | LA25~LA29 | 1 | | |
| | L2P_MS#1_SUB#2 | LA30~LA34 | 0 | | |
| | L2P_MS#1_SUB#3 | LA35~LA39 | 1 | | |
| L2P_MS#2 | L2P_MS#2_SUB#0 | LA40~LA44 | 1 | 4 | 1 |
| | L2P_MS#2_SUB#1 | LA45~LA49 | 1 | | |
| | L2P_MS#2_SUB#2 | LA50~LA54 | 1 | | |
| | L2P_MS#2_SUB#3 | LA55~LA59 | 1 | | |
| L2P_MS#3 | L2P_MS#3_SUB#0 | LA60~LA64 | 1 | 2 | 3 |
| | L2P_MS#3_SUB#1 | LA65~LA69 | 0 | | |
| | L2P_MS#3_SUB#2 | LA70~LA74 | 0 | | |
| | L2P_MS#3_SUB#3 | LA75~LA79 | 1 | | |

FIG. 47

| L2P_MAP_C | | A_INF | RANKING | P_INF_A |
|---|---|---|---|---|
| L2P_MS#0 | L2P_MS#0_SUB#0 | LA0~LA4 | 0 | 11 | 1 |
| | L2P_MS#0_SUB#1 | LA5~LA19 | 0 | 11 | |
| | L2P_MS#0_SUB#2 | LA10~LA14 | 0 | 11 | |
| | L2P_MS#0_SUB#3 | LA15~LA19 | 20 | 1 | |
| L2P_MS#1 | L2P_MS#1_SUB#0 | LA20~LA24 | 7 | 2 | 2 |
| | L2P_MS#1_SUB#1 | LA25~LA29 | 3 | 6 | |
| | L2P_MS#1_SUB#2 | LA30~LA34 | 4 | 5 | |
| | L2P_MS#1_SUB#3 | LA35~LA39 | 0 | 11 | |
| L2P_MS#2 | L2P_MS#2_SUB#0 | LA40~LA44 | 6 | 3 | 3 |
| | L2P_MS#2_SUB#1 | LA45~LA49 | 3 | 6 | |
| | L2P_MS#2_SUB#2 | LA50~LA54 | 5 | 4 | |
| | L2P_MS#2_SUB#3 | LA55~LA59 | 2 | 8 | |
| L2P_MS#3 | L2P_MS#3_SUB#0 | LA60~LA64 | 1 | 9 | 4 |
| | L2P_MS#3_SUB#1 | LA65~LA69 | 0 | 11 | |
| | L2P_MS#3_SUB#2 | LA70~LA74 | 0 | 11 | |
| | L2P_MS#3_SUB#3 | LA75~LA79 | 1 | 9 | |

FIG. 48B

| | L2P_MAP_C | D_INF | A_INF | AND | SUM | P_INF_N |
|---|---|---|---|---|---|---|
| L2P_MS#0 | L2P_MS#0_SUB#0 | LA0~LA4 | 0 | 0 | 0 | 0 | 4 |
| | L2P_MS#0_SUB#1 | LA5~LA19 | 0 | 0 | 0 | | |
| | L2P_MS#0_SUB#2 | LA10~LA14 | 1 | 0 | 0 | | |
| | L2P_MS#0_SUB#3 | LA15~LA19 | 0 | 1 | 0 | | |
| L2P_MS#1 | L2P_MS#1_SUB#0 | LA20~LA24 | 0 | 1 | 0 | 1 | 3 |
| | L2P_MS#1_SUB#1 | LA25~LA29 | 0 | 1 | 0 | | |
| | L2P_MS#1_SUB#2 | LA30~LA34 | 1 | 1 | 1 | | |
| | L2P_MS#1_SUB#3 | LA35~LA39 | 1 | 0 | 0 | | |
| L2P_MS#2 | L2P_MS#2_SUB#0 | LA40~LA44 | 1 | 1 | 1 | 4 | 1 |
| | L2P_MS#2_SUB#1 | LA45~LA49 | 1 | 1 | 1 | | |
| | L2P_MS#2_SUB#2 | LA50~LA54 | 1 | 1 | 1 | | |
| | L2P_MS#2_SUB#3 | LA55~LA59 | 1 | 1 | 1 | | |
| L2P_MS#3 | L2P_MS#3_SUB#0 | LA60~LA64 | 1 | 1 | 1 | 2 | 2 |
| | L2P_MS#3_SUB#1 | LA65~LA69 | 1 | 1 | 1 | | |
| | L2P_MS#3_SUB#2 | LA70~LA74 | 1 | 0 | 0 | | |
| | L2P_MS#3_SUB#3 | LA75~LA79 | 1 | 0 | 0 | | |

FIG. 49B

| | L2P_MAP_C | | D_INF | A_INF | OR | D_INF_W | SUM | P_INF_D |
|---|---|---|---|---|---|---|---|---|
| L2P_MS#0 | L2P_MS#0_SUB#0 | LA0~LA4 | 0 | 0 | 0 | 0 | 3 | 4 |
| | L2P_MS#0_SUB#1 | LA5~LA19 | 0 | 0 | 0 | 0 | | |
| | L2P_MS#0_SUB#2 | LA10~LA14 | 1 | 0 | 1 | 2 | | |
| | L2P_MS#0_SUB#3 | LA15~LA19 | 0 | 1 | 1 | 1 | | |
| L2P_MS#1 | L2P_MS#1_SUB#0 | LA20~LA24 | 0 | 1 | 1 | 1 | 6 | 3 |
| | L2P_MS#1_SUB#1 | LA25~LA29 | 0 | 1 | 1 | 1 | | |
| | L2P_MS#1_SUB#2 | LA30~LA34 | 1 | 1 | 1 | 2 | | |
| | L2P_MS#1_SUB#3 | LA35~LA39 | 1 | 0 | 1 | 2 | | |
| L2P_MS#2 | L2P_MS#2_SUB#0 | LA40~LA44 | 1 | 1 | 1 | 2 | 8 | 1 |
| | L2P_MS#2_SUB#1 | LA45~LA49 | 1 | 1 | 1 | 2 | | |
| | L2P_MS#2_SUB#2 | LA50~LA54 | 1 | 1 | 1 | 2 | | |
| | L2P_MS#2_SUB#3 | LA55~LA59 | 1 | 1 | 1 | 2 | | |
| L2P_MS#3 | L2P_MS#3_SUB#0 | LA60~LA64 | 1 | 1 | 1 | 2 | 8 | 2 |
| | L2P_MS#3_SUB#1 | LA65~LA69 | 1 | 1 | 1 | 2 | | |
| | L2P_MS#3_SUB#2 | LA70~LA74 | 1 | 0 | 1 | 2 | | |
| | L2P_MS#3_SUB#3 | LA75~LA79 | 1 | 0 | 1 | 2 | | |

FIG. 50B

| L2P_MAP_C | | | D_INF | A_INF | OR | A_INF_W | SUM | P_INF_A |
|---|---|---|---|---|---|---|---|---|
| L2P_MS#0 | L2P_MS#0_SUB#0 | LA0~LA4 | 0 | 0 | 0 | 0 | 3 | 4 |
| | L2P_MS#0_SUB#1 | LA5~LA19 | 0 | 0 | 0 | 0 | | |
| | L2P_MS#0_SUB#2 | LA10~LA14 | 1 | 0 | 1 | 1 | | |
| | L2P_MS#0_SUB#3 | LA15~LA19 | 0 | 1 | 1 | 2 | | |
| L2P_MS#1 | L2P_MS#1_SUB#0 | LA20~LA24 | 0 | 1 | 1 | 2 | 7 | 2 |
| | L2P_MS#1_SUB#1 | LA25~LA29 | 0 | 1 | 1 | 2 | | |
| | L2P_MS#1_SUB#2 | LA30~LA34 | 1 | 1 | 1 | 2 | | |
| | L2P_MS#1_SUB#3 | LA35~LA39 | 1 | 0 | 1 | 1 | | |
| L2P_MS#2 | L2P_MS#2_SUB#0 | LA40~LA44 | 1 | 1 | 1 | 2 | 8 | 1 |
| | L2P_MS#2_SUB#1 | LA45~LA49 | 1 | 1 | 1 | 2 | | |
| | L2P_MS#2_SUB#2 | LA50~LA54 | 1 | 1 | 1 | 2 | | |
| | L2P_MS#2_SUB#3 | LA55~LA59 | 1 | 1 | 1 | 2 | | |
| L2P_MS#3 | L2P_MS#3_SUB#0 | LA60~LA64 | 1 | 1 | 1 | 2 | 6 | 3 |
| | L2P_MS#3_SUB#1 | LA65~LA69 | 1 | 1 | 1 | 2 | | |
| | L2P_MS#3_SUB#2 | LA70~LA74 | 1 | 0 | 1 | 1 | | |
| | L2P_MS#3_SUB#3 | LA75~LA79 | 1 | 0 | 1 | 1 | | |

FIG. 51

| | L2P_MAP_C | | D_INF | A_INF | AND | A_INF_W | SUM | P_INF_A |
|---|---|---|---|---|---|---|---|---|
| L2P_MS#0 | L2P_MS#0_SUB#0 | LA0~LA4 | 0 | 0 | 0 | 0 | 0 | 4 |
| | L2P_MS#0_SUB#1 | LA5~LA19 | 0 | 0 | 0 | 0 | | |
| | L2P_MS#0_SUB#2 | LA10~LA14 | 1 | 0 | 0 | 0 | | |
| | L2P_MS#0_SUB#3 | LA15~LA19 | 0 | 20 | 0 | 0 | | |
| L2P_MS#1 | L2P_MS#1_SUB#0 | LA20~LA24 | 0 | 7 | 0 | 0 | 5 | 3 |
| | L2P_MS#1_SUB#1 | LA25~LA29 | 0 | 3 | 0 | 0 | | |
| | L2P_MS#1_SUB#2 | LA30~LA34 | 1 | 4 | 1 | 5 | | |
| | L2P_MS#1_SUB#3 | LA35~LA39 | 1 | 0 | 0 | 0 | | |
| L2P_MS#2 | L2P_MS#2_SUB#0 | LA40~LA44 | 1 | 6 | 1 | 7 | 20 | 1 |
| | L2P_MS#2_SUB#1 | LA45~LA49 | 1 | 3 | 1 | 4 | | |
| | L2P_MS#2_SUB#2 | LA50~LA54 | 1 | 5 | 1 | 6 | | |
| | L2P_MS#2_SUB#3 | LA55~LA59 | 1 | 2 | 1 | 3 | | |
| L2P_MS#3 | L2P_MS#3_SUB#0 | LA60~LA64 | 1 | 1 | 1 | 2 | 3 | 2 |
| | L2P_MS#3_SUB#1 | LA65~LA69 | 1 | 0 | 0 | 0 | | |
| | L2P_MS#3_SUB#2 | LA70~LA74 | 0 | 0 | 0 | 0 | | |
| | L2P_MS#3_SUB#3 | LA75~LA79 | 1 | 1 | 0 | 1 | | |

FIG. 52

| L2P_MAP_C | | | D_INF | A_INF | AND | REPRESENTATIVE VALUE | A_INF_W | SUM | P_INF_A |
|---|---|---|---|---|---|---|---|---|---|
| L2P_MS#0 | L2P_MS#0_SUB#0 | LA0~LA4 | 0 | 0 | 0 | 0 | 0 | 0 | 4 |
| | L2P_MS#0_SUB#1 | LA5~LA19 | 0 | 0 | 0 | | 0 | | |
| | L2P_MS#0_SUB#2 | LA10~LA14 | 1 | 0 | 0 | | 0 | | |
| | L2P_MS#0_SUB#3 | LA15~LA19 | 0 | 20 | 0 | | 0 | | |
| L2P_MS#1 | L2P_MS#1_SUB#0 | LA20~LA24 | 0 | 7 | 0 | 1 | 1 | 3 | 2 |
| | L2P_MS#1_SUB#1 | LA25~LA29 | 0 | 3 | 0 | | 1 | | |
| | L2P_MS#1_SUB#2 | LA30~LA34 | 1 | 4 | 1 | | 1 | | |
| | L2P_MS#1_SUB#3 | LA35~LA39 | 1 | 0 | 0 | | 0 | | |
| L2P_MS#2 | L2P_MS#2_SUB#0 | LA40~LA44 | 1 | 6 | 1 | 1 | 1 | 4 | 1 |
| | L2P_MS#2_SUB#1 | LA45~LA49 | 1 | 3 | 1 | | 1 | | |
| | L2P_MS#2_SUB#2 | LA50~LA54 | 1 | 5 | 1 | | 1 | | |
| | L2P_MS#2_SUB#3 | LA55~LA59 | 1 | 2 | 1 | | 1 | | |
| L2P_MS#3 | L2P_MS#3_SUB#0 | LA60~LA64 | 1 | 1 | 1 | 1 | 1 | 2 | 3 |
| | L2P_MS#3_SUB#1 | LA65~LA69 | 1 | 0 | 0 | | 0 | | |
| | L2P_MS#3_SUB#2 | LA70~LA74 | 0 | 0 | 0 | | 0 | | |
| | L2P_MS#3_SUB#3 | LA75~LA79 | 1 | 1 | 0 | | 1 | | |

FIG. 54B

| L2P_MAP_C ||| D_INF |
| L2P_MS | LA | PA | |
|---|---|---|---|
| 5 | 5120 ~ 6143 | 1 ~ 1024 | 0 |
| 6 | 6144 ~ 7167 | 1025 ~ 2048 | 1 |
| 7 | 7168 ~ 8191 | 2049 ~ 3072 | 1 |
| 8 | 8192 ~ 9215 | 3073 ~ 4096 | 1 |
| 9 | 9216 ~ 10239 | 4097 ~ 5120 | 1 |
| 10 | 10240 ~ 11263 | 5121 ~ 6144 | 1 |
| 11 | 11264 ~ 12287 | 6145 ~ 7168 | 0 |
| 12 | 12288 ~ 13311 | 7169 ~ 8182 | 1 |
| 13 | 13312 ~ 14335 | 8193 ~ 9216 | 1 |
| 14 | 14336 ~ 15359 | 9217 ~ 10240 | 1 |

FIG. 56A

| L2P_MS | L2P_MAP_C ||||| EN |
|---|---|---|---|---|---|---|
| | LA ||| PA ||  |
| 5 | 5120 | ~ | 6143 | 1 | ~ | 1024 | 0 |
| 6 | 6144 | ~ | 7167 | 1024 | ~ | 2048 | 0 |
| 7 | 7168 | ~ | 8191 | 2049 | ~ | 3072 | 0 |
| 8 | 8192 | ~ | 9215 | 3073 | ~ | 4096 | 0 |
| 9 | 9216 | ~ | 10239 | 4097 | ~ | 5120 | 0 |
| 10 | 10240 | ~ | 11263 | 5121 | ~ | 6144 | 0 |
| 11 | 11264 | ~ | 12287 | 6145 | ~ | 7168 | 0 |
| 12 | 12288 | ~ | 13311 | 7169 | ~ | 8192 | 0 |
| 13 | 13312 | ~ | 14335 | 8193 | ~ | 9216 | 0 |
| 14 | 14336 | ~ | 15359 | 9217 | ~ | 10240 | 0 |

FIG. 56B

| L2P_MS | L2P_MAP_H ||||| EN |
|---|---|---|---|---|---|---|
| | LA || | PA || |
| 0 | 0 | ~ | 1023 | 10000 | ~ | 11023 | 1 |
| 1 | 1024 | ~ | 2047 | 11024 | ~ | 12047 | 1 |
| 2 | 2048 | ~ | 3071 | 12048 | ~ | 13071 | 1 |
| 3 | 3072 | ~ | 4095 | 13072 | ~ | 14095 | 1 |
| 4 | 4096 | ~ | 5119 | 14096 | ~ | 15119 | 1 |
| 5 | 5120 | ~ | 6143 | 1 | ~ | 1024 | 0 |
| 6 | 6144 | ~ | 7167 | 1024 | ~ | 2048 | 0 |
| 7 | 7168 | ~ | 8191 | 2049 | ~ | 3072 | 0 |
| 8 | 8192 | ~ | 9215 | 3073 | ~ | 4096 | 0 |
| 9 | 9216 | ~ | 10239 | 4097 | ~ | 5120 | 0 |
| 10 | 10240 | ~ | 11263 | 5121 | ~ | 6144 | 0 |
| 11 | 11264 | ~ | 12287 | 6145 | ~ | 7168 | 0 |
| 12 | 12288 | ~ | 13311 | 7169 | ~ | 8192 | 0 |
| 13 | 13312 | ~ | 14335 | 8193 | ~ | 9216 | 0 |
| 14 | 14336 | ~ | 15359 | 9217 | ~ | 10240 | 0 |
| ⋮ | ⋮ | | ⋮ | | | | 1 |
| ⋮ | ⋮ | | ⋮ | | | | 1 |
| n | 1024n | | 1024(n+1)-1 | | | | 1 |

FIG. 56C

| L2P_MS | L2P_MAP_C | | | | | | EN |
|---|---|---|---|---|---|---|---|
| | LA | | | PA | | | |
| 5 | 5120 | ~ | 6143 | 1 | ~ | 1024 | 1 |
| 6 | 6144 | ~ | 7167 | 1024 | ~ | 2048 | 1 |
| 7 | 7168 | ~ | 8191 | 2049 | ~ | 3072 | 1 |
| 8 | 8192 | ~ | 9215 | 3073 | ~ | 4096 | 1 |
| 9 | 9216 | ~ | 10239 | 4097 | ~ | 5120 | 1 |
| 10 | 10240 | ~ | 11263 | 5121 | ~ | 6144 | 1 |
| 11 | 11264 | ~ | 12287 | 6145 | ~ | 7168 | 1 |
| 12 | 12288 | ~ | 13311 | 7169 | ~ | 8192 | 1 |
| 13 | 13312 | ~ | 14335 | 8193 | ~ | 9216 | 1 |
| 14 | 14336 | ~ | 15359 | 9217 | ~ | 10240 | 1 |

FIG. 56D

| L2P_MS | L2P_MAP_H ||||| EN |
|---|---|---|---|---|---|---|
| | LA ||| PA ||  |
| 0 | 0 | ~ | 1023 | 10000 | ~ | 11023 | 1 |
| 1 | 1024 | ~ | 2047 | 11024 | ~ | 12047 | 1 |
| 2 | 2048 | ~ | 3071 | 12048 | ~ | 13071 | 1 |
| 3 | 3072 | ~ | 4095 | 13072 | ~ | 14095 | 1 |
| 4 | 4096 | ~ | 5119 | 14096 | ~ | 15119 | 1 |
| 5 | 5120 | ~ | 6143 | 1 | ~ | 1024 | 1 |
| 6 | 6144 | ~ | 7167 | 1024 | ~ | 2048 | 1 |
| 7 | 7168 | ~ | 8191 | 2049 | ~ | 3072 | 1 |
| 8 | 8192 | ~ | 9215 | 3073 | ~ | 4096 | 1 |
| 9 | 9216 | ~ | 10239 | 4097 | ~ | 5120 | 1 |
| 10 | 10240 | ~ | 11263 | 5121 | ~ | 6144 | 1 |
| 11 | 11264 | ~ | 12287 | 6145 | ~ | 7168 | 1 |
| 12 | 12288 | ~ | 13311 | 7169 | ~ | 8192 | 1 |
| 13 | 13312 | ~ | 14335 | 8193 | ~ | 9216 | 1 |
| 14 | 14336 | ~ | 15359 | 9217 | ~ | 10240 | 1 |
| ⋮ | ⋮ | | ⋮ | | | | 1 |
| ⋮ | ⋮ | | ⋮ | | | | 1 |
| n | 1024n | | 1024(n+1)-1 | | | | 1 |

FIG. 60B

| L2P_MAP_C ||| T_INF |
| L2P_MS | LA | PA | |
|---|---|---|---|
| 5 | 5120 ~ 6143 | 1 ~ 1024 | 5 |
| 6 | 6144 ~ 7167 | 1025 ~ 2048 | 7 |
| 7 | 7168 ~ 8191 | 2049 ~ 3072 | 12 |
| 8 | 8192 ~ 9215 | 3073 ~ 4096 | 16 |
| 9 | 9216 ~ 10239 | 4097 ~ 5120 | 20 |
| 10 | 10240 ~ 11263 | 5121 ~ 6144 | 29 |
| 11 | 11264 ~ 12287 | 6145 ~ 7168 | 35 |
| 12 | 12288 ~ 13311 | 7169 ~ 8182 | 40 |
| 13 | 13312 ~ 14335 | 8193 ~ 9216 | 47 |
| 14 | 14336 ~ 15359 | 9217 ~ 10240 | 53 |

MEMORY SYSTEM FOR UTILIZING A MEMORY INCLUDED IN AN EXTERNAL DEVICE

CROSS-REFERENCE TO RELATED APPLICATIONS

This patent application claims to the benefit of Korean Patent Applications: No. 10-2019-0041418 filed on Apr. 9, 2019; No. 10-2019-0056868 filed on May 15, 2019; No. 10-2019-0088266 filed on Jul. 22, 2019; 10-2019-0088385 filed on Jul. 22, 2019; No. 10-2019-0088353, filed on Jul. 22, 2019; No. 10-2019-0092255, filed on Jul. 30, 2019, and the benefit of U.S. patent applications: Ser. No. 16/709,702 filed on Dec. 10, 2019; Ser. No. 16/717,144 filed on Dec. 17, 2019; Ser. No. 16/842,416 filed on Apr. 7, 2020; Ser. No. 16/837,727 filed on Apr. 1, 2020; Ser. No. 16/837,764 filed on Apr. 1, 2020; Ser. No. 16/797,773 filed on Feb. 21, 2020, the entire disclosures of which is incorporated herein by reference.

TECHNICAL FIELD

An embodiment of the disclosure relates to a memory system and a data processing system including the memory system, and more particularly, to a memory system which is capable of utilizing a memory included in an external device of the data processing system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices include a data storage device operating together with a memory device. The data storage device can be used as a main storage device or an auxiliary storage device of a portable electronic device.

A data storage device using a nonvolatile semiconductor memory device is advantageous in that it has excellent stability and durability because it has no mechanical driving part (e.g., a mechanical arm). Such data storage device also has high data access speed and low power consumption. Examples of data storage devices having such advantages include a USB (Universal Serial Bus) memory device, a memory card having various interfaces, a solid state drive (SSD) or others.

BRIEF DESCRIPTION OF THE DRAWINGS

The description herein makes reference to the accompanying drawings wherein like reference numerals refer to like parts throughout the figures.

FIG. 22A and FIG. 22B illustrate a map management table according to an embodiment of the disclosure.

FIGS. 31A and 31B illustrate an example of a method for performing the read operation by a data processing system, including the memory system illustrated in FIG. 30, according to an embodiment of the disclosure.

FIGS. 32A and 32B illustrate another example of a method for performing the read operation by the data processing system, including the memory system illustrated in FIG. 30, according to an embodiment of the disclosure.

FIGS. 33A and 33B illustrate an example of a method for performing a data prefetch operation by the memory system illustrated in FIG. 30.

FIGS. 35A and 35B illustrate an example of a method of generating, by a memory system according to an embodiment of the disclosure, state information.

FIGS. 38A and 38B illustrate an example of a method of managing dirty information according to an embodiment of the disclosure.

FIGS. 39 and 40 illustrate an example of a method of performing, by a data processing system according to an embodiment of the disclosure, a command operation.

FIGS. 41, 42A, 42B, 43A and 43B illustrate an example of a method of performing, by a memory system according to an embodiment of the disclosure, a command operation.

FIGS. 44 to 47 illustrate an example of a method of performing, by a memory system according to an embodiment of the disclosure, a map uploading operation.

FIGS. 48A to 52 illustrate another example of a method of performing, by a memory system according to an embodiment of the disclosure, a map uploading operation.

FIGS. 54A and 54B are a flowchart and table, respectively, for describing a method in which a memory system according to an embodiment controls temperature thereof through a map download.

FIGS. 56A to 56D are diagrams illustrating examples of map data.

FIGS. 60A and 60B are a flowchart and table, respectively. for describing a method in which the memory system according to an embodiment controls temperature thereof through a map upload.

Figure 1:
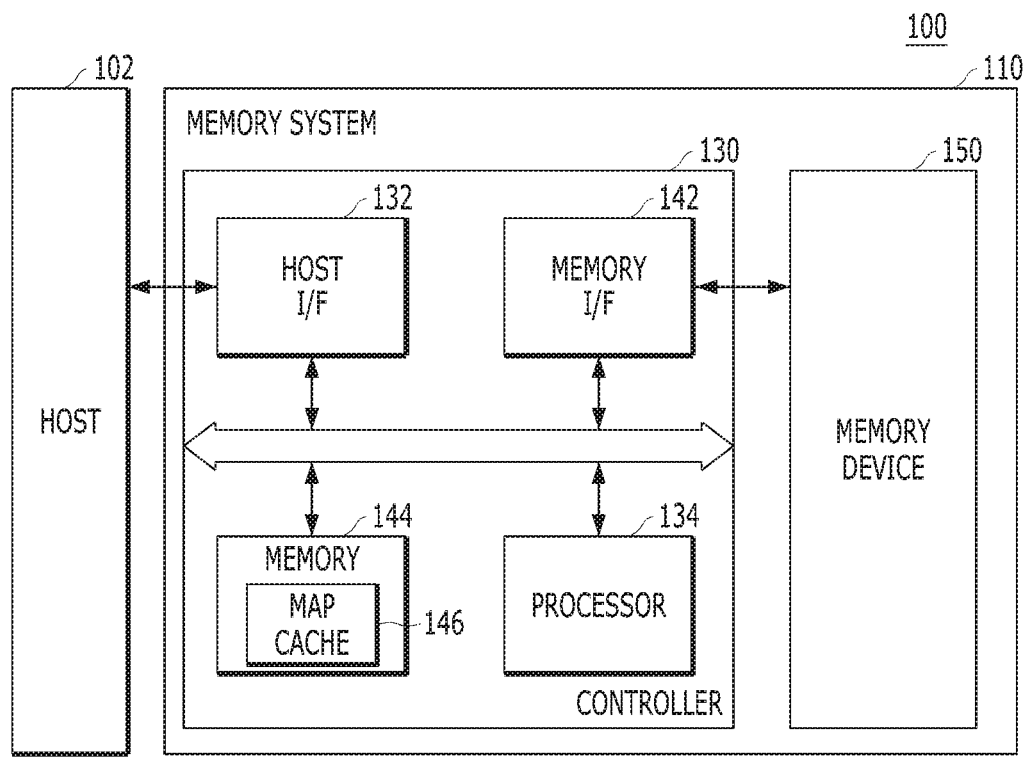
FIG. 1 illustrates a data processing system including a memory system according to an embodiment of the disclosure.

The disclosure includes references to "one embodiment" or "an embodiment" The appearances of the phrases "in one embodiment" or "in an embodiment" do not necessarily refer to the same embodiment. Particular features, structures, or characteristics may be combined in any suitable manner consistent with the disclosure.

DETAILED DESCRIPTION

Various embodiments of the disclosure are described below in with reference to the accompanying drawings. Elements and features of the disclosure, however, may be configured or arranged differently to form other embodiments, which may be variations of any of the disclosed embodiments.

In the disclosure, the terms "comprise," "comprising," "include" and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.). Further, the term "and/or" includes any and all combinations of one or more of the associated listed items.

In the disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, these terms are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Further, this term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

As used in the disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

An embodiment of the disclosure can provide an apparatus or a method for operating a memory system and an external device which can be operatively engaged with the memory system. Specifically, the memory system can transfer map information to the external device. Herein, the map information can be referred as to map data, mapping data or mapping information which can be used for associating two different addresses with each other. Two different addresses may be a kind of means indicating a piece of data or a location where a piece of data is stored. For example, the external device such as a computing device or a host generally uses a logical address, while a nonvolatile memory system uses its own address such as a physical address. Accordingly, the apparatus can be configured to generate the map information for associating the logical address with the physical address. When the external device transfers a request with a logical address, the memory system may perform address translation for finding a physical address corresponding to the logical address, based on the map information.

When the external device may include the map information, the external device can transfer a request along with the logical address which the external device uses for indicating a piece of data and the physical address which the memory system independently uses but the external device does not use. Further, the apparatus can transfer the map information to the external device so that the external device uses the map information to send a request along with two addresses. In this case, the memory system may skip address translation so that an input/output (I/O) throughput may be improved.

An embodiment of the disclosure may provide an apparatus and a method for configuring data transferred between an external device and a memory system. For example, an embodiment may be linked to how the memory system organize data to be transferred to the external device or how map data may be transferred to the external device. Further, an embodiment of the disclosure is linked to how the memory system transfers the map information to the external device or how the memory system utilizes a portion of memory included in the external device. By the way of example but not limitation, an embodiment of the disclosure may provide an apparatus or a method for determining which map information the memory system transfers to the external device. Another embodiment of the disclosure may provide an apparatus or a method for activating or inactivating an operation mode where the memory system or the external device transfers or receives the map information to or from each other. Another embodiment of the disclosure may provide an apparatus or a method for controlling or managing the map information transferred from the memory system and stored in the memory of the external device. Another embodiment of the disclosure may provide an apparatus or a method for checking whether the received or transferred map information is valid and determining whether the external device or the memory system continue to use the received or transferred map information.

An embodiment of the disclosure may provide an apparatus and a method in which a memory system provides a host with map data that is referenced a threshold count or more, thereby allowing a request including a physical address associated with data to be read by the host to be provided to the memory system.

An embodiment of the disclosure may provide an apparatus and a method in which a memory system adjusts a threshold count according to a predetermined condition.

An embodiment of the disclosure may provide a memory system which transmits map data to a computing device or an external device including a host, a data processing system, in which the external device uses the map data to transmit address information, together with an access request, to the memory system, and an apparatus and a method, which may reduce the overhead of the memory system due to the operation of transmitting the map data to the external device.

An embodiment of the disclosure may provide a memory system, a data processing system and a method for driving the memory system and the data processing system, which may reduce the overhead of the memory system due to unnecessary L2P conversion, and thus improve performance speed and efficiency of the command operation of the memory system as the memory device performs a command operation on a physical address inputted, together with a command, from an external device.

As a command operation is performed on a reference physical address inputted from an external device and one or more physical addresses consecutive to the reference physical address, there are provided a memory system, a data processing system and a method for driving the memory system and the data processing system according to various embodiments of the present disclosure, which may reduce command performing speed of the memory system, and thus improve performance speed and efficiency of the command operation of the memory system.

As a sequential access operation is performed when access to data, which are stored in physically consecutive spaces or accessible to consecutive physical addresses, is requested, there are provided a memory system, a data processing system and a method for driving the memory system and the data processing system according to various embodiments of the present disclosure, which may more efficiently access the data.

As read data according to a subsequently expected read request is prefetched when a sequential read operation is performed, there are provided a memory system, a data processing system and a method for driving the memory system and the data processing system according to various embodiments of the present disclosure, which may improve performance of the read operation of the memory system and prevent read disturbance.

An embodiment of the disclosure may provide a memory system, a data processing system and a method for driving the memory system and the data processing system, which may improve performance of an access operation of the memory system by accessing data, requested to be accessed by a host, in an interleaving manner, and thus improve performance of the access operation.

An embodiment of the disclosure may provide a device, an apparatus and method, which can reduce overhead in data transmission between a memory system within a data processing apparatus and a computing apparatus or a host, occurring due to an operation of transmitting, by the memory system, map data, in the data processing apparatus in which the memory system may transmit map data to the computing apparatus or the host and the computing apparatus or the host may transmit an address, together with a command, to the memory system using the map data.

An embodiment of the disclosure may provide a memory system, a data processing system and a method of driving them, which can improve efficiency of map data management by subdividing state information of map data into a plurality of map segment sub-area, instead of a map segment unit of map data, and managing the state information for each divided map segment sub-area.

An embodiment of the disclosure may provide a memory system, a data processing system and a method of driving them, which can reduce overhead of the memory system occurring due to unnecessary L2P conversion and thus improve the execution speed of a command operation of the memory system and efficiency of the command operation, because the memory device performs the command operation on a physical address received from an external device along with a command.

An embodiment of the disclosure may provide a memory system, a data processing system and a method of driving them, which can increase convenience of map data management by changing a value of state information of map data, stored in the memory system and having a bitmap form, a flag form, a table form or a list form, and writing whether the storage location of data corresponding to a given logical address has been changed and an invalid physical address, when the map data accompanied by a change in the storage location of the data stored in the memory system is updated.

An embodiment of the disclosure may provide a memory system, a data processing system and a method of driving them, which can improve the speed of an operation of determining the validity of a physical address and thus improve the speed of a command operation because the memory system determines the validity of a physical address received from an external device along with a command based on state information of map data without separate map data search.

An embodiment of the disclosure may provide a memory system which can differently set a performance condition of a map downloading or map uploading under a specific temperature condition within the memory system, and maintain the temperature thereof in a preset range by controlling the performance of the map downloading or the map uploading according to the set performance condition, thereby improving the reliability of data storage and input/output operations, and a method for driving the same.

An embodiment of the disclosure may provide a device or method which can decide whether to perform a map downloading or map uploading in response to an operation environment, thereby maintaining the lifetime of the memory system or improving data stability or element stability.

In an embodiment, a memory system can include a memory device configured to store a piece of data in a location which is distinguished by a physical address; and a controller configured to generate map data, each piece of map data associating a logical address, inputted along with a request from an external device, with the physical address, to select a piece of map data among the map data based on a status regarding the piece of map data, and to transfer selected map data to the external device.

By the way of example but not limitation, the status regarding the piece of map data can show whether the piece of map data is released, or deleted, in a map cache managed according to one of cache replacement policies employed by the controller.

The status regarding the piece of map data can include a transmission priority determined based on: a read count indicating how many times data associated with the logical address included in the piece of map data is accessed based on at least one read request inputted from the external device; a miss count indicating how many times the at least one read request with no physical address or an invalid physical address is inputted; and a provision count indicating how many time the controller transfers the piece of map data to the external device.

The controller can be configured to adjust a threshold corresponding to the read count, which is used for determining the transmission priority, based on the miss count and the provision count.

The controller can be further configured to monitor the status regarding the piece of map data which is transferred to the external device. The status can include dirty information and access information regarding the piece of map data.

The controller can be further configured to determine a transmission priority based at least on the dirty information and the access information and to select the piece of map data among the map data based on the transmission priority.

The controller can be further configured to measure a temperature of the memory device and to determine a timing of loading the map data stored in the memory device based on the temperature.

The controller can be configured to generate an identifier regarding the piece of map data based on application data associated with the logical address included in the piece of map data, to group the map data into at least one list based on the identifier, and to either store the at least one list in the memory device or transmit the at least one list as the selected map data to the external device.

The application data can include a name and a version of application which generate data associated with the logical address, and the controller is further configured to apply a hash function to the name and the version of the application to generate the identifier.

The controller can be further configured to receive the request, the logical address and the physical address which are inputted from the external device, to determine a type of access operations which are associated with the request, the logical address and the physical address, and to store, or access, the piece of map data in the memory device, based on the type of access operations.

When plural logical addresses and plural physical addresses corresponding to plural requests are individually sequential with each other, the controller can be further configured to sequentially store, or access, pieces of map data associating the plural logical addresses with the plural physical addresses in the memory device.

In another embodiment, a controller can operate between plural devices, each device including an independent address scheme to indicate a location in which a piece of data is stored. The controller can be configured to perform an operation in response to a request inputted from one of the plural devices, to generate map data, each piece of map data associating a logical address with a physical address used in the plural devices, to select a piece of map data among the map data based on a status regarding the piece of map data, and to transfer selected map data to the external device.

The status regarding the piece of map data can show whether the piece of map data is released, or deleted, in a map cache managed according to one of cache replacement policies employed by the controller.

The status regarding the piece of map data can include a transmission priority determined based on: a read count indicating how many times data associated with the logical address included in the piece of map data is accessed based on at least one read request inputted from the external device; a miss count indicating how many times the at least one read request with no physical address or an invalid physical address is inputted; and a provision count indicating how many time the controller transfers the piece of map data to the external device.

The controller can be further configured to monitor the status regarding the piece of map data which is transferred to the external device. The status can include dirty information and access information regarding the piece of map data.

The controller can be further configured to measure a temperature of the memory device and to determine a timing of loading the map data stored in the memory device based on the temperature.

The controller can be configured to generate an identifier regarding the piece of map data based on application data associated with the logical address included in the piece of map data, to group the map data into at least one list based on the identifier, and to either store the at least one list in the memory device or transmit the at least one list as the selected map data to the external device.

The controller can be further configured to receive the request, the logical address and the physical address which are inputted from the external device, to determine a type of access operations which are associated with the request, the logical address and the physical address, and to store, or access, the piece of map data in the memory device, based on the type of access operations.

In another embodiment, a method for operating a memory system, including a memory device configured to store a piece of data in a location which is distinguished by a physical address, can include generating map data, each piece of map data associating a logical address, inputted along with a request from an external device, with the physical address; selecting a piece of map data among the map data based on a status regarding the piece of map data; and transferring selected map data to the external device.

The status can be determined based on a read count, a miss count, a provision count, cache release, dirty information or access information regarding the peace of map data.

Hereinafter, embodiments of the disclosure will be described in detail with reference to the accompanying drawings.

FIG. 1 is a block diagram illustrating a data processing system 100 including a memory system according to an embodiment of the disclosure.

Referring to FIG. 1, the data processing system 100 may include a host 102 and a memory system 110.

The host 102 may include any of various portable electronic devices or any of various non-portable electronic devices. The portable electronic devices may include a mobile phone, an MP3 player, a laptop computer, and so on, and the non-portable electronic devices may include a desktop computer, a game machine, a television (TV), a projector, and so on.

The host 102 may include at least one operating system (OS), which may manage and control overall functions and operations of the host 102, and provide an operation between the host 102 and a user using the data processing system 100 or the memory system 110. The OS may support functions and operations corresponding to the use purpose and usage of the user. For example, the OS may be divided into a general OS and a mobile OS depending on the mobility of the host 102. The general OS may be divided into a personal OS and an enterprise OS depending on the environment of the user.

The memory system 110 may operate to store data for the host 102 in response to a request of the host 102. The memory system 110 may include any of a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card, a memory stick, and so on. The MMC may include an embedded MMC (eMMC), a reduced size MMC (RS-MMC), a micro-MMC, or the like. The SD card may include a mini-SD card, a micro-SD card, or the like.

The memory system 110 may be implemented with various types of storage devices. Such storage devices may include, but are not limited to, volatile memory devices, such as a dynamic random access memory (DRAM) and a static RAM (SRAM), and nonvolatile memory devices, such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM), a flash memory, and so on. The flash memory may have a 3-dimensional (3D) stack structure.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, an operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, a compact flash (CF) card, smart media (SM) card, a memory stick, a multimedia card (MMC) such as a reduced size MMC (RS-MMC) or a micro-MMC, a secure digital (SD) card including a mini-SD card, a micro-SD card, or an SDHC card, or a universal flash storage (UFS) device.

The memory device 150 may be a nonvolatile memory device that retains data stored therein even though power is not supplied. The memory device 150 may store data provided by the host 102 in a write operation, and provide data stored therein to the host 102 in a read operation. The memory device 150 may include a plurality of memory blocks each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided by the host 102 in the memory device 150. For this operation, the controller 130 may control read, program (or write), and erase operations of the memory device 150.

The controller 130 may include a host interface (I/F) 132, a processor 134, a memory I/F 142, and a memory 144.

The host I/F 132 may be configured to process a command and data of the host 102, and may communicate with the host 102 using one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI), integrated drive electronics (IDE), and so on.

The host I/F 132 may be driven through firmware referred to as a host interface layer (HIL) in order to exchange data with the host 102.

The memory I/F 142 may serve as a memory storage interface for interfacing the controller 130 and the memory device 150 such that the controller 130 controls the memory device 150 in response to a request from the host 102. When the memory device 150 is a flash memory, e.g., a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150. According to an embodiment, the memory I/F 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The processor 134 may control the overall operations of the memory system 110. The processor 134 may drive firmware to control the overall operations of the memory system 110. The firmware may be referred to as a flash translation layer (FTL). Also, the processor 134 may be implemented with a microprocessor or a central processing unit (CPU).

Also, the controller 130 may perform a background operation onto the memory device 150 through the use of the processor 134. For example, the background operation performed onto the memory device 150 may include a garbage collection (GC) operation, a wear-leveling (WL) operation, a map flush operation, or a bad block management operation.

The memory 144 may serve as a working memory of the memory system 110 and the controller 130, and store data for driving the memory system 110 and the controller 130.

The memory 144 may be embodied by a volatile memory. For example, the memory 144 may be embodied by a static random access memory (SRAM) or a dynamic random access memory (DRAM). The memory 144 may be disposed within or out of the controller 130. FIG. 1 exemplifies the memory 144 disposed within the controller 130. In another embodiment, the memory 144 may be embodied by an external volatile memory having a memory interface transferring data between the memory 144 and the controller 130.

As described above, the memory 144 may store data required for performing a data write/read operation between the host 102 and the memory device 150 and data when the data write/read operation is performed. In order to store such data, the memory 144 may include a program memory, a data memory, a write buffer/cache, a read buffer/cache, a data buffer/cache, a map buffer/cache, or the like.

FIG. 1 shows the memory 144 that includes a map cache 146. The map cache 146 may store map information. The map information may be used to map a logical address to a physical address. The map information will be described in detail with reference to FIG. 3. The map cache 146 may store the map information under the control of the processor 134. Since the map cache 146 has a limited storage space, it may store some of map information stored in the memory device 150. For example, the map cache 146 may store map information for recently processed data. In another example, the map cache 146 may store map information for data that is frequently processed. The map cache 146 may store the map information according to a first-in-first-out (FIFO) scheme.

Although not shown in the drawings, the controller 130 may further include an error correction code (ECC) circuitry and a power management unit (PMU).

The ECC circuitry may process data read from or data to be programmed in the memory device 150 in order to detect and correct a failure bit of data read from the memory device 150, and the ECC unit may include an ECC encoder and an ECC decoder.

The ECC encoder may perform an ECC encoding operation on the data to be programmed in the memory device 150 so as to generate a parity bit added to the data. The data and the parity bit may be stored in the memory device 150. The ECC decoder may detect and correct a failure bit included in the data read from the memory device 150 when reading the data stored in the memory device 150.

The ECC circuitry may perform error correction through a coded modulation using one or more of Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM), Block coded modulation (BCM), and so on. However, the ECC circuitry is not limited to any specific structure. The ECC circuitry may include all circuits, modules, systems, or devices for the error correction.

The power management unit (PMU) may include circuitry configured to control electrical power provided in the controller 130. The PMU may monitor the electrical power supplied to the memory system 110 (e.g., a voltage supplied to the controller 130) and provide the electrical power to components included in the controller 130. The PMU can not only detect power-on or power-off, but also generate a trigger signal to enable the memory system 110 to back up a current state urgently when the electrical power supplied to the memory system 110 is unstable. In an embodiment, the PMU may include a device or a component capable of accumulating electrical power that may be used in an emergency.

Figure 2:
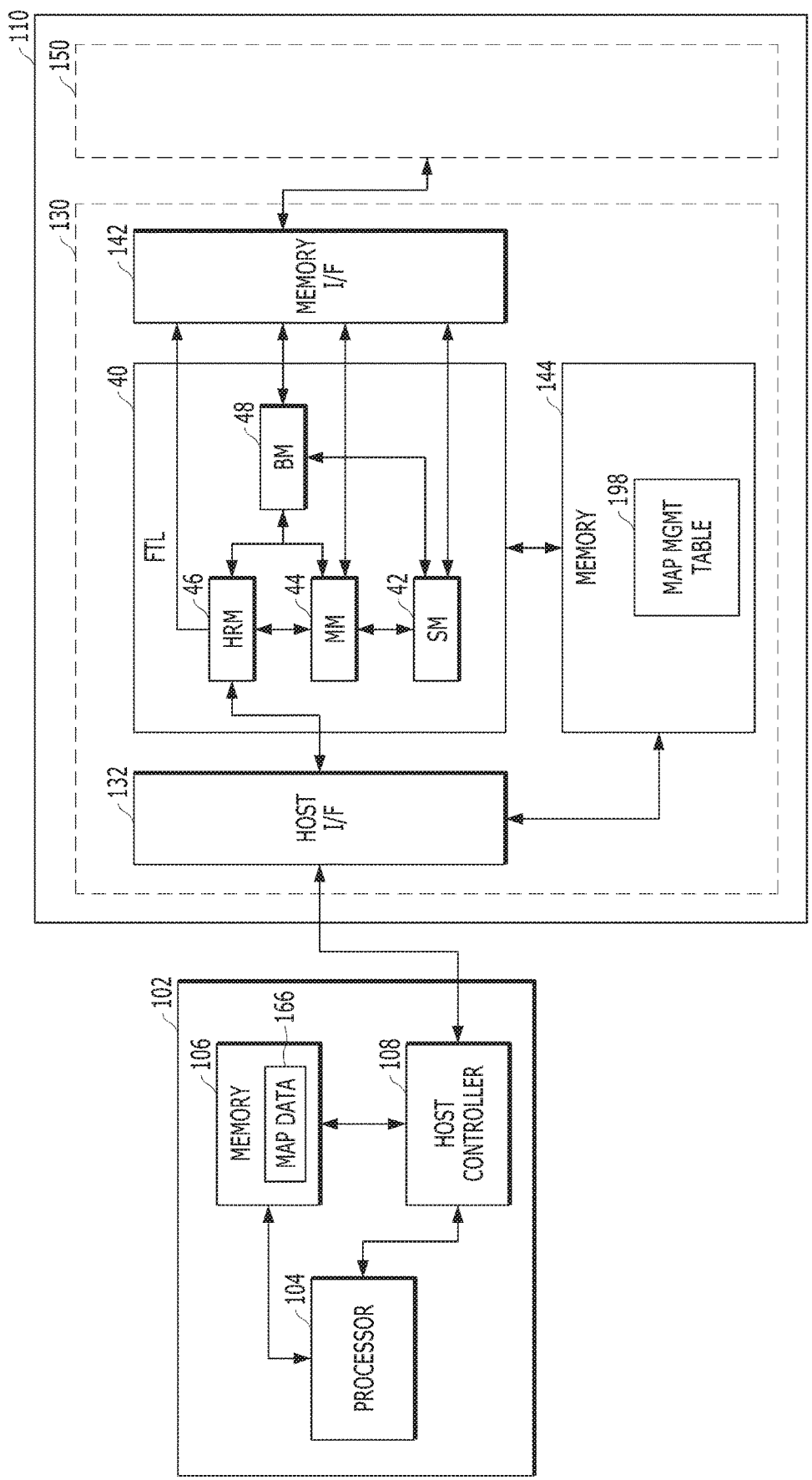
FIG. 2 illustrates a data processing system according to an embodiment of the disclosure.

Referring to FIG. 2, the host 102 may include a processor 104, a host cache 106, and a host controller 108. The host controller 108 may communicate with the memory system 110 through at least one of various interface protocols. The memory system 110 may include a memory controller 130 and a memory device 150.

The memory controller 130 may include a host interface (I/F) 132, a flash translation layer (FTL) 40, a memory interface (I/F) 142, and a memory 144, which cooperate with one another.

The host interface 132 may process requests of the host 102 and data. The host interface 132 may be configured to communicate with the host 102 through at least one of various interface protocols, such as a universal serial bus (USB), a multi-media card (MMC), a peripheral component interconnection-express (PCI-e or PCIe), a serial attached SCSI (SAS), a serial advanced technology attachment (SATA), a parallel advanced technology attachment (PATA), a small computer system interface (SCSI), an enhanced small disk interface (ESDI), an integrated device electronics (IDE), and/or a mobile industry processor interface (MIPI).

The memory interface 142 may serve as a memory/storage interface for interfacing between the memory controller 130 and the memory device 150 such that the memory controller 130 controls the memory device 150 in response to requests from the host 102. When the memory device 150 is a flash memory, particularly, a NAND flash memory, the memory interface 142 may generate a control signal for the memory device 150 and process data, which is provided to the memory device 150, under the control of a processor 134. The memory interface 142 may operate as an interface for processing commands and data between the memory controller 130 and the memory device 150, for example, a NAND flash interface.

The memory 144 may serve as a working memory of the memory system 110 and the memory controller 130, and store data for driving the memory system 110 and the memory controller 130. The memory controller 130 may control the memory device 150 to perform read, program, and erase operations in response to requests from the host 102. The memory controller 130 may provide the host 102 with data read from the memory device 150 and store data provided from the host 102 in the memory device 150. The memory 144 may further store map management data 198 in a map management (MGMT) table. According to an embodiment, the map management data 198 may be included in the map cache 146 shown in FIG. 1.

The FTL 40 may include a host request manager (HRM) 46 for managing a host request received from the host interface 132, a map manager (MM) 44 for managing map data, a status manager (SM) 42 for performing garbage collection (GC) or wear leveling (WL), and a block manager (BM) 48 for executing a command on a block in the memory device 150.

The HRM 46 may process a read request, a write request, and an event-based request received from the host interface 132, using the MM 44 and the BM 48. The HRM 46 may provide a search request to the MM 44 in order to understand physical addresses corresponding to logical addresses of the received requests, provide a read request to the memory interface 142 with respect to the physical addresses, and process the read request. On the other hand, the HRM 46 may first write data to a specific page (i.e., a page that has not been written to or contains no data) of the memory device 150 by transmitting a write request to the BM 48, and then update mapping information between logical addresses and physical addresses by providing a map update request for the write request to the MM 44.

The BM 48 may convert a write request made by the HRM 46, the MM 44, and the SM 42 into a program command for the memory device 150, and manage a block in the memory device 150. In order to maximize the write performance of the memory system 110 (see FIG. 2), the BM 48 may collect a write request and send a program command for multiple planes and one-shot program operations to the memory interface 142. Furthermore, in order to maximize parallel processing of multiple channels and multidirectional flash controllers, the BM 48 may provide various program commands to the memory interface 142.

The BM 48 may manage a flash block according to the number of valid pages. When a free block is needed, the BM 48 may select and erase a block with no valid page. When garbage collection is needed, the BM 48 may select a block including the smallest number of valid pages. In order for the BM 48 to have sufficient empty blocks, the SM 42 may perform garbage collection to collect valid data, move the collected valid data to an empty block, and delete blocks from which the valid data have been moved. When the BM 48 provides the SM 42 with information on a block to be deleted, the GC/WL 42 may first check all flash pages of the block to be deleted and check whether each page is valid. For example, in order to determine the validity of each page, the SM 42 may identify a logical address stored in the out-of-band (OOB) area of each page and then compare an actual address of the page with an actual address mapped to a logical address obtained from an inquiry request of the MM 44. The SM 42 may provide the BM 48 with a write request of each valid page. When the program operation is completed, the MM 44 may update a mapping table.

The MM 44 may manage a mapping table including mapping information between logical addresses and physical addresses and process requests such as inquires and updates generated by the HRM 46 and the SM 42.

The MM 44 may store memory map segments in the memory device 150 and cache mapping items according to the capacity of the memory 144. When a map cache miss occurs while the MM 44 processes search and update requests, the MM 44 may provide a read request to the memory interface 142 and load a mapping table stored in the memory device 150. The MM 44 may provide the memory map segment stored in the memory device 150 to the host cache 106 based on the read count threshold of the memory map segment. The MM 44 may adjust the read count threshold based on the provision count and the miss count.

When the number of dirty cache blocks of the MM 44 exceeds a specific threshold value, the MM 44 may generate a clean cache block by providing a write request to the BM 48 and store a dirty map table in the memory device 150.

When garbage collection is performed, the HRM 46 may program the latest version of data for the same logical address of a page and issue an update request simultaneously while the SM 42 copies a valid page. When the SM 42 requests a map update in a state in which the copy of the valid page is not normally completed, the MM 44 may not update the mapping table. The MM 44 may perform the map update only when the latest map table still indicates a previous actual address, thereby ensuring accuracy.

According to an embodiment, the memory device 150 may be a flash memory, for example, a nonvolatile memory such as a NAND flash memory. However, the memory device 150 may also be implemented as any one of various memories, such as a phase-change random access memory (PCRAM), a resistive random access memory (RRAM or ReRAM), a ferroelectrics random access memory (FRAM), and/or a spin transfer torque magnetic random access memory (STT-RAM or STT-MRAM).

The memory device 150 may include a plurality of memory blocks, each of which may be a single level cell (SLC) memory block of SLCs each of which stores one bit of data, or a multi-level cell (MLC) memory block of MLCs each of which stores a plurality of bits of data. The SLC memory block may include a plurality of pages implemented with SLCs. The SLC memory block may have high durability and quick data operation performance. The MLC memory block may include a plurality of pages implemented with MLCs. The MLC memory block may have a larger data storage space than the SLC memory block. That is, the MLC memory block may be highly integrated.

The memory device 150 may be implemented as a two-dimensional or three-dimensional memory device. Each memory block in the memory device 150 may include a plurality of NAND strings extending along three mutually orthogonal directions. Each of the NAND strings may be electrically connected to a bit line, at least one string selection line, at least one ground selection line, a plurality of word lines, at least one dummy word line, and a common source line, and may include a plurality of transistor structures.

The host 102 may include the processor 104 and the host cache 106, which gives the host 102 higher performance and larger capacity as compared with the memory system 110. Unlike the memory system 110, the processor 104 and the host cache 106 have a small spatial limitation and hardware upgrade of the processor 104 and the host cache 106 is feasible as needed. Accordingly, in order to improve operational efficiency, the memory system 110 may utilize resources of the host 102.

As the amount of data stored by the memory system 110 increases, the amount of corresponding metadata that is stored in the memory system 110 also increases. Since the space of the memory 144 in which the memory controller 130 may load metadata is limited, the increased amount of metadata imposes a burden on the operation of the memory controller 130. For example, due to the limited available space in the memory 144 for metadata, the memory controller 130 may only load some, not all, of the metadata. In a case where a piece of metadata to be accessed by the host 102 is not included in the portion of metadata loaded, when some of the loaded metadata has been updated, the memory controller 130 needs to store the metadata again in the memory device 150 and read metadata corresponding to the piece to be accessed by the host 102 from the memory device 150. Such operations may be performed as needed in order for the memory controller 130 to perform a read or write operation required by the host 102, and may degrade the operational performance of the memory system 110.

According to an embodiment, the storage space of the host cache 106 in the host 102 may be up to thousands of times larger than the memory 144 available by the memory controller 130. Accordingly, the memory system 110 may provide the host cache 106 with map data used by the memory controller 130, thereby allowing the host cache 106 to be used as a cache memory for an address translation process performed by the memory system 110. In such a case, based on map data 166 cached in the host cache 106, the host 102 may translate a logical address into a physical address and then provide the physical address to the memory system 110 together with a request. In that case, the memory system 110 need not translate the logical address into the physical address. Rather, the memory system 110 need only access the memory device 150 based on the provided physical address. In such a case, it is possible to reduce the operation burden on the memory controller 130 in using the memory 144, so that the operational efficiency of the memory system 110 may be improved.

Even though the memory system 110 provides the map data to the host 102, the memory system 110 may still perform update, deletion, and generation of the map data. This is because the memory controller 130 performs a background operation such as garbage collection and wear leveling according to the operation state of the memory device 150 and determines a physical position of the memory device 150 in which data received from the host 102 is stored, so that a physical address of data in the memory device 150 may be changed by the memory controller 130.

That is, when it is determined that the map data 166 provided to the host 102 needs to be updated in the process of managing the map data 166, the memory system 110 may request the host 102 to update the map data 166. According to an embodiment, when a memory map segment is provided to the host 102 and then is changed, the memory system 110 may store, in the memory 144, a flag indicating that the memory map segment has been changed. The memory system 110 may provide the host 102 with the changed memory map segment at a set time or cycle. In response to a request of the memory system 110, the host 102 may update the map data 166 cached in the host cache 106. In this way, the map data 166 may be kept up to date, and even though the host controller 108 translates an address value to be transmitted to the memory system 110 using the map data 166, the operation may be performed without error.

Map data between logical addresses and physical addresses may include logical-to-physical (L2P) map data for checking physical addresses corresponding to logical addresses and physical-to-logical (P2L) map data for checking logical addresses corresponding to physical addresses. The map data 166 may include L2P map data for checking physical addresses corresponding to logical addresses. The P2L map data is mainly used for an internal operation of the memory system 110 and might be not used for an operation in which the host 102 stores data in the memory system 110 or reads data corresponding to a specific logical address from the memory system 110. According to an embodiment, the memory system 110 may not transmit the P2L map data to the host 102.

The memory controller 130 may store map data in the memory device 150 while managing (e.g., generating, deleting, and updating) the map data. Since the host cache 106 is a volatile memory device, the map data 166 cached in the host cache 106 may be lost as a result of an event such as interruption of the supply of power to the host 102 and the memory system 110. Accordingly, the memory controller 130 in the memory system 110 may keep the map data 166 cached in the host cache 106 up to date and store the latest L2P map data or P2L map data in the memory device 150.

The host 102 and the memory system 110 may include a controller or an interface for transmitting and receiving a signal, data, and others, under a predetermined protocol. The memory system 110 may transfer map data to the host 102. For example, the host interface 132 in the memory system 110 may include an apparatus capable of transmitting a signal, data, and others to the host 102 or receiving a signal, data, and others inputted from the host 102.

The host interface 132 included in the controller 130 may receive a signal, a command (or a request), or data inputted from the host 102. The host 102 and the memory system 110 may use a predetermined protocol to transmit and receive data between the host 102 and the memory system 110. An example of protocols or interfaces, supported by the host 102 and the memory system 110 for sending and receiving a piece of data, can include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIS), Serial-attached SCSI (SAS), Serial Advanced Technology Attachment (SATA), Mobile Industry Processor Interface (MIPI), or others. In an embodiment, the host interface 132 may exchange data with the host 102 and is implemented with, or driven by, firmware called a host interface layer (HIL).

The Integrated Drive Electronics (IDE) or Advanced Technology Attachment (ATA), used as one of the interfaces for transmitting and receiving data, can use a cable including 40 wires connected in parallel to support data transmission and reception between the host 102 and the memory system 110. When a plurality of memory systems 110 are connected to a single host 102, the plurality of memory systems 110 may be divided into a master or a slave by using a position or a dip switch to which the plurality of memory systems 110 are connected. The memory system 110 set as the master may be used as the main memory device. The IDE (ATA) has evolved into Fast-ATA, ATAPI, and Enhanced IDE (EIDE).

Serial Advanced Technology Attachment (SATA) is a serial data communication interface that is compatible with various ATA standards of parallel data communication interfaces which is used by Integrated Drive Electronics (IDE) devices. The forty wires in the IDE interface can be reduced to six wires in the SATA interface. For example, 40 parallel signals for the IDE can be converted into 6 serial signals for the SATA to be transmitted between each other. The SATA has been widely used because of its faster data transmission and reception rate and its less resource consumption in the host 102 used for data transmission and reception. The SATA may support connection with up to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely detached like an external hard disk.

The Small Computer System Interface (SCSI) is a serial data communication interface used for connection between a computer, a server, and/or another peripheral device. The SCSI can provide a high transmission speed, as compared with other interfaces such as the IDE and the SATA. In the SCSI, the host 102 and at least one peripheral device (e.g., the memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. ×1, ×4, ×8, ×16, etc.), to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the nonvolatile memory system 110, such as an SSD, which operates at a higher speed than a hard disk.

In an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, or others. A plurality of peripheral devices such as the memory system 110 may be coupled to a single transceiver included in the host 102.

Also, for the sake of convenience in description, a case where the controller 130 may perform command operations in the memory system 110 according to the embodiment of the disclosure is described as an example. However, as described above, the processor 134 included in the controller 130 may perform the command operations using FTL. For example, according to the embodiment of the disclosure, the controller 130 may program and store user data and metadata corresponding to the write commands received from the host 102 in arbitrary memory blocks of a plurality of memory blocks included in the memory device 150, read user data and metadata corresponding to the read commands received from the host 102 from arbitrary memory blocks of the plurality of memory blocks included in the memory device 150 and provide the host 102 with the read user data and metadata, or erase user data and metadata corresponding to the erase commands received from the host 102 from arbitrary memory blocks of the plurality of memory blocks included in the memory device 150.

Herein, the metadata may include logical-to-physical (L2P) information and physical-to-logical (P2L) information on data stored in memory blocks in a program operation. The metadata may also include information on command data corresponding to a command received from the host 102, information on a command operation corresponding to a command, information on memory blocks of the memory device 150 on which the command operation is performed, and map information corresponding to the command operation. In other words, the metadata may include all other information and data except for user data corresponding to a command received from the host 102.

When the controller 130 performs a plurality of command operations corresponding to a plurality of commands received from the host 102, for example, when the controller 130 receives a plurality of write commands from the host 102, the controller 130 may perform program operations corresponding to the write commands. In this case, user data corresponding to the write commands may be written and stored in memory blocks of the memory device 150, for example, empty memory blocks in which an erase operation has been performed, open memory blocks, or free memory blocks among the memory blocks of the memory device 150. Mapping information between logical addresses and physical addresses for the user data stored in the memory blocks, i.e., a L2P map table storing logical information, and mapping information between physical addresses and logical addresses for memory blocks storing the user data, i.e., a P2L map table storing physical information, are written and stored in empty memory blocks, open memory blocks, or free memory blocks among the memory blocks of the memory device 150.

Herein, when the controller 130 receives write commands from the host 102, the controller 130 may write and store user data corresponding to the write commands in memory blocks, and store metadata including map information about the user data stored in the memory blocks in the memory blocks. In particular, the controller 130 may generate and update meta segments of the metadata, that is, L2P segments and P2L segments out of the map segments of the map information, and then store them in the memory blocks of the memory device 150. Herein, the map segments stored in the memory blocks of the memory device 150 may be loaded into the memory 144 included in the controller 130 to update the map segments.

When receiving a plurality of write commands from the host 102, states of a plurality of channels (or ways) for the memory device 150 may be checked, particularly, states of channels (or ways) coupled to a plurality of memory dies included in the memory device 150 may be checked, and then the best transfer channels (or transfer ways) and the best receiving channels (or receiving ways) corresponding to the states of the channels (or ways) may be determined independently. According to the embodiment of the disclosure, user data and metadata corresponding to the write commands may be transferred to corresponding memory dies of the memory device 150 through the best transfer channels (or transfer ways) and stored by performing program operations, and results of the program operations on the corresponding memory dies of the memory device 150 may be received from the corresponding memory dies of the memory device 150 through the best receiving channels (or receive ways), and provided to the host 102.

In addition, when the controller 130 receives a plurality of read commands from the host 102, the controller 130 may read data corresponding to the read commands from the memory device 150, store the read data in the buffer/cache included in the memory 144 of the controller 130, and provide the data stored in the buffer/cache to the host 102.

When the controller 130 receives a plurality of read commands from the host 102, the states of the channels (or ways) for the memory device 150 may be checked, particularly, the states of the channels (or ways) coupled to the memory dies included in the memory device 150 may be checked, and then the best transfer channels (or transfer ways) and the best receiving channels (or receiving ways) corresponding to the states of the channels (or ways) may be independently determined. According to the embodiment of the disclosure, a read request for user data and metadata corresponding to a read command may be transferred to the corresponding memory dies of the memory device 150 through the best transfer channels (or transfer ways) to perform read operations, and results of the read operations on the corresponding memory dies of the memory device 150, i.e., user data and metadata corresponding to the read command, may be received from the corresponding memory dies of the memory device 150 through the best receiving channels (or receiving ways) and provided to the host 102.

Also, when the controller 130 receives a plurality of erase commands from the host 102, the controller 130 may detect memory blocks of the memory device 150 corresponding to the erase commands, and then perform the erase operations onto the detected memory blocks.

According to the embodiment of the disclosure, when the plurality of erase commands are received from the host 102, the states of the channels (or ways) for the memory device 150 may be checked, particularly, the states of the channels (or ways) coupled to the memory dies included in the memory device 150 may be checked, and then the best transfer channels (or transfer ways) and the best receiving channels (or receiving ways) corresponding to the states of the channels (or ways) may be determined independently. According to the embodiment of the disclosure, an erase request for memory blocks in the memory dies of the memory device 150 corresponding to an erase command may be transferred to the corresponding memory dies of the memory device 150 through the best transfer channels (or transfer ways) to perform erase operations, and also results of the erase operations on the corresponding memory dies of the memory device 150 may be received from the corresponding memory dies of the memory device 150 through the best receiving channels (or receiving ways) and provided to the host 102.

In the memory system 110, when a plurality of commands, e.g., a plurality of write commands, a plurality of read commands, and a plurality of erase commands, are received from the host 102, particularly, when the plurality of commands are sequentially and simultaneously received, as described above, the states of the channels (or ways) for the memory device 150 may be checked, and then the best transfer channels (or transfer ways) and the best receiving channels (or receiving ways) corresponding to the states of the channels (or ways) may be determined independently, and the memory device 150 may be requested to perform command operations corresponding to the plurality of commands through the best transfer channels (or transfer ways), particularly, the memory device 150 may be requested to perform the corresponding command operations in a plurality of memory dies included in the memory device 150, and the operation results of the command operations may be received from the memory dies of the memory device 150 through the best receiving channels (or receiving ways). According to the embodiment of the disclosure, the memory system 110 may provide the host 102 with responses to the commands received from the host 102 by matching the commands transferred through the best transfer channels (or transfer ways) with the operation results received through the best receiving channels (or receiving ways).

The controller 130 may check the states of the plurality of channels (or ways) for the memory device 150, particularly, the channels (or ways) between the plurality of memory dies included in the memory device 150 and the controller 130, and then independently determine the best transfer channels (or transfer ways) and the best receiving channels (or receiving ways) for the memory device 150. The controller 130 may also check states of a plurality of channels (or ways) for a plurality of memory systems, particularly, states of channels (or ways) between a master memory system and the other memory systems, e.g., states of channels (or ways) between a master memory system and slave memory systems, and then independently determine the best transfer channels (or transfer ways) and the best receiving channels (or receiving ways) for the memory systems. In other words, according to the embodiment of the disclosure, the controller 130 may check the channels (or ways) for the memory dies of the memory device 150 or check whether the states of the channels (or ways) for the memory systems are a busy state, a ready state, an active state, an idle state, a normal state, or an abnormal state. For example, the controller 130 may determine channels (or ways) of a ready state or an idle state in the normal state as the best channels (or ways). Particularly, according to the embodiment of the disclosure, among the channels (or ways), channels (or ways) whose available capacity is in a normal range and whose operating level is in a normal range may be determined as the best channels. Herein, the operating levels of the channels (or ways) may be determined based on an operation clock, a power level, a current/voltage level, an operation timing, a temperature level, and the like of the channel (or way). Also, according to the embodiment of the disclosure, a master memory system may be determined among a plurality of memory systems based on information of each memory system, for example, the capability of command operations of each memory system, i.e., the capabilities of the command operations in the controller 130 and the memory device 150 that are included in each memory system. The capabilities may include a performance capability, a process capability, a process speed, and a process latency of the command operations. Herein, the master memory system may be determined through competition between the memory systems. For example, the master memory system may be determined through competition based on a coupling rank between the host 102 and the memory systems.

In order to store or read data requested by the host 102 in the memory device 150, the memory system 110 may map a file system used by the host 102 to a storage space of the memory device 150. For example, an address corresponding to the data according to the file system used by the host 102 may be referred to as a 'logical address' or a 'logical block address,' and an address corresponding to the data in the storage space of the memory device 150 may be referred to as a 'physical address' or a 'physical block address.'

When the host 102 transfers a logical address to the memory system 110 with a read command, the memory system 110 may search for a physical address corresponding to the logical address and then output the data stored in a storage space corresponding to the searched physical address. During this operation, mapping may be performed while the memory system 110 searches for the physical address corresponding to the logical address transferred from the host 102.

When the host 102 knows mapped data (hereinafter, referred to as 'map information') in advance, a time required for the memory system 110 to output the data corresponding to the read command, which is transferred by the host 102, may be reduced.

Figure 3:
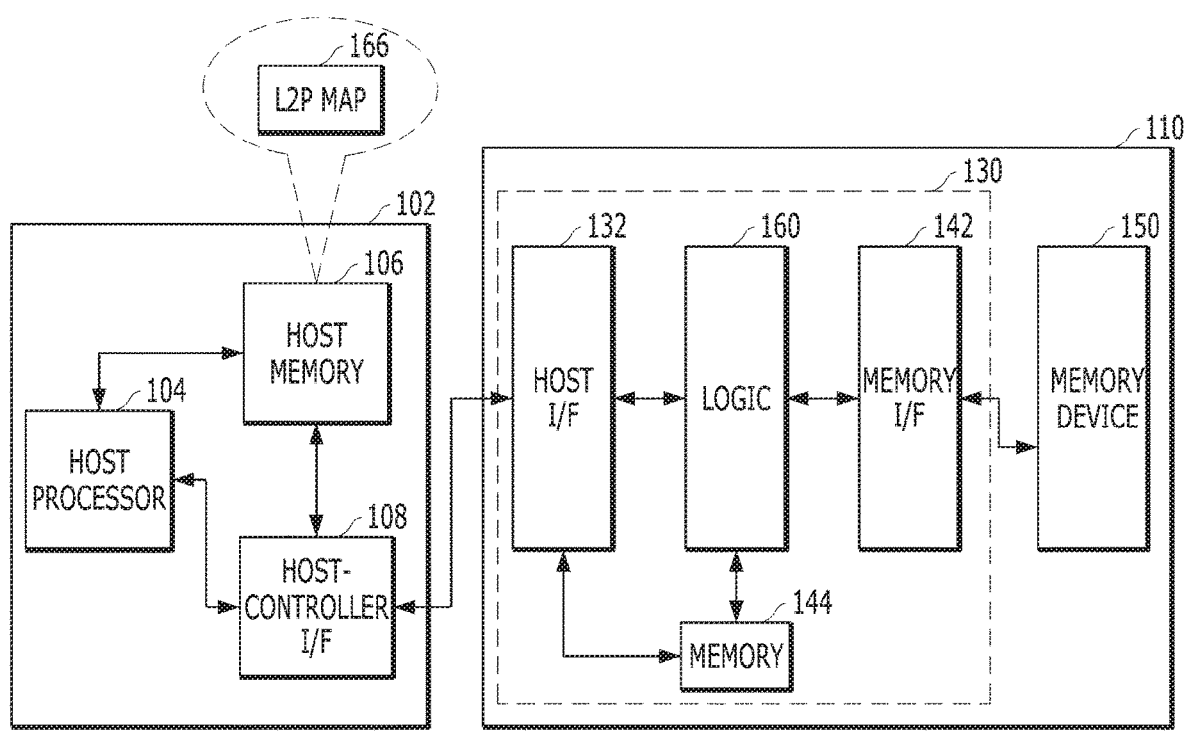
FIGS. 3 and 4 illustrate an example in which a host stores metadata in a host memory according to an embodiment of the disclosure.
Figure 4:
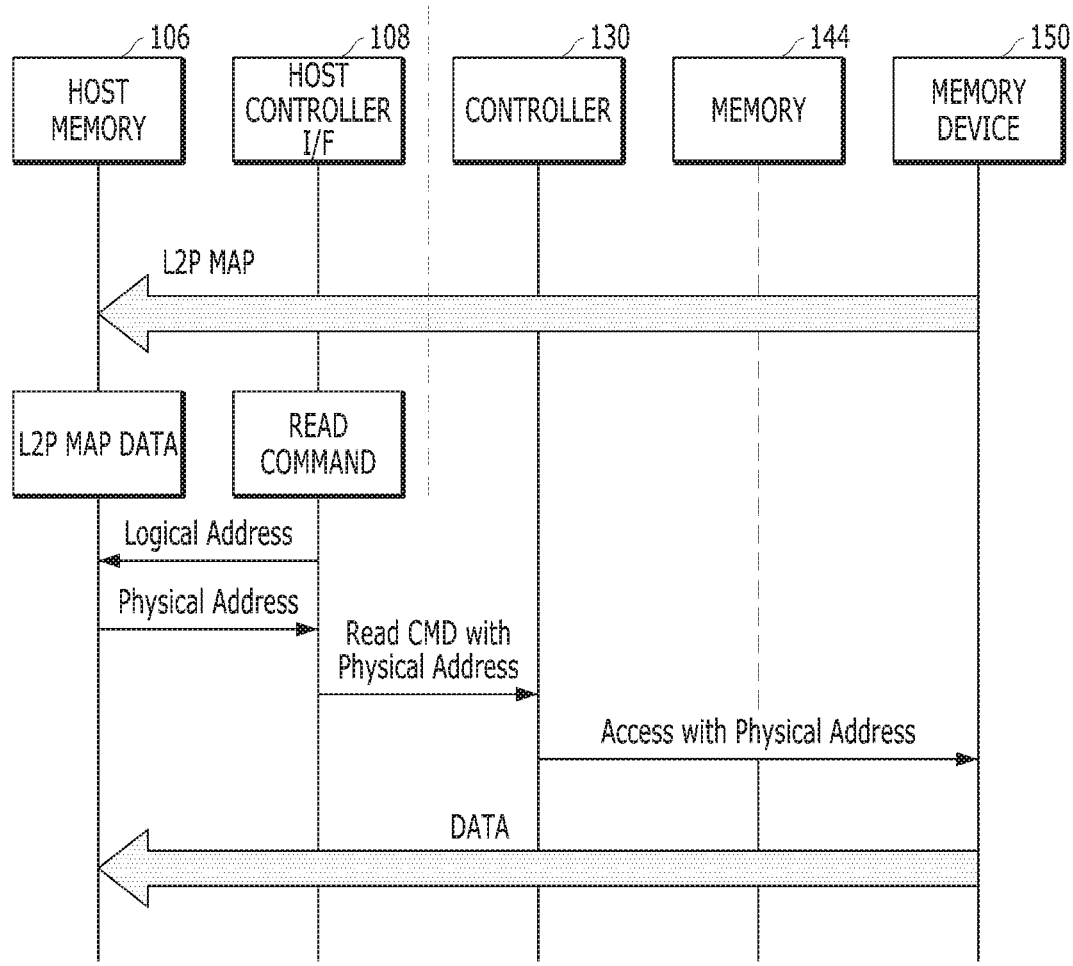

FIGS. 3 and 4 illustrate an example in which a host stores metadata in a host memory according to an embodiment of the disclosure. Referring to FIGS. 3 and 4, an example in which a host 102 stores metadata in a host memory 106 will be described.

Referring to FIG. 3, the host 102 may include a host processor 104, the host memory 106, and a host-controller interface 108. A memory system 110 may include a controller 130 and a memory device 150. The controller 130 may include a host interface 132, a logic block 160, a memory interface 142, and a memory 144. The controller 130 and the memory device 150 described with reference to FIG. 3 may correspond to the controller 130 and the memory device 150 described with reference to FIGS. 1 and 2.

Hereinafter, descriptions will be provided based on a technical difference between the controller 130 and the memory device 150 illustrated in FIG. 3 and the controller 130 and the memory device 150 described with reference to FIGS. 1 and 2. In particular, the logic block 160 in the controller 130 of FIG. 3 may correspond to the flash translation layer (FTL) circuitry 40 described above with reference to FIG. 2. However, according to some embodiments, the logic block 160 in the controller 130 may further perform a role and a function that are not performed in the flash translation layer (FTL) circuitry 40.

In FIG. 3, the host processor 104 may have higher performance and the host memory 106 may have larger capacity than the memory system 110. Unlike the memory system 110, the host processor 104 and the host memory 106 may be advantageous in that they have less space constraints and the hardware of the host processor 104 and the host memory 106 may be upgraded. Therefore, the memory system 110 may utilize resources of the host 102 in order to increase operational efficiency.

As an amount of data that the memory system 110 can store increases, an amount of metadata corresponding to the data stored in the memory system 110 may also increase. Since a space of the memory 144 into which the controller 130 in the memory system 110 may load metadata is limited, the increase in the amount of metadata may be a burden on an operation of the controller 130. For example, the controller 130 may load some but not all of the metadata due to the space constraints in the memory 144. When metadata that is accessed by the host 102 is not included in the partially loaded metadata and some of the loaded metadata is updated, the controller 130 may have to read the metadata accessed by the host 102 from the memory device 150 and store the updated loaded metadata in the memory device 150. These operations may be necessary for the controller 130 to perform a read or write operation required by the host 102, and may degrade the operation performance of the memory system 110.

A storage space of the host memory 106 included in the host 102 may be tens to thousands of times larger than that of the memory 144 that may be used by the controller 130. Accordingly, the memory system 110 may transfer metadata 166 used by the controller 130 to the host memory 106 so that the host memory 106 may be used as a cache memory for an address translation process performed by the memory system 110. In this case, the host 102 may not transfer a logical address with a command to the memory system 110 and may translate the logical address into a physical address based on the metadata 166 stored in the host memory 106 and then transfer the physical address to the memory system 110 along with the command. Accordingly, in this case, the memory system 110 may omit a mapping process for translating the logical address into the physical address and access the memory device 150 based on the physical address transferred from the host 102. As a result, the operational burden occurring when the controller 130 uses the memory 144 may be alleviated, and thus the operational efficiency of the memory system 110 may be significantly increased.

Meanwhile, even though the memory system 110 transfers the metadata 166 to the host 102, the memory system 110 may manage (e.g., update, erase, generate, and the like) sources that become reference for the metadata 166. Since the controller 130 in the memory system 110 may perform background operations, such as a garbage collection operation and a wear leveling operation, according to an operating state of the memory device 150 and determine a physical location (physical address) in the memory device 150, a physical address of data in the memory device 150 may be changed under the control of the controller 130. Therefore, the memory system 110 may take charge of managing the sources that become the reference for the metadata 166.

In other words, when it is determined that the memory system 110 needs to correct or update the metadata 166 transferred to the host 102 in the process of managing the metadata 166, the memory system 110 may request the host 102 to update the metadata 166. The host 102 may update the metadata 166 stored in the host memory 106 in response to the request of the memory system 110. In this way, the metadata 166 stored in the host memory 106 may be kept up to date. Therefore, even though the host controller interface 108 uses the metadata 166 stored in the host memory 106 to perform address mapping, it may not cause a problem in operation.

Meanwhile, the metadata 166 stored in the host memory 106 may include map information for detecting a physical address corresponding to a logical address. Referring to FIG. 2, metadata matching logical addresses and physical addresses to each other may include map information for detecting a physical address corresponding to a logical address and map information for detecting a logical address corresponding to a physical address. The map information for detecting a logical address corresponding to a physical address may be mainly used for an internal operation of the memory system 110, and therefore may not be used when the host 102 stores data in the memory system 110 or reads data corresponding to a specific logical address from the memory system 110.

The controller 130 in the memory system 110 may store map information in the memory device 150 while managing (creating, erasing, updating, etc.) the map information. Since the host memory 106 is a volatile memory, the metadata 166 stored in the host memory 106 may be lost when a power supply interruption occurs in the host 102 and the memory system 110. Accordingly, the controller 130 in the memory system 110 may not only maintain the metadata 166 stored in the host memory 106 up to date but also store the up-to-date map information in the memory device 150.

Referring to FIGS. 3 and 4, when the metadata 166 is stored in the host memory 106, an operation of the host 102 for reading data from the memory system 110 will be described.

Power may be supplied to the host 102 and the memory system 110, and the host 102 and the memory system 110 may interlock. When the host 102 and the memory system 110 interlock, metadata L2P MAP stored in the memory device 150 may be transferred to the host memory 106.

When a read command is generated by the host processor 104, the read command may be transferred to the host controller interface 108. After receiving the read command, the host controller interface 108 may transfer a logical address corresponding to the read command to the host memory 106. Based on the metadata L2P MAP stored in the host memory 106, the host controller interface 108 may detect a physical address corresponding to the logical address.

The host controller interface 108 may transfer a read command Read CMD along with the physical address to the controller 130 in the memory system 110. The controller 130 may access the memory device 150 based on the received read command Read CMD and the physical address. Data stored at a location corresponding to the physical address in the memory device 150 may be transferred to the host 102.

The controller 130 according to the embodiment of the disclosure may omit a process of receiving the logical address from the host 102 and searching for the physical address corresponding to the logical address. In particular, in a process of the controller 130 for searching for the physical address, an operation of reading metadata by accessing the memory device 150 may be omitted. In this way, the process of the host 102 for reading the data stored in the memory system 110 may become faster.

Figure 5:
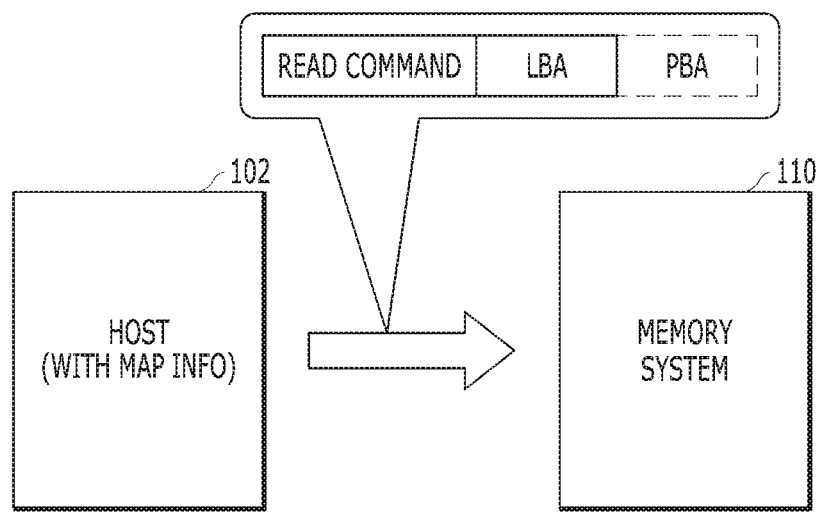
FIG. 5 illustrates a first example of a transaction between a host and a memory system in a data processing system according to an embodiment of the disclosure.

FIG. 5 illustrates a first example of a transaction between the host 102 and the memory system 110 in a data processing system according to an embodiment of the disclosure.

Referring to FIG. 5, the host 102 storing map information MAP INFO may transfer a read command including a logical address LBA and a physical address PBA to the memory system 110. When there is information about the physical address PBA corresponding to the logical address LBA in the host memory 106, the host 102 may transfer the read command including the logical address LBA and the physical address PBA to the memory system 110. However, when there is no information about the physical address PBA corresponding to the logical address LBA in the host memory 106, the host 102 may transfer the read command including only the logical address LBA to the memory system 110.

Although FIG. 5 describes the read command as an example, the concept and spirit of the invention may be applied to a write command or an erase command that the host 102 may transfer to the memory system 110.

Figure 6:
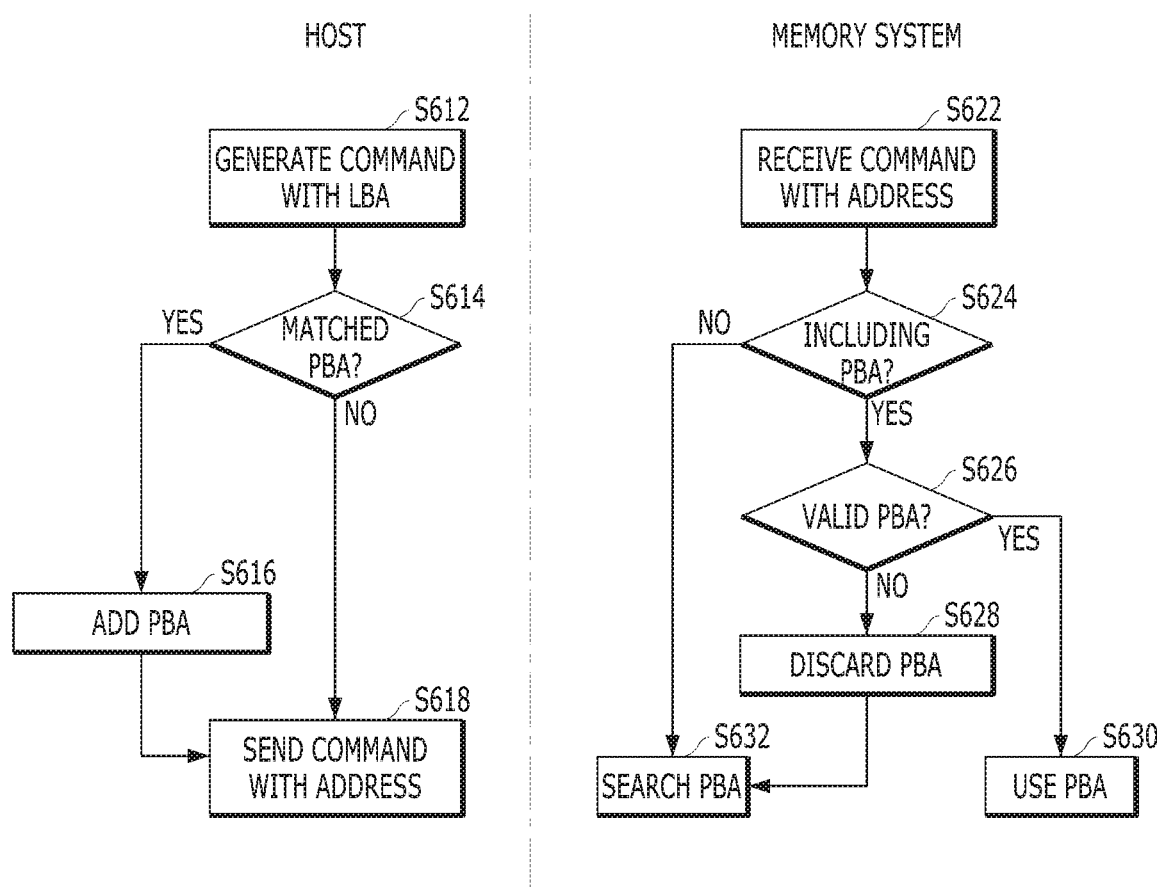
FIG. 6 is a flowchart describing a first operation of a host and a memory system according to an embodiment of the disclosure.

FIG. 6 is a flowchart describing a first operation of the host 102 and the memory system 110 according to the embodiment of the disclosure. To be specific, FIG. 6 describes a specific operation between the host 102 and the memory system 110. The host 102 transfers a command COMMAND including a logical address LBA and a physical address PBA, and the memory system 110 receives the command COMMAND.

At S612, the host 102 may generate the command COMMAND including the logical address LBA at a request of a user.

At S614, the host 102 may check whether there is a physical address PBA corresponding to the logical address LBA or not in the map information stored in the host memory 106.

When there is no physical address PBA corresponding to the logical address LBA in the map information ('NO' at S614), at S618, the host 102 may issue the command COMMAND that includes only the logical address LBA to the memory system 110.

Conversely, when there is the physical address PBA corresponding to the logical address LBA in the map information ('YES' at S616), at S616, the host 102 may add the physical address PBA to the command COMMAND including the logical address LBA.

Then, at S618, the host 102 may provide the memory system 110 with the command COMMAND including the logical address LBA and the physical address PBA.

At S622, the memory system 110 may receive the command COMMAND provided from the host 102.

At S624, the memory system 110 may check whether the received command COMMAND includes the physical address PBA or not.

When the received command COMMAND does not include the physical address PBA ('NO' at S624), at S632, the memory system 110 may search for the physical address PBA corresponding to the logical address LBA included in the received command COMMAND in the memory 144 or the memory device 150. The physical address search operation of the memory system 110 may be described in detail with reference to FIG. 7.

Conversely, when the received command COMMAND includes the physical address PBA ('YES' at S624), at S626, the memory system 110 may check whether the physical address PBA is valid or not.

The memory system 110 may transfer the map information to the host 102, and the host 102 may include the physical address PBA in the command COMMAND based on the map information transferred by the memory system 110. However, after the memory system 110 transfers the map information to the host 102, the map information managed by the memory system 110 may be changed and updated. As such, when the map information is dirty, the physical address PBA delivered by the host 102 to the memory system 110 may not be used as it is. Thus, the memory system 110 may be able to determine whether the physical address PBA included in the received command COMMAND is valid or not. For example, the memory system 110 may separately manage dirty map information. To take another example, the memory system 110 may compare the physical address PBA provided from the host 102 with a physical address stored in the memory system 110 to determine the validity of the physical address PBA. However, this is only an example and the concept and spirit of the invention may not be limited to it.

When the physical address PBA included in the received command COMMAND is valid ('YES' at S626), at S630, the memory system 110 may perform an operation corresponding to the command COMMAND by using the physical address PBA.

Conversely, when the physical address PBA included in the received command COMMAND is not valid ('NO' at S626), at S628, the memory system 110 may discard the physical address PBA included in the received command COMMAND.

At S632, the memory system 110 may search for a physical address corresponding to the logical address LBA included in the received command COMMAND.

Figure 7:
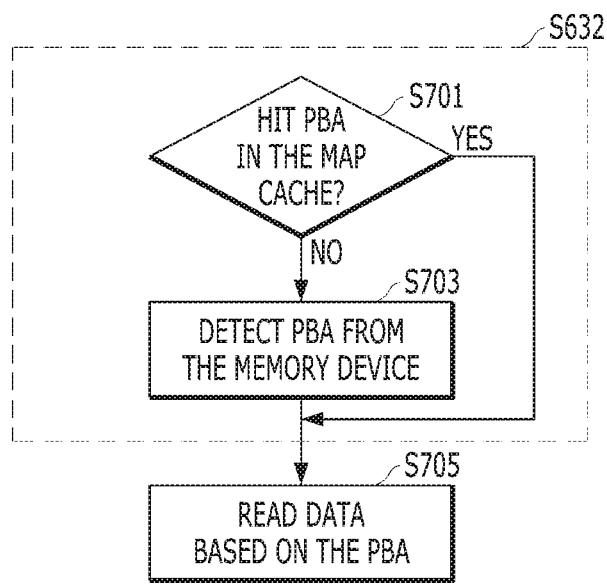
FIG. 7 is a flowchart describing an operation of a memory system according to an embodiment of the disclosure.

FIG. 7 is a flowchart describing an operation of a memory system according to an embodiment of the disclosure. In particular, FIG. 7 specifically illustrates the operation S632 shown in FIG. 6.

Referring back to FIG. 6, when the command COMMAND provided from the host 102 does not include the physical address PBA, or when the physical address PBA is invalid even though the command COMMAND includes the physical address PBA, the memory system 110 may search for a physical address corresponding to the logical address LBA included in the command COMMAND at S632.

First, at S701, the memory system 110 may determine whether a physical address is hit in the map cache 146 of the memory 144 shown in FIG. 1. In other words, the memory system 110 may check whether information on the physical address is stored in the map cache 146 or not.

When the physical address is not hit in the map cache 146 ('NO' at S701), at S703, the memory system 110 may detect a physical address in the memory device 150. To be specific, the memory system 110 may search the memory device 150 for the physical address corresponding to the logical address LBA included in the command COMMAND provided from the host 102. After that, the memory system 110 may store the searched physical address in the map cache 146.

Then, when the command COMMAND is a read command, at S705, the memory system 110 may read data based on the physical address searched from the memory device 150.

On the other hand, when the physical address is hit in the map cache 146 ('YES' at S701), at S705, the memory system 110 may read the data based on the physical address stored in the map cache 146.

When the physical address is stored in the map cache 146, the memory system 110 may skip the operation of searching the memory device 150 for the physical address. As a result, the memory system 110 may be able to efficiently perform the read operation according to the read command. When the map cache 146 stores lots of map information, the memory system 110 may efficiently perform a read operation. However, the map cache 146 may have a limited storage capacity. Thus, the memory system 110 may have to selectively store map information in the map cache 146 in order to efficiently perform the read operation. For example, the memory system 110 may store frequently used map information in the map cache 146.

The memory system 110 according to the embodiment of the disclosure may include the map cache 146 having a structure capable of selectively storing map information.

Figure 8A:
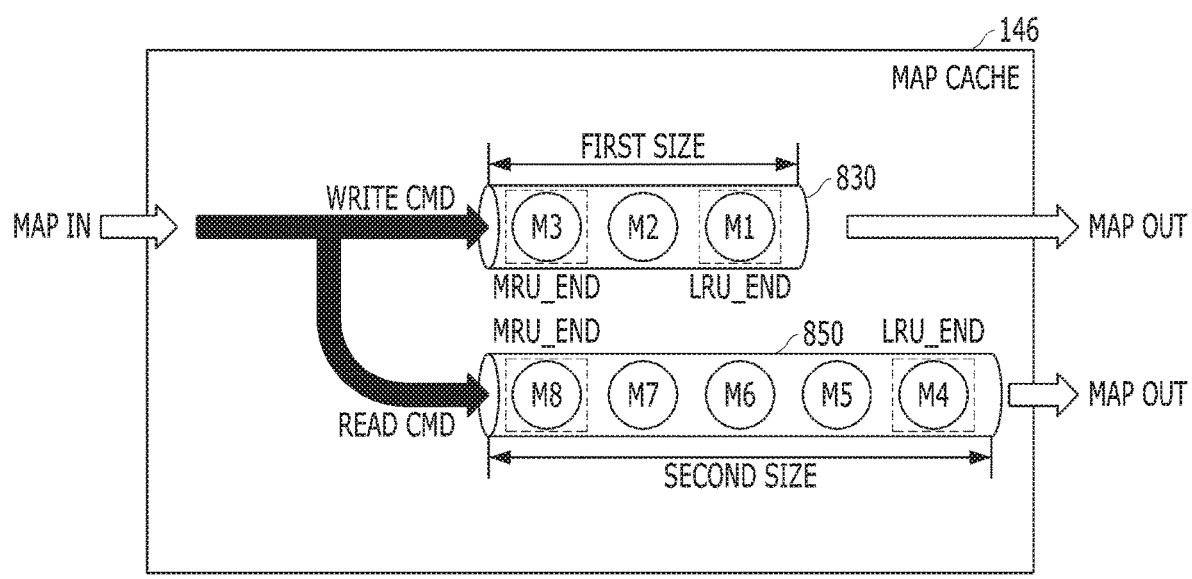
FIG. 8A illustrates a structure of a map cache according to the embodiment of the disclosure.

FIG. 8A illustrates a structure of the map cache 146 shown in FIG. 1 according to an embodiment of the disclosure.

The map cache 146 may include a write map cache 830 and a read map cache 850. The map cache 146 may store map information in the write map cache 830 and the read map cache 850. FIG. 8A illustrates the write map cache 830 and the read map cache 850 that are full of map information. The map cache 146 may selectively store the map information in the two map caches 830 and 850 according to the order in which the map information is inputted thereto.

The write map cache 830 and the read map cache 850 may have different sizes. The size of each of the write map cache 830 and the read map cache 850 may refer to a space where the map information is stored. The larger the map cache is, the more map information may be stored. FIG. 8A exemplarily illustrates the write map cache 830 having a first size and the read map cache 850 having a second size.

Map information of different properties may be stored in the write map cache 830 and the read map cache 850, respectively. For example, the write map cache 830 may store map information corresponding to a write command, whereas the read map cache 850 stores map information corresponding to a read command.

The write map cache 830 and the read map cache 850 may store the map information according to an LRU (Least Recently Used) scheme. FIG. 8A shows an example that the write map cache 830 and the read map cache 850 are realized based on the LRU scheme. Ends MRU_END of MRUs (Most Recently Used) of the write map cache 830 and the read map cache 850 may indicate locations of map information that is most recently accessed. Ends LRU_END of LRUs shown in the write map cache 830 and the read map cache 850 may indicate locations of map information that is accessed the longest ago.

When new map information that is not cached in the map cache 146 is accessed according to a write command or a read command and thus is newly stored in a first cache, which is either the write map cache 830 or the read map cache 850, the new map information may be stored at the end MRU_END of the MRU of the first cache. When the space of the first cache is not enough to store the new map information, map information located at the end LRU_END of the LRU of the first cache may be outputted to the outside.

When certain map information stored in the first cache is accessed again according to a homogeneous command, the certain map information may be moved to the end MRU_END of the MRU of the first cache.

When the certain map information stored in the first cache is accessed again according to a heterogeneous command, the certain map information may be moved to the end MRU_END of the MRU of a second cache corresponding to the heterogeneous command. When the space of the second cache is not enough to store the certain map information, map information located at the end LRU_END of the LRU of the second cache may be outputted to the outside. As the certain map information stored in the first cache is moved to the end MRU_END of the MRU of the second cache, an amount of map information cached in the first cache may decrease.

Referring to FIG. 8A, first to third map information M1 to M3 may be stored in the write map cache 830 in the order that they are accessed. When new map information corresponding to a write command is inputted to the map cache 146 (MAP IN), the first map information M1 stored at the end LRU_END of the LRU of the write map cache 830 may be outputted to the outside of the map cache 146 (MAP OUT). The new map information may then be stored in the write map cache 830.

The read map cache 850 may store the fourth to eighth map information M4 to M8 in the order that they are accessed. On the same principle, when new map information corresponding to a read command is inputted to the map cache 146 (MAP IN), the fourth map information M4 stored at the end LRU_END of the LRU of the read map cache 850 may be outputted to the outside of the map cache 146 (MAP OUT). The new map information may then be stored in the read map cache 850.

Meanwhile, the map information which was located at the end LRU_END of the LRU of the write map cache 830 or the read map cache 850 and then outputted may not be accessed often compared with the map information remaining in the map cache 146. However, the outputted map information was stored in the map cache 146 recently, and thus the outputted map information may be accessed more frequently than map information that has not been stored in the map cache 146 recently.

The host 102 may access the memory device 150 at the fastest speed when the map information is stored in the map cache 146. When the map information is stored in the host memory 106 of the host 102, the host 102 may access the memory device 150 at the second fastest speed. When the map information is stored in the memory device 150, the host 102 may access the memory device 150 at the slowest speed.

The outputted map information may be map information outputted from the write map cache 830 and map information outputted from the read map cache 850.

The map information outputted from the write map cache 830 is more likely to be accessed again for a write operation than the map information that has not been stored in the map cache 146 recently. However, whenever a write operation is performed, the map information may be changed. Therefore, when the memory system 110 transfers the map information outputted from the write map cache 830 to the host 102, whenever the map information is updated in the memory system 110 by a write operation, the host 102 may have to update the map information. As a result, the host 102 may have much burden. Thus, the memory system 110 may not provide the host 102 with the map information that is outputted from the write map cache 830.

On the other hand, the map information outputted from the read map cache 850 is more likely to be accessed again for a read operation than the map information that has not been stored in the map cache 146 recently. Whenever a read operation is performed, the map information may not be changed. Therefore, even when the memory system 110 transfers the map information outputted from the read map cache 850 to the host 102, there is a high probability that the host 102 does not update the map information. Therefore, the memory system 110 may provide the host 102 with the map information outputted from the read map cache 850. The host 102 may perform a read operation more quickly by providing a read command and a physical address based on the map information.

Figure 8B:
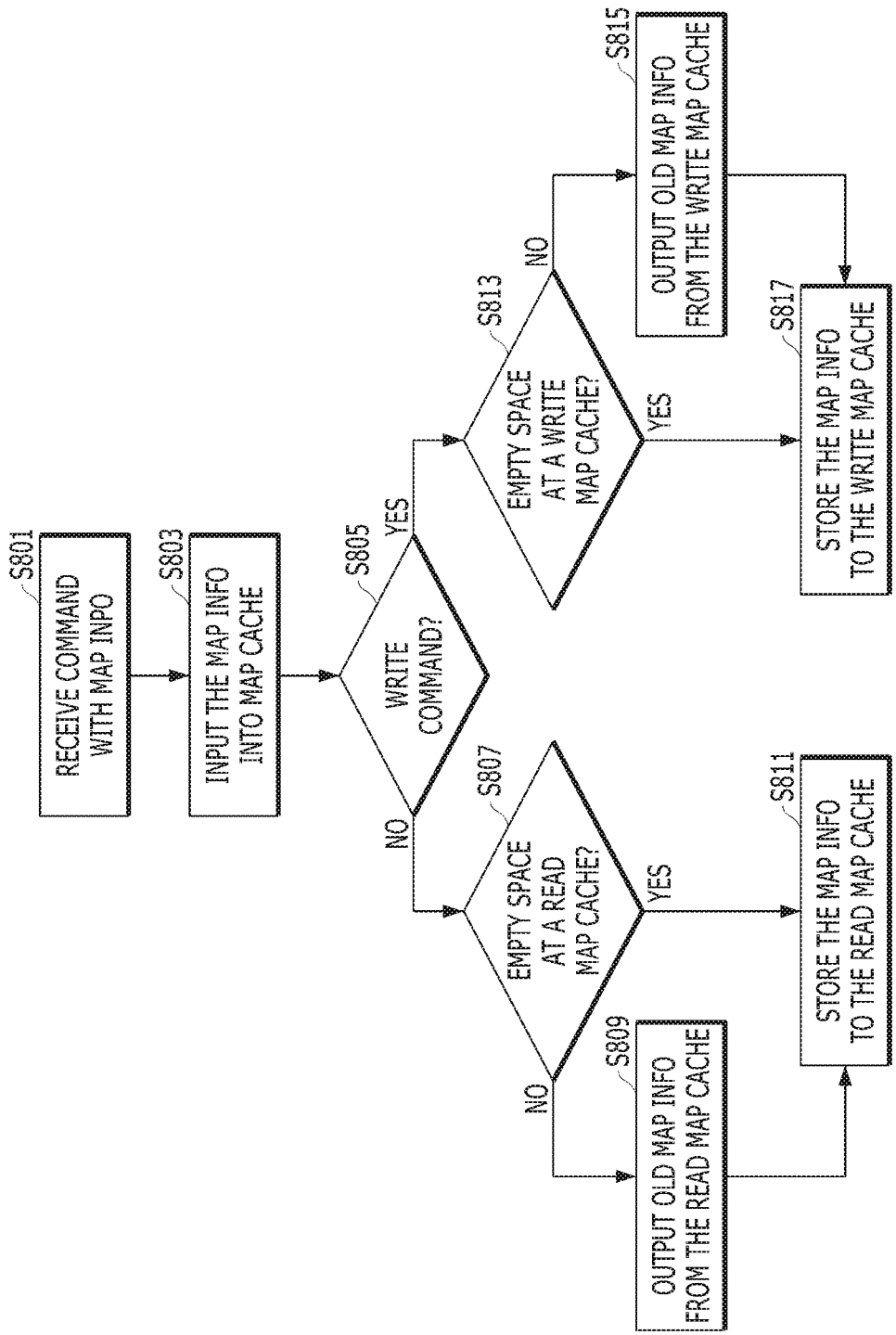
FIG. 8B is a flowchart describing an operation of processing map information by using a map cache according to an embodiment of the disclosure.

FIG. 8B is a flowchart describing an operation of processing map information by using a map cache according to an embodiment of the disclosure. FIG. 8B shows only a process of storing the map information in the map cache.

At S801, the memory system 110 may receive a read command or a write command from the host 102. The host 102 may selectively provide the memory system 110 with map information corresponding to the read command or the write command along with the read command or the write command.

At S803, the memory system 110 may input the map information corresponding to the read command or the write command. To be specific, the map cache 146 of the memory 144 may receive the map information under the control of the processor 134. Hereinafter, for the sake of convenience in explanation, the inputted map information may be referred to as 'target map information.'

At S805, it is determined whether the host 102 provides the memory system 110 with the read command or the write command. When the host 102 provides the memory system 110 with the read command ('NO' at S805), at S807, the memory system 110 may check whether there is an empty space in the read map cache 850 for storing the target map information.

When there is no empty space in the read map cache 850 ('NO' at S807), at S809, the map cache 146 may output old map information that is the oldest information among map information stored in the read map cache 850 to the outside. The oldest map information may be provided to the host 102, and the processing of the outputted old map information will be described later in detail with reference to FIG. 15 to FIG. 18.

Then, at S811, the map cache 146 may store the target map information in the read map cache 850. The map cache 146 may store the target map information in the read map cache 850 according to the LRU scheme.

On the other hand, when there is the empty space in the read map cache 850 ('YES' at S807), at S811, the map cache 146 may store the target map information in the read map cache 850 without outputting the old map information. The map cache 146 may store the target map information in the read map cache 850 according to the LRU scheme.

When the host 102 provides the memory system 110 with the write command ('YES' at S805), at S813, the memory system 110 may check whether there is an empty space in the write map cache 830 for storing the target map information.

When there is no empty space in the write map cache 830 ('NO' at S813), at S815, the map cache 146 may output old map information that is the oldest information among map information stored in the write map cache 830 to the outside. The outputted oldest map information may be deleted.

Then, at S817, the map cache 146 may store the target map information in the write map cache 830. The map cache 146 may store the target map information in the write map cache 830 according to the LRU scheme.

On the other hand, when there is the empty space in the write map cache 830 ('YES' at S813), at S817, the map cache 146 may store the target map information in the write map cache 830 without outputting the old map information. The map cache 146 may store the target map information in the write map cache 830 according to the LRU scheme.

Hereinafter, the process of inputting and outputting map information will be described with reference to FIGS. 9 to 14B by utilizing the structure of the map cache 146 illustrated in FIG. 8A. As illustrated in FIG. 8A, it is assumed that the first to third map information M1 to M3 corresponding to the write command are stored in the write map cache 830 and that the fourth to eighth map information M4 to M8 corresponding to the read command are stored in the read map cache 850. It is also assumed that the map cache 146 stores map information that is recently accessed. However, this is not more than a mere example and the concept and spirit of the invention are not limited thereto.

Figure 9:
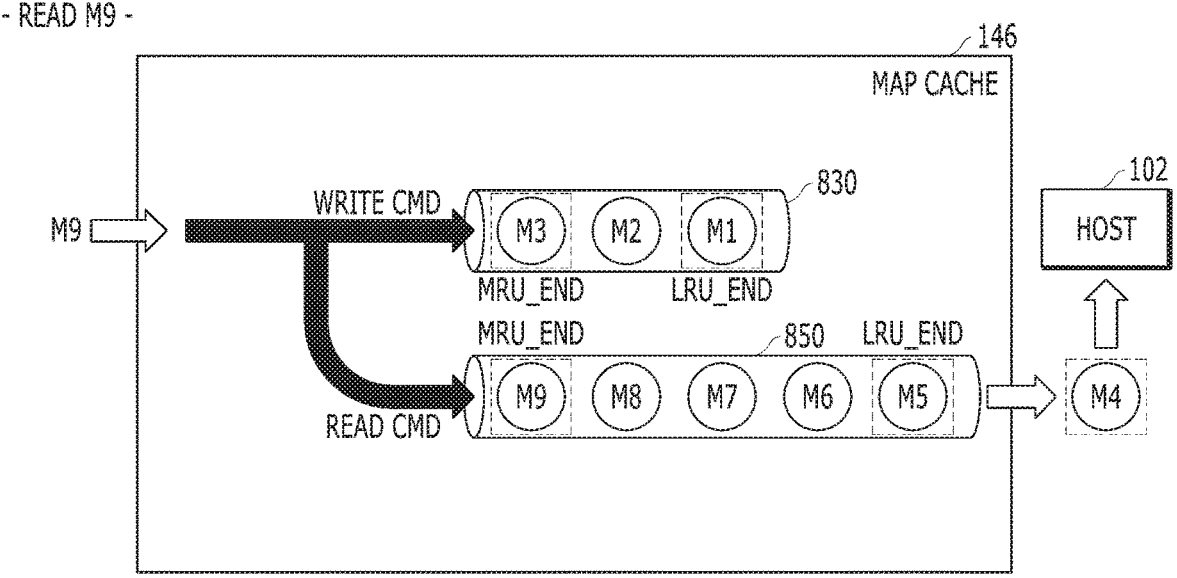
FIGS. 9 to 14B illustrate a map information processing operation according to the embodiment of the disclosure.

FIG. 9 illustrates a map information processing operation according to an embodiment of the disclosure. FIG. 9 shows an operation of the memory system 110 for storing new map information, e.g., ninth map information M9 corresponding to the read command, in the map cache 146.

Referring to FIG. 9, the ninth map information M9 may be inputted to the map cache 146. The map cache 146 may have to store the ninth map information M9 in the read map cache 850. However, the read map cache 850 may be full of the fourth to eighth map information M4 to M8. Thus, the map cache 146 may output the fourth map information M4 that is the oldest information stored in the read map cache 850 to the outside of the map cache 146. The map cache 146 may store the ninth map information M9 in the read map cache 850. The ninth map information M9 may be stored at the end MRU_END of the MRU as the most recently accessed map information according to the LRU scheme. When the fourth map information M4 is outputted, the fifth to eighth map information M5 to M8 may be shifted toward the end LRU_END of the LRU, and thus the fifth map information M5 that becomes the oldest information among the fifth to ninth map information M5 to M9 may be stored at the end LRU_END of the LRU.

The memory system 110 may provide the host 102 with the fourth map information M4 outputted from the map cache 146. Then, the host 102 may store the fourth map information M4 in the host memory 106. Alternatively, when the fourth map information M4 is already stored in the host memory 106, the host 102 may update the map information stored in the host memory 106 based on the fourth map information M4 received from the memory system 110. A detailed description thereof will be provided with reference to FIGS. 15 to 18.

Figure 10:
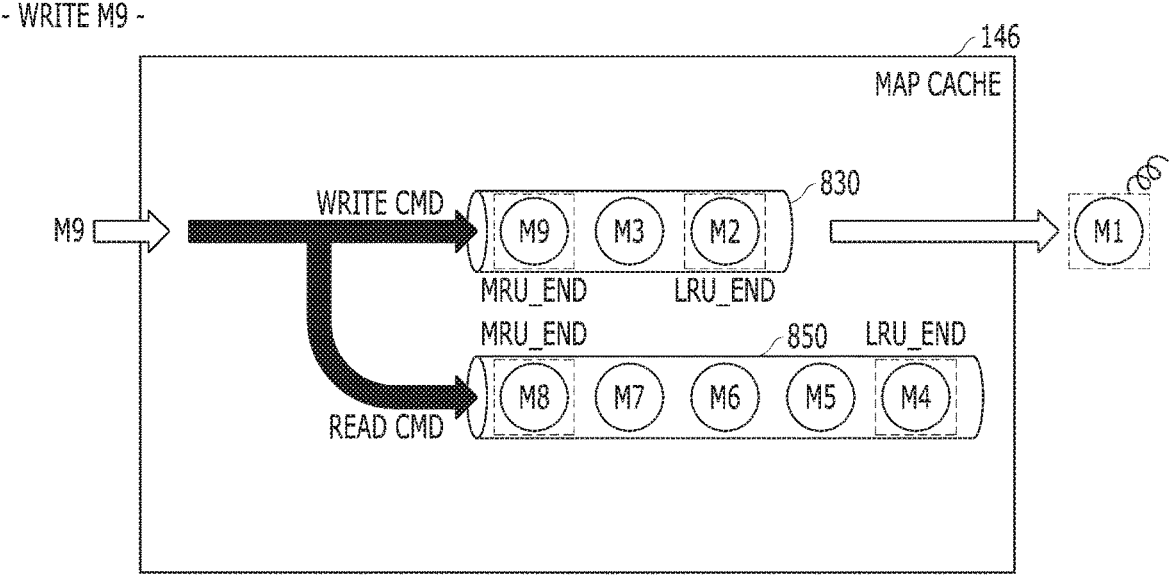

FIG. 10 illustrates a map information processing operation according to an embodiment of the disclosure. FIG. 10 shows an operation of the memory system 110 for storing new map information, e.g., the ninth map information M9 corresponding to the write command, in the map cache 146.

Referring to FIG. 10, the ninth map information M9 may be inputted to the map cache 146. The map cache 146 may have to store the ninth map information M9 in the write map cache 830. However, the write map cache 830 may be full of the first to third map information M1 to M3. Thus, the map cache 146 may output the first map information M1 that is the oldest information stored in the write map cache 830 to the outside of the map cache 146. After that, the second and third map information M2 and M3 may be shifted toward the end LRU_END of the LRU, and then the map cache 146 may store the ninth map information M9 in the write map cache 830.

The memory system 110 may delete the first map information M1 outputted from the map cache 146.

Figure 11A:
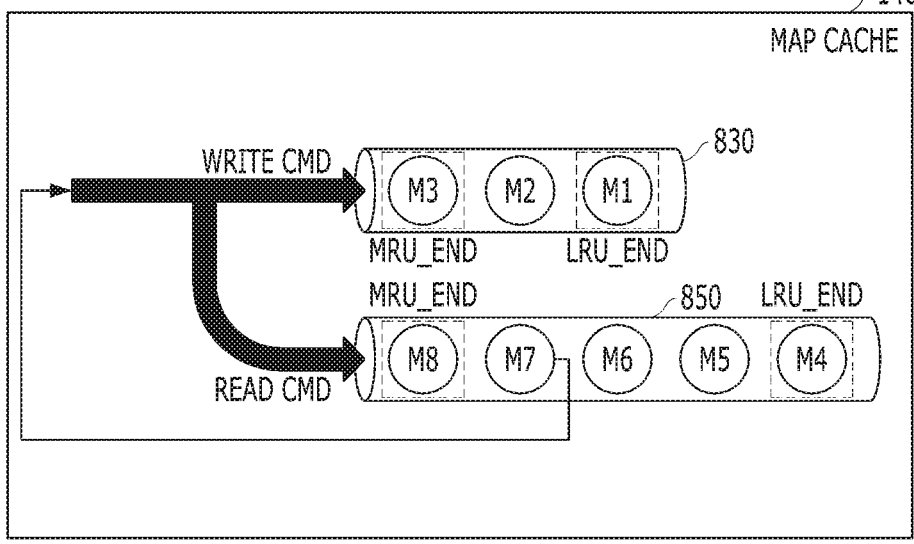
Figure 11B:
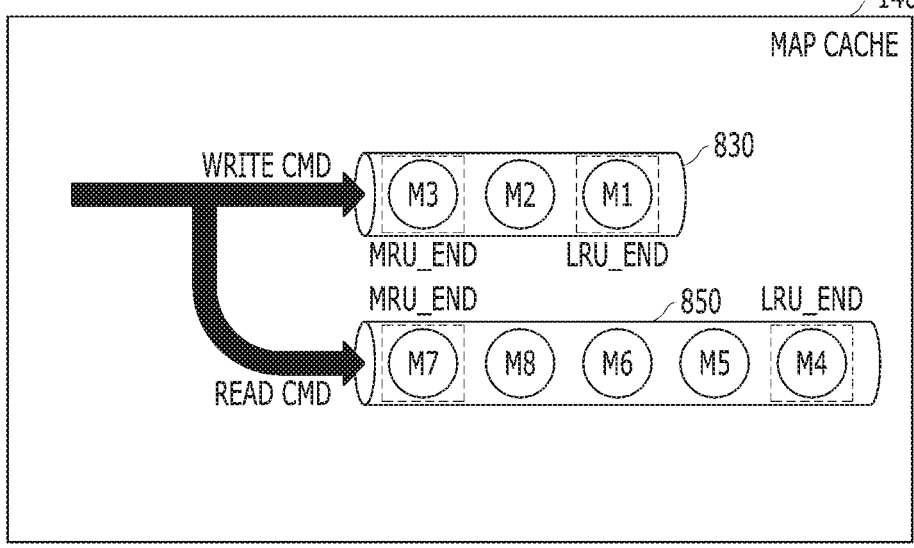

FIGS. 11A and 11B illustrate a map information processing process according to an embodiment of the disclosure. FIGS. 11A and 11B illustrate a moving path of the seventh map information M7 when the memory system 110 accesses the seventh map information M7 stored in the read map cache 850 in response to a read command.

The seventh map information M7 may be stored in the read map cache 850 as the most recently accessed map information according to the LRU scheme. Referring to FIG. 11B, the map cache 146 may move the seventh map information M7 stored in the read map cache 850 to the end MRU_END of the MRU.

FIG. 11B illustrates a state in which the seventh map information M7 is moved to the end MRU_END of the MRU. The eighth map information M8 previously stored at the end MRU_END of the MRU may be the second most recently accessed map data. Therefore, a storage location of the eighth map information M8 may be changed. As a result, a storage location of the seventh map information M7 may be changed to the previous storage location of the eighth map information M8 in the read map cache 850.

Figure 12A:
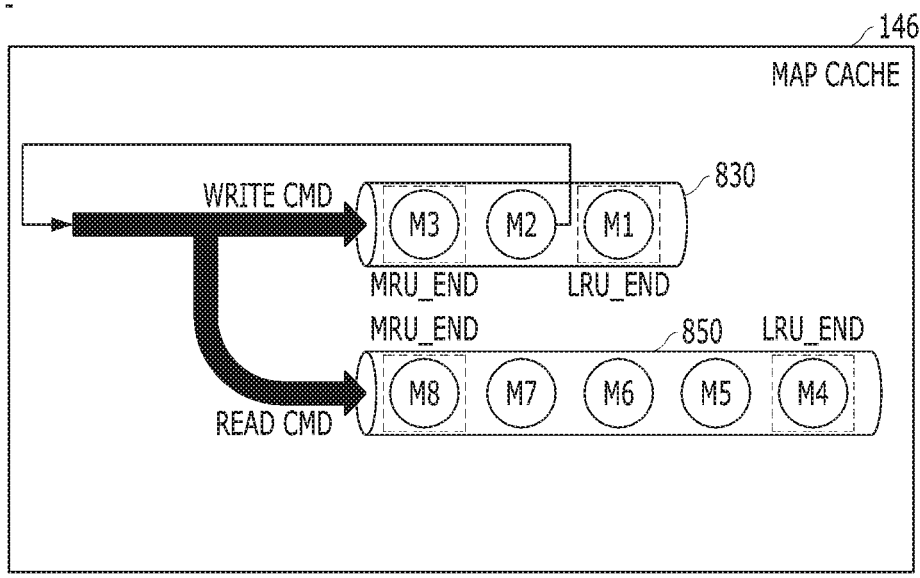
Figure 12B:
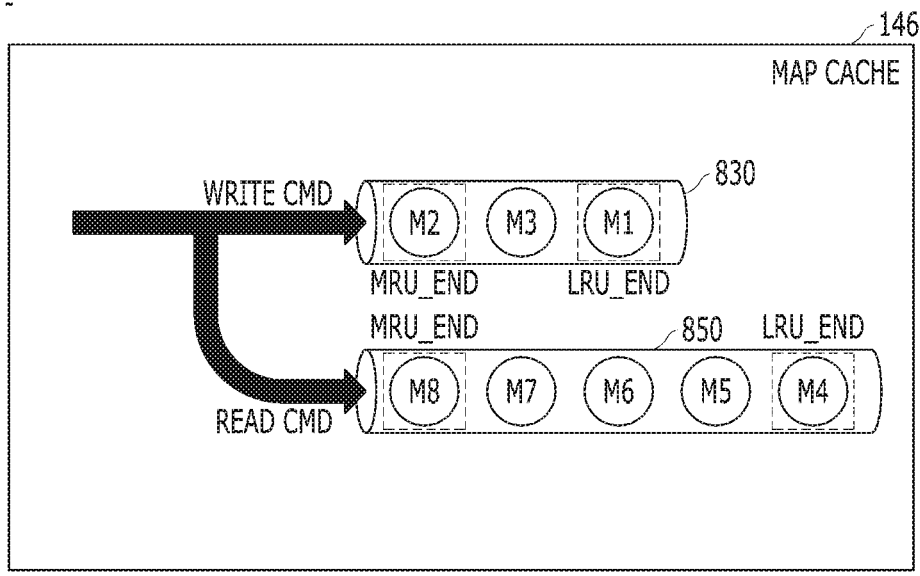

FIGS. 12A and 12B illustrate a map information processing process according to an embodiment of the disclosure. FIGS. 12A and 12B illustrate a moving path of the second map information M2 when the memory system 110 accesses the second map information M2 stored in the write map cache 830 in response to a write command.

The second map information M2 may be stored in the write map cache 830 as the most recently accessed map information according to the LRU scheme. Referring to FIG. 12B, the map cache 146 may move the second map information M2 stored in the write map cache 830 to the end MRU_END of the MRU. FIG. 12B illustrates a state in which the second map information M2 is moved to the end MRU_END of the MRU. The third map information M3 which is previously stored at the end MRU_END of the MRU may be the second most recently accessed map data. Therefore, a storage location of the third map information M3 may be changed. As a result, a storage location of the second map information M2 may be changed to the previous storage location of the third map information M3 in the write map cache 830.

Figure 13A:
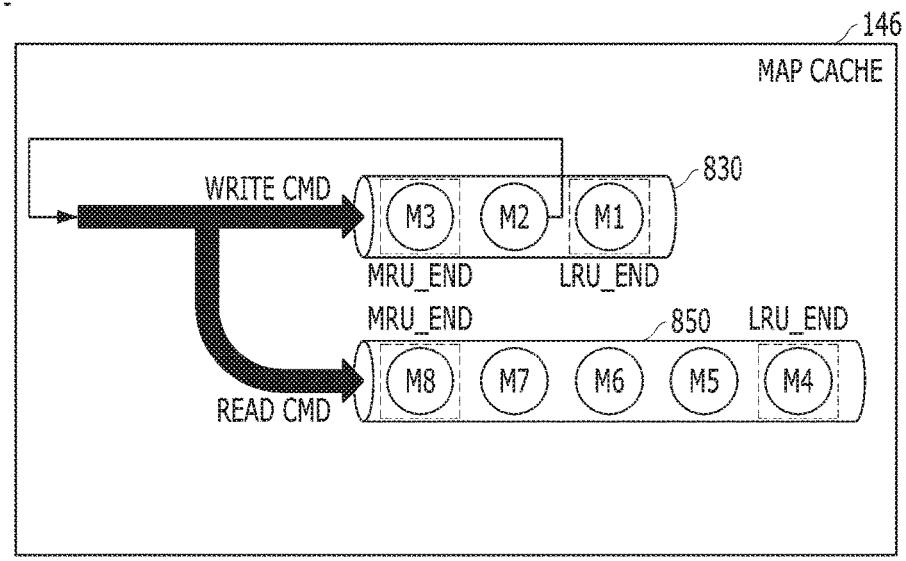
Figure 13B:
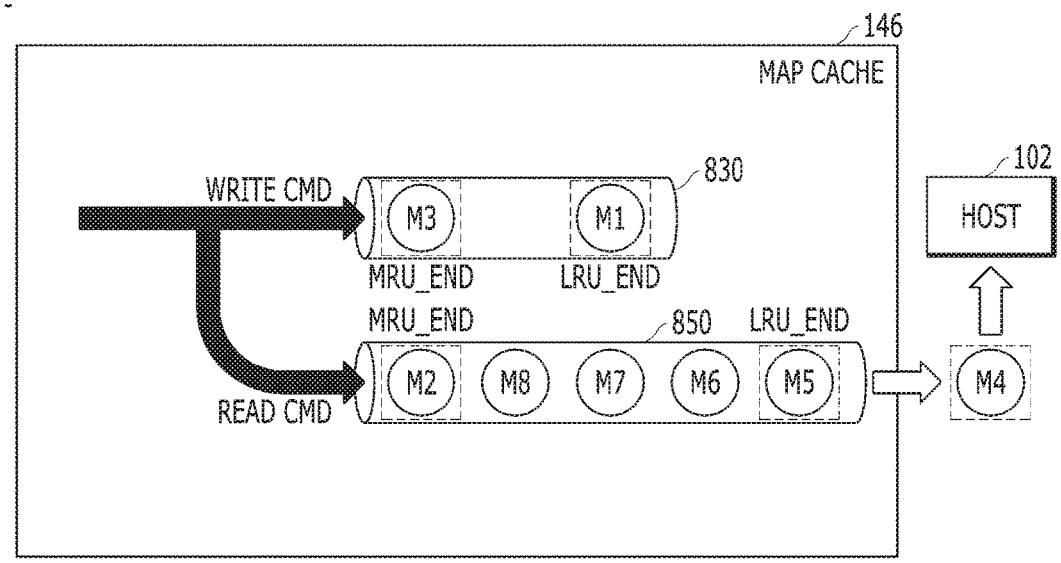

FIGS. 13A and 13B illustrate a map information processing process according to an embodiment of the disclosure. FIGS. 13A and 13B illustrate a moving path of the second map information M2 when the memory system 110 accesses the second map information M2 stored in the write map cache 830 in response to a read command.

The second map information M2 may be stored in the read map cache 850 as the most recently accessed map information according to the LRU scheme. Referring to FIG. 13B, the map cache 146 may move the second map information M2 stored in the write map cache 830 to the end MRU_END of the MRU of the read map cache 850. Referring to FIG. 13B, the map cache 146 may remove the second map information M2 stored in the write map cache 830, and store the second map information M2 at the end MRU_END of the MRU of the read map cache 850.

FIG. 13B illustrates a state in which the second map information M2 is moved to the end MRU_END of the MRU of the read map cache 850. In FIG. 13B, the read map cache 850 of the second size may be full of map information. Therefore, the map cache 146 may output the fourth map information M4 stored at the end LRU_END of the LRU in the read map cache 850 to the outside of the map cache 146. After that, the map cache 146 may store the second map information M2 at the end MRU_END of the MRU of the read map cache 850. Furthermore, an empty space may be generated in the write map cache 830 by removing the second map information M2 from the write map cache 830.

The memory system 110 may provide the host 102 with the fourth map information M4 outputted from the map cache 146. Then, the host 102 may store the fourth map information M4 in the host memory 106. Alternatively, when the fourth map information M4 is already stored in the host memory 106, the host 102 may update map information stored in the host memory 106 based on the fourth map information M4 received from the memory system 110. A detailed description thereof will be provided later with reference to FIGS. 15 to 18.

Figure 14A:
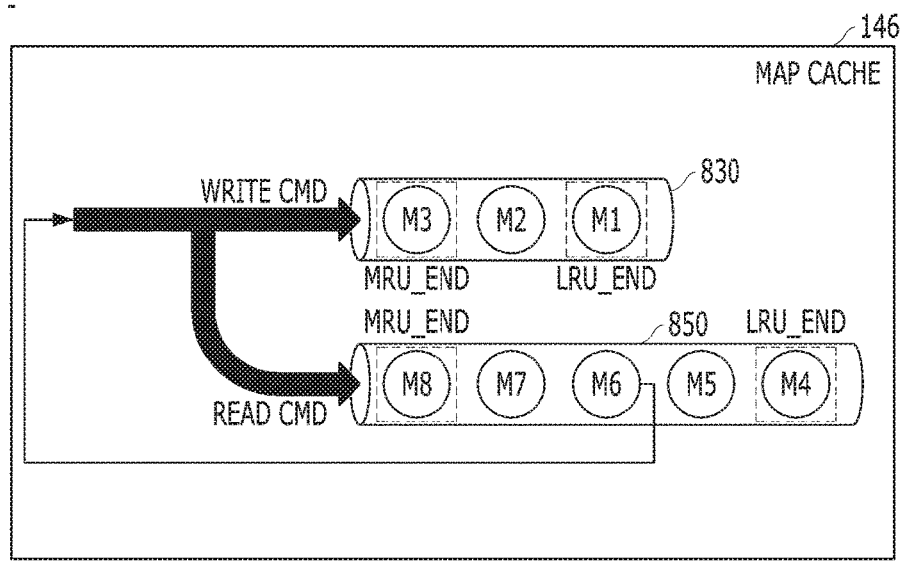
Figure 14B:
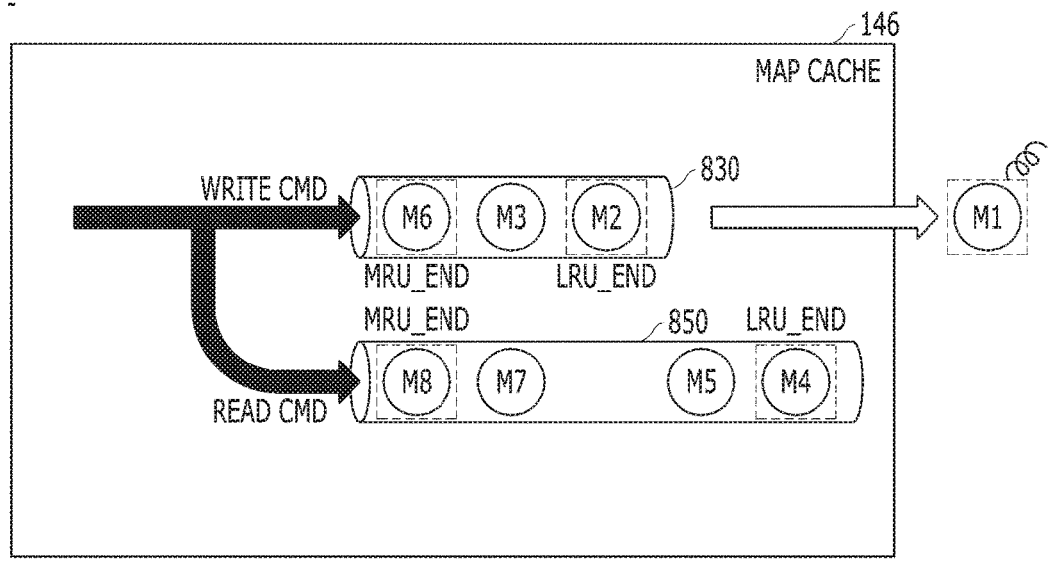

FIGS. 14A and 14B illustrate a map information processing process according to an embodiment of the disclosure. FIGS. 14A and 14B illustrate a moving path of the sixth map information M6 when the memory system 110 accesses the sixth map information M6 stored in the read map cache 850 in response to a write command.

The sixth map information M6 may be stored in the write map cache 830 as the most recently accessed map information according to the LRU scheme. Referring to FIG. 14B, the map cache 146 may move the sixth map information M6 stored in the read map cache 850 to the end MRU_END of the MRU of the write map cache 830. Referring to FIG. 14B, the map cache 146 may remove the sixth map information M6 stored in the read map cache 850, and store the sixth map information M6 at the end MRU_END of the MRU of the write map cache 830.

FIG. 14B illustrates a state in which the sixth map information M6 is moved to the end MRU_END of the MRU of the write map cache 830. In FIG. 14B, the write map information cache 830 of the first size may be full of map information. Accordingly, the map cache 146 may output the first map information M1 stored at the end LRU_END of the LRU of the write map cache 830 to the outside of the map cache 146. The map cache 146 may store the sixth map information M6 at the end MRU_END of the MRU of the write map cache 830. Furthermore, an empty space may be generated in the read map cache 850 by removing the sixth map information M6 from the read map cache 850.

The memory system 110 may delete the first map information M1 outputted from the map cache 146.

FIGS. 9 to 14B illustrate the map cache 146 that stores recently accessed map information. However, embodiments are not limited thereto. In another embodiment, the map cache 146 may store the most frequently accessed map information according to a Least Frequency Used (LFU) scheme.

Figure 15:
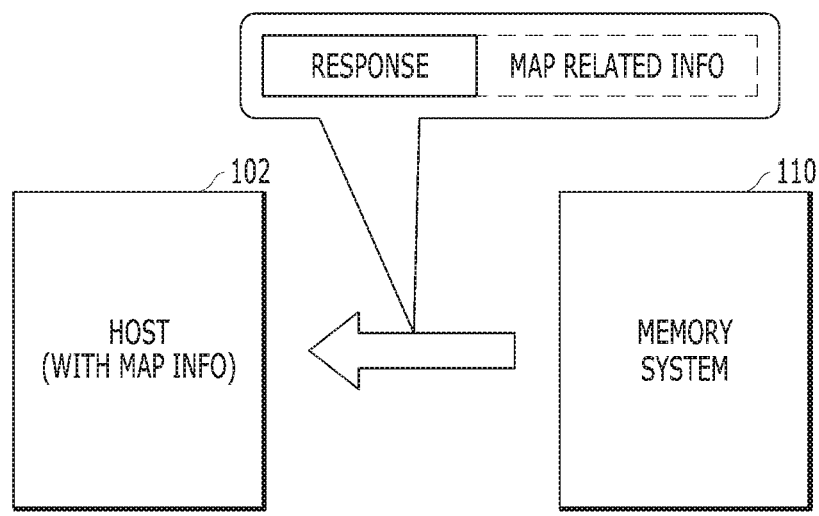
FIG. 15 illustrates a second example of a transaction between a host and a memory system in a data processing system according to an embodiment of the disclosure.

FIG. 15 illustrates a second example of a transaction between the host 102 and the memory system 110 in a data processing system according to an embodiment of the disclosure.

Referring to FIG. 15, the memory system 110 may transfer map information MAP_INFO to the host 102. The memory system 110 may transfer the map information MAP_INFO based on a response RESPONSE to a command COMMAND of the host 102. In particular, as described above with reference to FIGS. 9 to 13B, the memory system 110 may provide the host 102 with map information outputted from the read map cache 850.

There may be no particular restrictions on a response for transferring map information. For example, the memory system 110 may transfer the map information to the host 102 by using a response corresponding to a read command, a response corresponding to a write command, or a response corresponding to an erase command.

The memory system 110 and the host 102 may exchange a command and a response based on a unit format which is set according to a predetermined protocol. For example, the format of the response may include a basic header, a command due to the success or failure of the command transferred by the host 102, and additional information representing a state of the memory system 110. The memory system 110 may include the map information in the response and transfer the response including the map information to the host 102.

Figure 16:
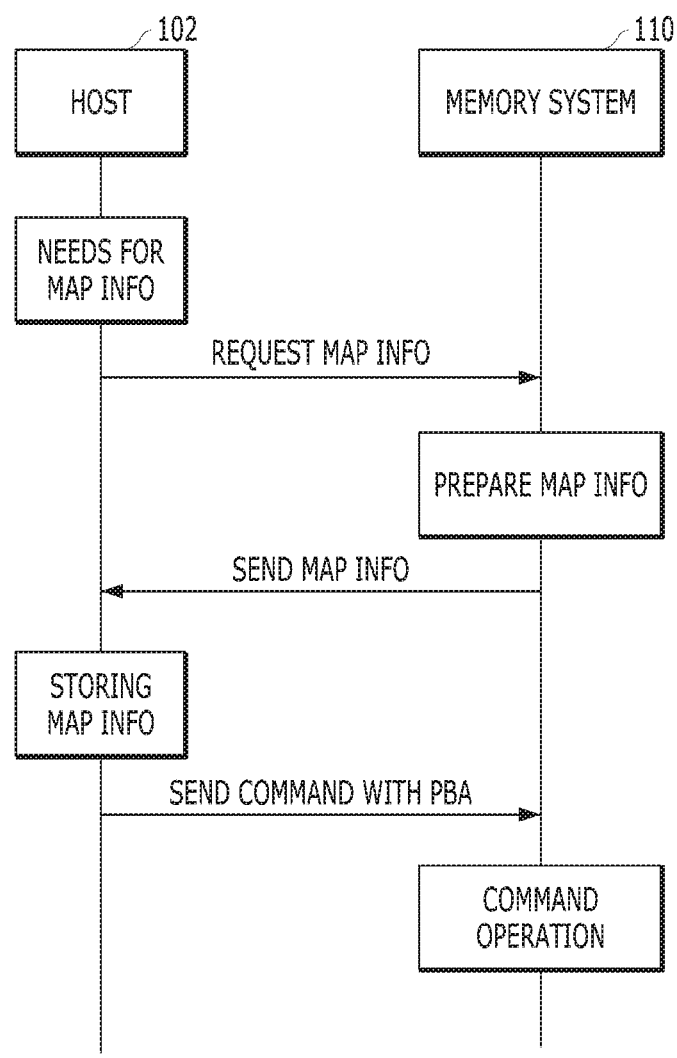
FIG. 16 illustrates a second operation of a host and a memory system according to an embodiment of the disclosure.

FIG. 16 illustrates a second operation of the host 102 and the memory system 110 according to an embodiment of the disclosure. To be specific, FIG. 16 illustrates a process in which the host 102 requests the memory system 110 for map information and the memory system 110 transfers the map information in response to the request from the host 102.

Referring to FIG. 16, needs for the map information may occur in the host 102. For example, when the host 102 may allocate a space to store the map information, or when data is expected to be inputted or outputted quickly to or from the memory system 110 in response to a command, the needs for the map information may occur. Also, needs for the map information may occur in the host 102 at a request of a user.

The host 102 may request the memory system 110 for the map information, and the memory system 110 may prepare the map information in response to the request from the host 102. According to the embodiment of the disclosure, the host 102 may specifically request for the map information required by the memory system 110. Meanwhile, according to another embodiment of the disclosure, the host 102 may request the memory system 110 for the map information, but which map information is to be provided may be determined by the memory system 110.

The memory system 110 may transfer the prepared map information to the host 102. The host 102 may store the map information transferred from the memory system 110 in an internal storage space (e.g., the host memory 106 described in FIG. 3).

The host 102 may include a physical address PBA in a command by using the stored map information, and transfer the command including the physical address PBA to the memory system 110. The memory system 110 may perform a corresponding operation based on the physical address PBA included in the command.

Figure 17:
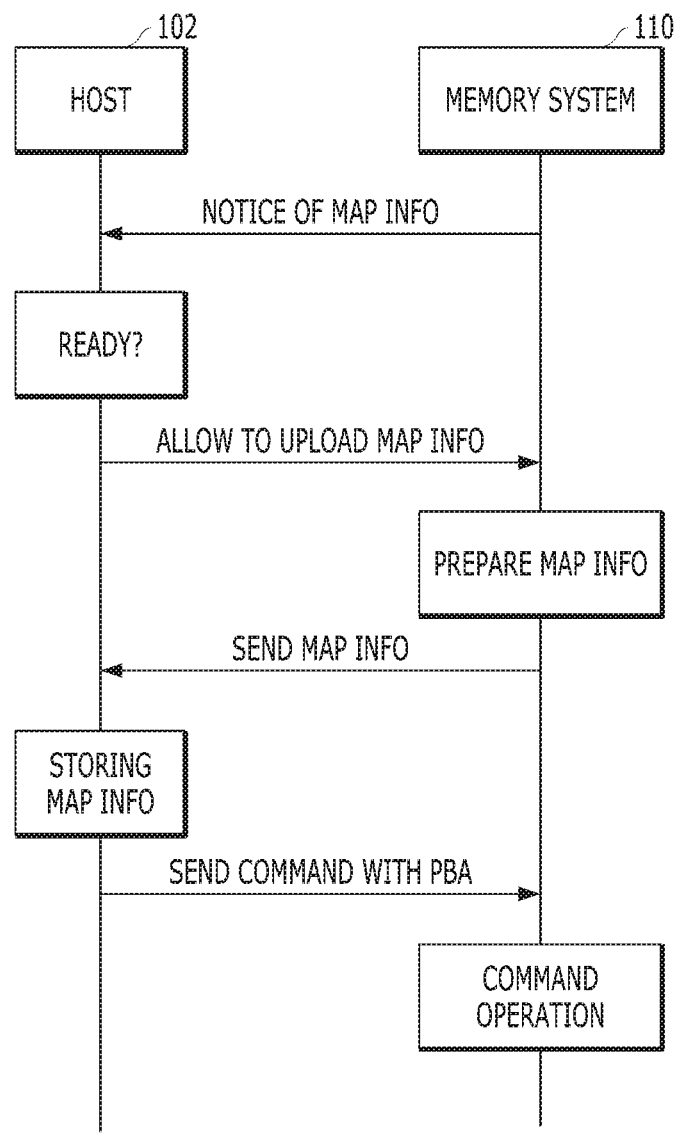
FIG. 17 illustrates a third operation of a host and a memory system according to an embodiment of the disclosure.

FIG. 17 illustrates a third operation of the host 102 and the memory system 110 according to an embodiment of the disclosure. To be specific, FIG. 17 illustrates a process in which the memory system 110 requests the host 102 to transfer map information and the host 102 receives the map information in response to the request of the memory system 110.

Referring to FIG. 17, the memory system 110 may notify the host 102 of transferring the map information. The host 102 may determine whether the map information can be stored in the host 102 in response to the notice regarding the map information transferred from the memory system 110. When the host 102 can receive the map information transferred from the memory system 110, the host 102 may allow the memory system 110 to upload the map information to the host 102. The memory system 110 may prepare the map information and then transfer the map information to the host 102.

Subsequently, the host 102 may store the received map information in the internal storage space (e.g., the host memory 106 described in FIG. 3). The host 102 may perform a mapping operation based on the stored map information and include a physical address PBA in a command to be transferred to the memory system 110.

The memory system 110 may check whether the command transferred from the host 102 includes the physical address PBA or not, and perform an operation corresponding to the command based on the physical address PBA when the command transferred from the host 102 includes the physical address PBA.

Regarding the transfer of the map information, the operation of FIG. 16 may be different from the operation of FIG. 17 in that the second operation of the host 102 and the memory system 110 described above with reference to FIG. 16 is initially performed by the host 102, whereas the third operation of the host 102 and the memory system 110 described above with reference to FIG. 17 is initially performed by the memory system 110. According to an embodiment of the disclosure, the memory system 110 and the host 102 may selectively use the methods of transferring the map information described with reference to FIGS. 16 and 17 according to the operating environment.

Figure 18:
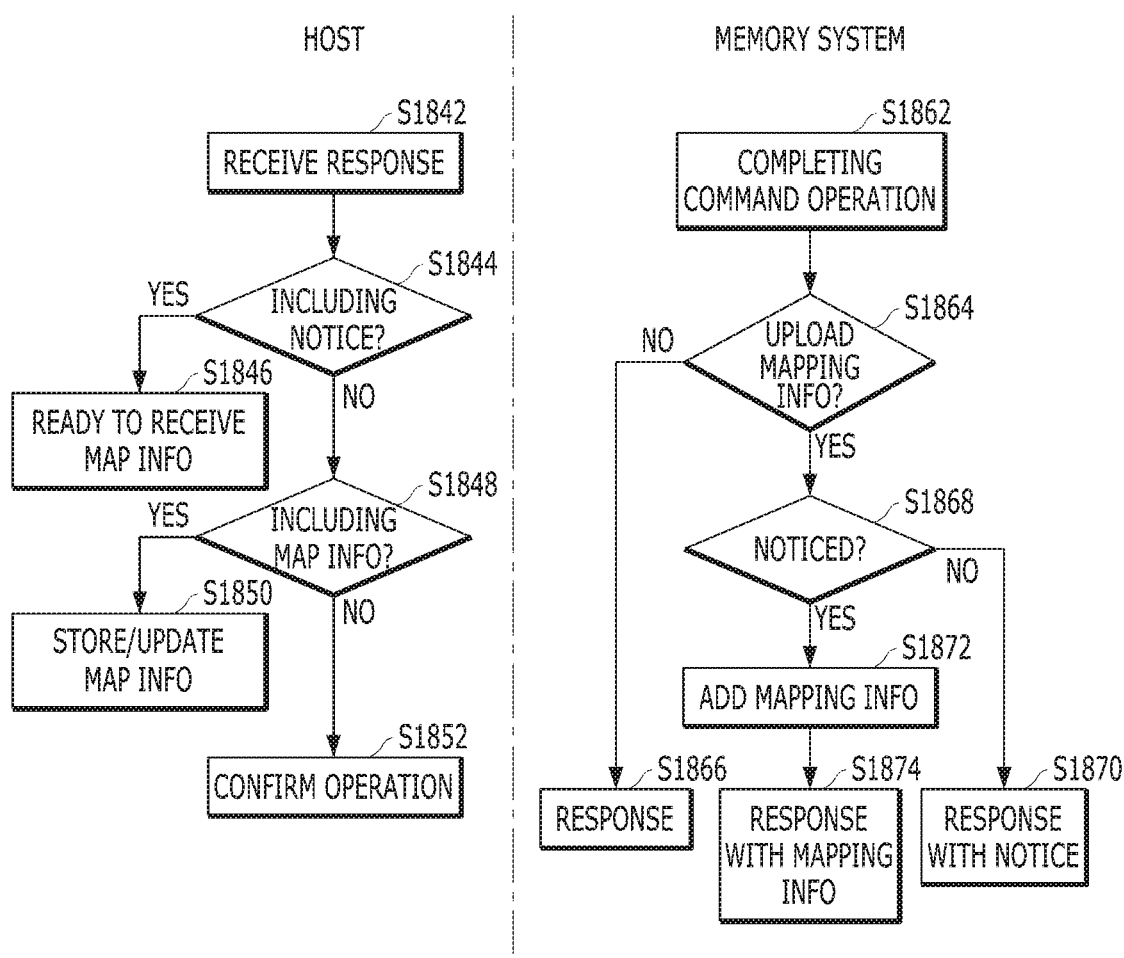
FIG. 18 illustrates a fourth operation of a host and a memory system according to an embodiment of the disclosure.

FIG. 18 illustrates a fourth operation of the host 102 and the memory system 110 in accordance an embodiment of the disclosure. To be specific, FIG. 18 illustrates a case in which the memory system 110 transfers map information to the host 102 while the host 102 and the memory system 110 are interlocked.

At S1862, the memory system 110 may complete an operation corresponding to a command COMMAND transferred from the host 102.

After the operation corresponding to the command COMMAND is completed, at S1864, the memory system 110 may check whether there is map information to be transferred to the host 102 or not before transferring a response RESPONSE corresponding to the command COMMAND to the host 102.

When there is no map information to be transferred to the host 102 ('NO' at S1864), at S1866, the memory system 110 may transfer the response RESPONSE that includes information about whether the operation corresponding to the command COMMAND transferred from the host 102 is completed or not (success or failure).

Meanwhile, when the memory system 110 has the map information to be transferred to the host 102 ('YES' at S1864), at S1868, the memory system 110 may check whether a notice for transferring the map information is made or not. Herein, the notice may be similar to the notice described above with reference to FIG. 17.

When the memory system 110 tries to transfer the map information but the memory system 110 has not notify the host 102 of the transfer of the map information in advance ('NO' at S1868), at S1870, the memory system 110 may add the notice to the response RESPONSE and transfer the response RESPONSE to the host 102.

Conversely, when the notice for transferring the map information is already made ('YES' at S1868), at S1872, the memory system 110 may add the map information to the response RESPONSE.

Subsequently, at S1874, the memory system 110 may transfer the response RESPONSE including the map information to the host 102.

At S1842, the host 102 may receive at least one of a response RESPONSE, a response including a notice RESPONSE WITH NOTICE, and a response including map information RESPOSNE WITH MAP INFO, transferred from the memory system 110.

At S1844, the host 102 may check whether the received response includes a notice or not.

When the received response includes the notice ('YES' at S1844), at S1846, the host 102 may prepare to receive and store map information that may be transferred later.

Subsequently, at S1852, the host 102 may check a response corresponding to a previous command. For example, the host 102 may check the response to see whether a result of the previous command was a success or failure.

Conversely, when the received response does not include the notice ('NO' at S1844), at S1848, the host 102 may check whether the response includes map information or not.

When the response does not include map information ('NO' at S1848), at S1852, the host 102 may check the response corresponding to the previous command.

Conversely, when the received response includes the map information ('YES' at S1848), at S1850, the host 102 may store the map information included in the response in an internal storage space of the host 102 or update map information that is already stored in the host 102.

The memory system 110 including the map cache 146 according to the embodiment of the disclosure may store frequently accessed map information or recently accessed map information in the map cache 146. In other words, the memory system 110 may store map information for data frequently or recently subjected to read and write operations in the map cache 146, thereby reducing a burden of loading map information from the memory device 150. The memory system 110 may then provide the host 102 with only map information stored in either the write map cache 830 or the read map cache 850 in the map cache 146. The write map cache 830 and the read map cache 850 may be realized to have different sizes. In particular, the memory system 110 may not provide the host 102 with map information for data onto which a write operation is frequently or recently performed. As a result, the memory system 110 may reduce the burden on the host 102 by reducing an amount of map information provided to the host 102.

Figure 19:
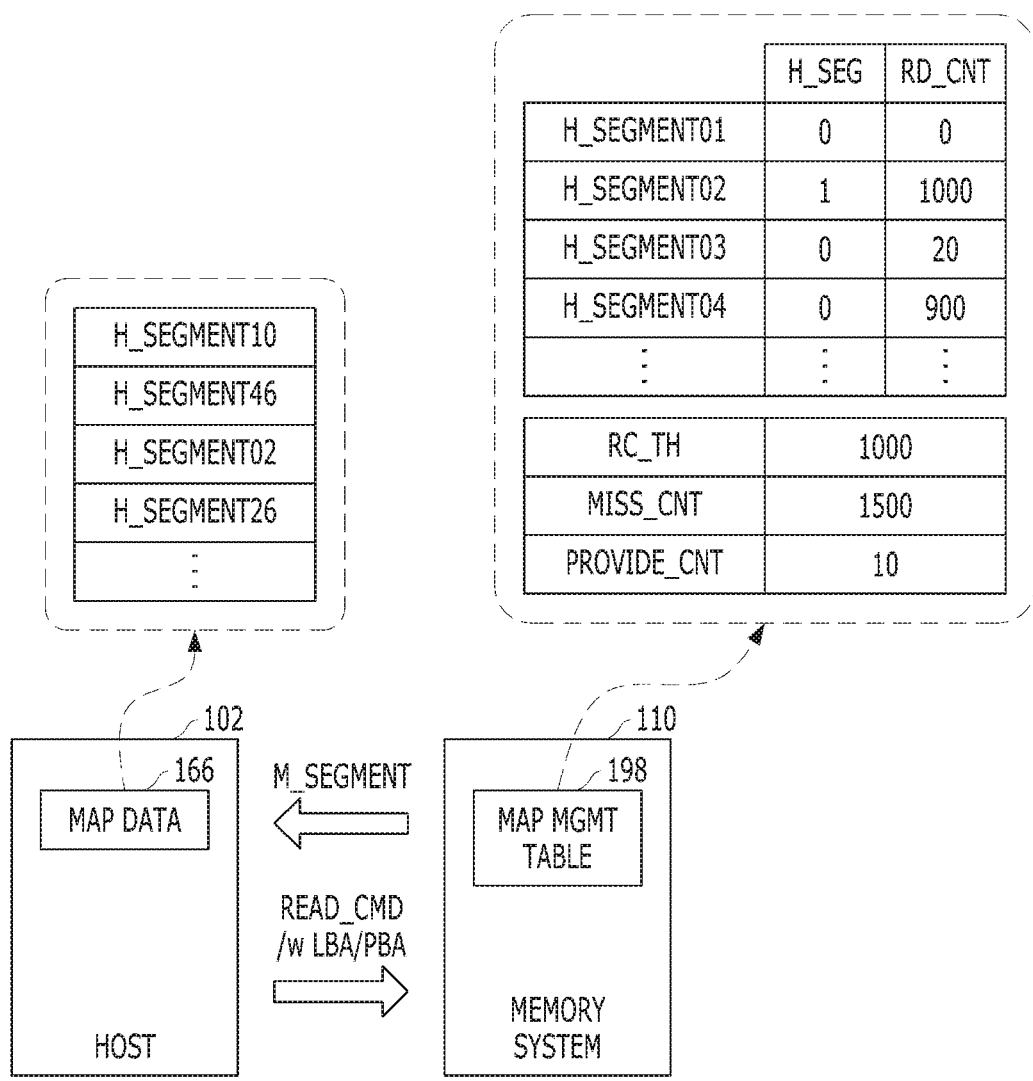
FIG. 19 illustrates a map data sharing method according to an embodiment of the disclosure.

FIG. 19 is a diagram illustrating a map data sharing method according to an embodiment.

Referring to FIG. 19, a host 102 and a memory system 110 may cooperate with each other. The host 102 may be a computing device and implemented in the form of a mobile device, a computer and/or a server. The memory system 110 may receive a command from the host 102 and store or output data in response to the received command.

The memory system 110 may have a storage space including a nonvolatile memory cell. For example, the memory system 110 may be implemented in the form of a flash memory and a solid-state drive (SSD).

In order to store data requested by the host 102 in the storage space including the nonvolatile memory cell, the memory system 110 may perform mapping a file system used by the host 102 to the storage space. For example, an address associated with data according to the file system may be referred to as a logical address and an address associated with data in the storage space may be referred to as a physical address.

The memory system 110 may store therein a plurality of map segments each including map data between one or more logical addresses and one or more physical addresses.

When the host 102 provides a logical address to the memory system 110 together with a read request, the memory system 110 may search for a physical address corresponding to the logical address, based on the mapping in at least one map segment stored therein and then output to the host 102 data stored in at the physical address found in the search.

If the host 102 performs the physical address search instead of the memory system 110, time required for the memory system 110 to output data corresponding to the read request provided by the host 102 may be reduced. In this situation, the host 102 may store map data that the host may directly access to search for a physical address and provide the physical address found in the search to the memory system 110.

The memory system 110 may provide a memory map segment M_SEGMENT to the host 102. The host 102 may receive the segment from the memory system 110 and may cache the segment in an internal memory of the host 102, as host map segment H_SEGMENT. The memory map segment may be stored in the memory system 110 and may include the latest map data. The host map segment may be cached by the host 102 after receiving the memory map segment from the memory system 110. The host map segment may be updated when an updated memory map segment is received.

When the memory system 110 provides the host 102 with all of multiple memory map segments and the host 102 stores such memory map segments as the host map segment, the memory system 110 may not need to individually provide the multiple memory map segments. However, it may be difficult for the host 102 to allocate a storage space in the internal memory in order to store the entire memory map segments managed by the memory system 110. Accordingly, the memory system 110 may selectively provide the host 102 with memory map segments including a logical address frequently accessed by the host 102.

The memory system 110 may store map management data 198 in order to selectively provide the host 102 with one or more memory map segments. The map management data 198 may be arranged in a map management (MGMT) table. The map management table may include an identifier of each segment as an index. The map management table may include fields for a read count RD_CNT for each memory segment and host provision (H_SEG) regarding whether each memory map segment has been provided to the host 102.

The read count RD_CNT for a given memory map segment may indicate the number of times a read request associated with that memory map segment has been received. Specifically, the read count RD_CNT may indicate the number of receptions of a read request for logical addresses in a given memory map segment. For example, a first memory map segment M_SEGMENT01 may include map data of first to 100th logical addresses and a read request for the fifth logical address and a read request for the tenth logical address may be received from the host 102. Regardless of whether the host 102 has acquired physical addresses corresponding to the fifth logical address and the tenth logical address by referring to the host map segment or the memory map segment, the read count of the first memory map segment may be '2'. The memory system 110 may provide the host 102 with a memory map segment having a read count greater than or equal to a read count threshold RC_TH.

When the memory system 110 provides the host 102 with the memory map segment selected based on the fixed read count threshold RC_TH, the map cache hit probability of the host 102 may be reduced. In the example of FIG. 19, since the read count of a fourth memory map segment M_SEGMENT04 is '900' and is less than the read count threshold RC_TH, the fourth memory map segment may not be provided to the host 102. However, since the read count of the fourth memory map segment M_SEGMENT04 is close to the read count threshold RC_TH, it may be expected that the configuration logical addresses of the fourth memory map segment M_SEGMENT04 will be frequently read. Since the host 102 stores no fourth host map segment corresponding to the fourth memory map segment therein, a map cache miss may occur whenever the host 102 reads data of the configuration logical addresses of the fourth memory map segment M_SEGMENT04.

According to an embodiment, the memory system 110 may adjust the read count threshold RC_TH according to a set condition in order to increase the map cache hit probability of the host 102. In an embodiment, the memory system 110 may adjust the read count threshold based on a miss count MISS_CNT and a provision count PROVIDE_CNT. The miss count indicates the total number of map cache misses that have occurred in the host 102. The provision count indicates the total number of memory map segments provided to the host 102. The map management data 198 may further include the miss count MISS_CNT, the provision count PROVIDE_CNT, and the read count threshold RC_TH.

Figure 20:
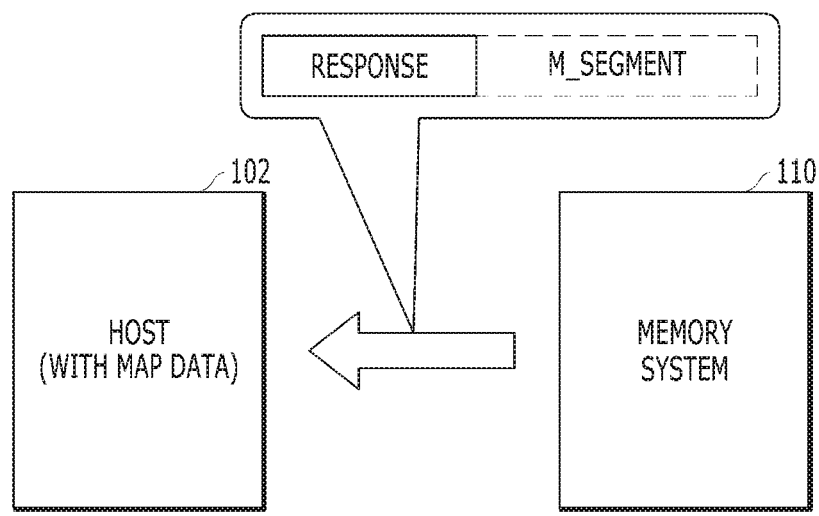
FIG. 20 illustrates a transaction between a host and a memory system in a data processing system according to an embodiment of the disclosure.

FIG. 20 is a diagram illustrating a transaction between the host 102 and the memory system 110 in the data processing system according to an embodiment.

Referring to FIG. 20, the memory system 110 may transmit the memory map segment M_SEGMENT to the host 102. The memory system 110 may transmit the memory map segment M_SEGMENT using a response RESPONSE corresponding to a command of the host 102.

There is no particular limitation on the type of response for transmitting map data. For example, the memory system 110 may transmit map data to the host 102 using a response corresponding to a read request, a response corresponding to a write command, and a response corresponding to an erase command.

The memory system 110 and the host 102 may exchange requests and responses according to a unit format set according to a specific protocol. For example, the format of the response RESPONSE may include a basic header, a request due to the success or failure of a request provided by the host 102, and additional information indicating the state of the memory system 110. The memory system 110 may put map data into the response RESPONSE and transmit the response RESPONSE to the host 102.

Figure 21:
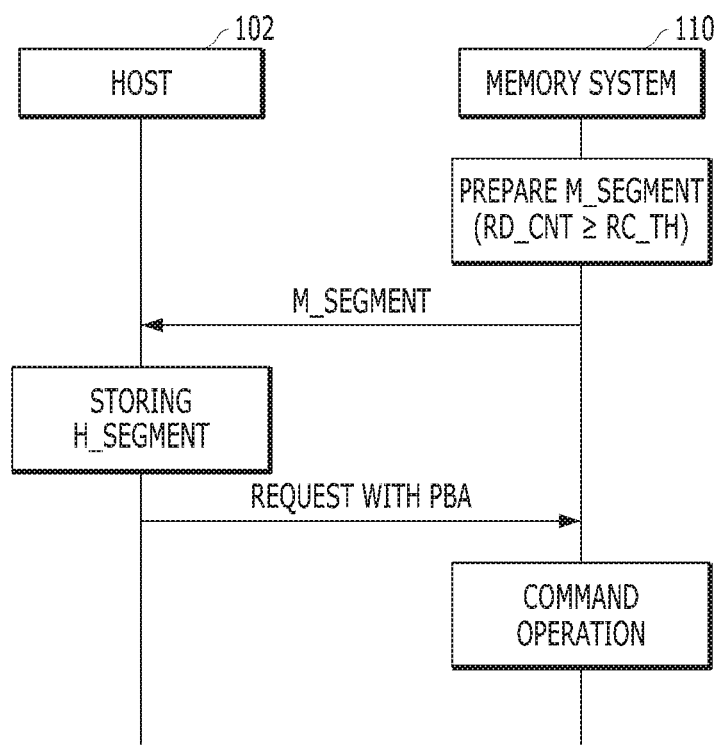
FIG. 21 illustrates operations of a host and a memory system according to an embodiment of the disclosure.

FIG. 21 is a diagram illustrating operations of the host 102 and the memory system 110 according to an embodiment. Specifically, FIG. 21 illustrates a process in which the memory system 110 transmits map data based on the need of the host 102.

Referring to FIG. 21, the memory system 110 may provide the host 102 with a memory map segment M_SEGMENT, which is expected to be frequently referenced by the host 102, in order to improve the read performance of the memory system 110. For this operation, first, the memory system 110 may count the number of reads or read requests to generate a read count RC_TH for each memory map segment based on a logical address in a read request from the host 102. The memory system 110 may prepare a memory map segment M_SEGMENT having a read count RD_CNT greater than or equal to a read count threshold RC_TH.

The memory system 110 may provide the host 102 with the prepared memory map segment M_SEGMENT. The host 102 may store the memory map segment M_SEGMENT from the memory system 110 in the internal storage space thereof (for example, the host cache 106 described in FIG. 20) as a host map segment H_SEGMENT.

The host 102 may put a physical address PBA into a request to be provided to the memory system 110 by referring to the stored host map segment H_SEGMENT and provide the request with the physical address PBA to the memory system 110. The memory system 110 may perform a corresponding operation using the physical address PBA in the request.

FIG. 22A is a diagram illustrating the map management data 198 according to an embodiment. FIG. 22A illustrates the map management data 198 at a first time.

Referring to FIG. 22A, the map management data 198 may be presented in the map management table. The map management table may include an identifier of each memory map segment as an index. The map management table may include fields for the read count RD_CNT, which is indicated for each memory map segment and host provision (H_SEG), which indicates whether the corresponding memory map segment has been provided to the host 102. The read count of each memory map segment may be the number of times any of the logical addresses in that segment was associated with a read request. The memory system 110 may provide the host 102 with a memory map segment having a read count RD_CNT greater than or equal to the read count threshold RC_TH. For example, when referring to the read count field of the map management table, the read count of a second memory map segment M_SEGMENT02 at the first time RD_CNT (1000) is equal to the read count threshold RC_TH (thereby satisfying the greater than or equal to requirement), and as indicated by the host provision field H_SEG, the second memory map segment may have been provided to the host 102 one time.

The MM 44 of FIG. 2 may increase the read count of the memory map segment based on the logical address in the read request of the host 102. When the MM 44 increases the read count of each memory map segment by substantially the same value in response to all read requests from the past to the present, it may be difficult to reflect the latest read trend. According to an embodiment, in order to reduce the influence of past read counts, the MM 44 may periodically decrease the read count of each memory map segment at a set rate or a set percentage.

FIG. 22B illustrates the map management data 198 at a second time after the first time. FIG. 22B illustrates a case where, relative to the first time indicated by FIG. 22A, the MM 44 after the first time decreases the read count of each memory map segment to 90% of the existing read count and increases the read count of a corresponding memory map segment in response to read requests.

Referring to FIG. 22A and FIG. 22B, the configuration logical addresses of the first memory map segment M_SEGMENT01 may not have been read at all up to the first time and may have been read 10 times after the first time up to the second time. The MM 44 may change the read count of the first memory map segment to '10'.

The MM 44 may decrease the read count of the second memory map segment M_SEGMENT02, which was '1,000' after the first time, to '900' corresponding to 90% of the existing read count. The configuration logical addresses of the second memory map segment M_SEGMENT02 may not be read at all after the first time up to the second time. The read count of the second memory map segment M_SEGMENT02 (1000) was equal to the read count threshold RC_TH (1000) at the first time but the read count of the second memory map segment M_SEGMENT02 (900) is less than the read count threshold RC_TH (1000) at the second time. The MM 44 may provide the host 102 with a remove signal REMOVE in addition to a response to be provided to the host 102 such that the second memory map segment is not maintained any longer in the host 102.

The configuration logical address of the third memory map segment M_SEGMENT03 may have been read once after the first time. The MM 44 may decrease the read count of the third memory map segment M_SEGMENT03, which was '20' at the first time, to '18' corresponding to 90% of the existing read count and change '18' to '19' to reflect the one read.

The configuration logical address of the fourth memory map segment M_SEGMENT04 may have been read 194 times after the first time up to the second time. The MM 44 may decrease the read count of the fourth memory map segment M_SEGMENT04, which was '900' at the first time, to '810' corresponding to 90% of the existing read count and change '810' to '1004' to reflect the 194 reads. Since the configuration logical addresses of the fourth memory map segment M_SEGMENT04 have been frequently read, the read count of the fourth memory map segment M_SEGMENT04 may be greater than or equal to the read count threshold RC_TH. The MM 44 may provide the fourth memory map segment M_SEGMENT04 to the host 102 in order to improve the performance of the read operation.

Figure 23:
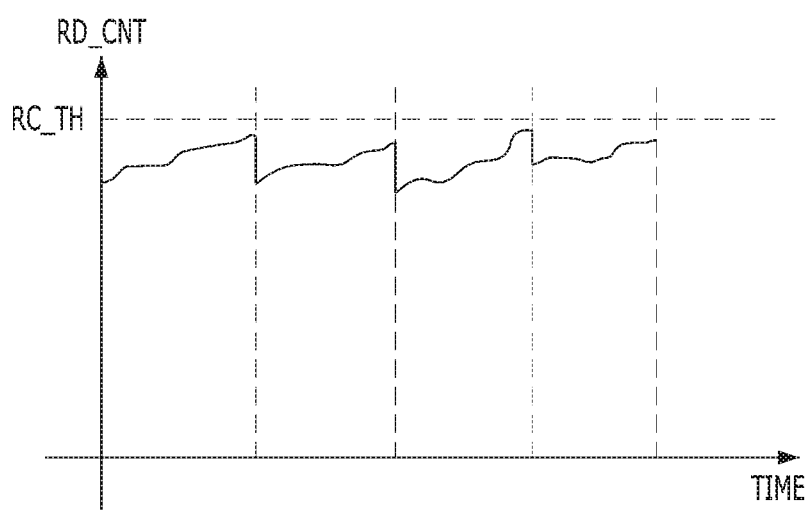
FIG. 23 is a graph for explaining an issue that may occur when a memory system provides a memory map segment based on a fixed read count threshold.

FIG. 23 is a graph for explaining an issue that may occur when the memory system 110 provides a memory map segment based on the fixed read count threshold.

In the graph of FIG. 23, a horizontal axis denotes time TIME and a vertical axis denotes the read count RD_CNT of the memory map segment. The fixed read count threshold RC_TH is illustrated on the vertical axis. As described with reference to FIG. 22A and FIG. 22B, in order to reduce the influence of the past reads and reflect the latest read trend, the MM 44 may decrease the read count of each memory map segment at a set cycle, i.e., periodically. Even though the configuration logical address of a certain memory map segment is read several times, the read count of the certain memory map segment may repeatedly increase and decrease and may be kept slightly less than the fixed read count threshold. Since the read count of the certain memory map segment is less than the fixed read count threshold, the MM 44 may not provide the certain memory map segment to the host 102. Since the host cache 106 does not cache a host map segment corresponding to the certain memory map segment, a map cache miss may occur whenever the host 102 reads configuration logical addresses in the certain memory map segment.

When there are several memory map segments having a read count slightly less than the fixed read count threshold, a map cache miss count may increase significantly. When a map cache miss occurs in the host 102 and the FTL 40 frequently searches for a physical address from memory map segments, the read performance of the memory system 110 may be degraded.

According to an embodiment, when there are many misses, reflected by a high miss count, and few memory map segments that have been provided, i.e., a low provision count, the MM 44 may decrease the read count threshold and provide the host 102 with memory map segments having a slightly lower read count. When the memory map segments having a slightly lower read count is provided to the host 102, the map cache miss probability of the host 102 is reduced, so that it is possible to improve the read performance of the memory system 110.

As described with reference to FIG. 19, the provision count indicates the total number of memory map segments provided to the host 102. An example of a method in which the memory system 110 counts the number of memory map segments provided to the host 102 to generate a provision count is described with reference to FIG. 24. The miss count indicates the total number of map cache misses that have occurred in the host 102. An example of a method in which the memory system 110 counts the map cache misses is described with reference to FIG. 25.

Figure 24:
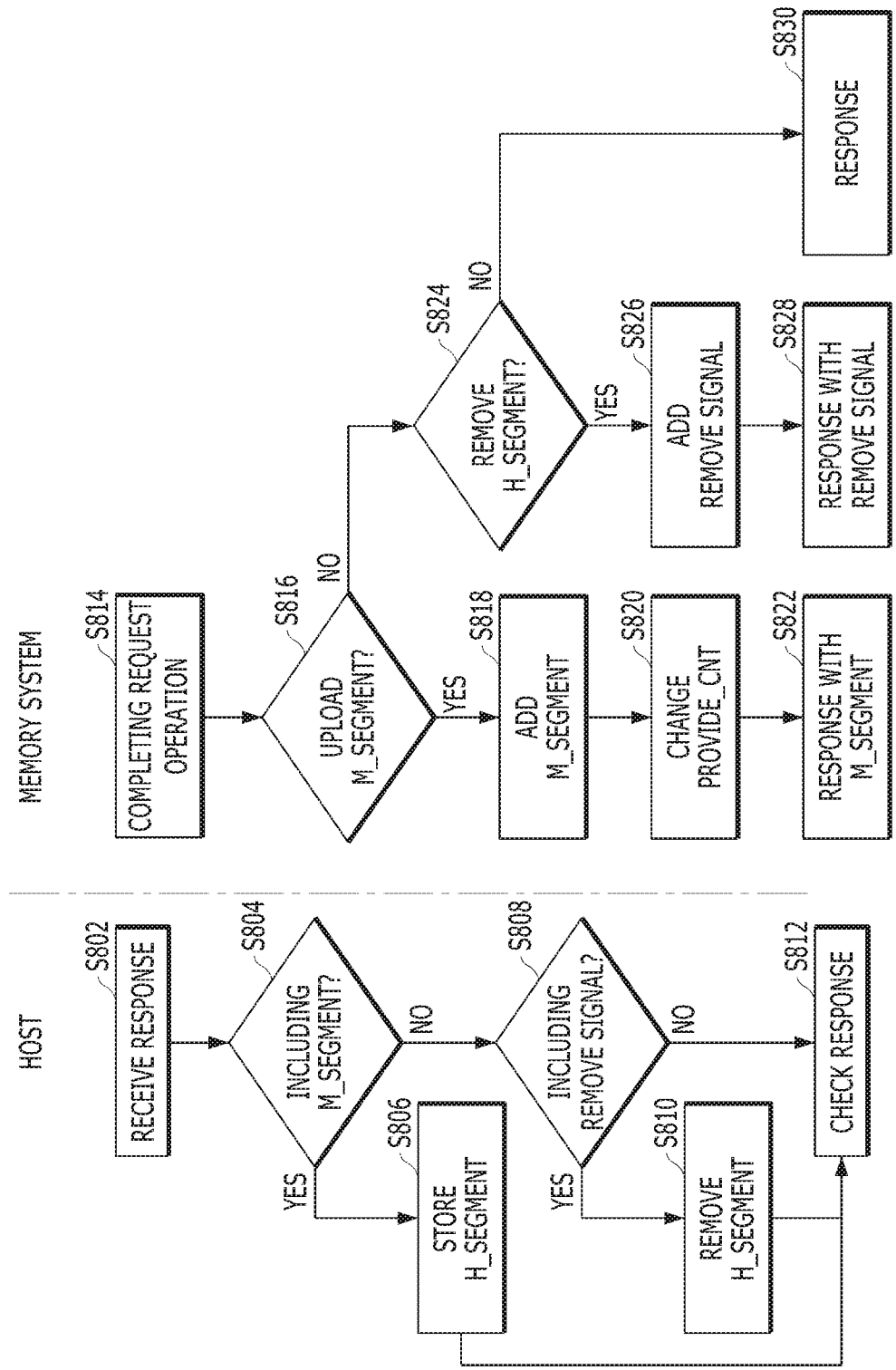
FIG. 24 illustrates operations of a host and a memory system according to an embodiment of the disclosure.

FIG. 24 illustrates a second operation of the host 102 and the memory system 110 according to an embodiment. Steps S814, S816, S818, S820, S822, S824, S826, S828, and S830 illustrate a case where the memory system 110 completes an operation corresponding to a request from the host 102 and intends to provide a memory map segment M_SEGMENT. Steps S802, S804, S806, S808, S810, and S812 illustrate a case where the host 102 stores the memory map segment M_SEGMENT received with a response from the memory system 110.

Referring to FIG. 24, in step S814, the FTL 40 may complete the operation corresponding to the request from the host 102. In step S816, the MM 44 of the FTL 40 may determine whether there is a memory map segment M_SEGMENT to be provided (or uploaded) to the host 102 before providing the host 102 with a response RESPONSE corresponding to the request. The memory map segment M_SEGMENT to be provided to the host 102 may be a segment that has not previously been provided to the host 102 and that has a read count greater than or equal to a threshold.

When there is the memory map segment M_SEGMENT to be provided to the host 102 ("YES" in step S816), the MM 44 may add the memory map segment M_SEGMENT to the response RESPONSE in step S818.

In step S820, the MM 44 may change a provision count PROVIDE_CNT. The provision count PROVIDE_CNT may be changed whenever a memory map segment is provided to the host cache 106 regardless of which memory map segment is provided to the host cache 106. The MM 44 may initialize the provision count periodically, i.e., at set cyclical intervals.

In step S822, the host interface 132 may provide the host 102 with the response RESPONSE with the memory map segment M_SEGMENT.

When there is no memory map segment M_SEGMENT to be provided to the host 102 ("NO" in step S816), the MM 44 may determine whether there is a memory map segment to be removed from the host 102 in step S824. The memory map segment to be removed from the host 102 may be a host map segment corresponding to the memory map segment at present and having a read count less than a threshold. For example, a host map segment corresponding to a memory map segment whose configuration logical addresses have been frequently accessed in the past but are not frequently accessed at present may be removed from the host 102. In the past, even though the read count of a corresponding memory map segment was greater than or equal to the threshold and thus provided to the host 102, the read count may be periodically decreased as described in FIG. 22A and FIG. 22B and the current read count may be less than the threshold.

When there is the memory map segment to be removed from the host 102 ("YES" in step S824), the MM 44 may add a remove signal to a response RESPONSE in step S826. In step S828, the host interface 132 may provide the host 102 with the response RESPONSE with the remove signal.

When there is no memory map segment to be removed from the host 102 ("NO" in step S824), the host interface 132 may provide the host 102 with a response RESPONSE corresponding to a request of the host 102.

In step S802, the host controller 108 may receive the response RESPONSE from the memory system 110.

In step S804, the processor 104 may determine whether the response includes the memory map segment M_SEGMENT.

When the response includes the memory map segment M_SEGMENT ("YES" in step S804), the processor 104 may cache the memory map segment M_SEGMENT in the response in the host cache 106 as a host map segment H_SEGMENT in step S806. Then, in step S812, the processor 104 may check a response corresponding to a request.

When the response includes no memory map segment M_SEGMENT ("NO" in step S804), the processor 104 may determine whether the response includes the remove signal in step S808.

When the response includes the remove signal ("YES" in step S808), the processor 104 may remove the memory map segment corresponding to the remove signal in the response from the host cache 106, in step S810. In step S812, the processor 104 may check the response corresponding to the request.

When the response includes no remove signal ("NO" in step S808), the processor 104 may check the response corresponding to the request in step S812.

Figure 25:
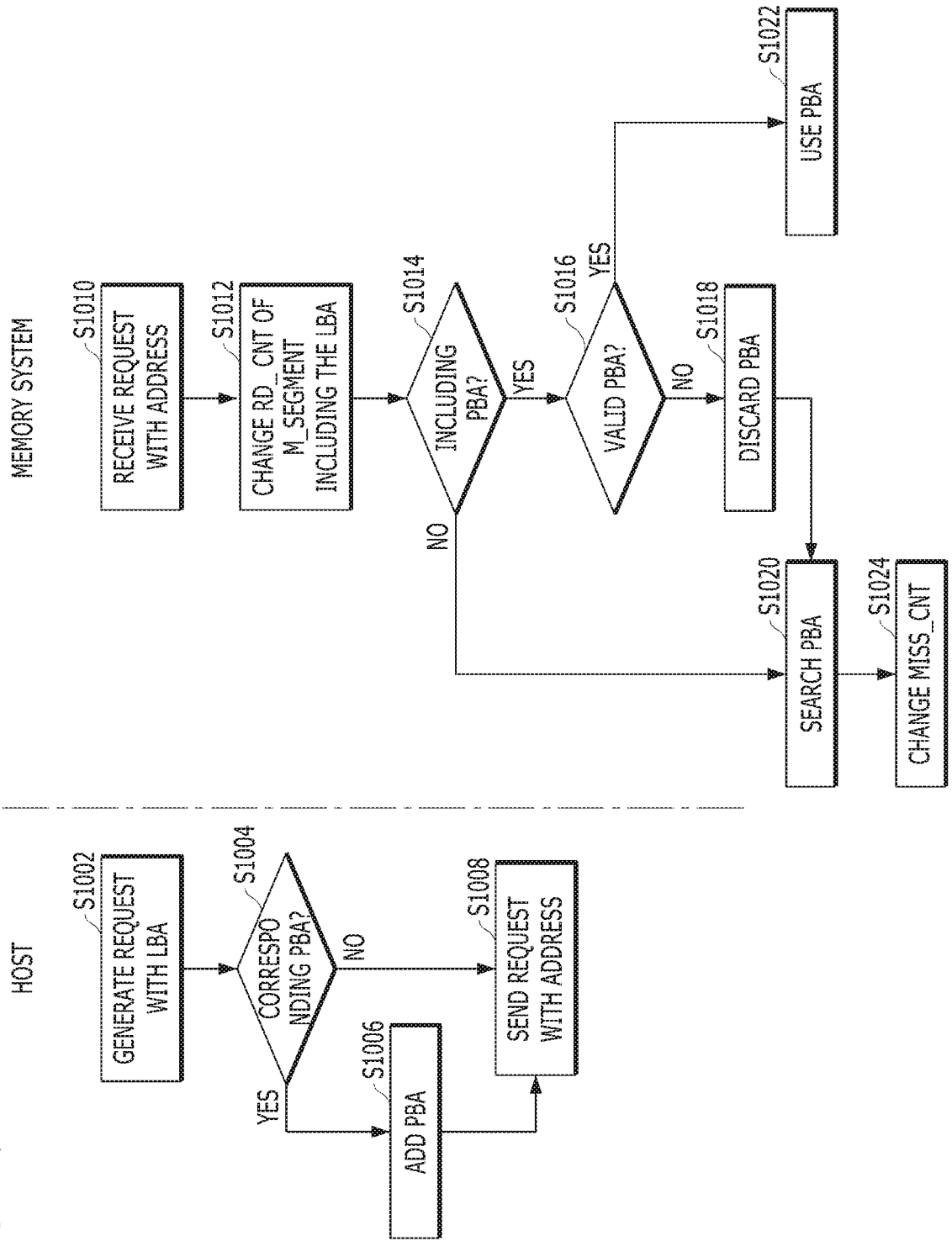
FIG. 25 illustrates operations of a host and a memory system according to an embodiment of the disclosure.

FIG. 25 illustrates operations of the host 102 and the memory system 110 according to an embodiment. Steps S1002, S1004, S1006, and S1008 illustrate the operation of the host 102 that provides a request with a logical address (LBA) and a physical address (PBA). Steps S1010, S1012, S1014, S1016, S1018, S1020, S1022, and S1024 illustrate a detailed operation of the memory system 110 that receives the request from the host 102.

Referring to FIG. 25, in step S1002, the processor 104 may generate a request REQUEST with the logical address (LBA).

In step S1004, the host controller 108 may determine whether a physical address (PBA) corresponding to a logical address is included in a host map segment cached to the host cache 106.

When there is no corresponding physical address ("NO" in step S1004), the host controller 108 may provide the memory system 110 with a request REQUEST with a logical address in step S1008.

When there is the corresponding physical address ("YES" in step S1004), the host controller 108 may add a physical address PBA to the request REQUEST with the logical address, in step S1006. In step S1008, the host controller 108 may provide the memory system 110 with the request REQUEST with the logical address and the physical address in step S1008.

In step S1010, the host interface 132 may receive the request REQUEST from an exterior source (i.e., a host 102). A command received from the host 102 may include a logical address LBA. In step S1012, the MM 44 may change the read count RD_CNT of a memory map segment M_SEGMENT including the logical address LBA.

In step S1014, the MM 44 may determine whether a physical address PBA is included in the received request REQUEST.

When there is no physical address PBA in the received request REQUEST ("NO" in step S1014), the MM 44 may search for a physical address PBA corresponding to the logical address LBA in the received request REQUEST, in step S1020.

When the physical address PBA is in the received request REQUEST ("YES" in step S1014), the MM 44 may determine whether the physical address PBA is valid, in step S1016. The host 102 may perform mapping based on the memory map segment received from the memory system 110, put the physical address PBA into a request, and provide the memory system 110 with the request with the physical address PBA. After the memory system 110 provides the memory map segment to the host 102, a memory map segment managed by the memory system 110 may be changed and updated. When the host map segment and the memory map segment are not the same, since the physical address received from the host 102 may not be used as is, the MM 44 may determine whether the physical address in the received request is valid.

For example, when a memory map segment is provided to the host 102 and then is changed, the MM 44 may store a flag, which indicates that the memory map segment has been changed, in the memory 144. When a logical address and a physical address are received from the host 102, the MM 44 may determine whether the physical address is valid by determining whether a memory map segment including the logical address has been changed. A method of determining whether the physical address received from the host 102 is valid may vary depending on the implementation of the memory system 110.

When the physical address PBA in the received request REQUEST is valid ("YES" in step S1016), the MM 44 may perform an operation corresponding to the request REQUEST using the physical address PBA, in step S1022.

When the physical address PBA in the received request REQUEST is not valid ("NO" in step S1016), the MM 44 may discard the physical address PBA in step S1018. In step S1020, the MM 44 may search for the physical address PBA based on the logical address in the received request REQUEST.

It can be understood that a map cache hit has occurred in the host 102 when the request of the host 102 includes a valid physical address PBA, so that the memory system 110 is able to use the physical address PBA in the request REQUEST in step S1022. On the other hand, it can be understood that a map cache miss has occurred in the host 102 when the request of the host 102 includes no valid physical address, so that the memory system 110 searches for a physical address in step S1020. Accordingly, after searching for the physical address in step S1020, the MM 44 may change a miss count MISS_CNT in step S1024. The miss count MISS_CNT may be changed whenever a map cache miss occurs regardless of the occurrence of a map cache miss of the configuration logical address of a certain memory map segment. In an embodiment, the MM 44 may initialize the miss count MISS_CNT periodically, i.e., at cyclical intervals.

Figure 26:
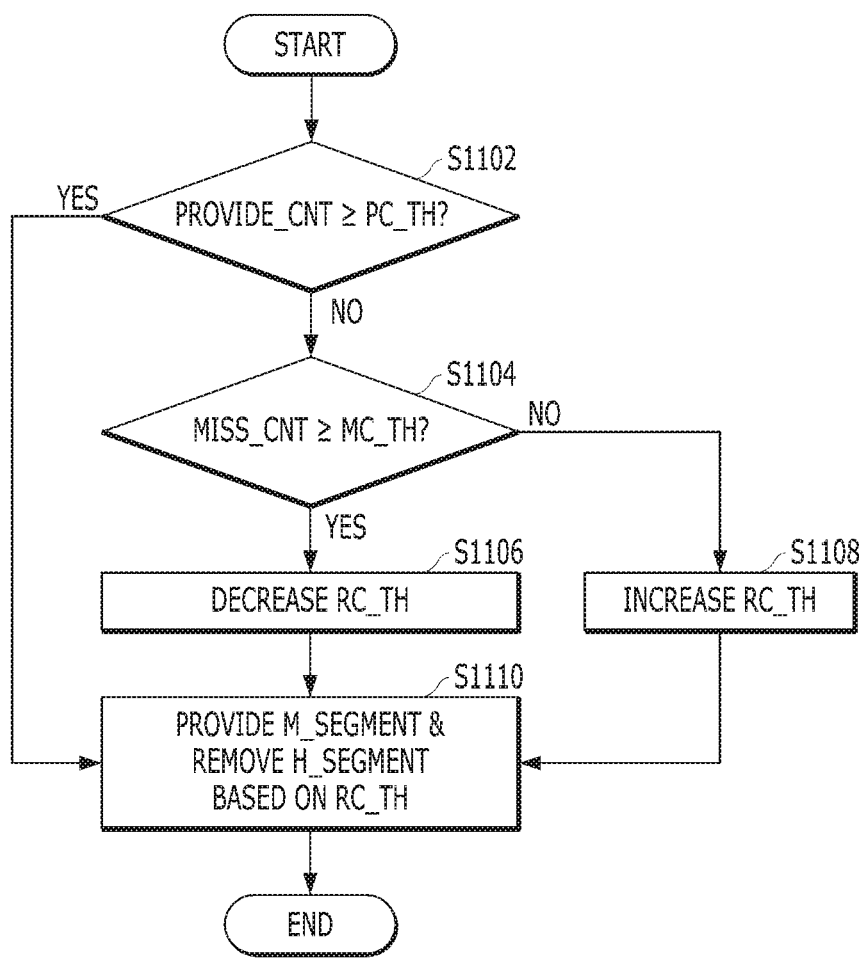
FIG. 26 illustrates an operation of a memory system according to an embodiment of the disclosure.

FIG. 26 is a flowchart illustrating an operation of the memory system 110 according to an embodiment.

Referring to FIG. 26, in step S1102, the MM 44 may determine whether a provision count PROVIDE_CNT is greater than or equal to a provision count threshold PC_TH.

When the provision count PROVIDE_CNT is greater than or equal to the provision count threshold PC_TH ("YES" in step S1102), the MM 44 may maintain a read count threshold. In step S1110, the MM 44 may provide the host 102 with a memory map segment M_SEGMENT, based on the maintained read count threshold RC_TH. The provided memory map segment M_SEGMENT may have a read count greater than or equal to the read count threshold RC_TH.

When the provision count PROVIDE_CNT is less than the provision count threshold PC_TH ("NO" in step S1102), the MM 44 may determine whether a miss count MISS_CNT is greater than or equal to a miss count threshold MC_TH, in step S1104.

When the miss count MISS_CNT is greater than or equal to the miss count threshold MC_TH ("YES" in step S1104), the MM 44 may decrease the read count threshold RC_TH in step S1106. In step S1110, the MM 44 may provide the host 102 with a memory map segment M_SEGMENT, based on the decreased read count threshold RC_TH. The provided memory map segment M_SEGMENT may have a read count greater than or equal to the read count threshold RC_TH.

When the provision count PROVIDE_CNT is less than the provision count threshold PC_TH and the miss count MISS_CNT is greater than or equal to the miss count threshold MC_TH, it may indicate a case where many segments are not provided from the memory system 110 to the host 102 despite a large number of map cache misses in the host 102. The MM 44 may provide memory map segments to the host 102 based on the decreased read count threshold, so that it is possible to reduce the map cache miss probability of the host 102. When the map cache miss probability of the host 102 is reduced, it is possible to reduce the number of times that the memory system 110 searches for a physical address among memory map segments. Accordingly, it is possible to improve the performance of the memory system 110.

When the miss count MISS_CNT is less than the miss count threshold MC_TH ("NO" in step S1104), the MM 44 may increase the read count threshold RC_TH in step S1108. In step S1110, the MM 44 may provide the host 102 with a memory map segment M_SEGMENT, based on the increased read count threshold RC_TH. The provided memory map segment M_SEGMENT may have a read count greater than or equal to the read count threshold RC_TH.

When the provision count PROVIDE_CNT is less than the provision count threshold PC_TH and the miss count MISS_CNT is less than the miss count threshold MC_TH, it may indicate a case where the host 102 may successfully perform physical address search with only host map segments. Accordingly, the MM 44 may recover the decreased read count threshold by increasing the read count threshold. In an embodiment, there may be an upper limit of the read count threshold.

In an embodiment, steps S1102, S1104, S1106, and S1108 may be performed periodically or at cyclical intervals. The MM 44 may initialize the provision count and the miss count periodically or at cyclical intervals.

In an embodiment, the read count may be periodically decreased fixed percentage. As described with reference to FIG. 22A and FIG. 22B, the MM 44 periodically decreases the read count of each memory map segment, so that it is possible to reduce the influence of the past read counts and reflect the latest read trend.

According to an embodiment, the memory system 110 may provide the host 102 with at least some memory map segments including map data indicating mapping between logical addresses and physical addresses. The host 102 may store the memory map segments as host map segments. The host 102 may provide a physical address identified in a search of the host map segments as well as a logical address to be read when providing a read request.

According to an embodiment, the memory system 110 may provide the host 102 with memory map segments including a logical address that is frequently read by the host 102. Depending on the temporal and spatial locality of data access, the host 102 is highly likely to access the logical address in the memory map segment. Therefore, there is a high probability that a map cache hit will occur and a physical address will be provided together therewith when the host 102 provides a read request.

According to an embodiment, the memory system 110 may provide the host 102 with memory map segments having a read count greater than or equal to the read count threshold and change the read count threshold according to a set condition. The memory system 110 provides the memory map segments to the host 102 based on the changed read count threshold, thereby further increasing the probability that a map cache hit will occur and a physical address will be provided together therewith when the host 102 provides a read request. Accordingly, it is possible to further improve the read performance of the memory system 110.

Figure 27A:
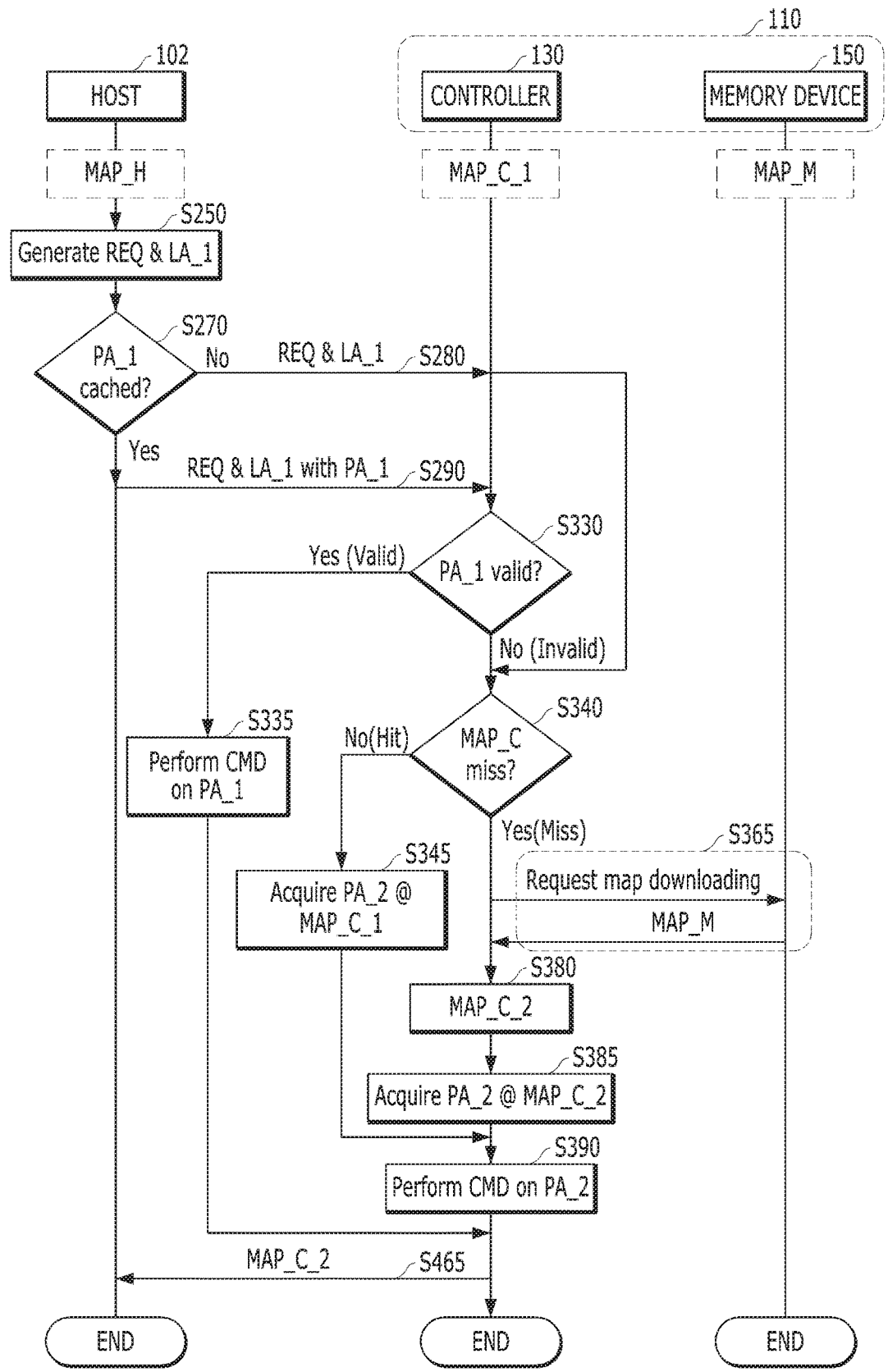
FIGS. 27A to 27E illustrate an example of a method for performing an access operation by a data processing system according to an embodiment of the disclosure.

FIG. 27A illustrates a method for performing a map downloading operation, corresponding to logical and physical addresses, transmitted from a host 102 to a memory system 110, and a map cache of the memory system 110, in a data processing system.

FIG. 27A illustrates a data processing system in which the host 102 can transmit a logical address and a physical address corresponding to the logical address to the memory system 110, in order to improve the input/output performance of the memory system 110.

Referring to FIG. 27A, the data processing system according to an embodiment includes the host 102 and the memory system 110. The host 102 may include a processor, a host controller interface and a host memory. The memory system 110 may include a controller 130 and a memory device 150. When power is supplied to the host 102 and the memory system 110 (power-on), the host 102 and the memory system 110 may be operably connected with each other. At this time, the memory system 110 may download memory map data MAP_M stored in the memory device 150. The memory system 110 may store the memory map data MAP_M downloaded from the memory device 150 as controller map data MAP_C_1 into a cache memory of the controller 130. The memory system 110 may upload the controller map data MAP_C_1 to the host 102. The host 102 may store the controller map data MAP_C received from the memory system 110 as host map data MAP_H into a host memory. In this way, the host map data MAP_H are stored in the host memory, the memory map data MAP_M are stored in the memory device 150, and the controller map data MAP_C_1 are stored in the memory of the memory system 110.

The processor within the host 102 generates a request REQ and a first logical address LA_1 corresponding to the target of the request REQ in step S250. The host controller interface receives the generated request REQ and the first logical address LA_1 from the processor. The host controller interface may determine whether a first physical address PA_1 corresponding to the first logical address LA_1 is stored (PA_1 cached), based on logical-to-physical (L2P) map data included in the host map data MAP_H stored in the host memory, in step S270.

The storage capacity of a host memory may be larger than the storage capacity of the cache memory of in the memory system 110. Therefore, even though all or most of memory map data MAP_M, not a part thereof, stored in the memory device 150 are transmitted to the host memory, operations of the host 102 and the memory system 110 may not be burdened. The size of a space allocated to store host map data MAP_H in the host memory may be equal to or smaller than the size of controller map data MAP_C. In addition, the size of a space allocated to store the host map data MAP_H in the host memory may be larger than the size of the controller map data MAP_C. When the size of the space allocated to the host map data MAP_H is limited to a predetermined size, the host 102 may select a release policy of the host map data MAP_H. For example, when there is not enough space in a storage space allocated to the host map data MAP_H to store a new map segment MS, the host 102 may discard a part of the host map data MAP_H and store new map data, according to a Least Recently Used (LRU) policy or a Least Frequently Used (LFU) policy. In addition, when map data MD is updated through a garbage collection operation or a wear leveling operation in the memory system 110, the controller 130 may upload an updated portion to the host 102 as the controller map data MAP_C. The host 102 may invalidate an old portion of the host map data MAP_H, which corresponds to the updated portion.

When a first physical address PA_1 corresponding to a first logical address LA_1 is not stored in the host map data MAP_H, a host controller interface transmits the request REQ and the first logical address LA_1 to the memory system 110 without the first physical address PA_1. In this case, the host controller interface may include the first logical address LA_1 with the request REQ and transmit the same to the memory system 110.

When the determination result of step S270 indicates that the first physical address PA_1 corresponding to the first logical address LA_1 is not included in the host map data MAP_H (No in step S270), the host controller interface transfers the request REQ and the first logical address LA_1 to the memory system 110 without the first physical address PA_1, in step S280. At this time, the host controller interface may transmit the first logical address LA_A with the request REQ to the memory system 110.

When the determination result of step S270 indicates that the first physical address PA_1 corresponding to the first logical address LA_1 is included in the host map data MAP_H (Yes in step S270), the host controller interface transfers the first physical address PA_1 with the request REQ and the first logical address LA_1 to the memory system 110 in step S290. At this time, the host controller interface may include the first physical address PA_1 in a reserved area of a command format of the request REQ, and transmit the first physical address PA_1 with the request REQ to the memory system 110.

When only the request REQ and the first logical address LA_1 without the first physical address PA_1 are received from the host 102 in step S280, the memory system 110 determines whether a map miss occurs between the first logical address LA_1 and the controller map data MAP_C_1, in step S340. That is, the memory system 110 determines whether L2P map data for the first logical address LA_1 are included in the controller map data MAP_C_1, in step S340.

When the first physical address PA_1 is received with the request REQ and the first logical address LA_1 from the host 102 in step S290, the memory system 110 determines the validity of the first physical address PA_1 received with the request REQ in step S330. At this time, the memory system 110 may determine whether the first physical address PA_1 is valid, using dirty information or invalid address information.

When the determination result of step S330 indicates that the first physical address PA_1 is valid (Yes in step S330), the memory system 110 may perform a command operation on the first physical address PA_1 in step S335.

When the determination result of step S330 indicates that the first physical address PA_1 is not valid (No in step S330), the memory system 110 determines that the first physical address PA_1 is invalid. Furthermore, the memory system 110 searches for a valid physical address in order to perform the command operation for the first logical address LA_1 on the valid physical address. For this operation, the memory system 110 determines whether a map miss occurs between the first logical address LA_1 and the controller map data MAP_C_1, in step S340. That is, the memory system 110 determines whether the map data for the first logical address LA_1 are included in the controller map data MAP_C_1 stored in the memory of the controller 130, in step S340.

When the determination result of step S340 indicates that the map data for the first logical address LA_1 are included in the controller map data MAP_C_1 (No in step S340), the memory system 110 determines that a map hit, not a map miss, occurred between the first logical address LA_1 and the controller map data MAP_C_1. Thus, the memory system 110 acquires a second physical address PA_2 by searching the controller map data MAP_C_1, the second physical address PA_2 being a valid physical address corresponding to the first logical address LA_1, in step S345. The memory system 110 performs the command operation on the second physical address PA_2 acquired in step S345, in step S390.

When the determination result of step S340 indicates that the map data for the first logical address LA_1 are not included in the controller map data MAP_C_1 (Yes in step S340), the memory system 110 determines that a map miss occurred between the first logical address LA_1 and the controller map data MAP_C_1. That is, the memory system 110 determines that the second physical address PA_2 corresponding to the first logical address LA_1 are not included in the controller map data MAP_C_1.

Therefore, the memory system 110 performs a map download operation for the memory map data MAP_M in step S365. The memory system 110 may request the memory map data MAP_M including the map data of the first logical address LA_1 from the memory device 150. The memory device 150 may transmit the memory map data MAP_M, which includes the valid physical address corresponding to the first logical address LA_1, to the memory system 110 according to a map download request received from the memory system 110. The memory system 110 may store the memory map data MAP_M received from the memory device 150 in the memory. Thus, the controller map data MAP_C_1 may be updated into controller map data MAP_C_2 in step S380.

The memory system 110 acquires the second physical address PA_2 corresponding to the first logical address LA_1 by searching the controller map data MAP_C_2, updated in step S380, in step S385. The memory system 110 may perform a command operation on the second physical address PA_2 acquired in step S385, in step S390.

Then, the memory system 110 may transmit a response to the host 102, the response including a message indicating that the operation for the request REQ received from the host 102 has been completed.

In the present embodiment, when the memory system 110 receives the first logical address LA_1 and the first physical address PA_1 corresponding to the first logical address LA_1 together from the host 102 in step S290 and the first physical address PA_1 is valid (Yes in step S330), steps S345 and S385 of searching for the second physical address PA_2 may be omitted. In particular, when the first physical address PA_1 is valid (Yes in step S330) and the map data for the first logical address LA_1 are included in the controller map data MAP_C_1 (map hit, No in step S340), the map downloading S365 in which the memory system 110 searches for the second physical address PA_2 may be omitted. This configuration can further shorten the performance time of the command operation performed by the memory system 110.

Hereinafter, a method for performing the access operation by the data processing system according to an embodiment is described with reference to FIGS. 27B to 27E.

Figure 27B:
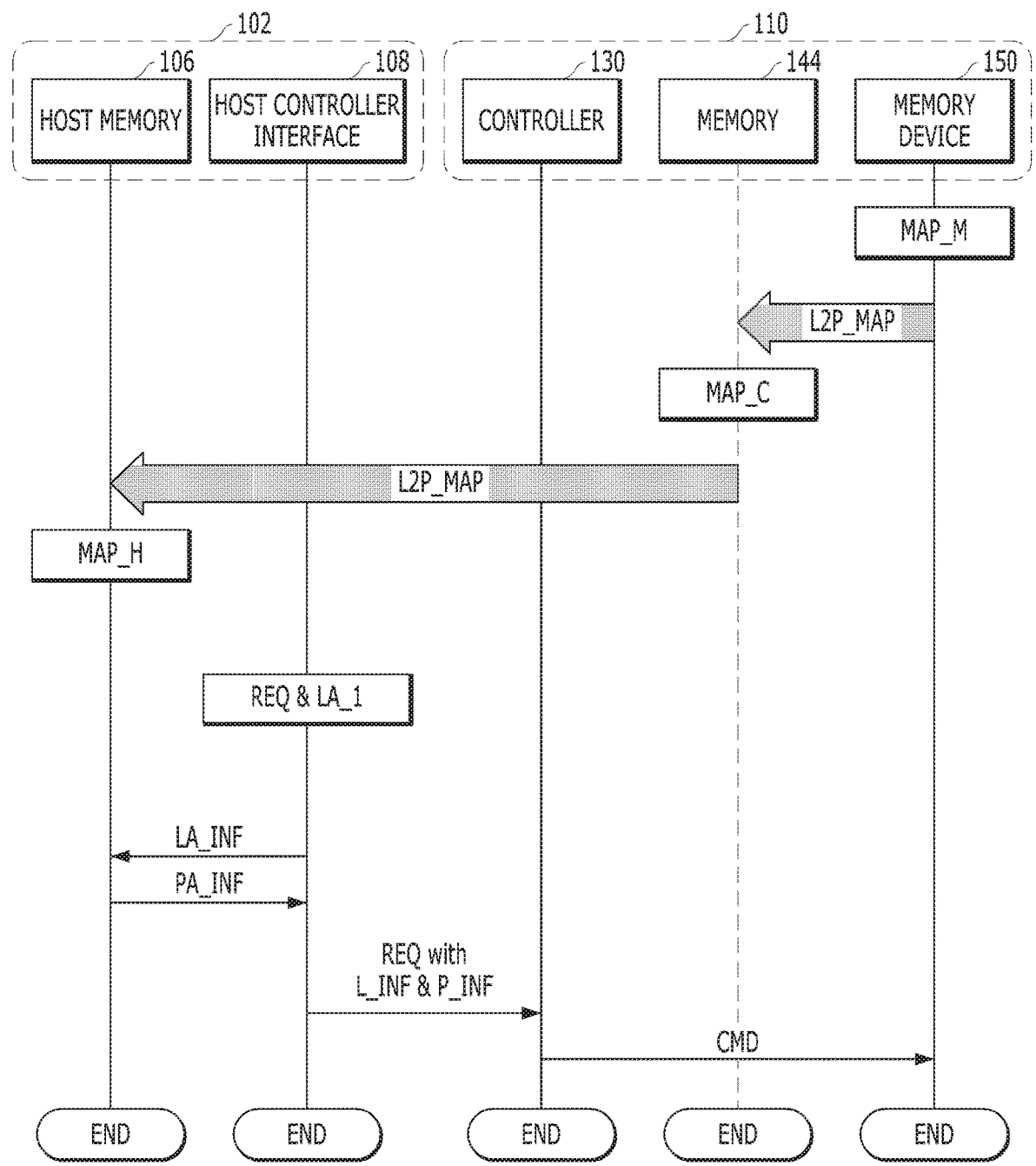
Figure 27C:
Figure 27D:
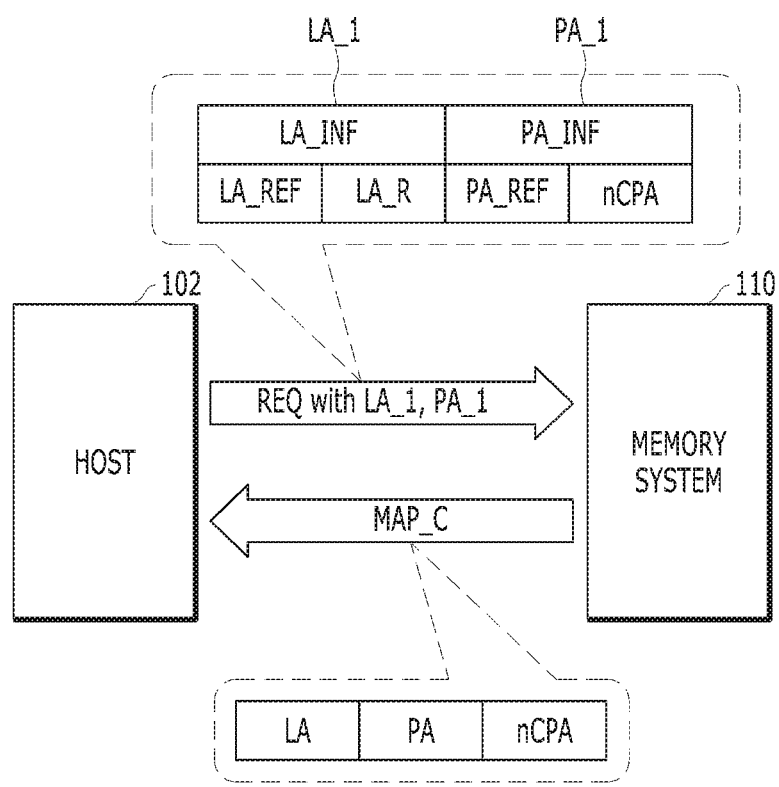
Figure 27E:
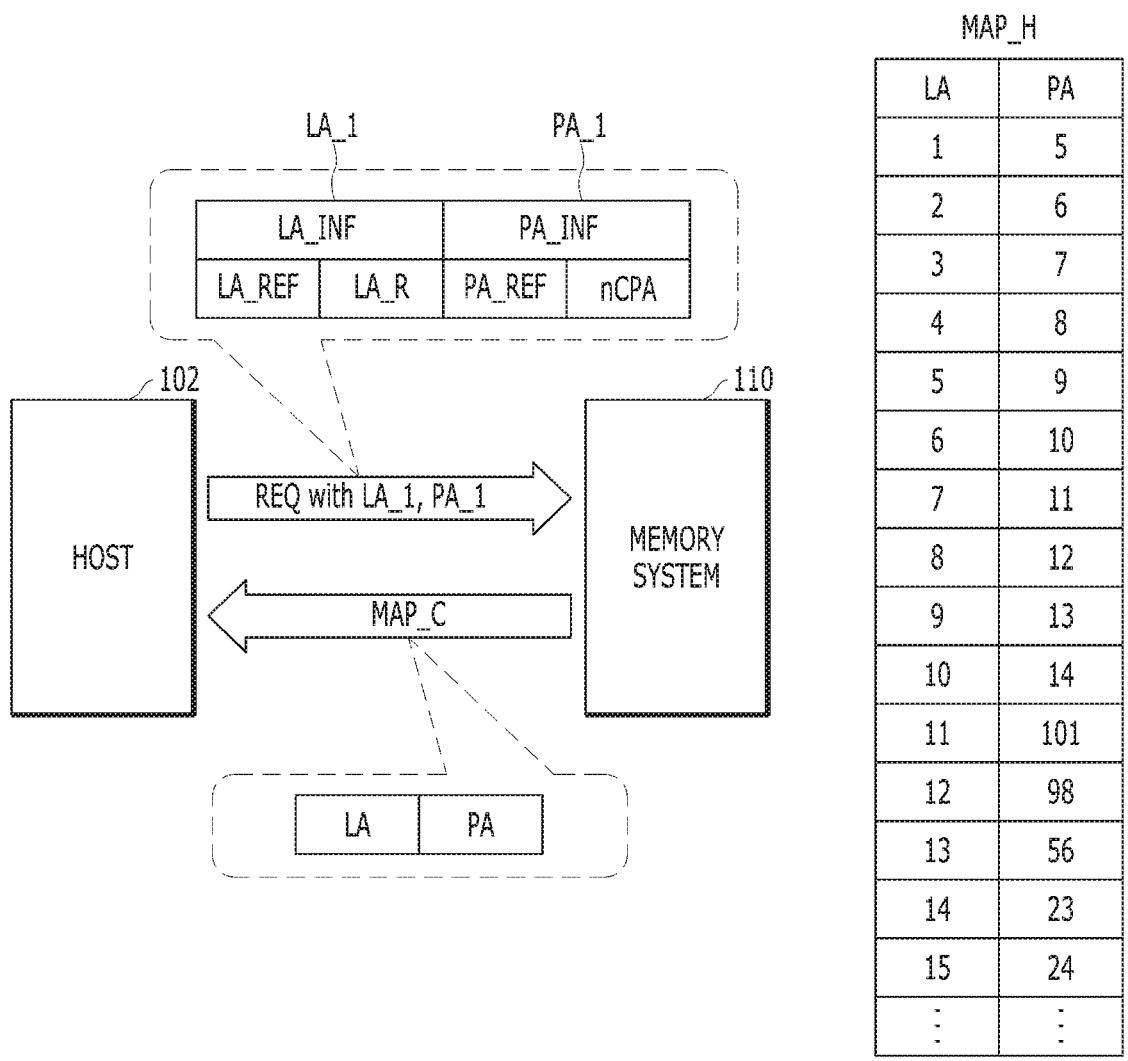

FIG. 27B illustrates an example of the controller map data MAP_C generated by the memory system 110. FIG. 27C illustrates an example of an access request and map data between a host and a memory system. FIG. 27D illustrates another example of an access request and map data between a host and a memory system. FIG. 27E illustrates another example of an access request and map data between a host and a memory system.

Referring to FIG. 27C, the controller map data MAP_C includes L2P (Logical to Physical) map information comprising a logical address LA of the host 102 and a physical address PA of the memory device 150.

Particularly, in the present embodiment, the controller map data MAP_C further includes a consecutive physical address number nCPA, as shown in MAP_C_1. In the present embodiment, the consecutive physical address number nCPA is included in a physical address PA, as shown in MAP_C_2.

The consecutive physical address number nCPA is the number of two or more consecutive physical addresses that are consecutive with a certain physical address PA. When a plurality of physical addresses PA corresponding to a plurality of consecutive logical addresses LA are consecutive, the controller 130 may generate the consecutive physical address number nCPA of each consecutive physical addresses, respectively. That is, when the physical addresses 'PA5 to PA14' corresponding to the consecutive logical addresses LA1 to LA10 are all consecutive, the controller 130 may generate the consecutive physical address number nCPA for each of the consecutive physical addresses PA5 to PA14, respectively.

Referring to FIG. 27C, the consecutive physical address number nCPA of the physical address PA5 is '+9'. It means that the number of consecutive physical addresses which are consecutive with the physical address PA5 is '9', That is, there are nine consecutive physical addresses which are consecutive with the physical address PA5, as shown in the MAP_C_1. As shown in the MAP_C_2, the consecutive physical address number nCPA of '+9' may be included in the physical address PA5 corresponding to the logical addresses LA1 thereby having a form of '5+9'.

Referring to FIG. 27D, the memory system 110 transmits the controller map data MAP_C including a plurality of L2P map information, to the host 102. Each of the L2P map information includes a logical address LA, a physical address PA and the consecutive physical address number nCPA. The consecutive physical address number nCPA is the number of physical addresses that are consecutive with the physical address PA.

The host 102 may store the controller map data MAP_C as the host map data MAP_H in the host memory 106. The host 102 may transmit an access request REQ with the L2P map information to the memory system 110.

When the number of the logical address LA in the L2P map information is in a plural, a plurality of physical addresses corresponding to the plurality of logical addresses are also required.

In this embodiment of the invention, consecutive logical addresses related to the access request REQ and received from the host 102 is referred to as a first logical address LA_1. In this embodiment of the invention, the consecutive physical addresses related to the access request REQ and received from the host 102 is referred to as a first physical address PA_1.

As shown in FIG. 27D, a logical information LA_INF includes a reference logical address LA_REF and a logical address range LA_R. The logical information LA_INF is for indicating the plurality of logical addresses included in the first logical address LA_1. The plurality of logical addresses in the first logical address LA_1 may be indicated by one reference logical address LA_REF and a logical address range LA_R which are consecutive with the reference logical address LA_REF.

A physical information PA_INF includes a reference physical address PA_REF and a consecutive physical address number nCPA. The reference physical address PA_REF is a physical address corresponding to the reference logical address LA_REF. The consecutive physical address number nCPA is the number of a plurality of the physical addresses that are consecutive with the reference physical address PA_REF.

The reference logical address LA_REF may have the lowest address index or the highest address index, among consecutive logical addresses related to the access request REQ. For example, when the logical addresses related to the access request REQ are 'LA1 to LA10', the reference logical address LA_REF may be 'LA1' having the lowest address index or 'LA10' having the highest address index.

According to the embodiment, the logical address range LA_R may indicate a size or a length of the two or more consecutive logical addresses related to the access request REQ.

The logical address range LA_R may include a range of the consecutive logical addresses having address indexes sequentially increased by 1. The logical address range LA_R may include a range of the consecutive logical addresses having address indexes sequentially decreased by 1. The address indexes are consecutive with the address index from the reference logical address LA_REF. For example, if the first logical address LA_1 includes logical addresses 'LA1 to LA10' and the reference logical address LA_REF is 'LA', the number of logical addresses consecutive with to the reference logical address LA_REF may be '+9'. That is, there are nine consecutive logical addresses which are consecutive with the reference logical address LA_REF of 'LA1'.

According to the embodiment, if the reference logical address LA_REF has the lowest address index, the logical address range LA_R may have the highest address index. For example, if the first logical address LA_1 includes logical addresses 'LA1 to LA10', and the reference logical address LA_REF is 'LA1', the logical address range LA_R may be indicated by 'LA10'. When the reference logical address LA_REF is the logical address having the highest address index, the logical address range LA_R may be indicated by the logical address having the lowest address index. For example, when the logical addresses related to the access request REQ are to 'LA1 to LA10', and the reference logical address LA_REF is 'LA10', the logical address range LA_R may be indicated by 'LA1'.

Consequently, in the present embodiment, when the plurality of the logical addresses are to 'LA1 to LA10', the host 102 may generate one format of 'LA1+9' or 'LA1,LA10' as an example of the combination of the reference logical address LA_REF and the logical address range LA_R, with reference to the host map data MAP_H.

The reference physical address PA_REF may be a physical address corresponding to the reference logical address LA_REF. The consecutive physical address number nCPA may include the number of consecutive physical addresses, which are one or more physical addresses consecutive with the reference physical address PA_REF.

In this case, the host controller interface 108 may include the logical information LA_INF and the physical information PA_INF in a reserved region of an command format of the access request REQ, and transmit the logical address range LA_R and the physical information PA_INF, included in the reserved region of the command format, to the memory system 110.

When receiving, from the host 102, the access request REQ with the logical information LA_INF and the physical information PA_INF, the memory system 110 determines validity of the reference physical address PA_REF included in the physical information PA_INF.

When the reference physical address PA_REF is valid, the memory system 110 may perform the command operation on a physical location of the memory device 150, which corresponds to a physical address range calculated based on the logical information LA_INF and the physical information PA_INF.

In the present embodiment, when the host 102 transmits an access request for a plurality of logical addresses to the memory system 110, the host 102 does not transmit the plurality of logical addresses to the memory system 110 a plurality of times. The host 102 according to the present embodiment may request access to the plurality of logical addresses by transmitting the reference logical address LA_REF and the logical address range LA_R to the memory system 110 one time. In other words, the logical information LA_INF and the physical information PA_INF may be included in one access request ACESS_REQ inputted from the host 102.

In the present embodiment, as the memory system 110 does not separately perform an L2P conversion operation and a map loading operation. The memory system 110 may directly performs the command operation on the physical address range calculated based the logical information LA_INF and the physical information PA_INF. Accordingly, a performance time of the command operation performed in the memory system 110 may be shortened.

In the present embodiment, as illustrated in FIG. 27E, the memory system 110 may uploads the L2P map information which does not include the consecutive physical address number nCPA. In this case, the host 102 may store the L2P map information without the consecutive physical address number nCPA, as the host map data MAP_H.

When the host 102 requests an access to the memory system 110, the host 102 may generate the physical information PA_INF including the reference physical address PA_REF and the consecutive physical address number nCPA using the L2P map information stored in the host map data MAP_H. The host 102 may transmit the physical information PA_INF to the memory system together with the access request REQ.

Figure 28:
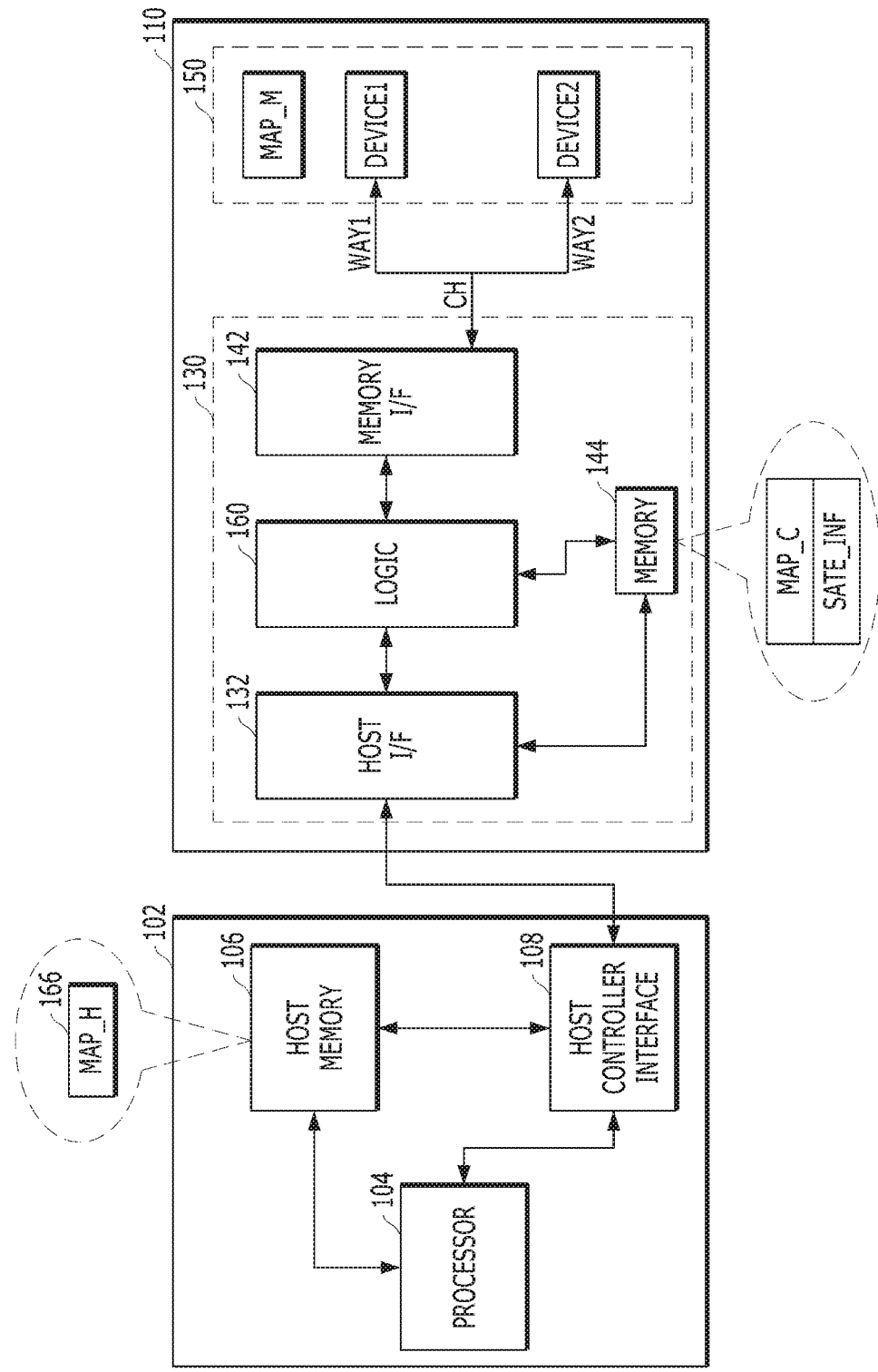
FIG. 28 illustrates an example of a data processing system including a memory system according to an embodiment of the disclosure.

Referring to FIG. 28, the host 102 may include a processor 104, host memory 106, and a host controller interface 108. The memory system 110 may include a controller 130 and a memory device 150. Herein, the controller 130 and the memory device 150 described with reference to FIG. 28 may correspond to the controller 130 and the memory device 150 described with reference to FIGS. 1 to 2.

FIG. 28 illustrates certain differences with respect to the data processing system shown in FIG. 1. Particularly, a logic block 160 in the controller 130 may correspond to the flash translation layer (FTL) 40 described with reference to FIG. 2. However, according to an embodiment, the logic block 160 in the controller 130 may perform an additional function that the flash translation layer (FTL) 40 of FIG. 2 may not perform.

The host 102 may include the processor 104, which has a higher performance than that of the memory system 110. the host 102 also includes the host memory 106 which is capable of storing a greater amount of data than that of the memory system 110 that cooperates with the host 102. The processor 104 and the host memory 106 in the host 102 have an advantage in terms of space and upgradability. For example, the processor 104 and the host memory 106 have less of a space limitation than the processor 134 and the memory 144 in the memory system 110. The processor 104 and the host memory 106 may be replaceable with upgraded versions, which is different than the processor 134 and the memory 144 in the memory system 110. In the embodiment of FIG. 28, the memory system 110 can utilize the resources of the host 102 in order to increase the operation efficiency of the memory system 110.

As an amount of data stored in the memory system 110 increases, an amount of metadata corresponding to the data stored in the memory system 110 also increases. When storage capability used to load the metadata in the memory 144 of the controller 130 is limited or restricted, the increased amount of loaded metadata may cause an operational burden on the controller 130. For example, because of the limitation of space or region allocated for metadata in the memory 144 of the controller 130, only some, but not all, of the metadata may be loaded. If the loaded metadata does not include specific metadata for a physical location to which the host 102 intends to access, the controller 130 must store the loaded metadata back into the memory device 150 if some of the loaded metadata has been updated, as well as load the specific metadata for the physical location the host 102 intends to access. These operations should be performed for the controller 130 to perform a read operation or a write operation directed by the host 102, and may degrade performance of the memory system 110.

Storage capability of the host memory 106 in the host 102 may be tens or hundreds of times greater than that of the memory 144 in the controller 130. The memory system 110 may transfer metadata 166 used by the controller 130 to the host memory 106 so that at least some part or portion of the host memory 106 may be accessed by the memory system 110. The part of the host memory 106 accessible by the memory system 110 can be used as a cache memory for address translation required for reading or writing data in the memory system 110. In this case, the host 102 translates a logical address into a physical address based on the metadata 166 stored in the host memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address transferred. In this case, overhead (e.g., operational burden) of the controller 130 loading metadata from the memory device 150 for the address translation may be reduced or eliminated, and operational efficiency of the memory system 110 can be enhanced.

On the other hand, even if the memory system 110 transmits the metadata 166 to the host 102, the memory system 110 can control mapping information based on the metadata 166 such as metadata generation, erase, update, and the like. The controller 130 in the memory system 110 may perform a background operation such as garbage collection or wear leveling according to an operation state of the memory device 150 and may determine a physical address, i.e., which physical location in the memory device 150 data transferred from the host 102 is to be stored. Because a physical address of data stored in the memory device 150 may be changed and the host 102 has not recognized the changed physical address, the memory system 110 may control the metadata 166 on its own initiative.

While the memory system 110 controls metadata used for the address translation, it can be determined that the memory system 110 needs to modify or update the metadata 166 previously transmitted to the host 102. The memory system 110 can send a signal or metadata to the host 102 so as to request the update of the metadata 166 stored in the host 102. The host 102 may update the stored metadata 166 in the host memory 106 in response to a request delivered from the memory system 110. This allows the metadata 166 stored in the host memory 106 in the host 102 to be kept as the latest version such that, even though the host controller interface 108 uses the metadata 166 stored in the host memory 106, there is no problem in an operation that a logical address is translated into a physical address and the translated physical address is transmitted along with the logical address to the memory system 110.

The metadata 166 stored in the host memory 106 may include mapping information used for translating a logical address into a physical address.

Referring to FIG. 28, metadata associating a logical address with a physical address may include two distinguishable items: a first mapping information item used for translating a logical address into a physical address; and a second mapping information item used for translating a physical address into a logical address. Among them, the metadata 166 stored in the host memory 106 may include the first mapping information. The second mapping information can be primarily used for internal operations of the memory system 110, but might not be used for operations requested by the host 102 to store data in the memory system 110 or read data corresponding to a particular logical address from the memory system 110. In an embodiment, the second mapping information item might not be transmitted by the memory system 110 to the host 102.

The controller 130 in the memory system 110 can control (e.g., create, delete, update, etc.) the first mapping information item or the second mapping information item, and store either the first mapping information item or the second mapping information item to the memory device 150. Because the host memory 106 is a type of volatile memory, the metadata 166 stored in the host memory 106 may disappear when an event such as interruption of power supply to the host 102 and the memory system 110 occurs. Accordingly, the controller 130 in the memory system 110 might not only keep the latest state of the metadata 166 stored in the host memory 106, but also store the latest state of the first mapping information item or the second mapping information item in the memory device 150.

Figure 29:
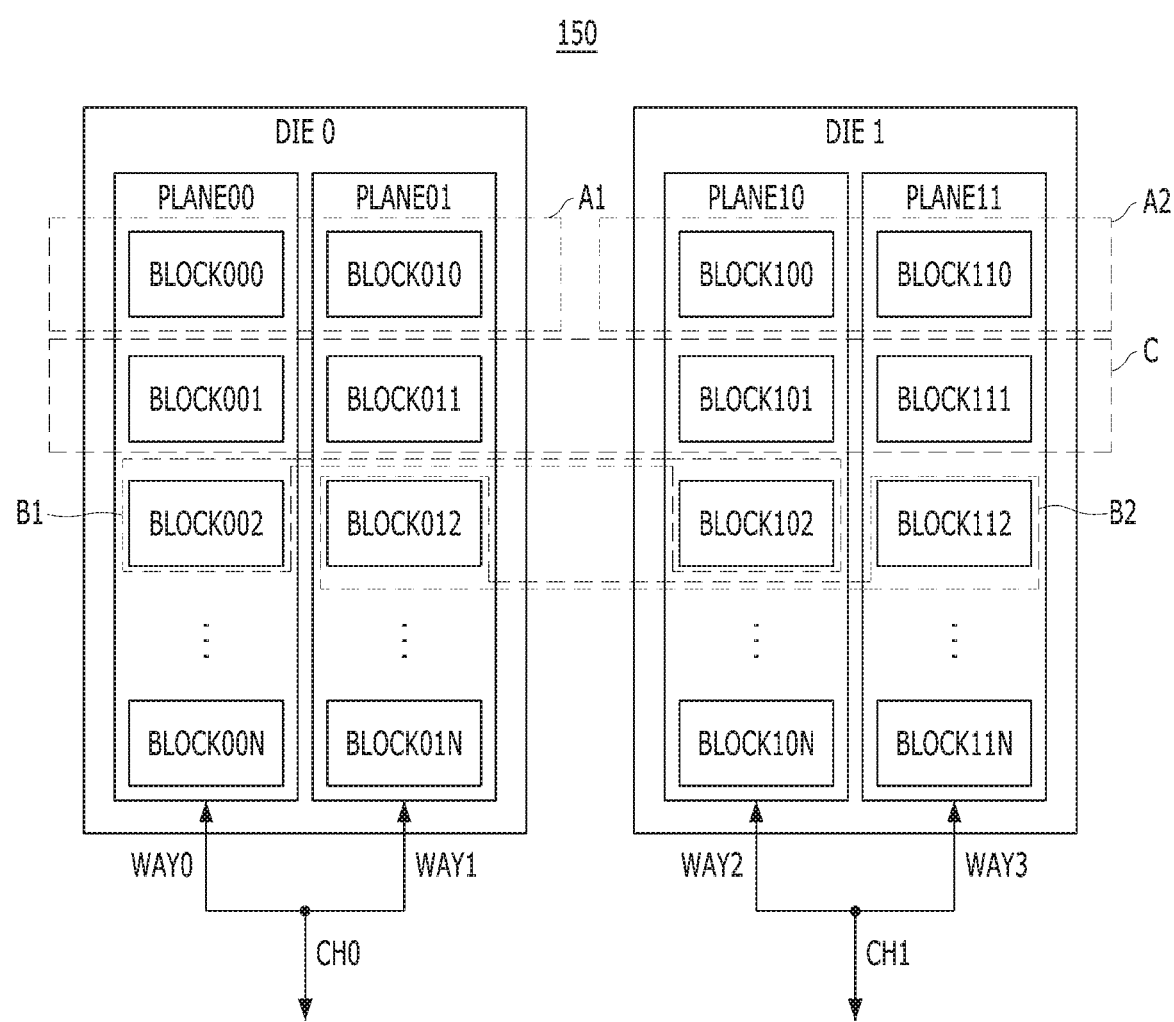
FIG. 29 illustrates examples of a memory device according to an embodiment of the disclosure.

FIG. 29 is a diagram illustrating a super memory block used in a memory system according to an embodiment of the invention.

Referring to FIG. 29, the memory device 150 includes a plurality of memory blocks BLOCK000 to BLOCK11N.

The memory device 150 includes a zeroth memory die DIE0 capable of inputting/outputting data through a zeroth channel CH0 and a first memory die DIE1 capable of inputting/outputting data through a first channel CH1, CH0 and CH1 may input/output data in an interleaving scheme.

DIE0 includes a plurality of planes PLANE00 and PLANE01 respectively corresponding to a plurality of ways WAY0 and WAY1 capable of inputting/outputting data in the interleaving scheme by sharing CH0.

DIE1 includes a plurality of planes PLANE10 and PLANE11 respectively corresponding to a plurality of ways WAY2 and WAY3 capable of inputting/outputting data in the interleaving scheme by sharing CH1.

PLANE00 of DIE0 includes a set number of memory blocks BLOCK000 to BLOCK00N among the plurality of memory blocks BLOCK000 to BLOCK11N.

PLANE01 of DIE0 includes a set number of memory blocks BLOCK010 to BLOCK01N among the plurality of memory blocks BLOCK000 to BLOCK11N.

PLANE10 of DIE1 includes a set number of memory blocks BLOCK100 to BLOCK10N among the plurality of memory blocks BLOCK000 to BLOCK11N.

PLANE11 of DIE1 includes a set number of memory blocks BLOCK110 to BLOCK11N among the plurality of memory blocks BLOCK000 to BLOCK11N.

In this manner, the plurality of memory blocks BLOCK000 to BLOCK11N in the memory device 150 may be divided into groups according to their physical positions and their use of the ways and channels. The set number of memory blocks in each plane may be the same.

FIG. 29 illustrates, as an example, that the memory device 150 has two dies, each of which has two planes, each of which has the same set number of memory blocks. It is noted, that according to system and/or design specifications, any suitable number of memory dies may be included in the memory device 150, and any suitable number of planes may be included in each memory die. Also, any suitable number of memory blocks may be included in each plane according to system and/or design specifications.

The controller 130 may manage a plurality of memory blocks by grouping the memory blocks into several super memory blocks. Each super memory block includes a subset of memory blocks which may be selected simultaneously among all memory blocks in the memory device 150.

Various schemes of grouping the plurality of memory blocks into a plurality of super memory blocks by the controller 130 are exemplified herein with reference to FIG. 29.

A first scheme is to manage one super memory block A1 by grouping, by the controller 130, one memory block BLOCK000 in the first plane PLANE00 and one memory block BLOCK010 in the second plane PLANE01 of the zeroth memory die DIE0 in the memory device 150. When applying the first scheme to the first memory die DIE1, the controller 130 may manage one super memory block A2 by grouping one memory block BLOCK100 in the first plane PLANE10 and one memory block BLOCK110 in the second plane PLANE11 of the first memory die DIE1.

A second scheme is to manage one super memory block B1 by grouping, by the controller 130, one memory block BLOCK002 in the first plane PLANE00 of the zeroth memory die DIED and one memory block BLOCK102 in the first plane PLANE10 of the first memory die DIE1. When applying the second scheme again, the controller 130 may manage one super memory block B2 by grouping one memory block BLOCK012 in the second plane PLANE01 of the zeroth memory die DIE0 and one memory block BLOCK112 in the second plane PLANE11 of the first memory die DIE1.

A third scheme is to manage one super memory block C by grouping, by the controller 130, one memory block BLOCK001 in the first plane PLANE00 of the zeroth memory die DIE0, one memory block BLOCK011 in the second plane PLANE01 of the zeroth memory die DIE0, one memory block BLOCK101 in the first plane PLANE10 of the first memory die DIE1 and one memory block BLOCK111 in the second plane PLANE11 of the first memory die DIE1.

In the respective super memory blocks, memory blocks may be simultaneously selected through an interleaving scheme, for example, a channel interleaving scheme, a memory die interleaving scheme, a memory chip interleaving scheme or a way interleaving scheme.

Hereinafter, an example of the command operation performed by the memory system according to an embodiment of the disclosure is described with reference to FIGS. 28 and 30. In particular, although FIG. 30 illustrates a read request as an access request inputted from a host, the disclosure is not limited thereto.

Hereinafter, an example of the command operation performed by the memory system according to an embodiment of the disclosure is described with reference to FIGS. 28 and 30.

Figure 30:
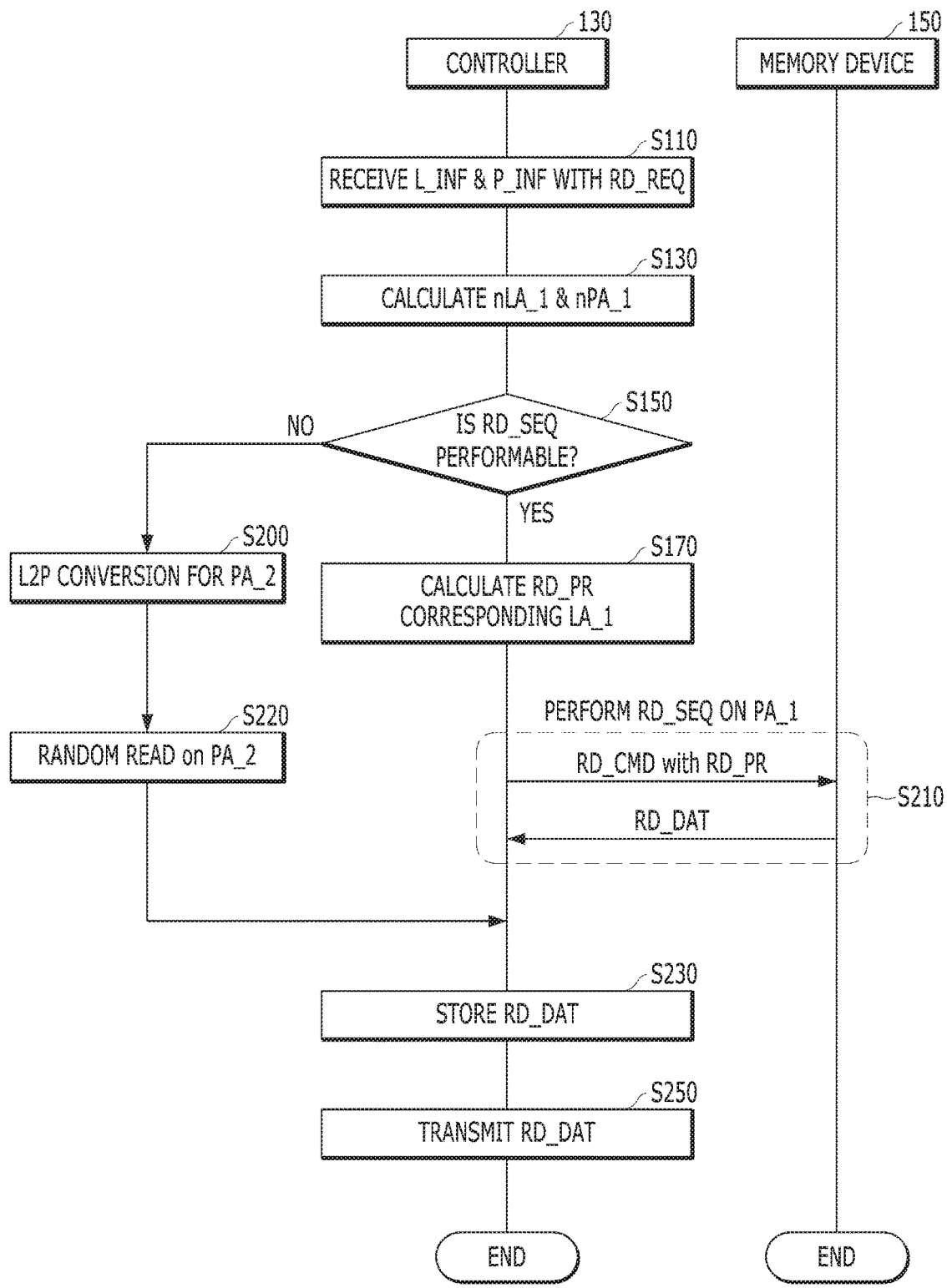
FIG. 30 illustrates an example of a method for performing a read operation by a memory system according to an embodiment of the disclosure.

In particular, although FIG. 30 illustrates a read request as an access request inputted from a host, the disclosure is not limited thereto.

Referring to FIG. 30, the controller 130 receives logical information LA_INF and physical information PA_INF corresponding to the logical information LA_INF together with a read request RD_REQ from the host (e.g. host 102 of FIG. 28) in step S110.

The logical information LA_INF is for a first logical address LA_1 related to the read request RD_REQ, and the physical information PA_INF is for a first physical address PA_1 related to the first logical addresses LA_1.

The logical information LA_INF includes a reference logical address LA_REF and a logical address range LA_R. The physical information PA_INF includes a reference physical address PA_REF and a consecutive physical address number nCPA.

The reference physical address PA_REF may include a physical address corresponding to the reference logical address LA_REF. The consecutive physical address number nCPA may include the number of physical addresses consecutive with the reference physical address PA_REF.

In step S130, the controller 130 calculates a first logical address number nLA_1 and a first physical address number nPA_1 for determining whether a sequential read operation RD_SEQ is performable.

The first logical address number nLA_1 is the number of a plurality logical addresses included in the first logical address LA_1. The first logical address number nLA_1 may be calculated based on the reference logical address LA_REF and the logical address range LA_R. The first physical address number nPA_1 is the number of the reference physical address PA_REF and a plurality physical addresses that consecutive with the reference physical address PA_REF. The first physical address number nPA_1 may be calculated based on the reference physical address PA_REF and the consecutive physical address number nCPA.

In step S150. the controller 130 may determine that the sequential read operation RD_SEQ is performable, based on the first logical address number nLA_1 and the first physical address number nPA_1. In the present embodiment, the controller 130 may compare the first logical address number nLA_1 with the first physical address number nPA_1.

When the first logical address number nLA_1 is less than or equal to the first physical address number nPA_1, the controller 130 may determine that all the physical addresses corresponding to the first logical address LA_1 are all consecutive. Accordingly, the controller 130 may determine that the sequential read operation RD_SEQ is performable in response to the read request RD_REQ.

When the first logical address number nLA_1 is greater than the first physical address number nPA_1, the controller 130 may determine that the physical addresses corresponding to the first logical address LA_1 are not all consecutive. Accordingly, the controller 130 may determine that the sequential read operation RD_SEQ is not performable.

When a determination result obtained in step S150 indicates that the sequential read operation RD_SEQ is performable, the controller 130 may calculate a read physical range RD_PR including physical addresses corresponding to the first logical address LA_1, in step S170.

In this case, the controller 130 may calculate the read physical range RD_PR without an L2P conversion operation for searching for the physical addresses.

Meanwhile, if the read physical range RD_PR is calculated based on only the physical information PA_INF, the read physical range RD_PR may include some physical addresses which are not related to the first logical address LA_1. Accordingly, the controller 130 calculates the read physical range RD_PR based on the logical information LA_INF and the physical information PA_INF. For example, when the reference physical address PA_REF is 'PA5', the consecutive physical address number nCPA is '9' and the first logical address number nLA_1 is '3', the controller 130 may calculate the physical addresses 'PA5, PA6 and PA7' (not 'PA5 to PA14') as the read physical range RD_PR, which is described in detail with reference to FIGS. 31A and 31B.

The controller 130 may perform the sequential read operation RD_SEQ on the calculated read physical range RD_PR, in step S210. In this case, the controller 130 may transmit the read physical range RD_PR to the memory device 150 and receive read data RD_DAT, stored in a physical region (i.e., pages) of the memory device 150 corresponding to the first physical address PA_1, in an interleaving manner. Since a location where the read operation is performable in the interleaving manner has been described with reference to FIG. 29, description thereof is omitted here. Thereafter, the controller 130 stores the received read data RD_DAT in the memory (reference numeral '144' of FIG. 28), in step S230. The controller 130 transmits the read data RD_DAT, stored in the memory 144, to the host 102, in step S250.

When a determination result obtained in step S150 indicates that the sequential read operation RD_SEQ is not performable, the controller 130 determines that the physical addresses corresponding to the logical addresses included in the first logical address LA_1 are not consecutive, but random. Accordingly, the controller 130 performs the L2P conversion operation to search for a second physical address PA_2, corresponding to the logical addresses included in the first logical address LA_1, in the L2P map data, in step S200.

The controller 130 performs a random read operation on the searched second physical address PA_2, in step S220. In this case, the controller 130 may transmit a plurality of physical addresses, included in the second physical address PA_2, to the memory device 150 several times. The controller 130 may randomly receive the read data RD_DAT.

In step S170, the controller 130 may further perform a determination of a validity of the first physical address PA_1, based on dirty information or invalid address information which corresponds to the first logical address LA_1. In the present embodiment, the dirty information may include information on whether a storage location of data corresponding to a logical address is changed. In other words, the dirty information may indicate whether the physical address corresponding to the first logical address LA_1 is changed. The invalid address information may include information on an invalidated physical address through the change in storage location of the data corresponding to the logical address, an erase operation or a mapping release operation of the physical address corresponding to the logical address.

When the first physical address PA_1 is not valid, the controller 130 determines whether a map miss occurs in the L2P map data for the first logical address LA_1. In other words, the controller 130 determines whether the L2P map data for the first logical address LA_1 is included in the controller map data MAP_C stored in the memory 144. When the map data for the first logical address LA_1 is included in the controller map data MAP_C, the controller 130 determines that a map hit of the controller map data MAP_C, not the map miss, has occurred for the first logical address LA_1. Accordingly, the controller 130 searches for and obtains the second physical address PA_2, which corresponds to the first logical address LA_1 and is valid, in the controller map data MAP_C, in step S200. When the map data for the first logical address LA_1 is not included in the controller map data MAP_C, the controller 130 determines that the map miss of the controller map data MAP_C has occurred for the first logical address LA_1. Thus, the controller 130 may perform the map downloading operation of the memory map data MAP_M. The controller 130 stores the memory map data MAP_M downloaded from the memory device 150 as the controller map data MAP_C in the memory 144. As a result, the controller map data MAP_C may be updated through the map downloading operation. The controller 130 may search for and obtain the second physical address PA_2 for the first logical address LA_1 in the updated controller map data MAP_C_2.

Figure 31A:
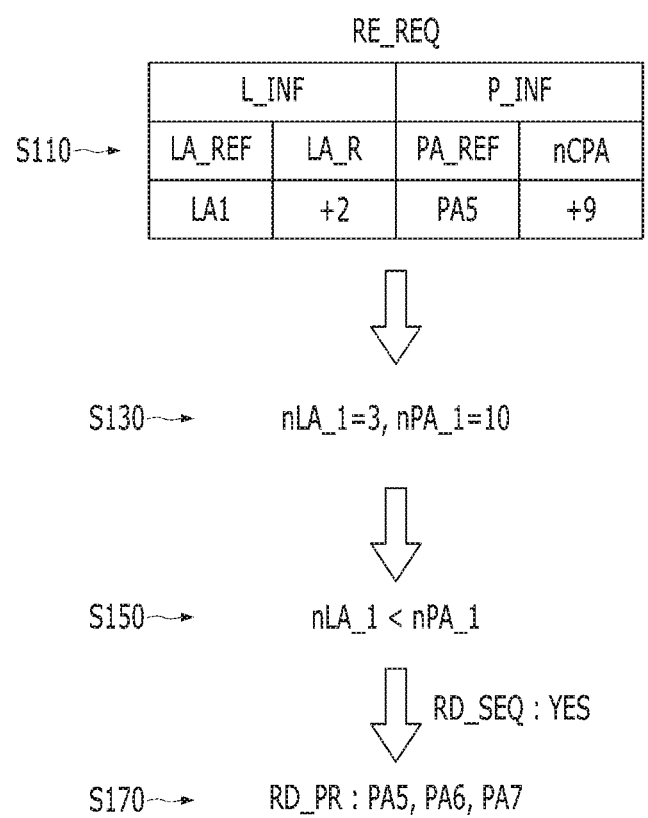

FIGS. 31A and 31B illustrate an example of a method for performing the read operation by a data processing system, including the memory system illustrated in FIG. 30, according to an embodiment.

Hereinafter, a specific method of the sequential read operation RD_REQ described above in FIG. 30 is described in detail with reference to FIGS. 31A and 31B. As an example, it is described in FIGS. 31A and 31B that the reference logical address LA_REF and the reference physical address PA_REF includes the lowest address index among consecutive logical addresses, the logical address range LA_R includes the number of consecutive logical addresses with the reference logical address LA_REF. However, the disclosure is not limited thereto.

Referring to FIG. 31A, the reference logical address LA_REF may include 'LA1' and the logical address range LA_R may include '+2'. The reference physical address PA_REF and the consecutive physical address number nCPA, included in the physical information PA_INF, include 'PA5' and '+9', respectively. Accordingly, the controller 130 may calculate the first logical address number nLA_1 is '3' by summing of the number(1EA) of the reference logical address LA_REF and the number(2EA) of the logical address range LA_R. The controller 130 may determine that the first logical address LA_1 include the reference logical address 'LA1' and the consecutive logical addresses 'LA2' and 'LA3' with the reference logical address 'LA1'.

In addition, the controller 130 may calculate the first physical address number nPA_1 of '10' by summing of the number(1EA) of the reference physical address PA_REF and the consecutive physical address number nCPA(9EA). In other words, the controller 130 may determine that the nine physical addresses 'PA6, PA7, PA8, PA9, PA10, PA11, PA12, PA13 and PA14' are consecutive with the reference physical address 'PA5', in step S130.

Since '3EA'(which is the first logical address number nLA_1) is less than '10EA'(which is the first logical address number nPA_1), the controller 130 may determine that the sequential read operation RD_SEQ is performable, in step S150. In other words, the controller 130 determines that physical addresses corresponding to three consecutive logical addresses included in the first logical address LA_1 are all consecutive. The controller 130 may determine the three consecutive physical addresses 'PA5', 'PA6' and 'PA7' as the read physical range RD_PR corresponding to the first logical address LA_1.

Accordingly, the controller 130 may perform the sequential read operation RD_SEQ on the 'PA5', 'PA6' and 'PA7', which are included in the read physical range RD_PR. As described above, in the embodiment illustrated in FIGS. 30, 31A and 31B, the controller 130 may perform the sequential read operation RD_SEQ on consecutive physical addresses, inputted from the host 102, without performing the L2P conversion operation.

To this end, as illustrated in FIG. 31B, the memory system 110 generates and adds the consecutive physical address number nCPA for each piece of L2P map information, and uploads the consecutive physical address number nCPA to the host 102. The host 102 may transmit the L2P map information, including the consecutive physical address number nCPA inputted from the memory system 110, to the memory system 110 together with the read request RD_REQ.

Figure 32A:
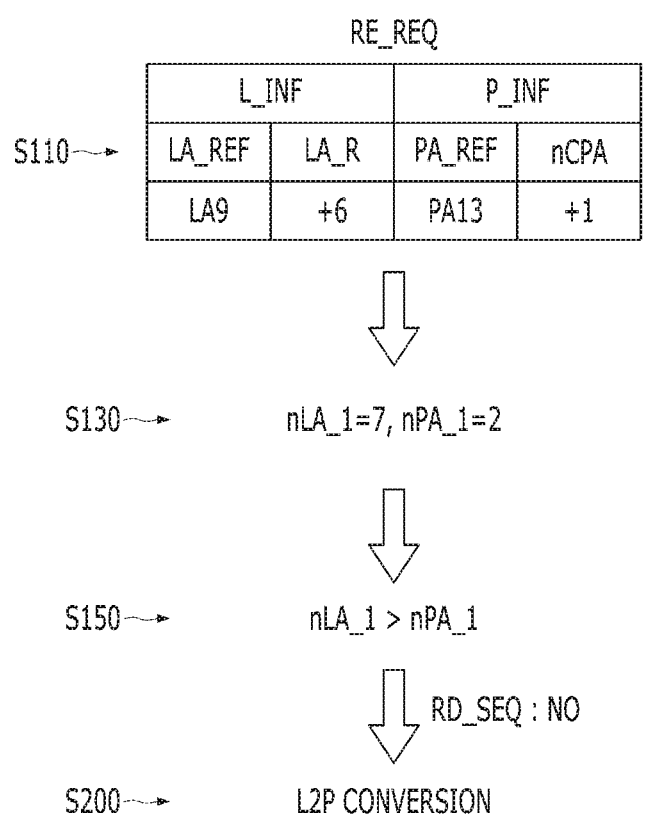

FIGS. 32A and 32B illustrate another example of a method for performing the read operation by a data processing system, including the memory system illustrated in FIG. 30, according to an embodiment.

Hereinafter, a case in which the sequential read operation RD_SEQ described in FIG. 30 is not performable is described with reference to FIGS. 32A and 32B.

Referring to FIG. 32A, the reference logical address LA_REF may include 'LA9' and the logical address range LA_R may include '+6'. The reference physical address PA_REF and the consecutive physical address number nCPA, included in the physical information PA_INF, include 'PA13' and '+1', respectively. The controller 130 may calculate the first logical address number nLA_1 is '7EA' by summing of the number(1EA) of the reference logical address LA_REF and the number(6EA) of logical addresses included in the logical address range LA_R. The controller 130 may determine that the first logical address LA_1 include the reference logical address 'LA9' and the logical addresses 'LA10 to LA15' consecutive with the reference logical address 'LA9'.

In addition, the controller 130 may calculate the first physical address number nPA_1 of '2EA' by summing of the number(1EA) of the reference physical address PA_REF and consecutive physical address number nCPA(1EA). In other words, the controller 130 may determine that the one physical addresses 'PA14' is consecutive with the reference physical address 'PA13', in step S130.

Since '7'(which is the first logical address number nLA_1) is greater than '2'(which is the first logical address number nPA_1), the controller 130 may determine that the sequential read operation RD_SEQ is not performable, in step S150. In other words, the controller 130 determines that physical addresses corresponding to three consecutive logical addresses included in the first logical address LA_1 are not all consecutive.

Accordingly, the controller 130 performs a L2P operation to search for a second physical address PA_2 corresponding to 'LA9 to LA15' included in the first logical address LA_1, with reference to the L2P map data illustrated in FIG. 32B, in step S200. The controller 130 performs the random read operation on the searched 'PA13, PA14, PA101, PA98, PA56, PA23 and PA24', in step S220.

As described above, according to the embodiment illustrated in FIGS. 32A and 32B, the controller 130 may perform the random read operation on the second physical address PA_2 searched through the L2P conversion operation, instead of the consecutive physical address inputted from the host 102.

Figure 33A:
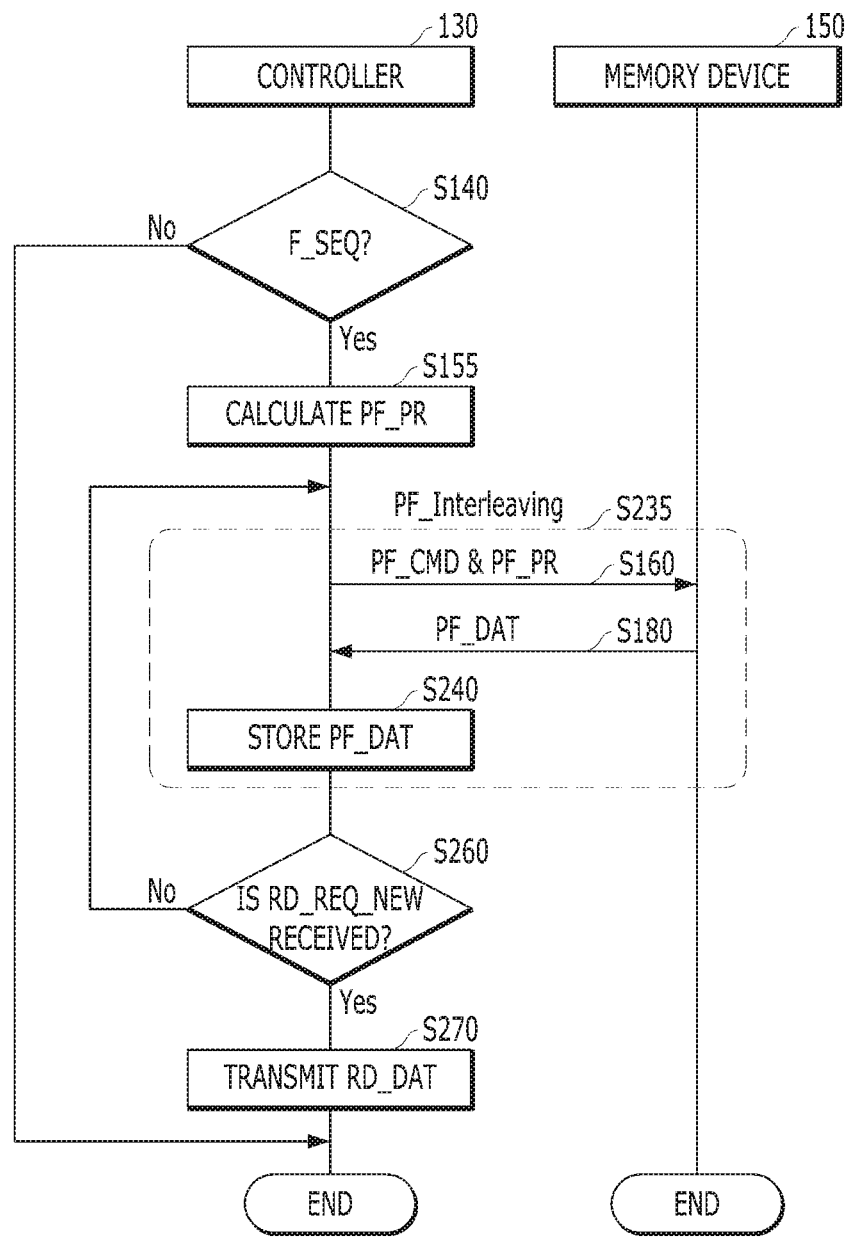

FIGS. 33A to 33B illustrate an example of a method for performing a sequential prefetch operation PF_SEQ by the memory system 110 according to an embodiment. Particularly, FIGS. 33A to 33B illustrate a method for prefetching data, corresponding to a prefetch physical range PF_PR which is consecutive with the read physical range RD_PR, into the memory 144.

Referring to FIGS. 30, 33A and 33B, although the controller 130 does not receive a read request corresponding to the prefetch physical range PF_PR from the host, the controller 130 determines, in step S140, whether the sequential prefetch operation PF_SEQ corresponding to the prefetch physical range PF_PR is performable while the sequential read operation RD_SEQ is performed on the read physical range RD_PR of step S210 of FIG. 30.

The controller 130 may prefetch the data corresponding to the prefetch physical range PF_PR, which are consecutive with the read physical range RD_PR in step S170 of FIG. 30, into the memory 144.

To this end, the controller 130 may determine whether the sequential prefetch operation PF_SEQ is performable, in step S140, and calculate a prefetch physical range PF_PR, in step S155, based on the first physical address number nPA_1 and the read physical range RD_PR.

When the number of the read physical range RD_PR is less than the first physical address number nPA_1, the controller 130 determines that the sequential prefetch operation PF_SEQ is performable on one or more physical addresses consecutive with the read physical range RD_PR.

When the read physical range RD_PR is equal to or greater than the first physical address number nPA_1, the controller 130 may determine that the sequential prefetch operation PF_SEQ is not performable since the physical addresses consecutive with the read physical range RD_PR are not present anymore. A detailed description thereon is described with reference to FIGS. 31B and 33B.

Referring to the read request format illustrated in FIG. 31B, the first physical address number nPA_1 is '+10' and read physical range RD_PR includes PA 5 to PA 7. Accordingly, since '3', which is the number of physical addresses included in the read physical range RD_PR, is less than '10', which is the first physical address number nPA_1. Accordingly, the controller 130 may determine that the sequential prefetch operation PF_SEQ is performable on the physical addresses consecutive with the read physical range RD_PR, among the first physical address number nPA_1.

When the number of physical addresses included in the read physical range RD_PR is equal to or greater than the first physical address number nPA_1, the controller 130 determines that there is no physical address on which the sequential prefetch operation PF_SEQ is to be performed. Thus, the procedure may terminate.

When the determination result obtained in step S140 of FIG. 33A indicates that the sequential prefetch operation PF_SEQ is performable (that is, 'YES' in step S140), the controller 130 calculates the prefetch physical range PF_PR for performing the sequential prefetch operation PF_SEQ in step S160. At this time, the controller 130 calculates one or more logical addresses consecutive with the read physical range RD_PR, as the prefetch physical range PF_PR, based on the first physical address number nPA_1 and the read physical range RD_PR.

Subsequently, the controller 130 transmits a prefetch command PF_CMD and one or more prefetch physical addresses PA_PF of 'PA8 to PA14', included in the prefetch physical range PF_PR, to the memory device 150, in step S160.

The controller 130 may receive prefetch data PF_DAT stored in a region, for example, pages, corresponding to the prefetch physical addresses PA_PF, from the memory device 150 in step S180, and store the prefetch data PF_DAT in the memory 144 in the step S240.

The controller 130 determines whether a subsequent read request RD_REQ_NEW is received from the host, in step S260. When the subsequent read request RD_REQ_NEW is received, the controller 130 may transmit the prefetch data PF_DAT to the host 102 as the read data RD_DAT for the subsequent read request RD_REQ_NEW, in step S270.

Figure 34:
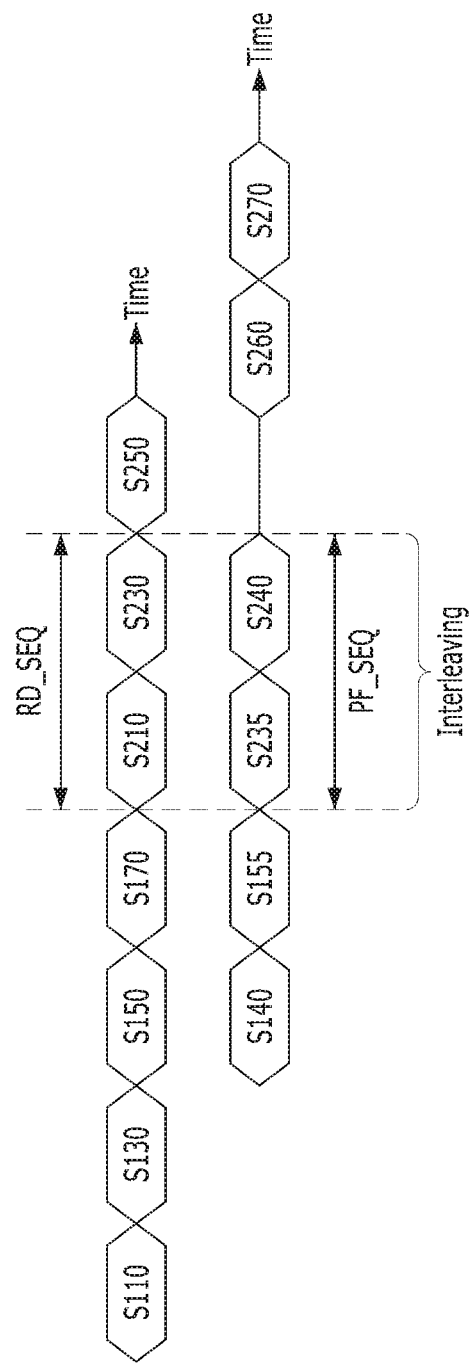
FIG. 34 illustrates an example of a method for performing the read operation and the data prefetch operation by the memory system illustrated in FIG. 30.

FIG. 34 is a timing diagram illustrating an operating method of a data processing system including a memory system according to an embodiment.

As illustrated in FIG. 34, the controller 130 may perform the sequential prefetch operation PF_SEQ in step S235 and S240 simultaneously while the sequential read operation RD_SEQ in step S210 and S230 in the interleaving manner.

The controller 130 may perform the sequential prefetch operation PF_SEQ on the prefetch physical range PF_PR in a period overlapping the sequential read operation RD_SEQ on the read physical range RD_PR. The controller 130 may perform the sequential prefetch operation PF_SEQ until the new subsequent read request RD_REQ_NEW is inputted from the host 102 in step S260.

When the subsequent read request RD_REQ_NEW, for requesting the prefetched data, inputted from the host 102 is a request for the prefetch data PF_DAT, the controller 130 may transmit the prefetch data PF_DAT, stored in the memory 144, to the host 102, in step S270. Therefore, the data processing system including the memory system according to an embodiment may rapidly perform the read operation.

As described above, the operational efficiency of the memory system 110 may be improved based on the different embodiments described with reference to FIGS. 27A to 27E and FIGS. 30 to 34. The memory system 110 may use a region or part of the host memory 106 in the host 102 as a cache or a buffer, and store meta data or user data, thereby overcoming a limitation in a storage space of the memory 144 used by the controller 130 in the memory system 110.

Figure 35A:
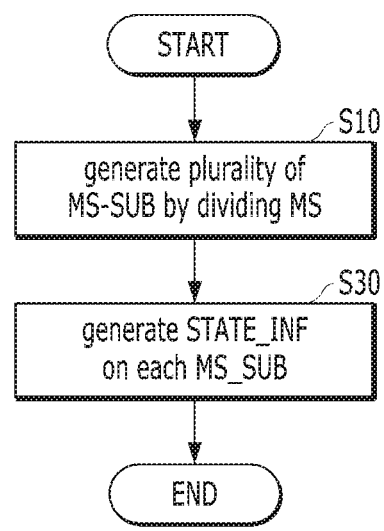

FIGS. 35A and 35B are diagrams illustrating a method of generating, by a memory system according to an embodiment of the disclosure, state information of meta data uploaded to a host.

Meta data may include information on command data corresponding to a command received by a memory system from a host, that is, an external device, information on a command operation corresponding to a command, information on memory blocks of a memory device in which a command operation is performed, and information on map data corresponding to a command operation. In other words, meta data may include any and all information and data pertaining to a command received from a host, except program data corresponding to the command.

Furthermore, meta data may include map data stored in a memory system and configured with L2P map segments L2P_MS to which a logical address LA and a physical address PA corresponding to the logical address LA have been mapped.

If a memory system transmits map data to a host, an operation may be performed in a map segment unit having a set size. This is for improving efficiency of data communication between the memory system and the host. Accordingly, the memory system can transmit information on a plurality of physical addresses PA, corresponding to a plurality of logical addresses LA, to the host at the same time. For example, one L2P map segment L2P_MS may include information that connects the plurality of logical addresses LA and the plurality of physical addresses PA.

A process of transmitting, by a memory system, map data to a host is described below with reference to FIG. 37 and other figures. Furthermore, an effect which may be obtained because a memory system shares map data with a host is described below with reference to FIG. 28 and other figures.

Referring to FIG. 35A, a memory system according to an embodiment of the disclosure generates a plurality of L2P sub-segments L2P_MS_SUB by dividing each of a plurality of L2P map segments L2P_MS included in map data (S10). In this case, the plurality of L2P map segments L2P_MS may have been transmitted from the memory system to a host. Furthermore, the memory system generates state information STATE_INF on each of the plurality of generated sub-segments L2P_MS_SUB (S30).

The state information STATE_INF according to an embodiment of the disclosure may indicate the states regarding map data included in the memory system. Further, according to an embodiment, the state information STATE_INF may include a status (e.g., wear-level, retention time, etc.) regarding a block or a page storing the map data, which is included in the memory device 150. By the way of example but not limitation, the state information STATE_INF according to an embodiment of the disclosure may include dirty information D_INF, invalid address information INV_INF, access information A_INF and priority information P_INF.

The dirty information D_INF and the access information A_INF may represent at least one of whether a physical address has changed and whether a region related to the physical address. Accordingly, the dirty information D_INF and the access information A_INF which may be referred to as history information.

The dirty information D_INF may be of a bitmap form having an initial value of a first level (e.g., 0), which is updated with a value of a second level (e.g., 1) when a physical address corresponding to a given logical address LA is changed.

The invalid address information INV_INF may indicate information on a physical address corresponding to a given logical address LA and may be of a bitmap form having an initial value of a first level, which is updated with a value of a second level (e.g., 1) when the physical address is invalidated.

The access information A_INF may be of a bitmap form having an initial value of a first level, which is updated with a value of a second level (e.g., 1) when an access request for a given logical address LA is received from a host. In another embodiment, the access information A_INF may be of a counter form having an initial value of a first level and increasing whenever an access request for a logical address LA is received from a host. The access request for the logical address LA from the host means that the host requests access (e.g., read request) to data corresponding to the logical address LA.

The priority information P_INF may include uploading priority information of map segments included in map data. Specifically, map data whose physical address is changed and for which access has been requested by a host may have a high uploading priority.

A memory system according to an embodiment of the disclosure may determine the validity of a physical address, received along with a command from a host, using dirty information D_INF or invalid address information INV_INF. Furthermore, a memory system according to an embodiment of the disclosure may generate priority information P_INF using dirty information D_INF and access information A_INF. Furthermore, a memory system according to an embodiment of the disclosure may upload map segments, included in map data, to a host based on priority information P_INF.

Referring to FIG. 35B, map data may include a plurality of L2P map segments L2P_MS#0 to L2P_MS#3. For example, the first L2P map segment L2P_MS#0 includes L2P map data for logical addresses "LA0 to LA19." The second L2P map segment L2P_MS#1 includes L2P map data for logical addresses "LA20 to LA39." The third L2P map segment L2P_MS#2 includes L2P map data for logical addresses "LA40 to LA59." The fourth L2P map segment L2P_MS#3 includes L2P map data for logical addresses "LA60 to LA79." That is, each of the L2P map segments may include L2P map data for 20 logical addresses.

Each of the plurality of L2P map segments L2P_MS#0 to L2P_MS#3 according to an embodiment of the disclosure may include a plurality of L2P sub-segments L2P_MS#n_SUB#0 to L2P_MS#n_SUB#3. Accordingly, state information STATE_INF according to an embodiment of the disclosure may be generated and updated for each of the plurality of L2P sub-segments L2PMS#n_SUB#0 to L2PMS#n_SUB#3 included in each of the plurality of L2P map segments L2P_MS#0 to L2P_MS#3. That is, each of the L2P sub-segments may include L2P map data for 5 logical addresses.

Furthermore, state information STATE_INF according to an embodiment of the disclosure may have a bitmap form. Since state information STATE_INF has a simple bitmap form (e.g., 1 or 0), a storage space occupied by the state information STATE_INF in a memory system is small, so that the burden of the memory system to access the state information STATE_INF can be reduced. Furthermore, state information STATE_INF according to an embodiment of the disclosure may have a counter form. Furthermore, state information STATE_INF according to an embodiment of the disclosure may have a flag form, a table form or a list form.

In this case, a state value of the state information STATE_INF generated at step S30 may have an initial value of "0." When the state of the map data is changed, the state value may be changed (e.g., "1").

If a memory system repeatedly transmits to a host map data that is not the latest version, overhead occurs in data communication between the memory system and the host, and efficiency may be degraded. However, referring to FIGS. 35A and 35B, whether map data transmitted from the memory system to the host has been updated or whether the map data has been used can be identified more precisely. If memory system determines timing (i.e., the retransmission of the map data) in which map data transmitted from the memory system to the host will be replaced, based on whether the map data has been updated or whether the map data has been used, unnecessary data communication between the memory system and the host can be avoided.

Figure 36:
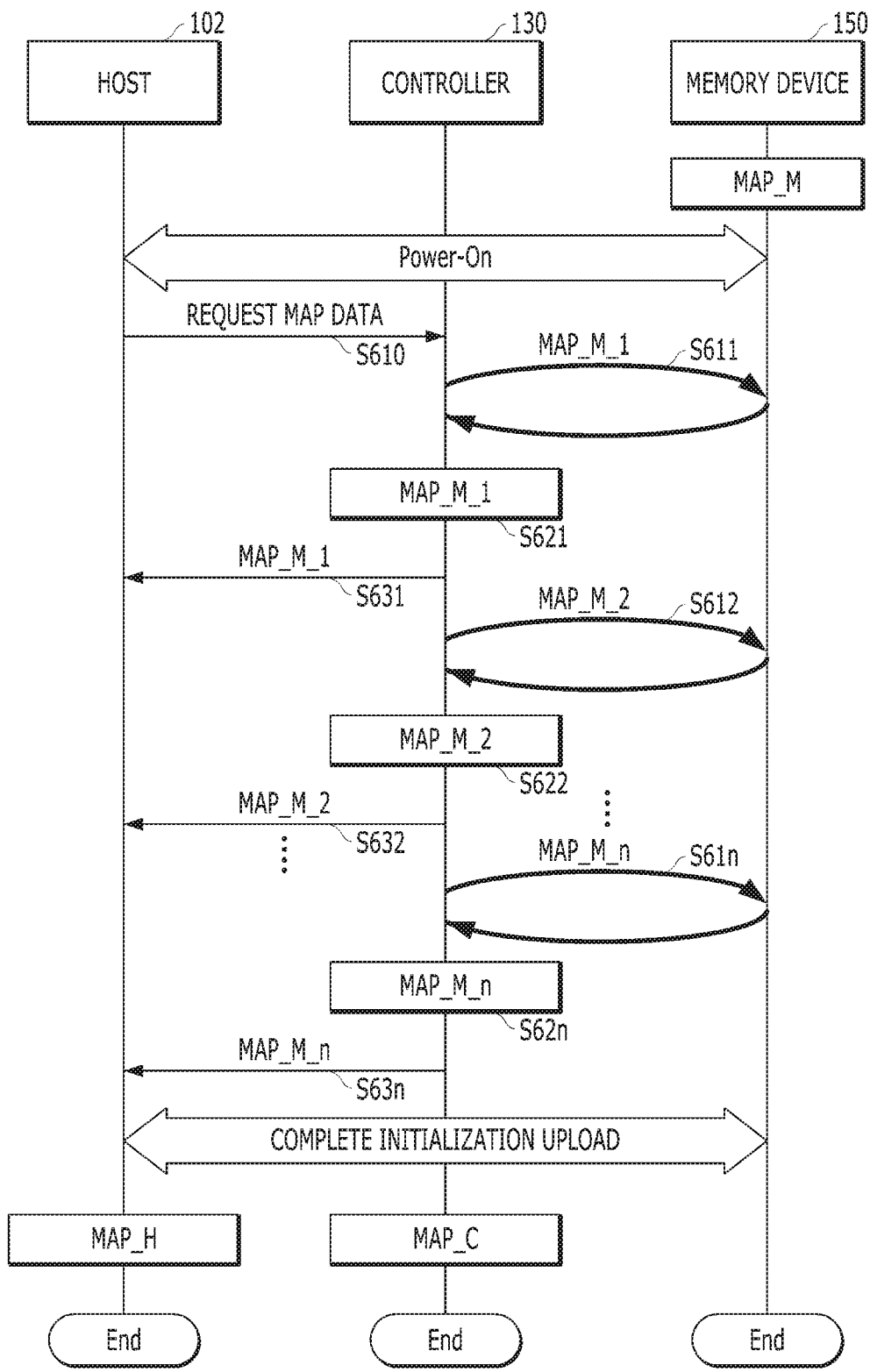
FIG. 36 is a flowchart illustrating a process of initially uploading map data.

FIG. 36 is a flowchart illustrating a method in which the memory system 110 transmits all or a portion of the memory map data MAP_M to the host 102 at power-on. Referring to FIG. 36, the controller 130 loads some or all of a memory map data MAP_M stored in the memory device 150 and transmits memory map data MAP_M to the host 102 at power-on. Upon power-on, the host 102, the controller 130, and the memory device 150 may start an initialization uploading operation of a map data.

In S610, the host 102 may request map data from the controller 130. For example, the host 102 may designate and request a specific portion of the map data, e.g., data needed to drive the data processing system 100, such as a file system, a boot image, and an operating system, is stored. As another example, the host 102 may request map data from the controller 130 without any designation.

In S611, the controller 130 may read a first portion MAP_M_1 of the memory map data MAP_M from the memory device 150. In S621, the first portion MAP_M_1 may be stored in the controller 130 as the controller map data MAP_C. In S631, the controller 130 may transmit the first portion MAP_M_1, which is stored as the controller map data MAP_C, to the host 102. The first portion MAP_M_1 may be stored in the host memory 106 as the host map data MAP_H.

In S612, the controller 130 may read a second portion MAP_M_2 of the memory map data MAP_M from the memory device 150. In S622, the second portion MAP_M_2 may be stored in the controller 130 as the controller map data MAP_C. In S632, the controller 130 may transmit the second portion MAP_M_2, which is stored as the controller map data MAP_C, to the host 102. The second portion may be stored in the host memory 106 as the host map data MAP_H, by the host 102.

The process continues in this sequence. Thus, in S61n, the controller 130 may read an nth portion MAP_M_n of the memory map data MAP_M from the memory device 150. In S62n, the nth portion MAP_M_n may be stored in the controller 130 as the controller map data MAP_C. In S63n, the controller 130 may transmit the nth portion MAP_M_n, which is stored as the controller map data MAP_C, to the host 102. The nth portion MAP_M_n may be stored in the host memory 106 as the host map data MAP_H, by the host 102. Consequently, the host 102, the controller 130, and the memory device 150 may complete initialization upload of the map data.

The controller 130 in FIG. 36 downloads a part of the memory map data MAP_M a plurality of times and uploads the downloaded memory map data MAP_M to the host 102 a plurality of times in response to a single request of map data received from the host 102 in S610. However, the controller 130 may upload all of the memory map data MAP_M to the host 102 in response to a single request of map data received from the host 102. Alternatively, the controller 130 may upload the memory map data MAP_M to the host 102 in parts or pieces in succession in response to respective requests from the host 102.

As described above, the controller map data MAP_C is stored in the memory 144 of the controller 130, and the host map data MAP_H is stored in the host memory 106 of the host 102. Accordingly, at least one of the memory map data MAP_M or the controller map data MAP_C which may be referred to as a system segment and the host map data MAP_H may be referred to as a host segment.

If the initialization uploading of the map data is completed, the host 102 may cooperate with the memory system 110 and start accessing the memory system 110. An example is illustrated in FIG. 36 as the host 102 and the memory system 110 perform the initialization upload. However, the invention is not limited to that specific configuration or processing. For example, the initialization upload may be omitted. The host 102 may gain access to the memory system 110 without the initialization upload.

After the map data initial uploading operation, uploading and updating the memory map data MAP_M may be performed in response to a host request or may be performed under the control of the controller 130 without a host request. The uploading and updating operation of the memory map data MAP_M may be performed in part or in whole, and may be performed at different times, e.g., periodically.

Figure 37:
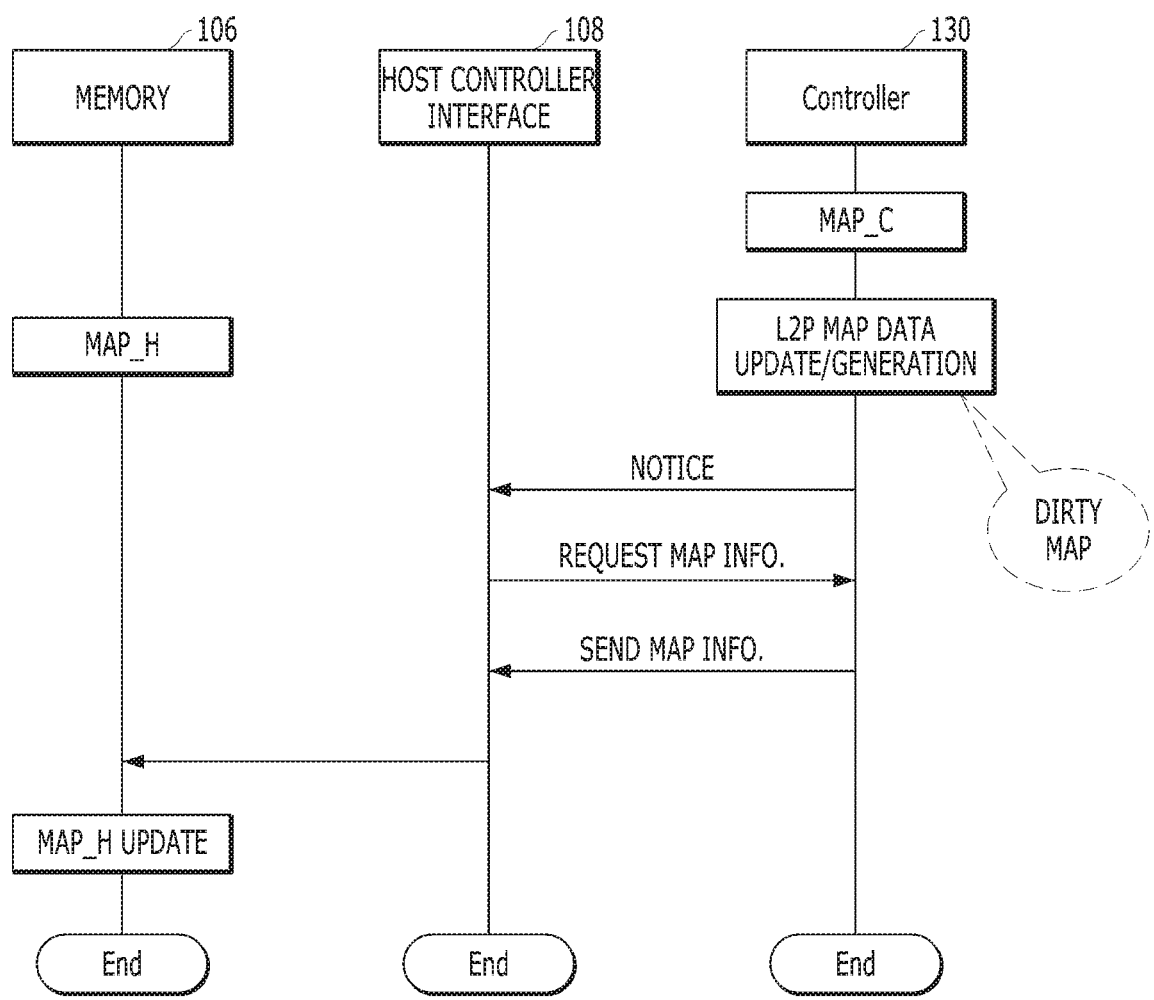
FIG. 37 is a block and flow diagram illustrating a process of updating map data.

FIG. 37 is a block and flow diagram illustrating an example of the map update operation performed by the data processing system illustrated in FIG. 8. Particularly, FIG. 37 illustrates a process of periodically uploading memory map data MAP_M to the host 102, and updating the host map data MAP_H which is meta data stored in the host memory 106, under the control of the controller 130.

The memory system 110 operably engaged with the host 102 may perform a read operation, an erase operation and a write operation of data requested by the host 102. After performing the read, erase and write operations of the data requested by the host 102, the memory system 110 may update the meta data when a change in the position of the data in the memory device 150 occurs.

The memory system 110 may update the meta data in response to such change in a process of performing a background operation, for example, a garbage collection operation or a wear-leveling operation, even without the request of the host 102. The controller 130 in the memory system 110 may detect whether the meta data is updated through the above-described operation. In other words, the controller 130 may detect that the meta data has become dirty (i.e., dirty map) while the meta data is generated, updated, erased, etc., and reflect the dirty map in dirty information.

When the meta data gets dirty, the controller 130 transmits a notice, informing of the need to update the host map data MAP_H, to the host controller interface 108. In this case, the notice may be periodically transmitted at regular time intervals or transmitted according to how dirty the meta data has become.

In response to the notice received from the controller 130, the host controller interface 108 may transmit a request for the host map data MAP_H that needs to be updated, to the controller 130 (i.e., request map information). In this case, the host controller interface 108 may designate and request only a portion of the host map data MAP_H that needs to be updated or request all of the host map data MAP_H.

The controller 130 may transmit the meta data, that needs to be updated, in response to the request of the host controller interface 108 (i.e., transmit map information). The host controller interface 108 may transmit the transmitted meta data to the host memory 106, and update the stored host map data MAP_H (i.e., L2P map update).

The memory map data MAP_M stored in the memory device 150 may include mapping information between the physical address PA and the logical address LA which are associated with a piece of data stored the memory device 150. The memory map data MAP_M may be managed in units of map segments MS. Each of the map segments MS may include a plurality of entries, and each of the entries may include mapping information between consecutive logical addresses LA and consecutive physical addresses PA.

Hereinafter, a method of updating, by a controller 130 included in a memory system 110, dirty information D_INF is described with reference to FIGS. 28, 38A and 38B. The update of the dirty information D_INF may include a change in the state value of the dirty information D_INF.

Figure 38A:
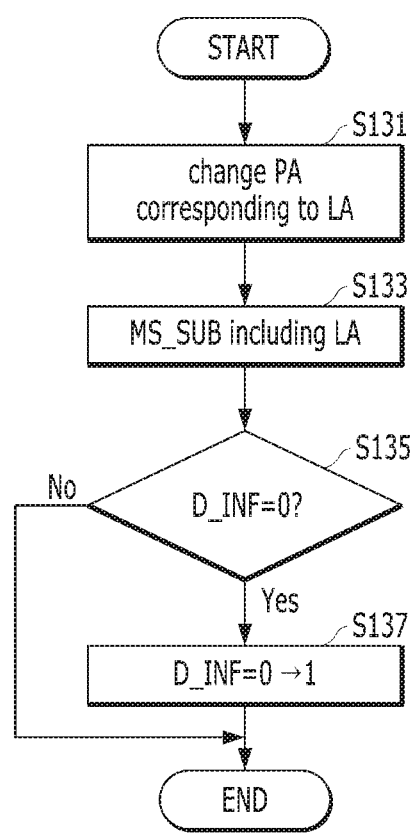

Referring to FIGS. 28 and 38A, if a physical address PA corresponding to a given logical address LA in map data uploaded to a host 102 is changed (S131), the controller 130 searches for a sub-segment L2P_MS_SUB including the given logical address LA (S133). The controller 130 determines a state value of dirty information D_INF of the retrieved sub-segment L2P_MS_SUB (S135).

If, as a result of the determination at step S135, the state value of the dirty information D_INF is "0" (YES in S135), the controller 130 changes the state value of the dirty information D_INF to "1" (S137). If, as a result of the determination at step S135, the state value of the dirty information D_INF is "1" (No in S135), the controller 130 does not change the state value of the dirty information D_INF.

The dirty information D_INF is state information STATE_INF indicating whether the physical address PA, at which user data according to the logical address LA has been stored, has been changed. The state value "0" of the dirty information D_INF may indicate that after the physical address PA mapped to the logical address LA is uploaded to the host 102, the physical address corresponding to the logical address has not been changed. The state value "1" of the dirty information D_INF may indicate that after the physical address PA mapped to the logical address LA is uploaded to the host 102, the physical address corresponding to the logical address has been changed.

FIG. 38B illustrates a detailed method of updating, by the controller 130, the dirty information D_INF. In the description of FIG. 38B, the dirty information D_INF has a bitmap form, but the invention is not limited thereto.

Referring to FIGS. 28 and 38B, after map data is uploaded to the host 102, if a physical address PA mapped to a given logical address LA37 is changed (S131), the controller 130 searches for a sub-segment L2P_MS_SUB including the logical address LA37. Furthermore, the controller 130 identifies that the logical address LA37 is included in the fourth L2P sub-segment L2P_MS#1_SUB#3 of the second L2P map segment L2P_MS#1 (S133).

The controller 130 determines dirty information D_INF of the fourth L2P sub-segment L2P_MS#1_SUB#3 of the second L2P map segment L2P_MS#1 (S135). In this case, since a state value of the dirty information D_INF of the fourth L2P sub-segment L2P_MS#1_SUB#3 of the second L2P map segment L2P_MS#1 is "1" (No in S135), the controller 130 may recognize that map data for the logical address of the fourth L2P sub-segment L2P_MS#1_SUB#3 of the second L2P map segment L2P_MS#1 has already been updated and a change in the physical address PA mapped to the given logical address LA37 at step S131 is not the first. Accordingly, the controller 130 does not change the state value of the dirty information D_INF of the fourth L2P sub-segment L2P_MS#1_SUB#3 of the second L2P map segment L2P_MS#1.

Furthermore, after map data is uploaded to the host 102, if a physical address PA mapped to a logical address LA28 is changed (S131), the controller 130 searches a sub-segment L2P_MS_SUB including the logical address LA28. Furthermore, the controller 130 identifies that the logical address LA28 is included in the second L2P sub-segment L2P_MS#1_SUB#1 of the second L2P map segment L2P_MS#1 (S133).

The controller 130 determines dirty information D_INF of the second L2P sub-segment L2P_MS#1_SUB#1 of the second L2P map segment L2P_MS#1 (S135). In this case, since a state value of the dirty information D_INF of the second L2P sub-segment L2P_MS#1_SUB#1 of the second L2P map segment L2P_MS#1 is "0" (Yes in S135), the controller 130 may recognize that map data for the logical address of the second L2P sub-segment L2P_MS#1_SUB#1 of the second L2P map segment L2P_MS#1 has not been updated and a change in the physical address PA mapped to the given logical address LA37 at step S131 is the first change. Accordingly, the controller 130 changes the state value of the dirty information D_INF of the second L2P sub-segment L2P_MS#1_SUB#1 of the second L2P map segment L2P_MS#1 to "1."

If dirty information D_INF is generated for each L2P map segment L2P_MS instead of an L2P sub-segment L2P_MS_SUB, although only a physical address PA mapped to one logical address is changed, the controller 130 needs to change all state values of dirty information D_INF corresponding to 20 logical addresses included in the L2P map segment L2P_MS. That is, the controller 130 needs to change even the state values of the dirty information D_INF of the 19 logical addresses whose update is unnecessary in order to update the state value of the dirty information D_INF of one logical address.

However, in an embodiment, dirty information D_INF is generated and updated for each L2P sub-segment L2P_MS_SUB instead of an L2P map segment L2P_MS. Accordingly, if a physical address PA mapped to one logical address is changed, the controller 130 changes only state values of dirty information D_INF corresponding to 5 logical addresses included in an L2P sub-segment L2P_MS_SUB, instead of state values of dirty information D_INF corresponding to 20 logical addresses included in an L2P map segment L2P_MS. That is, the controller 130 according to an embodiment of the disclosure has only to change state values of dirty information D_INF corresponding to 4 logical addresses whose update is unnecessary, in order to update a state value of dirty information D_INF of one logical address. Accordingly, an embodiment of the disclosure can improve efficiency of map data management compared to a case where state information STATE_INF is generated and updated for each L2P map segment L2P_MS.

Furthermore, although not illustrated in the drawings, the controller 130 may invalidate an old physical address old PA as a physical address PA mapped to a logical address generated at step S131 is changed. To this end, the controller 130 may invalidate the old physical address by changing a state value of invalid address information INV_INF.

As described above, an embodiment of the disclosure can improve map data management, e.g., make such management more convenient, by changing a value of state information of map data, stored in the memory device 150, which state information is represented in a bitmap form, a flag form, a table form or a list form, and writing whether a physical address corresponding to a given logical address has been changed and an invalidated physical address, when the storage location (i.e., physical address) of user data stored in the memory system is changed.

Furthermore, an embodiment of the disclosure can improve efficiency of map data management by generating and updating state information of map data for each of a plurality of sub-segments of each map segment, instead of the map segment unit as a whole.

FIG. 39 illustrates a method of transmitting, by the host 102 illustrated in FIG. 8, a physical address PA_1 to the memory system 110 along with a command CMD and a logical address LA_1 and performing, by the memory system 110, a command operation on the physical address PA_1 received from the host 102.

FIG. 40 illustrates an example of the command format CMD format of a command transmitted from the host 102 of FIGS. 28 and 39 to the memory system 110. In particular, FIG. 40 illustrates an example of the command format CMD format of a read command Read CMD including a logical address LA_1 and a physical address PA_1.

Figure 41:
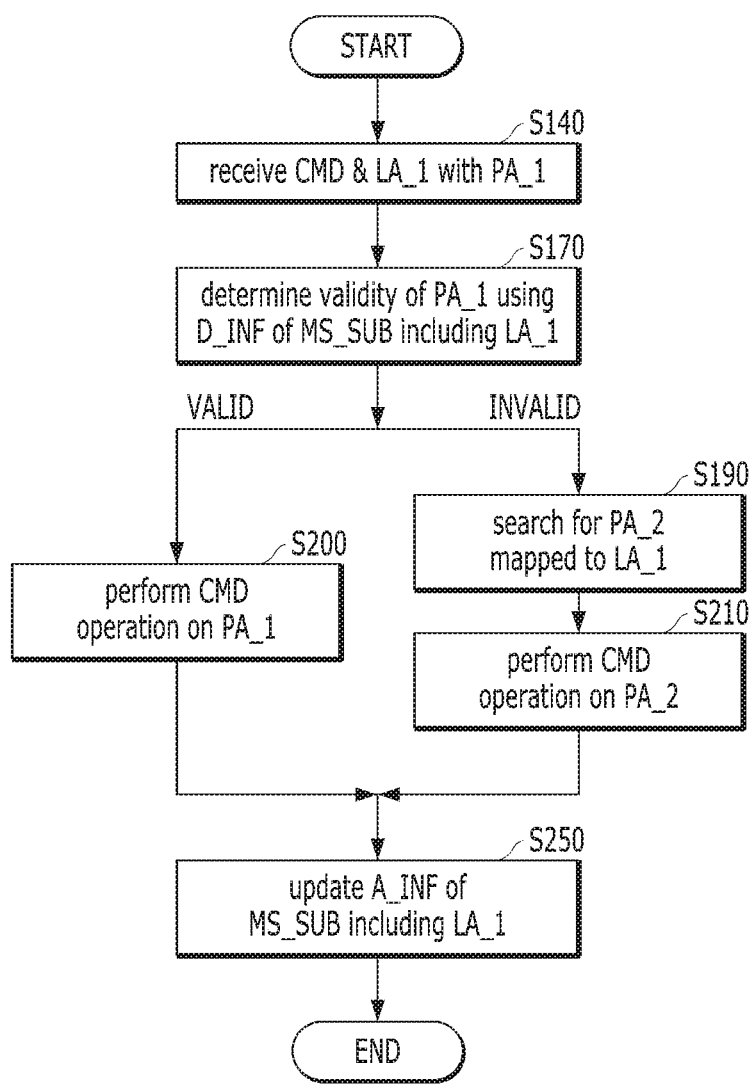

FIG. 41 illustrates a method of performing, by the controller 130, a command operation on a logical address LA_1 and physical address PA_1 received from the host 102.

Hereinafter, a method of performing, by the memory system 110 according to an embodiment of the disclosure, a command operation on a physical address PA_1 received from the host 102 along with a command and a logical address LA_1 is described with reference to FIGS. 28 to 40.

Referring to FIGS. 28 to 40, the host 102 includes a host memory 106 and a host controller interface 108. Host map data MAP_H is stored in the host memory 106. Furthermore, the memory system 110 includes a controller 130 and a memory device 150. Controller map data MAP_C is stored in a memory 144.

Referring to FIGS. 28 to 40, when the host 102 and the memory system 110 are powered on (power-on in FIG. 36), the host 102 and the memory system 110 may operably engage each other. In this case, the controller 130 may load memory map data MAP_M (e.g., L2P MAP) stored in the memory device 150. The controller 130 may store the memory map data MAP_M, loaded from the memory device 150, in the memory 144 as controller map data MAP_C. Furthermore, the controller 130 may transmit the controller map data MAP_C, stored in the memory 144, to the host

102. The host 102 may store the controller map data MAP_C, received from the controller 130, in the host memory 106 as host map data MAP_H.

When a command CMD is generated by a processor 104 within the host 102, the generated command is transmitted to the host controller interface 108. After receiving the command from the processor 104, the host controller interface 108 transmits a logical address LA_1, corresponding to the command, to the host memory 106.

The host controller interface 108 may recognize a physical address PA_1, corresponding to the logical address LA_1, based on map data L2P MAP included in the host map data MAP_H stored in the host memory 106.

The host controller interface 108 transmits the physical address PA_1 to the controller 130 within the memory system 110 along with the command and the logical address LA_1. In this case, the host controller interface 108 may transmit the physical address PA_1, included in the reserved area of a command format, to the memory system 110. That is, as illustrated in FIG. 39, the host controller interface 108 may transmit the logical address LA_1 and the physical address PA_1 included in the command format of a read command, to the memory system 110.

The controller 130 determines the validity of the physical address PA_1 received along with the command. Furthermore, the controller 130 may perform a command operation on the memory device 150 based on the received command CMD and the valid physical address PA_1.

In the above-described process of performing a command operation, a process of receiving, by the controller 130, the logical address LA_1 from the host 102 and searching for the physical address PA_1 corresponding to the logical address LA_1 may be omitted. In particular, in the process of searching for the physical address PA_1 by the controller 130, an operation of accessing the memory device 150 and reading the memory map data MAP_M may be omitted. Accordingly, a process of performing, by the host 102, a command operation on the memory system 110 can become faster.

Furthermore, the controller 130 updates access information A_INF of the logical address LA_1 on which an operation for a command has been performed.

Hereinafter, a detailed method of performing, by the controller 130, a command operation on the physical address PA_1 received from the host 102 along with the command and the logical address LA_1 is described with reference to FIGS. 28 to 41.

Referring to FIGS. 28 to 41, the controller 130 receives a first physical address PA_1 from the host 102 along with a command and a first logical address LA_1 (S140).

The controller 130 determines the validity of the first physical address PA_1 received from the host 102 (S170). In this case, the controller 130 may determine the validity of the first physical address PA_1 using dirty information D_INF of sub-segment L2P_MS_SUB including the first logical address LA_1.

The dirty information D_INF and the invalid address information INV_INF may be generated by the method described with reference to FIGS. 35A and 35B, and may be updated by the method described with reference to FIGS. 38A and 38B.

If, as a result of the determination at step S170, the first physical address PA_1 is valid, the controller 130 performs a command operation on the valid first physical address PA_1 (S200). Furthermore, the controller 130 updates access information A_INF of a sub-segment L2P_MS_SUB including the first logical address LA_1 (S250).

If, as a result of the determination at step S170, the first physical address PA_1 is invalid, the controller 130 searches controller map data MAP_C or memory map data MAP_M for a second physical address PA_2 mapped to the first logical address LA_1 received from the host 102(S190).

Furthermore, the controller 130 performs a command operation according to the command on the retrieved second physical address PA_2 (S210). Furthermore, the controller 130 updates the access information A_INF of the sub-segment L2P_MS_SUB including the first logical address LA_1 (S250). A method of updating the access information A_INF at step S250 is described in detail below with reference to FIGS. 42A, 42B, 43A and 43B.

A method of performing a command operation according to an embodiment of the disclosure is described, assuming that dirty information D_INF is generated and managed for each sub-segment L2P_MS_SUB, the first logical address LA_1 received from the host 102 is "LA4", and the first physical address PA_1 received along with the first logical address LA_1 is "PA77."

Referring to the dirty information D_INF illustrated in FIG. 38B, the controller 130 may recognize that a state value of the dirty information D_INF of the first L2P sub-segment L2P_MS#0_SUB#0 of the first L2P map segment L2P_MS#0 including the first logical address LA4 is "0." Accordingly, the controller 130 determines the first physical address PA77, received from the host 102 along with the first logical address LA4, to be a valid physical address because a physical address mapped to the first logical address LA4 has not been changed. Furthermore, the controller 130 performs a command operation on the first physical address PA77 received from the host 102 without performing a separate L2P search process at step S190 (S200).

If dirty information D_INF is generated and updated for each map segment L2P_MS instead of each sub-segment L2P_MS_SUB, a state value of the dirty information D_INF of the first L2P map segment L2P_MS#0 becomes "1" because logical addresses "LA10 to LA14" in the first L2P map segment L2P_MS#0 including the first logical address LA4 have been updated. That is, a state value of the dirty information D_INF of the not-updated logical address "LA4" also becomes "1" due to the updated logical addresses "LA10 to LA14." At this time, the controller 130 recognizes that a physical address mapped to the first logical address LA4 has been changed and determines the first physical address PA77 to be an invalid physical address, at step S170. Furthermore, the controller 130 performs an unnecessary L2P search and conversion process at step S190, which results in overhead of the memory system 110.

As described above, an embodiment of the disclosure can reduce overhead of the memory system 110 occurring due to an unnecessary L2P search and conversion process by generating and updating dirty information D_INF for each sub-segment L2P_MS_SUB and generating and updating invalid address information INV_INF. Accordingly, an embodiment of the disclosure can increase and thus improve the execution speed of a command operation of the memory system 110 and efficiency of a command operation.

Hereinafter, a method of updating access information A_INF according to a first embodiment of the disclosure is described with reference to FIGS. 28, 42A and 42B. In particular, FIGS. 42A and 42B illustrate a method of updating, by the controller 130, access information A_INF in a bitmap form after the controller 130 performs the command operation according to the command at steps S200 and S210 in FIG. 41.

Access information A_INF in a bitmap form may indicate whether an access request for map data, corresponding to a logical address LA_1, from the host 102 has been made. A state value "0" of the access information A_INF may indicate that no access request for the logical address LA_1 from the host 102 has been made after map data is uploaded to the host 102. A state value "1" of the access information A_INF may indicate that an access request for the logical address LA_1 from the host 102 has been made after map data is uploaded to the host 102.

Figure 42A:
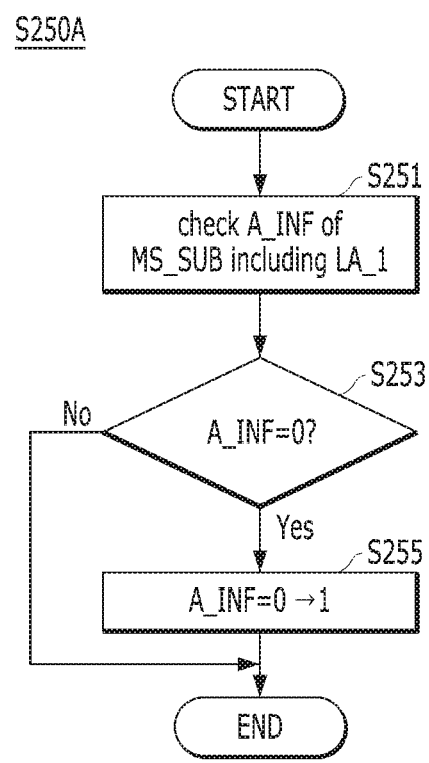

Referring to FIG. 42A, the controller 130 identifies a sub-segment L2P_MS_SUB including the logical address LA_1 (S251). The controller 130 determines a state value of the access information A_INF of the sub-segment L2P_MS_SUB including the logical address LA_1 (S253). If, as a result of the determination at step S253, the state value of the access information A_INF of the sub-segment L2P_MS_SUB is "0" (Yes in S235), the controller 130 changes the state value of the access information A_INF to "1" (S137). If, as a result of the determination at step S253, the state value of the access information A_INF of the sub-segment L2P_MS_SUB is "1", not "0" (No in S135), the controller 130 does not change the state value of the access information A_INF.

If the first logical address LA_1 received from the host 102 at step S140 in FIG. 41 or the first logical address LA_1 on which the command operation has been performed at steps S200 and S210 in FIG. 41 is "LA37", the controller 130 may identify that the logical address LA37 is included in the fourth L2P sub-segment L2P_MS#1_SUB#3 of the second L2P map segment L2P_MS#1 (S251). Furthermore, the controller 130 determines a state value of the access information A_INF of the fourth L2P sub-segment L2P_MS#1_SUB#3 of the second L2P map segment L2P_MS#1 (S253). Since a state value of the access information A_INF of the fourth L2P sub-segment L2P_MS#1_SUB#3 of the second L2P map segment L2P_MS#1 is "1", not "0" (No in S253), the controller 130 does not change the state value of the access information A_INF of the fourth L2P sub-segment L2P_MS#1_SUB#3 of the second L2P map segment L2P_MS#1.

If the first logical address LA_1 received from the host 102 at step S140 in FIG. 41 or the first logical address LA_1 on which the command operation has been performed at steps S200 and S210 in FIG. 41 is "LA28", the controller 130 may identify that the logical address LA28 is included in the second L2P sub-segment L2P_MS#1_SUB#1 of the second L2P map segment L2P_MS#1 (S251). Furthermore, the controller 130 determines a state value of the access information A_INF of the second L2P sub-segment L2P_MS#1_SUB#1 of the second L2P map segment L2P_MS#1 (S253). Since a state value of the access information A_INF of the second L2P sub-segment L2P_MS#1_SUB#1 of the second L2P map segment L2P_MS#1 is "0" (Yes in S253), the controller 130 may change the state value of the access information A_INF of the second L2P sub-segment L2P_MS#1_SUB#1 of the second L2P map segment L2P_MS#1 from "0" to "1" (S255).

Hereinafter, a method of updating access information A_INF according to a second embodiment of the disclosure is described with reference to FIGS. 28, 43A and 43B. In particular, FIG. 43B illustrates a method of updating, by the controller 130, access information A_INF in a counter form after the controller 130 performs the command operation according to the command, at steps S200 and S210 in FIG. 41.

The access information A_INF in a counter form may indicate the number of access requests for map data, corresponding to the logical address LA_1, from the host 102. A state value "0" of the access information A_INF may indicate that no access request for the logical address LA_1 from the host 102 has been made after map data is uploaded to the host 102. Access information A_INF having a state value of "1" or more may indicate the number of access request(s) for the logical address LA_1 from the host 102 that have been made after map data is uploaded to the host 102.

Figure 43A:
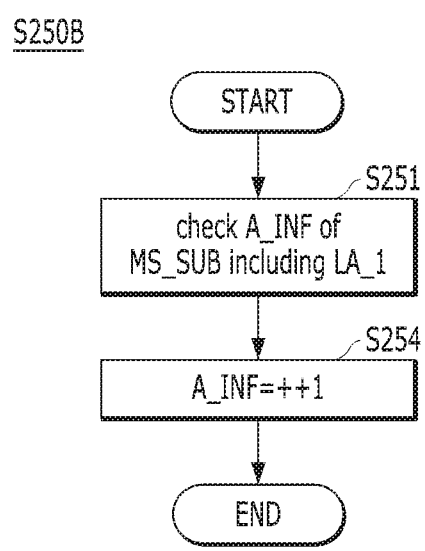

Referring to FIGS. 43A and 43B, the controller 130 identifies a sub-segment L2P_MS_SUB including the logical address LA_1 (S251). The controller 130 increases a state value of the access information A_INF of the sub-segment L2P_MS_SUB including the logical address LA_1 by "1" (S254).

If the first logical address LA_1 received from the host 102 at step S140 in FIG. 41 and the first logical address LA_1 on which the command operation has been performed at steps S200 and S210 in FIG. 41 are "LA23", the controller 130 may identify that the logical address LA37 is included in the first L2P sub-segment L2P_MS#1_SUB#0 of the second L2P map segment L2P_MS#1 (S251). Furthermore, the controller 130 checks a state value of the access information A_INF of the first L2P sub-segment L2P_MS#1_SUB#0 of the second L2P map segment L2P_MS#1 (S253).

Since the state value of the access information A_INF of the first L2P sub-segment L2P_MS#1_SUB#0 is "5", the controller 130 changes the state value from "5" to "6" by increasing the state value by "1" (S254).

If the first logical address LA_1 received from the host 102 at step S140 in FIG. 41 and the first logical address LA_1 on which the command operation has been performed at steps S200 and S210 in FIG. 41 are "LA55", the controller 130 may identify that the logical address LA28 is included in the fourth L2P sub-segment L2P_MS#2_SUB#3 of the third L2P map segment L2P_MS#2 (S251). Furthermore, the controller 130 checks a state value of the access information A_INF of the fourth L2P sub-segment L2P_M5#2_SUB#3 of the third L2P map segment L2P_MS#2 (S253).

Because the state value of the access information A_INF of the fourth L2P sub-segment L2P_MS#2_SUB#3 of the third L2P map segment L2P_MS#2 is "2", the controller 130 changes the state value from "2" to "3" by increasing the state value by "1" (S254).

Figure 44:
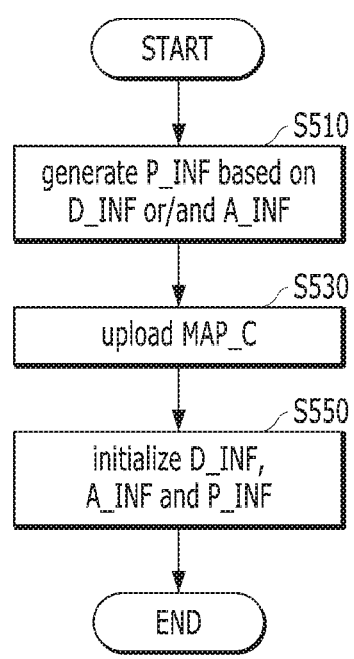

Hereinafter, a method of uploading, by the controller 130, controller map data MAP_C to the host 102 is described with reference to FIGS. 28 and 44.

The controller 130 generates priority information P_INF based on dirty information D_INF and/or access information A_INF (S510).

The controller 130 uploads controller map data MAP_C for the map segment (MS) unit based on the generated uploading priority information P_INF (S530).

After the uploading of the controller map data MAP_C is completed at step S530, the controller 130 initializes the dirty information D_INF, the access information A_INF and the priority information P_INF (S550).

The generation of the priority information P_INF at step S510 may be performed before the controller map data MAP_C is uploaded to the host 102.

Furthermore, at step S530, the controller 130 may upload the controller map data MAP_C to the host 102 if a degree that the controller map data MAP_C becomes dirty is higher than a preset reference or if the memory system 110 is in an idle state. Furthermore, the controller 130 may upload the controller map data MAP_C to the host 102 when receiving an uploading request from the host 102.

FIGS. 45 and 46 illustrate a method of generating priority information P_INF using dirty information D_INF in a bitmap form and access information A_INF in a bitmap form.

Hereinafter, a method of generating priority information P_INF according to a first embodiment of the disclosure is described with reference to FIGS. 28 and 45. In particular, FIG. 45 illustrates a method of generating second priority information P_INF_D using dirty information D_INF in a bitmap form.

Referring to FIG. 45, the controller 130 calculates a sum (SUM) by adding the number of pieces of dirty information D_INF having a State value "1" for each L2P sub-segment L2P_MS__SUB. The sum (SUM) may indicate the number of L2P sub-segments L2P_MS_SUB that belong to L2P sub-segments L2P_MS_SUB included in an L2P map segment L2P_MS and whose physical addresses have been changed.

The sum (SUM) of a first L2P map segment L2P_MS#0 may be "1." The sum (SUM) of a second L2P map segment L2P_MS#1 may be "3." The sum (SUM) of a third L2P map segment L2P_MS#2 may be "4." The sum (SUM) of a fourth L2P map segment L2P_MS#3 may be "2."

Based on the sum (SUM) calculated for each L2P map segment L2P_MS, the controller 130 may set second priority information P_INF_D of the third L2P map segment L2P_MS#2 as the first priority, may set second priority information P_INF_D of the second L2P map segment L2P_MS#1 as the second priority, may set second priority information P_INF_D of the fourth L2P map segment L2P_MS#3 as the third priority, and may set second priority information P_INF_D of the first L2P map segment L2P_MS#0 as the fourth priority.

As described above, the method of generating second priority information P_INF_D according to an embodiment of the disclosure, illustrated in FIG. 45, can raise the uploading priority of an L2P map segment L2P_MS including many L2P sub-segments L2P_MS_SUB whose physical addresses have been changed.

Hereinafter, a method of generating priority information P_INF according to a second embodiment of the disclosure is described with reference to FIGS. 28 and 46. In particular, FIG. 46 illustrates a method of generating third priority information P_INF_A using access information A_INF in a bitmap form.

Referring to FIG. 46, the controller 130 calculates a sum (SUM) by adding the number of pieces of access information A_INF having a state value "1" for each L2P sub-segment L2P_MS_SUB. The sum (SUM) may indicate the number of L2P sub-segments L2P_MS_SUB that belong to L2P sub-segments L2P_MS_SUB included in an L2P map segment L2P_MS and that has been requested by the host.

The sum (SUM) of a first L2P map segment L2P_MS#0 may be "1." The sum (SUM) of a second L2P map segment L2P_MS#1 may be "3." The sum (SUM) of a third L2P map segment L2P_MS#2 may be "4." The sum (SUM) of a fourth L2P map segment L2P_MS#3 may be "2."

Based on the sum (SUM) calculated for each L2P map segment L2P_MS, the controller 130 may set third priority information P_INF_A of the third L2P map segment L2P_MS#2 as the first priority, may set third priority information P_INF_A of the second L2P map segment L2P_MS#1 as the second priority, may set third priority information P_INF_A of the fourth L2P map segment L2P_MS#3 as the third priority, and may set third priority information P_INF_A of the first L2P map segment L2P_MS#0 as the fourth priority.

As described above, the method of generating the third priority information P_INF_A according to an embodiment of the disclosure, illustrated in FIG. 46, can raise the uploading priority of an L2P map segment L2P_MS including many L2P sub-segments L2P_MS_SUB requested by the host.

Hereinafter, a method of generating priority information P_INF according to a third embodiment of the disclosure is described with reference to FIGS. 28 and 47. In particular, FIG. 47 illustrates a method of generating third priority information P_INF_A using access information A_INF in a counter form.

Referring to FIG. 47, a state value of the access information A_INF of a fourth L2P sub-segment L2P_MS#0_SUB3 included in a first L2P map segment L2P_MS#0 may be "20." A state value of the access information A_INF of a first L2P sub-segment L2P_MS#1_SUB0 included in a second L2P map segment L2P_MS#1 may be "7." A state value of the access information A_INF of a first L2P sub-segment L2P_MS#2_SUB0 included in a third L2P map segment L2P_MS#2 may be "6." State values of the access information A_INF of a first L2P sub-segment L2P_MS#3_SUB0 and a fourth L2P sub-segment L2P_MS#3_SUB3 included in a fourth L2P map segment L2P_MS#3 may be "1."

Accordingly, the controller 130 may generate ranking information RANKING having a high priority as a state value of the access information A_INF (i.e., the number of access requests) of each of L2P sub-segments increases.

Based on a state value of the access information A_INF of each sub-segment L2P_MS_SUB, the controller 130 may set ranking information RANKING of the first L2P map segment L2P_MS#0 to "1", may set ranking information RANKING of the second L2P map segment L2P_MS#1 to "2", may set ranking information RANKING of the third L2P map segment L2P_MS#2 to "3", and may set ranking information RANKING of the fourth L2P map segment L2P_MS#3 to "9."

The state value of the access information A_INF may indicate the number of requests from the host. The ranking information RANKING may indicate relative priorities of the map segments.

Based on the ranking information RANKING of each sub-segment L2P_MS_SUB, the controller 130 may set the third priority information P_INF_A of the first L2P map segment L2P_MS#0 as the first priority, may set the third priority information P_INF_A of the second L2P map segment L2P_MS#1 as the second priority, may set the third priority information P_INF_A of the third L2P map segment L2P_MS#2 as the third priority, and may set the third priority information P_INF_A of the fourth L2P map segment L2P_MS#3 as the fourth priority.

L2P sub-segments L2P_MS_SUB having ranking information RANKING of "4 to 8" are included in the second L2P map segment L2P_MS#1 and the third L2P map segment L2P_MS#2, which have been determined to be the first priority and the third priority, respectively. Accordingly, the third priority information P_INF_A of the fourth L2P map segment L2P_MS#3 having ranking information RANKING of "9" may be set to the fourth priority.

As described above, the method of generating priority information P_INF according to the third embodiment of the disclosure, illustrated in FIG. 47, can raise the uploading priority of a map segment including sub-segment having many access requests from the host.

Figure 48A:
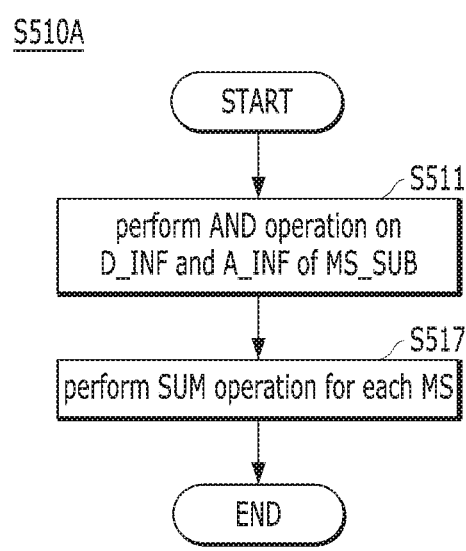

Hereinafter, a method of generating priority information P_INF according to a fourth embodiment of the disclosure is described with reference to FIG. 8, FIG. 48A and FIG. 48B. In particular, FIG. 48A and FIG. 48B illustrate a method of generating first priority information P_INF_N using dirty information D_INF in a bitmap form and access information A_INF in a bitmap form.

The controller 130 may generate the first priority information P_INF_N, based on the dirty information D_INF and the access information A_INF, in order to upload controller map data MAP_C to the host 102.

The dirty information D_INF may be updated for each L2P sub-segment L2P_MS_SUB as described with reference to FIGS. 38A and 38B. The access information A_INF may be updated for each L2P sub-segment L2P_MS_SUB as described with reference to FIGS. 42A and 42B.

The first priority information P_INF_N may be generated for each map segment L2P_MS. That is, the controller 130 may generate the first priority information P_INF_N for each map segment L2P_MS based on the dirty information D_INF and access information A_INF updated for each L2P sub-segment L2P_MS_SUB.

Referring to FIG. 48A, the controller 130 calculates an operation result (AND) by performing an AND operation on state values of dirty information D_INF and access information A_INF updated for each L2P sub-segment L2P_MS_SUB (S511). The controller 130 calculates a sum (SUM) by adding the operation result (AND), calculated for each L2P sub-segment L2P_MS_SUB, for each map segment MS (S517). The controller 130 may generate the first priority information P_INF_N of a map segment MS based on the sum (SUM).

Referring to FIG. 48B, the controller 130 calculates an operation result (AND) by performing an AND operation on dirty information D_INF and access information A_INF managed for each L2P sub-segment L2P_MS_SUB.

The controller 130 calculates a sum (SUM) by adding the operation result (AND), calculated for each L2P sub-segment L2P_MS_SUB, for each map segment MS. The sum (SUM) of a first L2P map segment L2P_MS#0 may be "0", the sum (SUM) of a second L2P map segment L2P_MS#1 may be "1", the sum (SUM) of a third L2P map segment L2P_MS#2 may be "4", and the sum (SUM) of a fourth L2P map segment L2P_MS#3 may be "2."

Accordingly, based on the sum (SUM) of each map segment MS, the controller 130 may set the first priority information P_INF_N of the third L2P map segment L2P_MS#2 as the first priority, may set the first priority information P_INF_N of the fourth L2P map segment L2P_MS#3 as the second priority, may set the first priority information P_INF_N of the second L2P map segment L2P_MS#1 as the third priority, and may set the first priority information of the first L2P map segment L2P_MS#0 as the fourth priority.

Accordingly, the controller 130 may preferentially upload, to the host, an L2P map segment L2P_MS including many L2P sub-segments L2P_MS_SUB whose physical address corresponding to a logical address has been changed and for which an access request from the host has been made, based on the first priority information P_INF_N described with reference to FIG. 48A and FIG. 48B.

Hereinafter, a method of generating priority information P_INF according to a fifth embodiment of the disclosure is described with reference to FIGS. 28, 49A and 49B. In particular, FIGS. 49A and 49B illustrate a method of generating priority information P_INF using dirty information D_INF in a bitmap form and access information A_INF in a bitmap form, but generating second priority information P_INF_D in which a weight has been given to the dirty information D_INF.

Figure 49A:
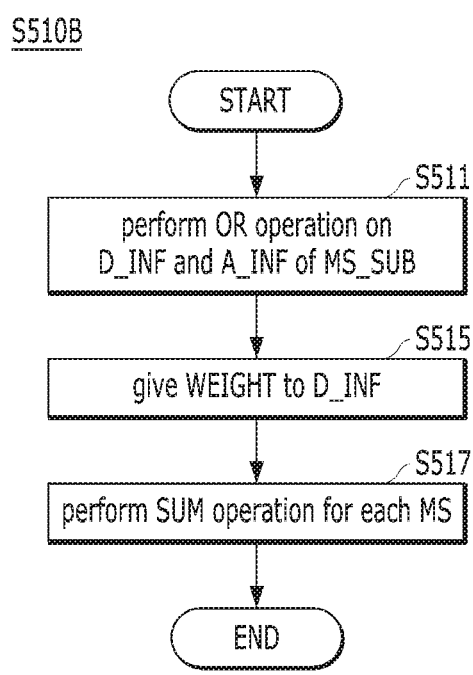

Referring to FIG. 49A, the controller 130 calculates an operation result (OR) by performing an OR operation on state values of dirty information D_INF and access information A_INF updated for each L2P sub-segment L2P_MS_SUB (S511). The controller 130 gives a weight for the dirty information D_INF to the calculated operation result (OR) (S515). The controller 130 calculates a sum (SUM) by adding values D_INF_W, which are calculated for each L2P sub-segment L2P_MS_SUB and to which weights for dirty information D_INF have been given, for each map segment MS (S517). The controller 130 may generate the second priority information P_INF_D of a map segment MS based on the sum (SUM).

Referring to FIG. 49B, the sum (SUM) of a first L2P map segment L2P_MS#0 may be "3", the sum (SUM) of a second L2P map segment L2P_MS#1 may be "6", the sum (SUM) of a third L2P map segment L2P_MS#2 may be "8", and the sum (SUM) of a fourth L2P map segment L2P_MS#3 may be "8."

Accordingly, based on the sum (SUM) of each map segment MS, the controller 130 may set the second priority information P_INF_D of the third L2P map segment L2P_MS#2 as the first priority, may set the second priority information P_INF_D of the fourth L2P map segment L2P_MS#3 as the second priority, may set the second priority information P_INF_D of the second L2P map segment L2P_MS#1 as the third priority, and may set the second priority information P_INF_D of the first L2P map segment L2P_MS#0 as the fourth priority.

In this case, the sums (SUM) of the third L2P map segment L2P_MS#2 and the fourth L2P map segment L2P_MS#3 are the same, that is, "8." However, in order to give a weight to the dirty information D_INF, the controller 130 sets the second priority information P_INF_D of the third L2P map segment L2P_MS#2 as the first priority, and sets the second priority information P_INF_D of the fourth L2P map segment L2P_MS#3 as the second priority.

Accordingly, the controller 130 may preferentially upload, to the host, an L2P map segment L2P_MS including many L2P sub-segments L2P_MS_SUB whose physical addresses have been changed, among L2P sub-segments L2P_MS_SUB whose physical address corresponding to a logical address has been changed or for which an access request from the host has been made, based on the second priority information P_INF_D described with reference to FIGS. 49A and 49B.

Hereinafter, a method of generating priority information P_INF according to a sixth embodiment of the disclosure is described with reference to FIGS. 28, 50A and 50B. In particular, FIGS. 50A and 50B illustrate a method of generating priority information P_INF using dirty information D_INF and access information A_INF, but generating third priority information P_INF_A in which a weight has been given to the access information A_INF.

Figure 50A:
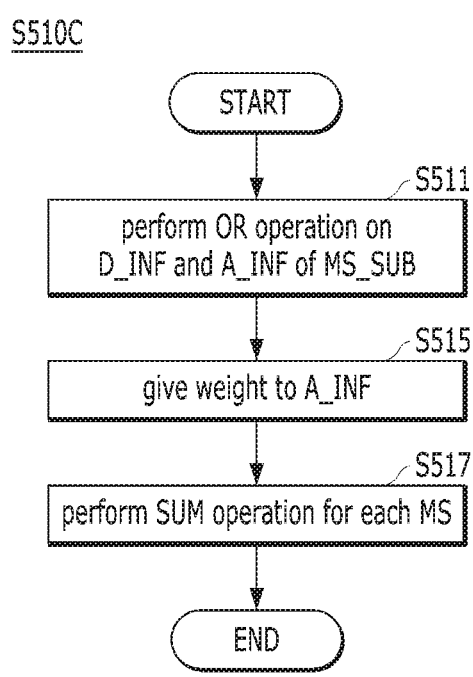

Referring to FIG. 50A, the controller 130 calculates an operation result (OR) by performing an OR operation on state values of dirty information D_INF and access information A_INF updated for each L2P sub-segment L2P_MS_SUB (S511). The controller 130 gives a weight for access information A_INF to the calculated operation result (OR) (S516). The controller 130 calculates a sum (SUM) by adding values, which are calculated for each L2P sub-segment L2P_MS_SUB and to which weights for access information A_INF have been given, for each map segment MS (S517). The controller 130 may generate the third priority information P_INF_A of a map segment MS based on the sum (SUM).

Referring to FIG. 50B, the sum (SUM) of a first L2P map segment L2P_MS#0 may be "3", the sum (SUM) of a second L2P map segment L2P_MS#1 may be "7", the sum (SUM) of the third L2P map segment L2P_MS#2 may be "8", and the sum (SUM) of the fourth L2P map segment L2P_MS#3 may be "6."

Accordingly, based on the sum (SUM) of each map segment MS, the controller 130 may set the third priority information P_INF_A of the third L2P map segment L2P_MS#2 as the first priority, may set the third priority information P_INF_A of the second L2P map segment L2P_MS#1 as the second priority, may set the third priority information P_INF_A of the fourth L2P map segment L2P_MS#3 as the third priority, and may set the third priority information P_INF_A of the first L2P map segment L2P_MS#0 as the fourth priority.

Accordingly, the controller 130 may preferentially upload, to the host, an L2P map segment L2P_MS including many L2P sub-segments L2P_MS_SUB for which access requests from the host have been made, among L2P sub-segments L2P_MS_SUB whose physical address corresponding to a logical address has been changed or for which an access request from the host has been made, based on the third priority information P_INF_A described with reference to FIGS. 50A and 50B.

Hereinafter, a method of generating priority information P_INF according to a seventh embodiment of the disclosure is described with reference to FIGS. 28 and 51. In particular, FIG. 50 illustrates a method of generating priority information P_INF using dirty information D_INF in a bitmap form and access information A_INF in a counter form, but generating third priority information P_INF_A in which a weight has been given to the access information A_INF.

Referring to FIG. 51, the sum (SUM_0) of a first L2P map segment L2P_MS#0 may be "3", the sum (SUM_1) of a second L2P map segment L2P_MS#1 may be "5", the sum (SUM_2) of a third L2P map segment L2P_MS#2 may be "20", and the sum (SUM_3) of a fourth L2P map segment L2P_MS#3 may be "3."

Accordingly, based on the sum (SUM) of each map segment MS, the controller 130 may set the third priority information P_INF_A of the third L2P map segment L2P_MS#2 as the first priority, may set the third priority information P_INF_A of the fourth L2P map segment L2P_MS#3 as the second priority, may set the third priority information P_INF_A of the second L2P map segment L2P_MS#1 as the third priority, and may set the third priority information P_INF_A of the first L2P map segment L2P_MS#0 as the fourth priority.

Accordingly, the controller 130 may preferentially upload, to the host, an L2P map segment L2P_MS including many L2P sub-segments L2P_MS_SUB for which many access requests from the host have been made, among L2P sub-segments L2P_MS_SUB whose physical address corresponding to a logical address has been changed and for which an access request from the host has been made, based on the third priority information P_INF_A described with reference to FIG. 51.

Hereinafter, a method of generating priority information P_INF according to an eighth embodiment of the disclosure is described with reference to FIGS. 28 and 52. In particular, FIG. 52 illustrates a method of generating priority information P_INF using dirty information D_INF in a bitmap form and access information A_INF in a counter form, but generating third priority information P_INF_A in which a weight has been given to the access information A_INF.

The controller 130 calculates an operation result (AND) by performing an AND operation on state values of dirty information D_INF and access information A_INF updated for each L2P sub-segment L2P_MS_SUB.

Thereafter, the controller 130 calculates a representative value of the calculated operation results (AND), and identifies an L2P map segment area L2P_MS whose physical address corresponding to a logical address has been changed and for which an access request from the host has been made. The controller 130 gives a weight for access information A_INF to the calculated representative value (A_INF_W).

The controller 130 calculates a sum (SUM) by adding values A_INF_W, which are calculated for each L2P sub-segment L2P_MS_SUB and to which weights for access information A_INF have been given, for each map segment (MS). The controller 130 may generate the third priority information P_INF_A of a map segment MS based on the sum (SUM).

Referring to FIG. 52, the sum (SUM_0) of a first L2P map segment L2P_MS#0 may be "0", the sum (SUM_1) of a second L2P map segment L2P_MS#1 may be "3", the sum (SUM_2) of a third L2P map segment L2P_MS#2 may be "4", and the sum (SUM_3) of a fourth L2P map segment L2P_MS#3 may be "2."

Accordingly, based on the sum (SUM) of each map segment MS, the controller 130 may set the third priority information P_INF_A of the third L2P map segment L2P_MS#2 as the first priority, may set the third priority information P_INF_A of the second L2P map segment L2P_MS#1 as the second priority, may set the third priority information P_INF_A of the fourth L2P map segment L2P_MS#3 as the third priority, and may set the third priority information P_INF_A of the first L2P map segment L2P_MS#0 as the fourth priority.

Accordingly, the controller 130 may preferentially upload, to the host, an L2P map segment L2P_MS including many L2P sub-segments L2P_MS_SUB for which many access requests from the host have been made, among L2P map segments L2P_MS whose physical address corresponding to a logical address has been changed and for which an access request from the host has been made, based on the third priority information P_INF_A described with reference to FIG. 52.

As described above, operation efficiency of the memory system 110 can be improved based on the different embodiments described with reference to FIGS. 28 to 52. The memory system 110 can overcome the limitations of the storage space of the memory 144 used by the controller 130 within the memory system 110 by using some areas of the host memory 106 included in the host 102 as a cache or buffer and storing meta data or user data in the some areas.

Figure 53:
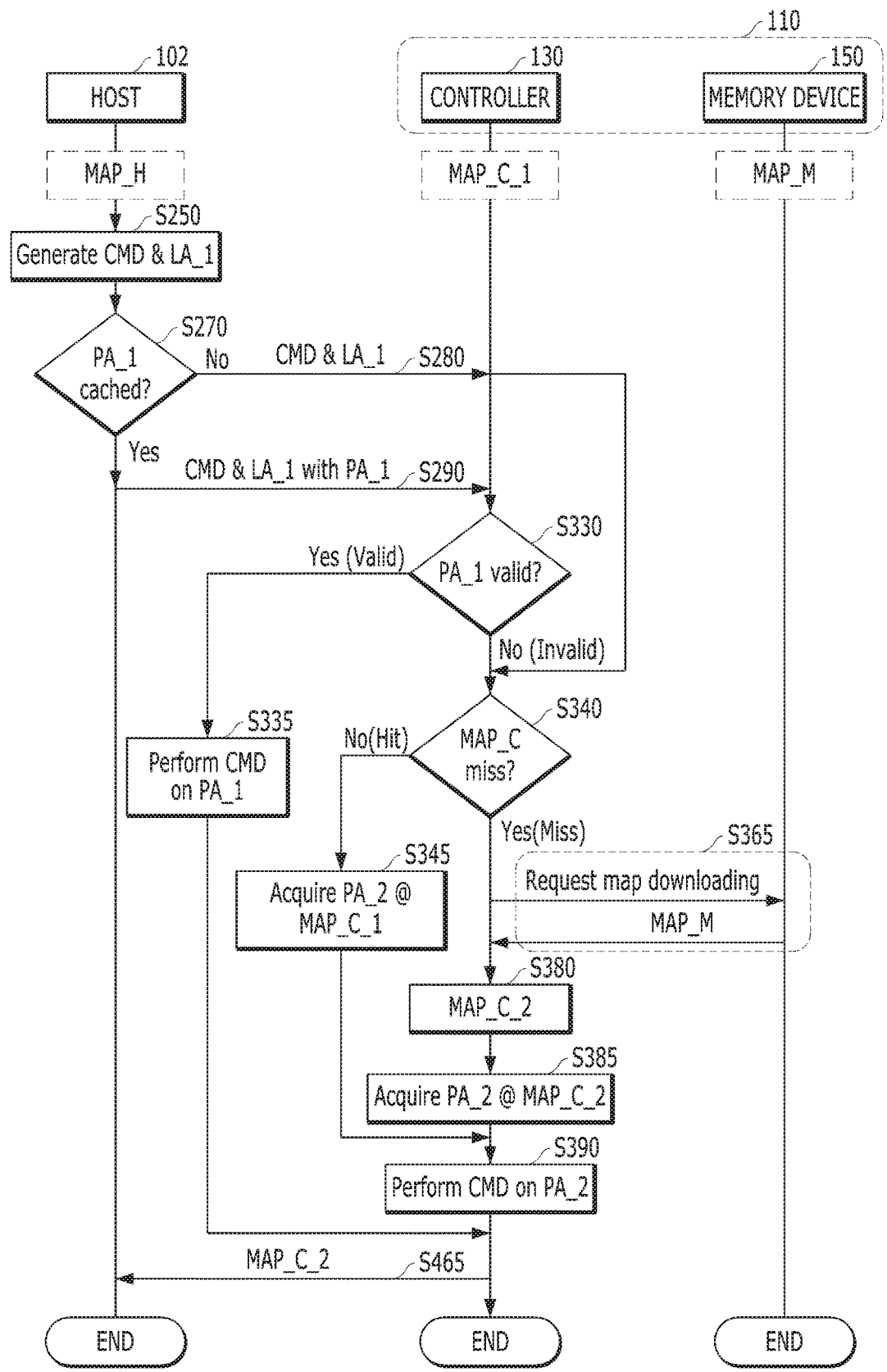
FIG. 53 is a flowchart illustrating a method in which a data processing system according to an embodiment performs a command operation.
Figure 54A:
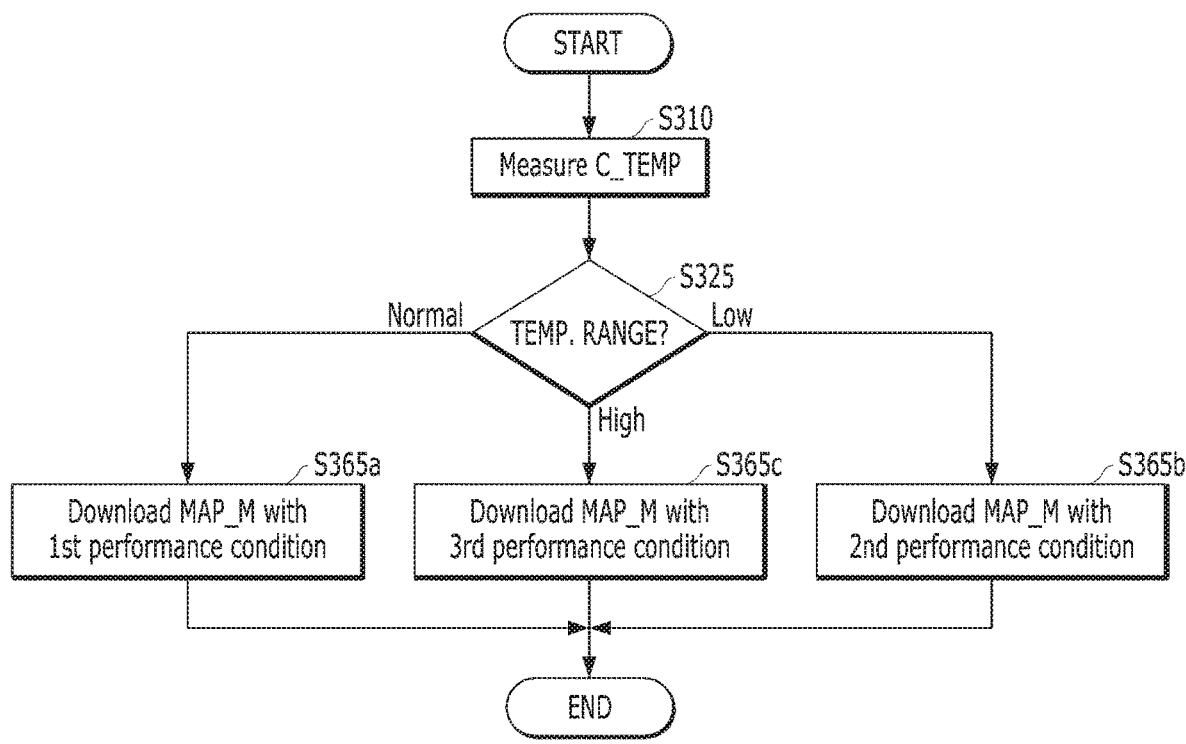

FIG. 53 illustrates a method in which a data processing system performs a map download in response to logical and physical addresses transferred to a memory system 110 from a host 102 and map caching of the memory system 110, and FIG. 54A illustrates a method in which the data processing system performs a map download in preferential response to the internal temperature of the memory system 110 instead of logical and physical addresses transferred to the memory system 110 and map caching of the memory system 110.

FIG. 53 illustrates a method in which a data processing system according to another embodiment performs a command operation. Specifically, FIG. 53 illustrates a data processing system in which the host 102 can transmit a logical address and a physical address associated with the logical address to the memory system 110, in order to improve the input/output performance of the memory system 110.

Referring to FIG. 53, the data processing system according to the present embodiment includes the host 102 and the memory system 110. The host 102 may include a processor, a host controller interface and a host memory, and the memory system 110 may include a controller 130 and a memory device 150. When power is supplied to the host 102 and the memory system 110 (power-on), the host 102 and the memory system 110 may be operably coupled with each other. The memory system 110 may download memory map data MAP_M stored in the memory device 150. The memory system 110 may store the memory map data MAP_M downloaded from the memory device 150 as controller map data MAP_C_1 into a cache memory of the controller 130. The memory system 110 may upload the controller map data MAP_C_1 stored in the cache memory of the controller 130 to the host 102. The host 102 may store the controller map data MAP_C received from the memory system 110 as host map data MAP_H into a host memory. In this way, the host map data MAP_H are stored in the host memory, the memory map data MAP_M are stored in the memory device 150, and the controller map data MAP_C_1 are stored in the memory of the memory system 110.

The processor within the host 102 generates a command CMD and a first logical address LA_1 corresponding to the target of the command CMD in step S250. The host controller interface receives the generated command CMD and the generated first logical address LA_1 from the processor, and transfers the received command and address to the host memory. The host controller interface may determine whether a first physical address PA_1 corresponding to the first logical address LA_1 is stored (PA_1 cached), based on logical-to-physical (L2P) map data included in the host map data MAP_H stored in the host memory, in step S270.

When the determination result of step S270 indicates that the first physical address PA_1 corresponding to the first logical address LA_1 is not included in the host map data MAP_H (No in step S270), the host controller interface transfers the command CMD and the first logical address LA_1 to the memory system 110 without the first physical address PA_1, in step S280. The host controller interface may include the first logical address LA_1 in the command format of the command CMD, and transmit the first logical address LA_A and the command CMD to the memory system 110.

When the determination result of step S270 indicates that the first physical address PA_1 corresponding to the first logical address LA_1 is included in the host map data MAP_H (Yes in step S270), the host controller interface transfers the first physical address PA_1 with the command CMD and the first logical address LA_1 to the memory system 110 in step S290. The host controller interface may include the first physical address PA_1 in a reserved area of the command format of the command CMD, and transmit the first physical address PA_1 and the command CMD to the memory system 110.

When only the command CMD and the first logical address LA_1 without the first physical address PA_1 are received from the host 102 in step S280, the memory system 110 determines whether a map miss occurs between the first logical address LA_1 and the controller map data MAP_C_1, in step S340. That is, the memory system 110 determines whether L2P map data for the first logical address LA_1 are included in the controller map data MAP_C_1, in step S340.

When the first physical address PA_1 is received with the command CMD and the first logical address LA_1 from the host 102 in step S290, the memory system 110 determines the validity of the first physical address PA_1 received with the command CMD in step S330. The memory system 110 may determine whether the first physical address PA_1 is valid, using dirty information D_INF or invalid address information INV_INF.

When the determination result of step S330 indicates that the first physical address PA_1 is valid (Yes in step S330), the memory system 110 may perform a command operation on the first physical address PA_1 in step S335.

When the determination result of step S330 indicates that the first physical address PA_1 is not valid (No in step S330), the memory system 110 determines that the first physical address PA_1 is invalid. Furthermore, the memory system 110 searches for a valid physical address in order to perform the command operation for the first logical address LA_1 on the valid physical address. For this operation, the memory system 110 determines whether a map miss occurs between the first logical address LA_1 and the controller map data MAP_C_1, in step S340. That is, the memory system 110 determines whether the map data for the first logical address LA_1 are included in the controller map data MAP_C_1 stored in the memory of the controller 130, in step S340.

When the determination result of step S340 indicates that the map data for the first logical address LA_1 are included in the controller map data MAP_C_1 (No in step S340), the memory system 110 determines that a map hit, not a map miss, occurred between the first logical address LA_1 and the controller map data MAP_C_1. Thus, the memory system 110 acquires a second physical address PA_2 by searching the controller map data MAP_C_1, the second physical address PA_2 being a valid physical address corresponding to the first logical address LA_1, in step S345. The memory system 110 performs the command operation on the second physical address PA_2 acquired in step S345, in step S390.

When the determination result step S340 indicates that the map data for the first logical address LA_1 are not included in the controller map data MAP_C_1 (Yes in step S340), the memory system 110 determines that a map miss occurred between the first logical address LA_1 and the controller map data MAP_C_1, That is, the memory system 110 determines that the second physical address PA_2 corresponding to the first logical address LA_1 are not included in the controller map data MAP_C_1.

Therefore, the memory system 110 performs a map download operation for the memory map data MAP_M in step S365. The memory system 110 may request the memory map data MAP_M including the map data of the first logical address LA_1 from the memory device 150. The memory device 150 may transmit the memory map data MAP_M, which includes the valid physical address corresponding to the first logical address LA_1, to the memory system 110 according to a map download request received from the memory system 110. The memory system 110 may store the memory map data MAP_M received from the memory device 150 in the memory. Thus, the controller map data MAP_C_1 may be updated into controller map data MAP_C_2 in step S380.

The memory system 110 acquires the second physical address PA_2 corresponding to the first logical address LA_1 by searching the controller map data MAP_C_2, updated in step S380, in step S385. The memory system 110 may perform a command operation on the second physical address PA_2 acquired in step S385, in step S390.

Then, the memory system 110 may transmit a response to the host 102, the response including a message indicating that the operation for the command CMD received from the host 102 has been completed.

In the present embodiment, when the memory system 110 receives the first logical address LA_1 and the first physical address PA_1 corresponding to the first logical address LA_1 together from the host 102 in step S290 and the first physical address PA_1 is valid (Yes in step S330), steps S345 and S385 of searching for the second physical address PA_2 may be omitted. In particular, when the first physical address PA_1 is valid (Yes in step S330) and the map data for the first logical address LA_1 are included in the controller map data MAP_C_1 (map hit, No in step S340), the map download of step S365 may be omitted. This configuration can further shorten the performance time of the command operation performed by the memory system 110.

The performance period of the map download and the map upload which are performed in a low temperature range may be set to a shorter period than the performance period of the map download and the map upload which are performed in a normal temperature range corresponding to a temperature range in which the memory system can normally operate. Thus, the performance frequency or count of the map downloads and the map uploads in the low temperature range may be higher than that in the normal temperature range. Furthermore, the number of targets of the map download and the map upload which are performed in the low temperature range may be set to a higher value than the number of targets of the map download and the map upload which are performed in the normal temperature range. Therefore, the map download and the map upload in the low temperature range may be performed for a longer time than that in the normal temperature range. In conclusion, due to the performance frequency or count and the performance time of the map downloads and the map uploads which are performed in the low temperature range, the amount of heat generated by the memory system 110 in the low temperature range may be greater than that in the normal temperature range. Thus, the temperature of the memory system 110 in the low temperature range may gradually rise.

The performance period of the map download and the map upload which are performed in a high temperature range may be set to a longer period than the performance period of the map download and the map upload which are performed in the normal temperature range. Thus, the performance frequency or count of the map downloads and the map uploads in the high temperature range may be lower than that in the normal temperature range. Furthermore, the number of targets of the map download and the map upload which are performed in the high temperature range may be set to a lower value than the number of targets of the map download and the map upload which are performed in the normal temperature range. Therefore, the map downloads and the map uploads in the high temperature range may be performed for a shorter time than that in the normal temperature range. In conclusion, due to the performance frequency or count and the performance time of the map downloads and the map uploads which are performed in the high temperature range, the amount of heat generated by the memory system 110 in the high temperature range may be smaller than that in the normal temperature range. Thus, the temperature of the memory system 110 in the high temperature range may gradually drop.

The data processing system according to the present embodiment includes the memory device 150 including a plurality of memory blocks and the memory system 110 for controlling the memory device 150. Each of the memory blocks includes a plurality of memory cells. However, when the temperature is excessively low or high, the resistance of the memory cells may be increased which increases the probability that data corruption will occur. Therefore, when the temperature of the memory device 150 may rise, e.g., in the summer, or drop, e.g., in the winter an error may occur in an operation of the memory device 150.

In order to solve such a problem, the memory device 150 according to the present embodiment may include a temperature sensor for measuring the current temperature of the memory device 150, and store map data of the plurality of memory cells. In order to accurately measure the temperature of the memory device 150, the temperature sensor may be located in the memory device 150. However, the present embodiment is not limited thereto. In an embodiment, the memory device 150 may receive temperature information from an external device operably coupled with the memory device 150.

When the temperature of the memory device 150 is within a set low or high temperature range, the memory system 110 may set the performance conditions of the map download and the map upload accordingly, and thus induce a temperature rise or drop of the memory cell array, such that the temperature of the memory device 150 returns to the normal temperature range. Furthermore, when the temperature of the memory device 150 is within the low temperature range, the memory system 110 may raise the temperature of the memory device 150 by additionally performing the map download and the map upload or advancing the performance time of the map download and the map upload, such that the temperature of the memory device 150 returns to the normal temperature range. Therefore, the memory system 110 according to the present embodiment may effectively improve the performance and data reliability of the memory device 150. For this configuration, the memory system 110 includes a memory for storing map data MAP_C and state information STATE_INF.

The state information STATE_INF may indicate the states of map data included in the memory device 150. The state information STATE_INF may be generated and managed for each map segment MS. The state information STATE_INF may be configured in the form of a bitmap. Since the state information STATE_INF is managed in the form of a simple bitmap (for example, 1 or 0), the state information STATE_INF may occupy a small storage space in the memory, and the burden of the memory system 110 to access the state information STATE_INF may be reduced. In the present embodiment, the state information STATE_INF may be configured in the form of a counter. Furthermore, the state information STATE_INF may be configured in the form of a flag corresponding one-to-one to map data. Furthermore, the state information STATE_INF may be configured in the form of a table or list. In the present embodiment, the state information STATE_INF may include dirty information D_INF, map miss information M_INF, invalid address information INV_INF and access information A_INF.

The memory system 110 according to the present embodiment may determine the validity of a physical address PA received with a command from the host 102, using the dirty information D_INF or the invalid address information INV_INF.

The memory system 110 according to the present embodiment may decide the performance period and performance target of the map download, using the dirty information D_INF and/or the map miss information M_INF.

The memory system 110 according to the present embodiment may decide the performance period and performance target of the map upload, using the access information A_INF and/or the map miss information M_INF.

FIGS. 54A and 54B are a flowchart and table, respectively, for describing a method in which the memory system according to the present embodiment controls temperature thereof through the map download.

Referring to FIG. 54A, the map download according to the present embodiment may be performed in step S365 of FIG. 53, and includes an operation in which the memory system 110 transmits a read request for memory map data stored in the memory device 150, and stores the memory map data received from the memory device 150 in the memory. Hereafter, embodiments are described in more detail with reference to the accompanying drawings.

Referring to FIG. 54A, the temperature sensor measures the current temperature C_TEMP of the memory device 150 in step S310. The memory system 110 determines a temperature range to which the measured current temperature C_TEMP belongs, in step S325. When the current temperature C_TEMP is within a preset normal temperature range, the memory system 110 performs a map download for memory map data L2P_MAP_M according to a first performance condition in step S365a. When the current temperature C_TEMP is within a preset low temperature range, the memory system 110 performs the map download for the memory map data L2P_MAP_M according to a second performance condition in step S365b. When the current temperature C_TEMP is within a preset high temperature range, the memory system 110 performs the map download for the memory map data L2P_MAP_M according to a third performance condition in step S365c. The first to third performance conditions may include a performance period and a performance target. The normal temperature range may be set to be higher than the lowest temperature and lower than the highest temperature in the normal temperature range corresponding to a normal operation temperature range of the memory system 110. The low temperature range may be set to be lower than the lowest temperature of the normal temperature range. The high temperature range may be set to be higher than the highest temperature of the normal temperature range of the memory system 110.

The map downloads performed in steps S365a, S365b and S365c in FIG. 54A may be performed under the lead of the memory system 110, without an interactive operation between the memory system 110 and the host 102. The memory system 110 may set the first to third performance conditions, which are differently set according to the current temperature C_TEMP, to a fixed performance period and a fixed performance target.

For example, when the current temperature C_TEMP is within the normal temperature range, the memory system 110 may perform the map download according to the first performance condition. The first performance condition may include a fixed performance period (for example, 12 hours) and a fixed performance target (50% of memory capacity). Furthermore, when the current temperature C_TEMP is within the low temperature range, the memory system 110 may perform the map download according to the second performance condition. The second performance condition may include a fixed performance period (for example, 30 seconds) and a fixed performance target (100% of map cache memory capacity). Furthermore, when the current temperature C_TEMP is within the high temperature range, the memory system 110 may perform the map download according to the third performance condition. The third performance condition may include a fixed performance period (for example, 24 hours) and a fixed performance target (10% of map cache memory capacity).

The map downloads performed in steps S365a, S365b and S365c in FIG. 54A may be performed under the lead of the memory system 110, based on the state information STATE_INF of map data updated by an interactive operation between the memory system 110 and the host 102. The memory system 110 may set the performance period and performance target of the map download according to the current temperature C_TEMP and the state information STATE_INF.

Hereafter, a method in which the memory system 110 according to the present embodiment controls the temperature of the memory device 150 using the dirty information D_INF included in the state information STATE_INF are described.

When the current temperature C_TEMP is within the normal temperature range, the memory system 110 may perform the map download in the case that the dirty information D_INF indicates that the number of L2P map segments L2P_MS each including a logical address LA whose corresponding physical address PA has been changed is equal to or more than 50% (performance period). Furthermore, the memory system 110 may download L2P memory map data L2P_MAP_M corresponding to 50% of L2P controller map data L2P_MAP_C (performance target of 50%).

When the current temperature C_TEMP is within the low temperature range, the memory system 110 may perform the map download in the case that the dirty information D_INF indicates that the number of L2P map segments L2P_MS each including a logical address LA whose corresponding physical address PA has been changed is equal to or more than 10% (performance period). The memory system 110 may download L2P memory map data L2P_MAP_M corresponding to 100% of the L2P controller map data L2P_MAP_C (performance target of 100%).

When the current temperature C_TEMP is within the high temperature range, the memory system 110 may perform the map download in the case that the dirty information D_INF indicates that the number of L2P map segments L2P_MS each including a logical address LA whose corresponding physical address PA has been changed is 100% (performance period). The memory system 110 may download L2P memory map data L2P_MAP_M corresponding to 10% of the L2P controller map data L2P_MAP_C (performance target of 10%).

FIG. 54B illustrates an example of the dirty information D_INF. In the present embodiment, the dirty information D_INF may include information on whether the storage position of data corresponding to a logical address LA has been changed. While a background operation (for example, garbage collection or wear leveling) is performed even without a request from the host 102, the memory system 110 may update map data in response to a change in position of data within the memory device 150. That is, the memory system 110 may check dirty map data which occur while the map data are updated, and reflect the dirty map data into the dirty information D_INF.

The dirty information D_INF may be configured in the form of a bitmap which has the initial value of a first level (for example, 0), and is updated to a second level (for example, 1) when a physical address PA corresponding to a specific logical address LA is changed. That is, the state value '0' of the dirty information D_INF may indicate that the physical address PA corresponding to the logical address LA is not changed. The state value '1' of the dirty information D_INF may indicate that the physical address PA corresponding to the logical address LA has been changed.

As illustrated in FIG. 54B, the L2P controller map data L2P_MAP_C stored in the memory include 10,240 logical addresses LA5120 to LA15359 and physical addresses PA corresponding to the logical addresses. The logical addresses and the physical addresses are grouped into 10 L2P map segments L2P_MS_5 to L2P_MS_14, and each of the L2P map segments L2P_MS_5 to L2P_MS_14 includes 1,024 logical addresses LA and 1,024 physical addresses PA corresponding to the logical addresses LA. Thus, the memory system 110 generates and manages dirty information D_INF on each of the 10 L2P map segments L2P_MS_5 to L2P_MS_14.

Eight L2P map segments L2P_MS_6 to L2P_MS_10 and L2P_MS_12 to L2P_MS_14, whose dirty information D_INF has a state value of '1', include logical addresses LA whose corresponding physical addresses PA have been changed. The other two L2P map segments L2P_MS_5 and L2P_MS_11, whose dirty information D_INF has a state value of '0', include logical addresses LA whose corresponding physical addresses PA are not changed.

That is, 80% of the L2P map segments L2P_MS included in the L2P controller map data L2P_MAP_C illustrated in FIG. 54B have a value of '1' as the state value of the dirty information D_INF. In this case, when the current temperature C_TEMP is within the normal temperature range (performance period of 50% or more) and the low temperature range (performance period of 10% or more), the memory system 110 performs the map download. In the high temperature range (performance period of 90% or more), however, the memory system 110 does not perform the map download.

Hereafter, a method in which the memory system 110 according to the present embodiment controls the temperature of the memory device 150 using the map miss information M_INF included in the state information STATE_INF are described.

Map miss indicates that L2P map data corresponding to a logical address LA transmitted to the memory system 110 from the host 102 are not stored in the memory. Map hit indicates that L2P map data corresponding to a logical address LA transmitted to the memory system 110 from the host 102 are stored in the memory. In the present embodiment, the map miss information M_INF may include the number of times that a map miss occurs. The map miss information M_INF may be configured in the form of a counter which has the initial value of a first level (for example, 0) and is increased whenever a map miss occurs.

When the current temperature C_TEMP is within the normal temperature range, the memory system 110 may perform the map download in the case that the state value of the map miss information M_INF is equal to or more than 10 times (performance period). The memory system 110 may download L2P memory map data L2P_MAP_M corresponding to 50% of the L2P controller map data L2P_MAP_C (performance target of 50%).

When the current temperature C_TEMP is within the low temperature range, the memory system 110 may perform the map download in the case that the state value of the map miss information M_INF is equal to or more than one time (performance period). The memory system 110 may download L2P memory map data L2P_MAP_M corresponding to 100% of the L2P controller map data L2P_MAP_C (performance target of 100%).

When the current temperature C_TEMP is within the high temperature range, the memory system 110 may perform the map download in the case that the state value of the map miss information M_INF is equal to or more than 130 times (performance period). The memory system 110 may download L2P memory map data L2P_MAP_M corresponding to 10% of the L2P controller map data L2P_MAP_C (performance target of 10%).

When the state value of the map miss information M_INF indicating the map miss count is '35' and the current temperature C_TEMP is within the normal temperature range (performance period of 10 times or more) and the low temperature range (performance period of one time or more), the memory system 110 performs the map download. In the high temperature range (performance period of 30 times or more), however, the memory system 110 does not perform the map download.

That is, the memory system 110 according to the present embodiment may differently set the performance condition of the map download according to the current temperature C_TEMP of the memory device 150, and thus induce a temperature rise or drop of the memory device 150 when the current temperature C_TEMP of the memory device 150 is within the preset low or high temperature range. Therefore, the memory system 110 according to the present embodiment can effectively reduce a malfunction of the memory device 150 and an occurrence of data corruption and improve the reliability of data stored therein.

Figure 55:
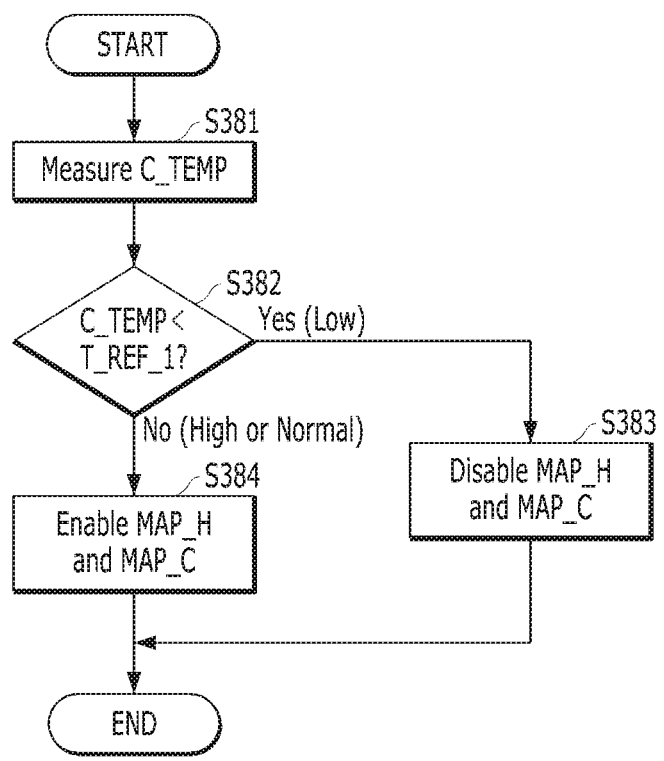
FIG. 55 is a flowchart illustrating a method in which the memory system according to an embodiment controls temperature thereof through a map miss ratio control operation.

FIG. 55 is a flowchart illustrating a method in which the memory system 110 according to the present embodiment adjusts a map miss ratio in order to adjust the performance period and performance target of the map download. FIGS. 56A to 56D illustrate examples of the controller map data MAP_C and the host map data MAP_H which are controlled by the memory system 110.

Hereafter, referring to FIGS. 55 and 56A to 56D, the method in which the memory system 110 according to the present embodiment adjusts the map miss ratio in order to adjust the performance period and performance target of the map download is described. Map miss indicates that L2P map data corresponding to a logical address LA transmitted to the memory system 110 from the host 102 are not stored in the memory.

Referring to FIG. 55, the temperature sensor may remeasure the current temperature C_TEMP under control of the memory system 110 in step S381. Furthermore, the temperature sensor may provide the measured current temperature C_TEMP to the memory system 110.

Thus, the memory system 110 compares the current temperature C_TEMP to a first reference temperature T_REF_1, and determines a temperature range to which the current temperature C_TEMP belongs, in step S382. The first reference temperature T_REF_1 may correspond to the lowest temperature in the normal temperature range indicating the normal operation temperature range of the memory system 110. The first reference temperature T_REF_1 may be preset and stored in the memory system 110. That is, the memory system 110 determines whether the current temperature C_TEMP is lower than the first reference temperature T_REF_1, in step S382.

When the determination result of step S382 indicates that the current temperature C_TEMP is lower than the first reference temperature T_REF_1 (Yes in step S382), the memory system 110 determines that the current temperature C_TEMP is within the low temperature range. Thus, the memory system 110 (e.g., the controller 130) may disable the controller map data MAP_C and the host map data MAP_H, in order to frequently perform the map download by raising the map miss ratio, in step S383. The memory system 110 may disable map segments which coincide with map segments L2P_MS of the controller map data MAP_C, among map segments L2P_MS included in the host map data MAP_H. For this operation, the memory system 110 may transmit a disable signal to the host 102.

Since the map segments coinciding with the map segments L2P_MS of the controller map data MAP_C among the map segments L2P_MS included in the host map data MAP_H are disabled, the host 102 is highly likely to transmit only a first logical address LA_1 without a first physical address PA_1, when transmitting the command CMD to the memory system 110. Thus, when performing a command operation, the memory system 110 needs to search for a second physical address PA_2 corresponding to the first logical address LA_1. Since the map data corresponding to the controller map data MAP_H are all disabled, the memory system 110 determines that a map miss occurred between the first logical address LA_1 and the controller map data MAP_C, and needs to perform the map download.

Referring to FIGS. 56A and 56B, step S383 is described in detail. FIG. 56A illustrates an example of the L2P controller map data L2P_MAP_C including 10 L2P map segments L2P_MS_5 to L2P_MS_14. FIG. 56B illustrates an example of the L2P host map data L2P_MAP_H including (n+1) L2P map segments L2P_MS_0 to L2P_MS_n. The L2P controller map data L2P_MAP_C and the L2P host map data L2P_MAP_H may be reset to an active state when updated.

As illustrated in FIG. 56A, when the current temperature C_TEMP of the memory device 150 is within the low temperature range, the memory system 110 may disable the 10 L2P map segments L2P_MS_5 to L2P_MS_14 included in the controller map data MAP_C (for example, EN=0), in order to frequently perform the map download by raising the map miss ratio.

As illustrated in FIG. 56B, the memory system 110 may disable map segments which coincide with the disabled 10 L2P map segments L2P_MS_5 to L2P_MS_14 of the controller map data MAP_C, among the (n+1) L2P map segments L2P_MS_0 to L2P_MS_n, (for example, EN=0). For this operation, the memory system 110 may transmit the disable signal to the host 102. In the present embodiment, the disable signal may be an enable signal EN having an inactive level (for example, 0).

According to the disable signal (EN=0), the 10 L2P map segments L2P_MS_5 to L2P_MS_14 among the (n+1) L2P map segments L2P_MS_0 to L2P_MS_n included in the host map data MAP_H may be disabled. Thus, the map miss ratio may be increased.

When a logical address corresponding to the target of a command generated by the processor included in the host 102 is 'LA7000', the host 102 recognizes that an L2P map segment corresponding to the logical address 'LA7000' is not included in the host map data MAP_H, because the L2P map segment L2P_MS_6 including the logical address 'LA7000' is disabled. Thus, the host 102 transmits only the command and the logical address LA7000 to the memory system 110 without a physical address PA.

The memory system 110 receives only the logical address LA7000 with the command from the host 102. The memory system 110 searches for a physical address PA corresponding to the logical address LA7000 in order to perform a command operation corresponding to the command received from the host 102 on the memory device 150. Since the L2P map segment L2P_MS_6 corresponding to the logical address LA7000 received from the host 102 was disabled in the controller map data MAP_C, the memory system 110 recognizes that the L2P map segment L2P_MS_6 corresponding to the logical address LA7000 received from the host 102 is not included in the controller map data MAP_C. Thus, the memory system 110 determines that a map miss occurred, requests the L2P map segment L2P_MS_6 corresponding to the logical address LA7000 from the memory device 150, and performs the map download.

That is, when the current temperature C_TEMP of the memory device 150 is within the low temperature range, the memory system 110 may immediately perform the map download by raising the map miss ratio, thereby inducing a temperature rise of the memory device 150. Therefore, the memory system 110 according to the present embodiment can effectively reduce a malfunction of the memory device 150 and an occurrence of data corruption and improve the reliability of data stored therein.

When the determination result of step S382 indicates that the current temperature C_TEMP is not lower than the first reference temperature T_REF_1 (No in step S382), the memory system 110 determines that the current temperature C_TEMP is not within the low temperature range. Thus, the memory system 110 may enable the controller map data MAP_C and the host map data MAP_H, in order not to frequently perform the map download by lowering the map miss ratio, in step S383. For this operation, the memory system 110 may transmit the enable signal to the host 102.

Since the controller map data MAP_C and the host map data MAP_H are enabled, the host 102 is highly likely to transmit the first physical address PA_1 with the first logical address LA_1 when transmitting the command CMD to the memory system 110. Thus, when the first physical address PA_1 is valid during a command operation, the memory system 110 may perform the command operation on the valid first physical address PA_1, and thus does not need to perform the map download. Furthermore, since the map data corresponding to the controller map data MAP_C are all disabled when the first physical address PA_1 is invalid, the memory system 110 may search the controller map data MAP_C for a valid second physical address PA_2 corresponding to the first logical address LA_1, because a map miss of the controller map data MAP_C does not occur. Therefore, the memory system 110 does not need to perform the map download.

Referring to FIGS. 56C and 56D, step S384 is described in detail. As illustrated in FIG. 56C, when the current temperature C_TEMP of the memory device 150 is not within the low temperature range, the memory system 110 may enable the 10 L2P map segments L2P_MS_5 to L2P_MS_14.

As illustrated in FIG. 56C, the memory system 110 may enable map segments which coincide with the disabled 10 L2P map segments L2P_MS_5 to L2P_MS_14 of the controller map data MAP_C, among the (n+1) L2P map segments L2P_MS_0 to L2P_MS_n. For this operation, the memory system 110 may transmit the enable signal (EN=1) to the host 102.

According to the enable signal (EN=1), the 10 L2P map segments L2P_MS_5 to L2P_MS_14 among the (n+1) L2P map segments L2P_MS_0 to L2P_MS_n included in the host map data MAP_H are enabled. Thus, the map miss ratio may be decreased, and the map hit ratio may be increased.

When a logical address corresponding to the target of a command is 'LA7000', the host 102 recognizes that an L2P map segment corresponding to the logical address 'LA7000' is included in the host map data MAP_H, because the L2P map segment L2P_MS_6 including the logical address 'LA7000' is enabled. Thus, the host 102 transmits a physical address PA corresponding to the logical address LA7000 to the memory system 110 with the command and the logical address LA7000.

The memory system 110 determines whether the physical address PA is valid, in order to perform a command operation according to the command, the logical address LA7000 and the physical address PA which are received from the host 102. When the physical address PA is valid, the memory system 110 performs the command operation on the physical address PA. Since the L2P translation operation of steps S340, S345 and S385 in FIG. 2 is not performed, the memory system 110 may generate less heat. Furthermore, since the map download of step S365 in which much heat is generated is not performed, the amount of heat generated by the memory system 110 may be further reduced.

When the physical address PA is invalid, the memory system 110 searches for the physical address PA corresponding to the logical address LA7000. Since the L2P map segment L2P_MS_6 corresponding to the logical address LA7000 received from the host 102 is already enabled in the controller map data MAP_C, the memory system 110 recognizes that the L2P map segment L2P_MS_6 corresponding to the logical address LA7000 is included in the controller map data MAP_C. Thus, the memory system 110 determines that a map hit, not a map miss, occurred, searches the controller map data MAP_C for the L2P map segment L2P_MS_6 corresponding to the logical address LA7000, and does not perform the map download.

That is, when the current temperature C_TEMP of the memory device 150 is within the low temperature range, the memory system 110, the data processing system and the method for driving the same according to the present embodiment may raise the map miss ratio to increase the temperature of the memory system 110 using heat generated by the map download. Therefore, the memory system 110 according to the present embodiment can effectively prevent, or reduce occurrence of, malfunction of the memory device 150 and data corruption, and thus improve the reliability of data stored therein.

That is, when the current temperature C_TEMP of the memory device 150 is not within the low temperature range, the memory system 110, the data processing system and the method for driving the same according to the present embodiment may lower the map miss ratio to reduce overhead of the memory system 110, which is caused by an unnecessary map download. Thus, it is possible to improve the performance speed and efficiency of the command operation of the memory system 110.

Figure 57:
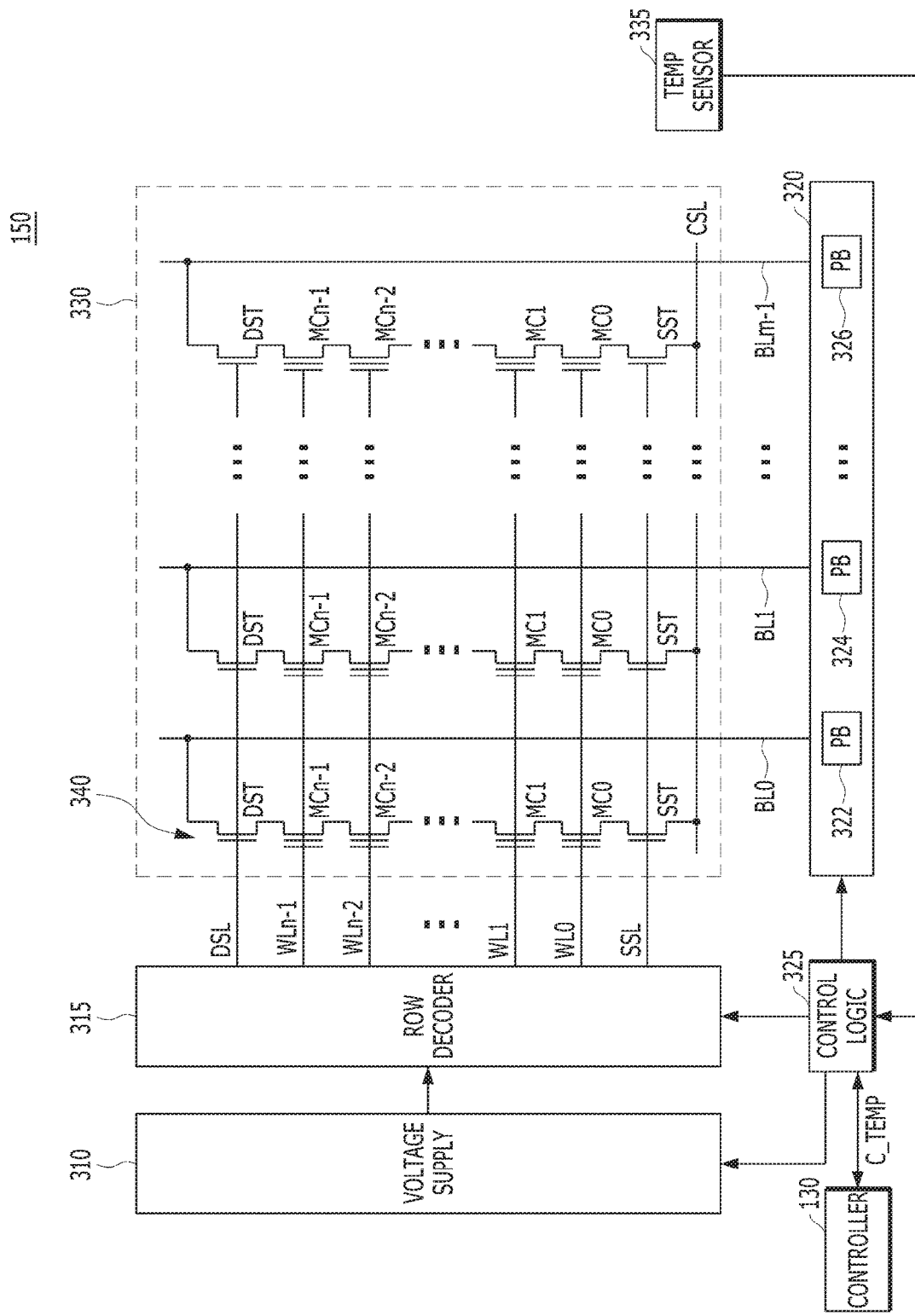
FIG. 57 illustrates a configuration of a memory cell array of a memory block in a memory device, such as that shown in FIG. 6A.

FIG. 57 is a circuit diagram illustrating a configuration of a memory cell array 330 of a memory block in the memory device 150.

Referring to FIG. 55, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example 2M pages, the number of which may vary according to circuit design. For example, in some applications, each of the memory blocks may include M pages. Each of the pages may include a plurality of memory cells that are coupled to a word line WL.

Furthermore, each of the plurality of memory blocks in the memory device 150 may be implemented with a single level cell (SLC) memory block with memory cells each capable of storing one bit of data, or a multi-level cell (MLC) memory block with memory cells each capable of storing two or more bits of data. Some examples of MLC memory blocks are a double level cell memory block (also called an MLC memory block), a triple level cell (TLC) memory block, and a quadruple level cell (QLC) memory block.

According to an embodiment of the invention, the memory device 150 may be a non-volatile memory, such as a flash memory, e.g., a NAND flash memory. However, the memory device 150 may be realized as any one of a Phase Change Random-access Memory (PCRAM), a Resistive Random-access Memory (RRAM or ReRAM), a Ferroelectric Random-access Memory (FRAM), a Spin Transfer Torque Magnetic Random-access Memory (STT-RAM or STT-MRAM) and the like.

The memory blocks 210, 220, 230, 240 may store the data transferred from a host through a program operation, and transfer data stored therein to the host through a read operation, FIG. 57 is a circuit diagram illustrating a memory block 330 in the memory device 150.

Referring to FIG. 57, the memory device 150 may include a memory block 330 comprising a plurality of memory cell arrays, a row decoder 315, a read/write circuit 320, a voltage supplier 310, and a control logic 325. The memory device 150 may include a temperature sensor 335 that detects a current temperature of the memory device 150. The temperature sensor 335 may be located inside the memory device 150 to accurately measure the temperature of the memory device, but as previously noted the invention is not limited thereto. In one embodiment of the invention, the temperature sensor 335 may measure the current temperature under the control of control logic 325. The temperature sensor 335 may also provide the measured current temperature to the control logic 325. The control logic 325 may also provide the measured current temperature to a controller 130 (shown in FIG. 6A). Thus, the controller 130 compares the current temperature with a reference temperature, and determines the temperature range to which the current temperature belongs. The reference temperature may be preset and stored in the controller 130.

Referring to FIG. 57, the memory block 330 may correspond to any of the plurality of memory blocks 152 to 156.

The memory block 330 of the memory device 150 may include a plurality of cell strings 340 which are electrically coupled to bit lines BL0 to BLm?1, respectively. The cell string 340 of each column may include at least one drain select transistor DST and at least one source select transistor SST. A plurality of memory cells or a plurality of memory cell transistors MC0 to MCn?1 may be electrically coupled in series between the select transistors DST and SST. The respective memory cells MC0 to MCn?1 may be configured as single level cells (SLC) each of which may store 1 bit of information, or by multi-level cells (MLC) each of which may store data information of a plurality of bits. The strings 340 may be electrically coupled to the corresponding bit lines BL0 to BLm?1, respectively. For reference, in FIG. 57, 'DSL' denotes a drain select line, 'SSL' denotes a source select line, and 'CSL' denotes a common source line.

While FIG. 57 only shows, as an example, that the memory block 330 is constituted with NAND flash memory cells, it is to be noted that the memory block 330 of the memory device 150 is not limited to a NAND flash memory. The memory block 330 may be realized by a NOR flash memory, a hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supplier 310 of the memory device 150 may provide word line voltages, for example, a program voltage, a pass voltage, a selection read voltage and non-selection read voltage, among other possible voltages to be supplied to respective word lines according to an operation mode and voltages to be supplied to bulks, for example, well regions in which the memory cells are formed. The voltage supplier 310 may perform a voltage generating operation under the control of control logic 325. The voltage supplier 310 may generate a plurality of variable read voltages to generate a plurality of read data, select one of the memory blocks or sectors of a memory cell array under the control of the control logic 325, select one of the word lines of the selected memory block, and provide the word line voltages to the selected word line and unselected word lines.

The row decoder 315 of the memory device 150 may select one of a plurality of the memory blocks 330 in response to an address ADDR. The row decoder 315 may select one of word lines of the selected memory block. The row decoder 315 may transfer a word line voltage, from the voltage supplier 310 to the selected word line. During a program operation, the row decoder 315 may transfer a program/verification voltage to the selected word line and a pass voltage Vpass to each of unselected word lines.

The read/write circuit 320 of the memory device 150 may be controlled by the control logic 325, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The control logic 325 may control the row decoder 315, the read/write circuit 320, and the voltage supplier 310 in response to a command from a controller 130 (see FIG. 6A). The control logic 325 may control the voltage supplier 310 and the read/write circuit 320 in response to a write command such that data (DATA) from the outside are programmed in selected memory cells. For example, the selected memory cells may be programmed in an incremental step pulse programming (ISPP) scheme under control of the control logic 325.

In the ISPP scheme, a program cycle for programming the selected memory cells (e.g., memory cells connected to one word line) is performed. One program cycle (or program operation) is composed of a plurality of program loops. In each program loop, at least one program pulse and at least one verification pulse are used. The program pulse has a level of the program voltage Vpgm, and the verification pulse has a level of the verification voltage. In the ISPP scheme, a level of the program voltage Vpgm may increase as a loop count increases.

Figure 58A:
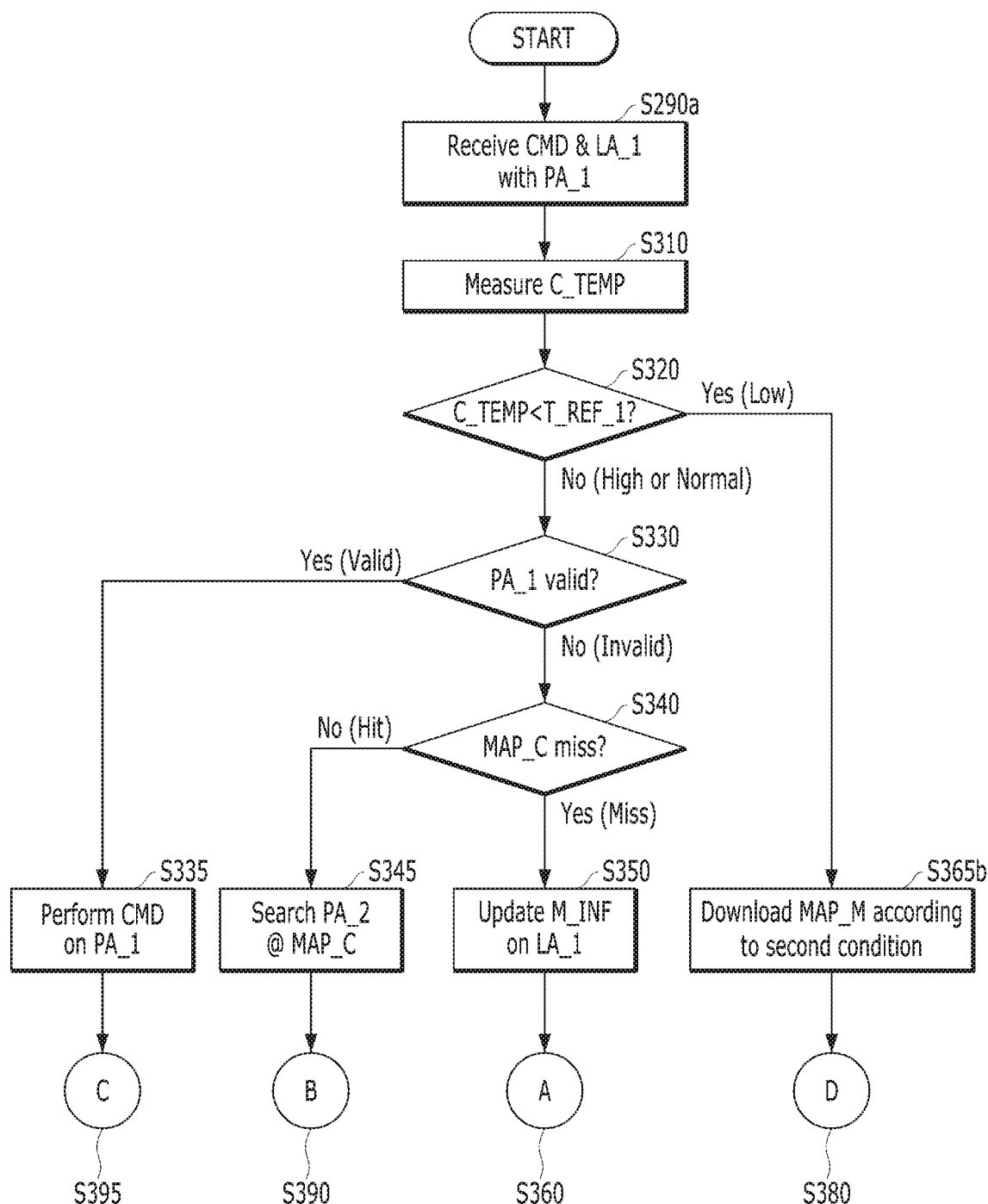
FIGS. 58A and 58B are flowcharts illustrating a method in which the memory system according to an embodiment performs a command operation.
Figure 58B:
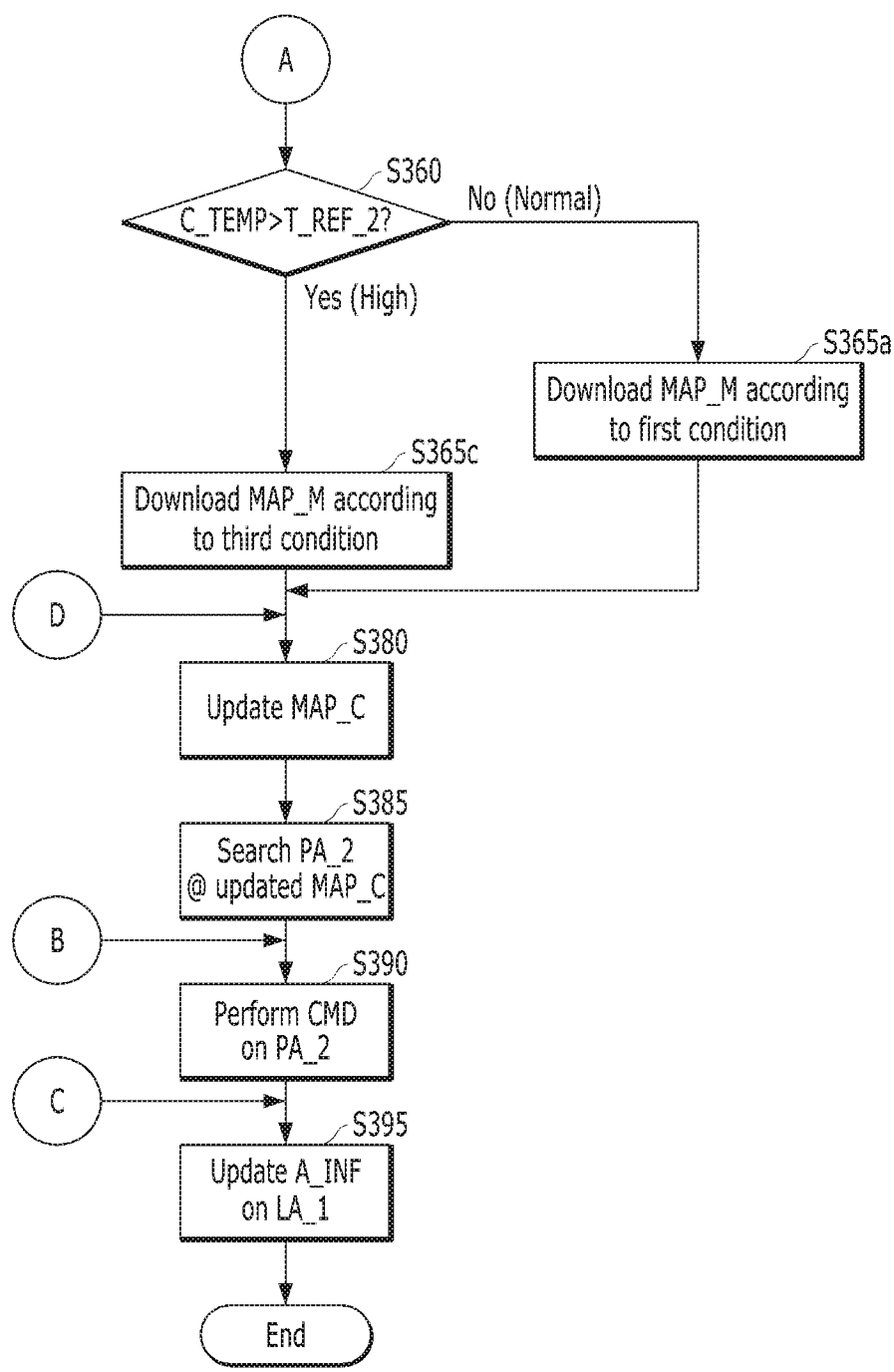

Referring to FIG. 58A, the controller 130 receives the first physical address PA_1 with the command CMD and the first logical address LA_1 in step S290.

The temperature sensor 335 included in the memory device 150 measures the current temperature C_TEMP of the memory device 150 in step S310. The temperature sensor 335 may periodically measure the current temperature C_TEMP of the memory device 150. In an embodiment, the temperature sensor 335 may measure the current temperature C_TEMP under control of the controller 130. Furthermore, the temperature sensor 335 may provide the measured current temperature C_TEMP to the controller 130.

Then, the controller 130 determines whether the current temperature C_TEMP is lower than the first reference temperature T_REF_1, in step S320. The first reference temperature T_REF_1 may be preset and stored in the controller 130.

When the determination result of step S320 indicates that the current temperature C_TEMP is lower than the first reference temperature T_REF_1 (Yes in step S320), the controller 130 determines that the current temperature C_TEMP of the memory device 150 is included in the low temperature range. When the current temperature C_TEMP is included in the low temperature range, the controller 130 may determine that the temperature of the memory device 150 is so low that an error occurred during a program or read operation on the memory device 150. In this case, the controller 130 may perform the map download for the memory map data MAP_M according to the second performance condition in step S365b.

When the determination result of step S320 indicates that the current temperature C_TEMP is not lower than the first reference temperature T_REF_1 (No in step S320), the controller 130 determines that the current temperature C_TEMP of the memory device 150 is included in the high temperature range or the normal temperature range.

Then, the controller 130 determines whether the first physical address PA_1 received in step S305 is valid, in step S330. The controller 130 may determine the validity of the first physical address PA_1 using the dirty information D_INF of the L2P map segment L2P_MS including the first logical address LA_1. Furthermore, the controller 130 may determine the validity of the first physical address PA_1 using invalid address information INV_INF of a P2L map segment sub region P2L_MS including the first physical address PA_1.

In the present embodiment, the dirty information D_INF may include information on whether the storage position of data corresponding to the logical address LA has been changed. That is, the dirty information D_INF may indicate whether the physical address PA corresponding to the first logical address LA_1 has been changed. The invalid address information INV_INF may include information on a physical address which has been invalidated by a change in the storage position of the data corresponding to the logical address LA, an erase operation, or an unmapping operation for the physical address PA corresponding to the logical address LA.

When the determination result of step S330 indicates that the first physical address PA_1 is valid (Yes in step S330), the controller 130 performs a command operation on the first physical address PA_1 in step S335. Then, the controller 130 updates the access information A_INF by increasing the state value of the access information A_INF on the first logical address LA_1 by 1 in step S395.

The access information A_INF may include information on whether the host 102 has accessed the logical address LA or the number of times that the host 102 accesses the logical address LA. The access information A_INF may be configured in the form of a counter that has the initial value of a first level (for example, 0), and is increased whenever an access of the host 102 to a specific logical address LA is requested.

When the determination result of step S330 indicates that the first physical address PA_1 is not valid (No in step S330), the controller 130 determines that the first physical address PA_1 is invalid. Then, the controller 130 performs an operation for searching for a valid second physical address PA_2 in order to perform the command operation for the first logical address LA_1 on the valid second physical address PA_2.

For this operation, the controller 130 determines whether a map miss occurred between the first logical address LA_1 and the controller map data MAP_C, in step S340. The controller 130 determines whether map data for the first logical address LA_1 are included in the controller map data MAP_C_1 stored in the memory 144.

When the determination result of step S340 indicates that the map data for the first logical address LA_1 are included in the controller map data MAP_C (No in step S340), the controller 130 determines that a map hit, not a map miss, occurred between the first logical address LA_1 and the controller map data MAP_C. Thus, the controller 130 acquires the second physical address PA_2 by searching the controller map data MAP_C, the second physical address PA_2 being a valid physical address corresponding to the first logical address LA_1, in step S345. Then, the controller 130 performs a command operation on the acquired second physical address PA_2 in step S390. Then, the controller 130 updates the access information A_INF by increasing the state value of the access information A_INF on the first logical address LA_1 by 1 in step S395.

When the determination result of step S340 indicates that the map data for the first logical address LA_1 are not included in the controller map data MAP_C (Yes in step S340), the controller 130 determines that a map miss occurred between the first logical address LA_1 and the controller map data MAP_C. The controller 130 updates the map miss information M_INF on the first logical address LA_1 by increasing the state value of the map miss information M_INF by 1 in step S350. In the present embodiment, the map miss information M_INF may include the number of times that a map miss occurs. The map miss information M_INF may be configured in the form of a counter which has the initial value of the first level (for example, 0) and is increased whenever a map miss occurs.

The controller 130 determines whether the current temperature C_TEMP measured in step S310 is lower than a second reference temperature T_REF_2, in step S360. The second reference temperature T_REF_2 may correspond to the highest temperature in the normal temperature range indicating the normal operation temperature range of the memory system 110. The second reference temperature T_REF_2 may be preset and stored in the controller 130.

When the determination result of step S360 indicates that the current temperature C_TEMP is higher than the second reference temperature T_REF_2 (Yes in step S360), the controller 130 determines that the current temperature C_TEMP of the memory device 150 is included in the high temperature range. When the current temperature C_TEMP is included in the high temperature range, the controller 130 may perform the map download for the memory map data MAP_M according to the third performance condition in step S365c.

When the determination result of step S360 indicates that the current temperature C_TEMP is not higher than the second reference temperature T_REF_2, the controller 130 determines that the current temperature C_TEMP of the memory device 150 is included in the normal temperature range. When the current temperature C_TEMP is included in the normal temperature range, the controller 130 may perform the map download for the memory map data MAP_M according to the first performance condition in step S365a.

In steps S365a, S365b and S365c, the controller 130 may request the memory map data MAP_M from the memory device 150, the memory map data MAP_M including map data for the first logical address LA_1. The memory device 150 may transmit the memory map data MAP_M including the map data for the first logical address LA_1 to the controller 130 according to a map download request of the controller 130.

Then, the controller 130 stores the memory map data MAP_M, downloaded from the memory device 150 in steps S365a, S365b and S365c, as the controller map data MAP_C in the memory 144. In this way, the controller map data MAP_C may be updated by the map download in step S380.

The controller 130 acquires the second physical address PA_2 for the first logical address LA_1 by searching the controller map data MAP_C_2 updated in step S380, in step S385. Then, the controller 130 performs the command operation on the acquired second physical address PA_2 in step S390.

Then, the controller 130 updates the access information A_INF by increasing the state value of the access information A_INF on the first logical address LA_1 by 1 in step S395.

The map download for the map data, which is performed under different performance conditions depending on the current temperature C_TEMP in steps S365a, S365b and S365c, may be performed according to the method described with reference to FIGS. 54A and 54B.

Figure 59A:
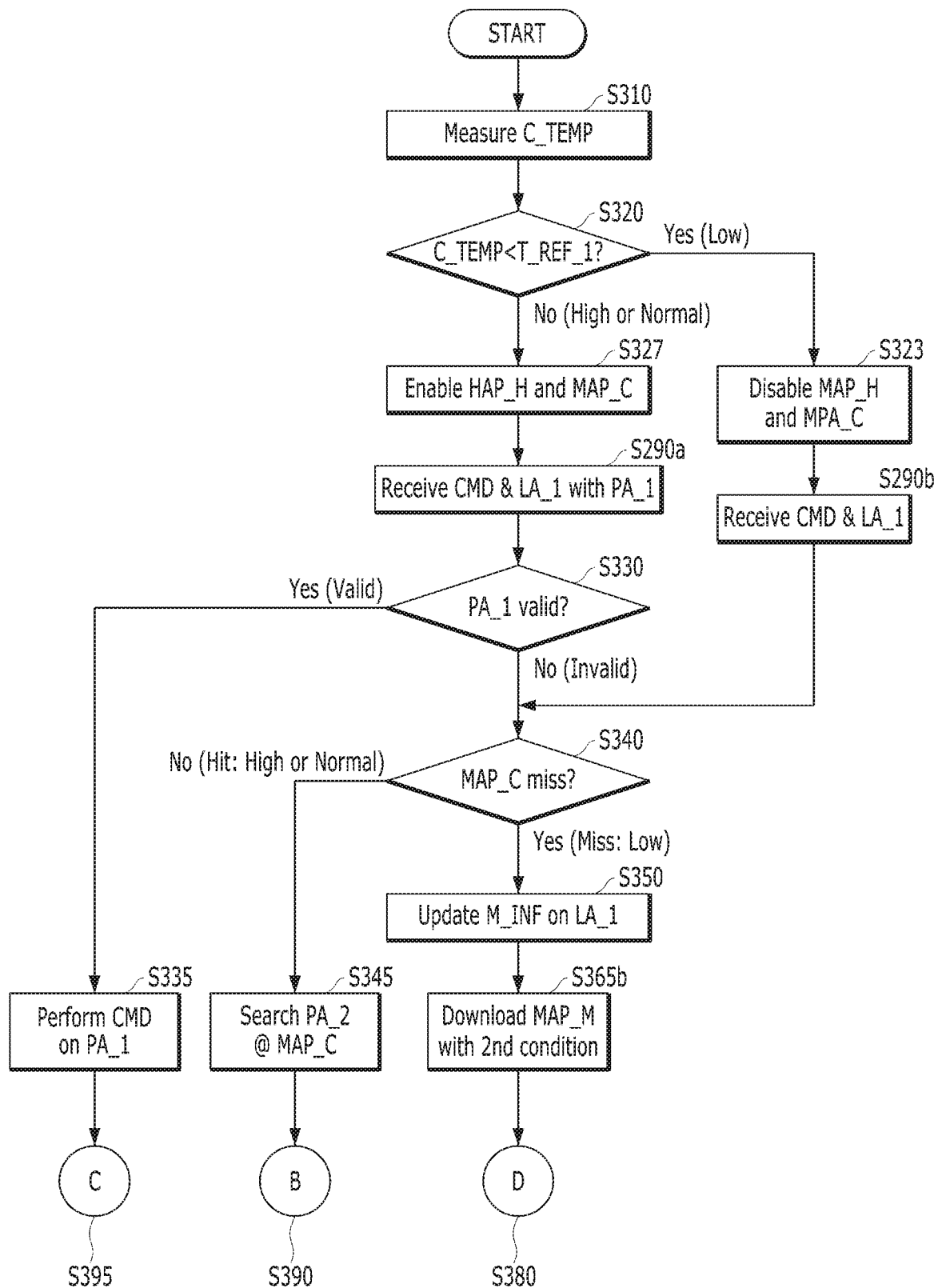
FIGS. 59A and 59B are flowcharts illustrating a method in which the memory system according to an embodiment performs a command operation.
Figure 59B:
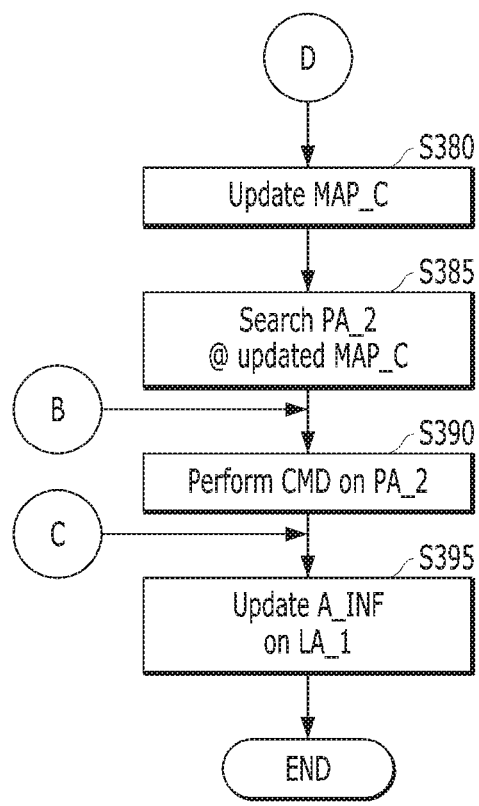

Hereafter, referring to FIGS. 28, 59A and 59B, a method in which a memory system according to an embodiment controls temperature thereof while performing a command operation is described. FIGS. 59A and 59B are flowcharts illustrating a method in which the memory system according to the present embodiment performs a command operation.

In particular, in the present embodiment illustrated in FIGS. 59A and 59B, the controller 130 may disable the controller map data MAP_C and the host map data MAP_H in order to raise the map miss ratio, when the current temperature C_TEMP of the memory device 150 is within the low temperature range. In this case, the host 102 transmits only the command CMD and the first logical address LA_1 to the controller 130 without the first physical address PA_1. Then, a map miss occurs during the command operation of the controller 130, and the controller 130 performs the map download to raise the temperature of the memory system 110.

Referring to FIG. 59A, the temperature sensor 335 included in the memory device 150 measures the current temperature C_TEMP of the memory device 150 in step S310. The temperature sensor 335 may periodically measure the current temperature C_TEMP of the memory device 150. In an embodiment, the temperature sensor 335 may measure the current temperature C_TEMP under control of the controller 130. Furthermore, the temperature sensor 335 may provide the measured current temperature C_TEMP to the controller 130.

Thus, the controller 130 determines whether the current temperature C_TEMP is lower than the first reference temperature T_REF_1, in step S320. The first reference temperature T_REF_1 may correspond to the lowest temperature in the normal temperature range indicating the normal operation temperature range of the memory system 100. The first reference temperature T_REF_1 may be preset and stored in the controller 130.

When the determination result of step S320 indicates that the current temperature C_TEMP is lower than the first reference temperature T_REF_1 (Yes in step S320), the controller 130 determines that the current temperature C_TEMP of the memory device 150 is included in the low temperature range. Thus, the controller 130 disables the host map data MAP_H stored in the host memory 106 and the controller map data MAP_C stored in the memory 144 in step S323. Since this process has already been described with reference to FIGS. 55, 56A and 56B, description thereof is omitted here.

In this case, since portions of the host map data MAP_H, corresponding to the controller map data MAP_C, are disabled, the host 102 transmits only the command CMD and the first logical address LA_1 to the controller 130 without the first physical address PA_1. Thus, the controller 130 receives only the command CMD and the first logical address LA_1 from the host 102 in step S290b. Then, the controller 130 performs step S340.

When the determination result of step S320 indicates that the current temperature C_TEMP is not lower than the first reference temperature T_REF_1 (No in step S320), the controller 130 determines that the current temperature C_TEMP of the memory device 150 is included in the high temperature range or the normal temperature range. In this case, the controller 130 enables the host map data MAP_H stored in the host memory 106 and the controller map data MAP_C stored in the memory 144 in step S327. Since to this process has already been described with reference to FIGS. 55, 56C and 56D, description thereof is omitted here.

In this case, since portions of the host map data MAP_H, corresponding to the controller map data MAP_C, are enabled, the host 102 transmits the first physical address PA_1 with the command CMD and the first logical address LA_1 to the controller 130. Thus, the controller 130 receives the first physical address PA_1 with the command CMD and the first logical address LA_1 from the host 102 in step S290a.

After step S290a, the controller 130 determines whether the first physical address received in step S290a is valid, in step S330. The controller 130 may determine the validity of the first physical address PA_1 using the dirty information D_INF of the L2P map segment L2P_MS including the first logical address LA_1. Furthermore, the controller 130 may determine the validity of the first physical address PA_1 using the invalid address information INV_INF of the P2L map segment sub region P2L MS including the first physical address PA_1.

When the determination result of step S330 indicates that the first physical address PA_1 is valid (Yes in step S330), the controller 130 performs the command operation on the first physical address PA_1 in step S335. Then, the controller 130 updates the access information A_INF by increasing the state value of the access information A_INF on the first logical address LA_1 by 1 in step S395.

When the determination result of step S330 indicates that the first physical address PA_1 is not valid (No in step S330), the controller 130 determines that the first physical address PA_1 is invalid. Then, the controller 130 performs an operation for searching for and acquiring a valid second physical address PA_2 in order to perform the command operation for the first logical address LA_1 on the valid second physical address PA_2.

For this operation, the controller 130 determines whether a map miss occurred between the first logical address LA_1 and the controller map data MAP_C, in step S340. The controller 130 determines whether map data for the first logical address LA_1 are included in the controller map data MAP_C stored in the memory 144, in step S340.

When the current temperature C_TEMP measured in step S310 is within the normal temperature range or the high temperature range, the map data corresponding to the host map data MAP_H and the controller map data MAP_C are all enabled in step S327. Therefore, the map data for the first logical address LA_1 received by the controller 130 in step S305 are included in the controller map data MAP_C (No in step S340). Thus, the controller 130 determines that a map hit occurred between the first logical address LA_1 and the controller map data MAP_C (No in step S340). In the present embodiment, according to the determination result of step S340 a map hit may occur only when the current temperature C_TEMP is higher than the first reference temperature T_REF_1.

The controller 130 acquires the second physical address PA_2 for the first logical address LA_1 by searching the controller map data MAP_C_1 in step S345. Then, the controller 130 performs the command operation on the acquired second physical address PA_2 in step S390. Then, the controller 130 updates the access information A_INF by increasing the state value of the access information A_INF on the first logical address LA_1 by 1 in step S395.

When the current temperature C_TEMP measured in step S310 is within the low temperature range, the map data corresponding to the host map data MAP_H and the controller map data MAP_H are all disabled in step S327. Therefore, the map data for the first logical address LA_1 received by the controller 130 in step S305 are not included in the controller map data MAP_C_1 (Yes in step S340). Thus, the controller 130 determines that a map miss occurred between the first logical address LA_1 and the controller map data MAP_C (Yes in step S340). Then, the controller 130 updates the map miss information M_INF on the first logical address LA_1 by increasing the state value of the map miss information M_INF by 1 in step S350. In the present embodiment, according to the determination result of step S340, a map miss may occur only when the current temperature C_TEMP is lower than the first reference temperature T_REF_1.

After step S350, the controller 130 performs the map download for the memory map data MAP_M in step S365b. The controller 130 may request the memory map data MAP_M including the map data for the first logical address LA_1 from the memory device 150. The memory device 150 may transmit the memory map data MAP_M including the map data for the first logical address LA_1 to the controller 130 according to the map download request of the controller 130.

Referring to FIG. 59B, the controller 130 stores the memory map data MAP_M downloaded from the memory device 150 as the controller map data MAP_C_1 in the memory 144. In this way, the controller map data MAP_C_1 may be updated into the controller map data MAP_C_2 by the map download in step S380.

The controller 130 acquires the second physical address PA_2 for the first logical address LA_1 by searching the controller map data MAP_C_2 updated in step S380, in step S385. Then, the controller 130 performs the command operation on the acquired second physical address PA_2 in step S390.

Then, the controller 130 updates the access information A_INF by increasing the state value of the access information A_INF on the first logical address LA_1 by 1 in step S395.

Figure 60A:
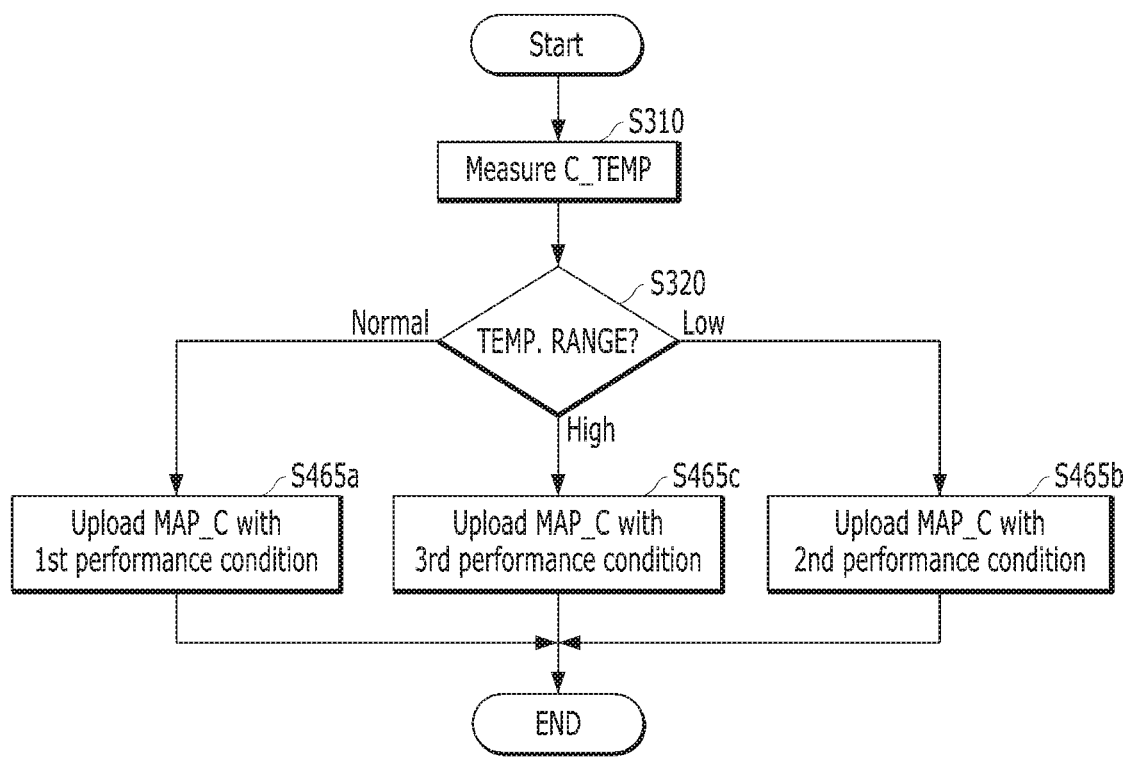

Hereafter, referring to FIGS. 60A and 60B, a method in which the memory system 110 according to the present embodiment controls the temperature of the memory device 150 is described. FIGS. 60A and 60B are a flowchart and table for describing the method in which the memory system 110 according to the present embodiment performs the map upload. In the present embodiment, the map upload may accompany the map download.

The temperature sensor 335 measures the current temperature C_TEMP of the memory device 150 in step S310. The controller 130 determines a temperature range to which the measured current temperature C_TEMP belongs, in step S320a. When the current temperature C_TEMP is within the normal temperature range, the controller 130 performs the map upload for the controller map data MAP_C according to the first performance condition in step S465a. When the current temperature C_TEMP is within the low temperature range, the controller 130 performs the map upload for the controller map data MAP_C according to the second performance condition in step S465b. When the current temperature C_TEMP is within the high temperature range, the controller 130 performs the map upload for the controller map data MAP_C according to the third performance condition in step S465c. Each of the first to third performance conditions may include a performance period and a performance target.

The map uploads performed in steps S465a, S465b and S465c in FIG. 60A may be performed under the lead of the controller 130, without an interactive operation between the memory system 110 and the host. The controller 130 may set each of the first to third performance conditions, which are differently set depending on the current temperature C_TEMP, to a fixed performance period and a fixed performance target.

For example, when the current temperature C_TEMP is within the normal temperature range, the controller 130 may perform the map upload according to the first performance condition. The first performance condition may include a fixed performance period (for example, 12 hours) and a fixed performance target (50% of controller memory capacity). Furthermore, when the current temperature C_TEMP is within the low temperature range, the controller 130 may perform the map upload according to the second performance condition. The second performance condition may include a fixed performance period (for example, 30 seconds) and a fixed performance target (100% of map cache memory capacity). Furthermore, when the current temperature C_TEMP is within the high temperature range, the controller 130 may perform the map upload according to the third performance condition. The third performance condition may include a fixed performance period (for example, 24 hours) and a fixed performance target (10% of map cache memory capacity).

The map uploads performed in steps S465a, S465b and S465c in FIG. 60A may be performed under the lead of the controller 130, based on the state information STATE_INF of the map data updated by an interactive operation between the memory system 110 and the host. The controller 130 may set the performance period and performance target of the map upload according to the current temperature C_TEMP and the state information STATE_INF.

In the present embodiment, the map upload includes an operation in which the memory system 110 transmits the controller map data stored in the memory to the host 102. The uploaded controller map data MAP_C may be stored as the host map data MAP_H in the host memory 106.

When the current temperature C_TEMP is within the normal temperature range, the controller 130 may perform the map upload in the case that the state value of the access information A_INF is equal to or more than 10 times (performance period). Then, the controller 130 may upload 50% of the L2P controller map data L2P_MAP_C (performance target of 50%).

When the current temperature C_TEMP is within the low temperature range, the controller 130 may perform the map upload in the case that the state value of the access information A_INF is equal to or more than 2 times (performance period). Then, the controller 130 may upload 100% of the L2P controller map data L2P_MAP_C (performance target of 100%).

Hereafter, a method in which the memory system 110 according to the present embodiment controls the temperature of the memory device 150 using the map miss information M_INF included in the state information STATE_INF is described.

When the current temperature C_TEMP is within the normal temperature range, the memory system 110 may perform the map upload in the case that the state value of the map miss information M_INF is equal to or more than 10 times (performance period). Then, the memory system 110 may upload L2P memory map data L2P_MAP_M corresponding to 50% of L2P controller map data L2P_MAP_C (performance target of 50%).

When the current temperature C_TEMP is within the low temperature range, the memory system 110 may perform the map upload in the case that the state value of the map miss information M_INF is equal to or more than one time (performance period). Then, the memory system 110 may upload L2P memory map data L2P_MAP_M corresponding to 100% of L2P controller map data L2P_MAP_C (performance target of 100%).

When the current temperature C_TEMP is within the high temperature range, the memory system 110 may perform the map upload in the case that the state value of the map miss information M_INF is equal to or more than 130 times (performance period). Then, the memory system 110 may upload L2P memory map data L2P MAP_M corresponding to 10% of L2P controller map data L2P_MAP_C (performance target of 10%).

When the state value of the map miss information M_INF indicating the map miss count is '35' and the current temperature C_TEMP is within the normal temperature range (performance period of 10 times or more) and the low temperature range (performance period of one time or more), the memory system 110 performs the map upload. In the high temperature range (performance period of 30 times or more), however, the memory system 110 does not perform the map upload.

When the current temperature C_TEMP is within the high temperature range, the controller 130 may perform the map upload in the case that the state value of the access information A_INF is equal to or more than 50 times (performance period). Then, the controller 130 may upload 10% of the L2P controller map data L2P_MAP_C (performance target of 10%).

That is, the memory system 110 according to the present embodiment may differently set the performance condition of the map upload according to the current temperature C_TEMP of the memory device, and thus induce a temperature rise or drop of the memory device when the current temperature C_TEMP of the memory device is within the low or high temperature range. Therefore, the memory system 110 according to the present embodiment can effectively reduce a malfunction of the memory device and an occurrence of data corruption, and improve the reliability of data stored therein.

Figure 61:
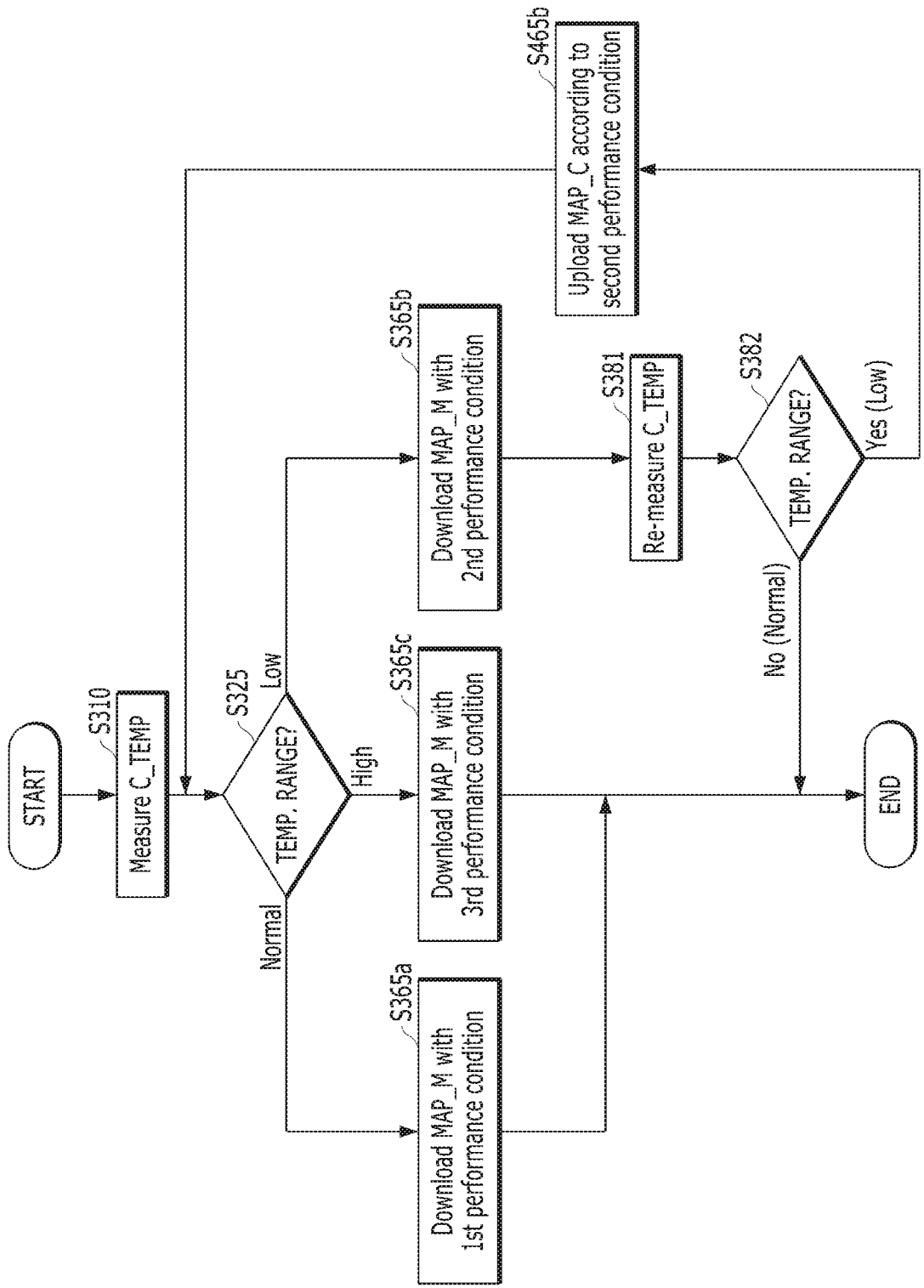
FIG. 61 is a flowchart illustrating a method in which the memory system according to an embodiment controls temperature thereof through the map upload and the map download.

FIG. 61 is a flowchart illustrating a method in which the memory system according to the present embodiment controls temperature thereof through the map upload and the map download.

In particular, FIG. 61 illustrates an example in which the controller 130 remeasures the current temperature C_TEMP of the memory device 150 in step S381, after controlling the temperature of the memory system through the map download illustrated in FIGS. 54A and 54B. The controller 130 determines a temperature range to which the current temperature C_TEMP measured in step S381 belongs, in step S382. When the current temperature C_TEMP measured in step S381 is within the low temperature range, the controller 130 uploads the controller map data MAP_C to the host 102 in step S465b.

When the determination result of step S382 indicates that the current temperature C_TEMP is not lower than the first reference temperature T_REF_1 (No in step S382), the controller 130 determines that the current temperature C_TEMP of the memory device was out of the low temperature range due to the map upload performed in step S365b according to the second performance condition.

As such, in the present embodiment illustrated in FIG. 61, the performance condition including the performance period and performance target of the map download may be changed according to the current temperature C_TEMP, thereby improving the reliability of the memory system 110.

When the current temperature C_TEMP of the memory system 110 illustrated in FIG. 61 is within the low temperature range, the memory system 110 may additionally perform the map upload, such that the temperature of the memory system 110 rises rapidly to be within the normal temperature range. In the present embodiment, the map upload may accompany the map download.

As described above, it is possible to improve the data reliability of the memory device based on the different embodiments which have been described with reference to FIGS. 54A to 54B, FIG. 55, FIGS. 58A to 58B, FIG. 59A to 59B, FIG. 60A to 60B and FIG. 61.

For this configuration, the memory system 110 according to the present embodiment differently sets the performance conditions of the map upload and the map download depending on the temperature of the memory device 150, and induces a temperature rise or drop of the memory device 150 such that the temperature of the memory device 150 returns to the normal temperature range. In this way, the memory system 110 according to the present embodiment can effectively prevent, or reduce occurrence of, malfunction of the memory device 150 and data corruption, and thus improve the reliability of data stored therein.

Hereinafter, the following description will be given with reference to FIGS. 62 and 63 which describe an operation of generating an application-level ID according to an embodiment, and FIGS. 64 and 65 which describe a method of outputting map data according to an embodiment.

Figure 62:
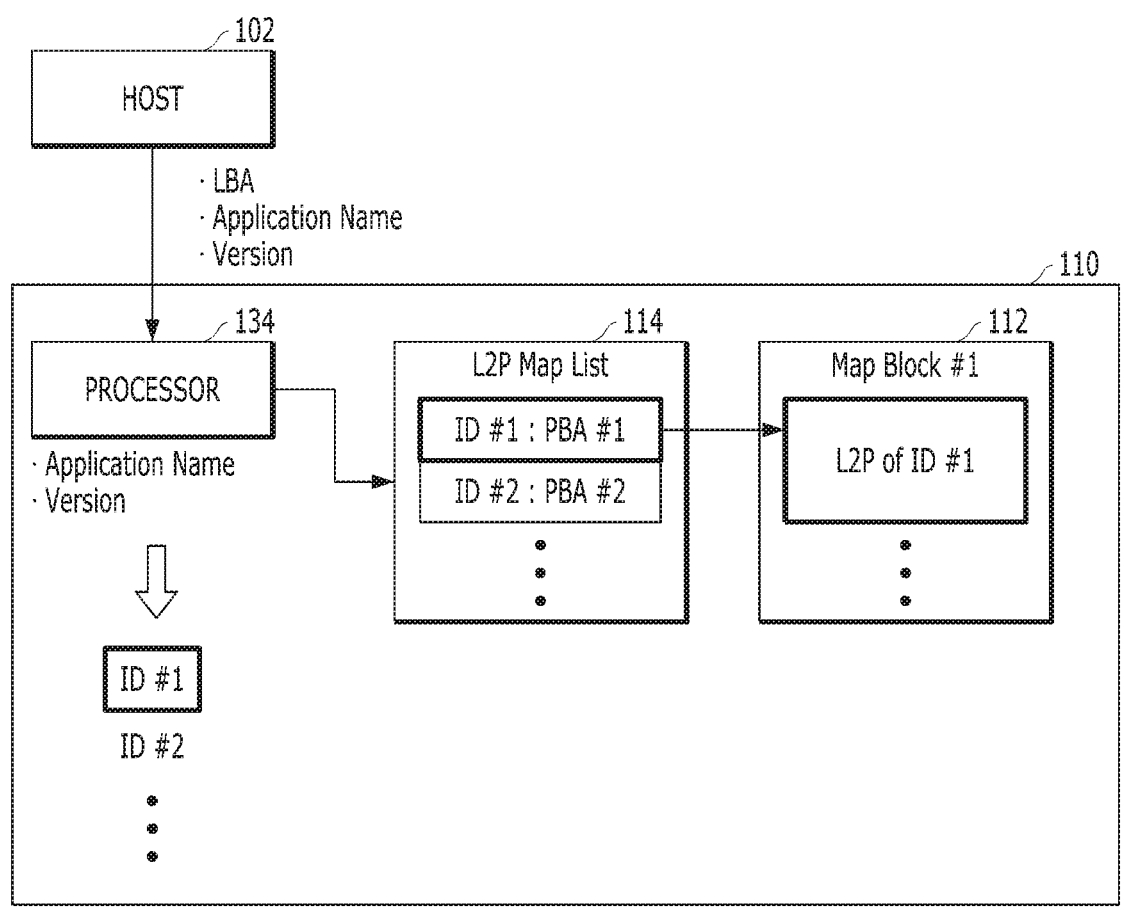
FIGS. 62 and 63 are diagrams describing an operation of generating an application-level ID according to an embodiment.
Figure 63:
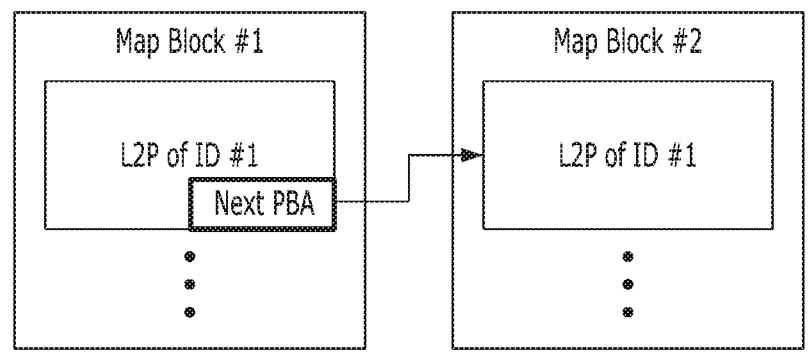

Referring to FIG. 62, when transmitting a read command, the host 102 may transmit a name and a version of an application to the memory system 110 in addition to a logical address.

According to the present embodiment, the host 102 may determine a logical address used by a foreground application as a hot region to receive corresponding map data in advance. The foreground application may denote an application currently running in the foreground.

The host device may transmit application information before receiving map data for the foreground application returned from the memory system 110, thereby configuring a logical address area for each application. That is, the host 102 may generate and manage in advance an L2P map list for the application information before the memory system 110 provides the host 102 with the map data for the foreground application.

The processor 134 of the memory system 110 may generate IDs (ID#1, ID#2, . . . ) by applying a hash function to the name and version of the application transmitted from the host 102, and generate an L2P map list for each application based on the IDs. That is, in order to provide the map data for the foreground application to the host 102, the processor 134 generates and manages the L2P map list in advance with respect to the name and version of the application transmitted from the host 102.

Referring to FIG. 62, the L2P map list may include physical addresses that match by IDs, to which the hash function has been applied, such as ID#1: PBA#1, ID#2: PBA#2, . . . . . The IDs, to which the hash function has been applied, may match map data for each ID (e.g., L2P of ID#1) of a map block (e.g., map block #1).

When the map data for each ID is stored across two or more map blocks, the map data for each ID may include a physical address link of a next map block.

Specifically, in some applications, since a relatively large number of LBAs are used, all maps may not be generated in a single physical block address (PBA). Referring to FIG. 63, it may be seen that map data L2P of ID#1 is very large and stored across a map block #1 and a map block #2. The processor 134 may store the PBA of the map block #2, which is a next map block, at the end of the map block #1 of ID#1.

The processor 134 may receive current foreground application information transmitted from the host 102 for which map data is to be provided.

For reference, the host 102 may determine a logical address, at which map data is provided from the memory system 110, as a logical address currently used by the foreground application. This is because the host 102 determines that an application running in the foreground performs a relatively large number of inputs/outputs (I/O).

Figure 64:
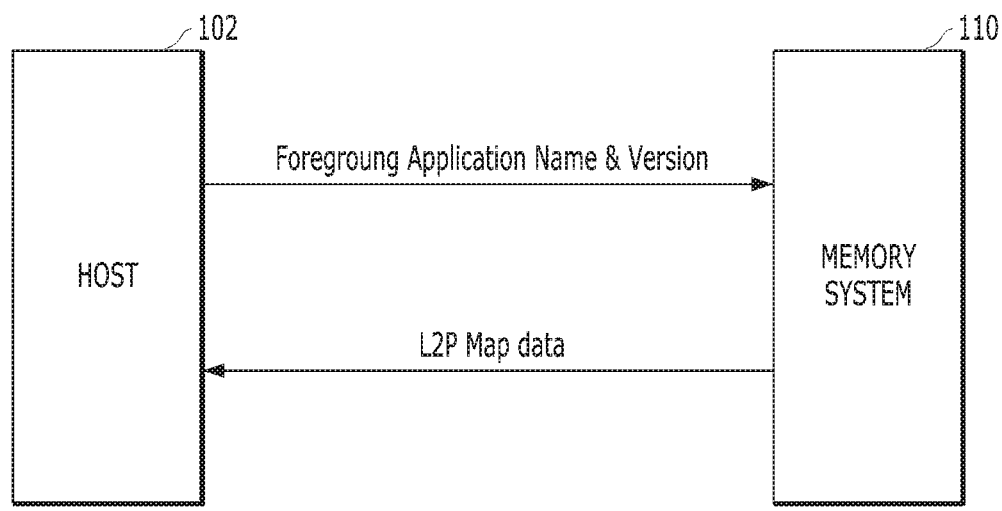
FIGS. 64 and 65 are diagrams describing a method of outputting map data according to an embodiment.

Referring to FIG. 64, when the name and version of the foreground application are transmitted from the host 102, the processor 134 of the memory system 110 may search for and return corresponding map data based on the IDs. That is, the processor 134 transmits map data for the foreground application to the host 102, and this allows the host 102 to utilize the map data when transmitting a read command.

Figure 65:
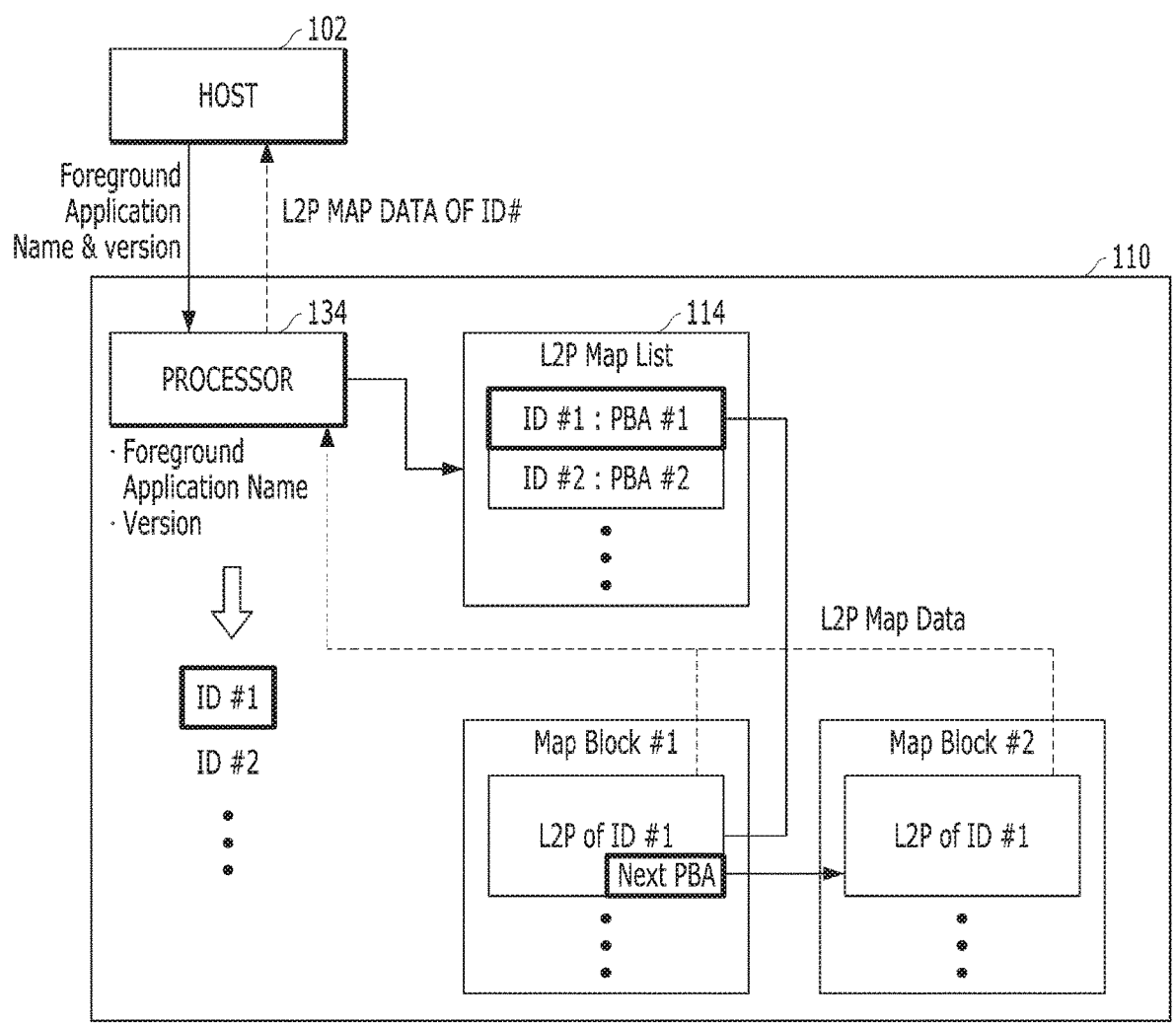

Referring to FIG. 65, when the name and version of the foreground application 'Foreground Application Name & Version' are received, the processor 134 may search for an ID (e.g., ID#1) that matches the name and version of the aforementioned foreground application, search for map data from a map block 112 based on the searched ID, and provide the searched map data to the host 102. According to an embodiment, the map block 112 may include the memory map data MAP_M are stored in the memory device 150 shown in FIG. 28. When the map data is stored across two or more map blocks, the processor 134 may search for map data stored in a next map block (e.g., Map Block #2) together, based on the physical address link (i.e., Next PBA) of the next map block. Of course, when the map data is stored only in one map block, the physical address link of the next map block is omitted.

The memory 144 may store the L2P map list for each application, which matches the IDs.

Referring to FIGS. 1 to 2 and 62 to 65, the memory 144 may match the L2P map list with the IDs to which the hash function has been applied, such as ID#1: PBA#1, ID#2: PBA#2, . . . , and store the L2P map list.

The memory interface 142 may control the memory device 150 under the control of the processor 134.

The memory device 150 may include the map block 112 that stores the map data for each ID.

Figure 66:
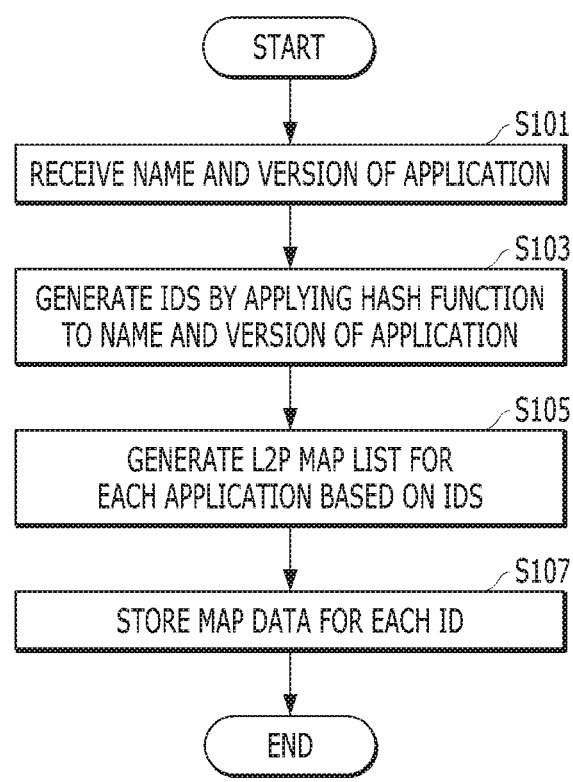
FIG. 66 is a flowchart describing an operating method of a data storage device according to an embodiment.

FIG. 66 is a flowchart describing an operating method of the memory system 110 according to an embodiment.

First, the memory system 110 may generate IDs based on application information transmitted from the host 102.

Specifically, the memory system 110 may receive the name and version of an application transmitted from the host 102 when a read command is transmitted at step S101. Next, the memory system 110 may generate the IDs by applying a hash function to the name and version of the application at step S103.

At step S105, the memory system 110 may generate a map list for each application based on the IDs.

At step S107, the memory system 110 may store the map data for each ID.

Referring back to FIG. 63, when the map data for each ID is stored across two more map blocks, the memory system 110 may allow the map data for each ID to include the physical address link of a next map block. The map data may be L2P map data including the logical address and the physical address of the foreground application.

The aforementioned steps S103, S105, and S107 may be pre-operations for returning map data for the foreground application which will be described below.

Figure 67:
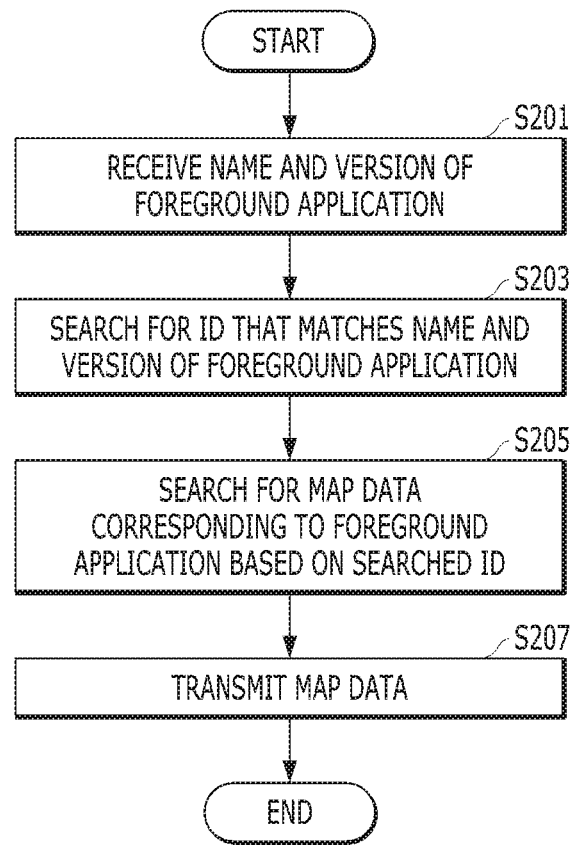
FIG. 67 is a flowchart describing in detail a technology of returning map data for a foreground application of FIG. 66.

FIG. 67 is a flowchart describing an operating method of the memory system 110 according to an embodiment. FIG. 67 illustrates an operation of returning the map data corresponding to the foreground application.

At step S201, the memory system 110 may receive, from the host 102, information on the foreground application, which is transmitted whenever the foreground application is changed. The information on the foreground application may include a name and a version of the foreground application.

At step S203, the memory system 110 may search for an ID that matches the name and version of the foreground application.

At step S205, the memory system 110 may search for map data corresponding to the foreground application based on the searched ID.

At step S207, the memory system 110 may transmit the searched map data corresponding to the foreground application to the host 102.

The host 102 may store the map data corresponding to the foreground application transmitted from the memory system 110, in the host memory 330. When map data (i.e., L2P information) corresponding to a logic address to access is stored in the host memory 330, the host 102 may transmit the map data to the memory system 110 along with a read command.

As illustrated in FIG. 65, the memory system 110 may return map data (i.e., L2P map data for each ID) corresponding to the name and version of the foreground application to the host 102.

According to an embodiment of the disclosure, a memory system may efficiently search for map information in a map cache, and selectively provide a host with updated map information.

According to embodiments, the data processing system including the memory system and a computing device or an external device including a host may efficiently control an operation of transmitting map data by the memory system, thereby reducing overhead that may occur in data transmission between the memory system and the computing device or the host in the data processing device.

According to embodiments, in the memory system, the data processing system and the driving method thereof, a memory device may perform a command operation corresponding to a physical address inputted, together with a command, from an external device, thereby reducing overhead of the memory system, which occurs due to unnecessary L2P conversion, and improving performance speed and efficiency of the command operation of the memory system.

According to embodiments, the data processing system including the memory system and an external device may perform a command operation on a reference physical address inputted from the external device and one or more physical addresses consecutive with the reference physical address, thereby reducing command performance time of the memory system, and improving performance speed and efficiency of the command operation of the memory system.

According to embodiments, a sequential access operation may be performed when access to data stored in a physically consecutive space is requested, thereby accessing the data more efficiently.

According to embodiments, read data according to a subsequently expected read request may be prefetched when a sequential read operation is performed, thereby improving performance of the read operation of the memory system and preventing read disturbance.

According to embodiments, data requested to be accessed by a host may be accessed in an interleaving manner, thereby improving performance of an access operation of the memory system.

The data processing apparatus including the memory system and the computing apparatus or the host according to an embodiment of the disclosure can reduce overhead in transmitting data between the memory system within the data processing apparatus and the computing apparatus or the host by efficiently controlling an operation of transmitting, by the memory system, map data.

The memory system, data processing system, and methods of driving them according to an embodiment of the disclosure can improve efficiency of map data management by generating and updating state information of map data for each of a plurality of sub-segments of a map segment, instead of the map segment as a whole, of the map data.

The memory system, data processing system, and methods of driving them according to an embodiment of the disclosure can reduce overhead of the memory system by eliminating unnecessary L2P conversion because the memory device performs a command operation according to a physical address received from an external device along with a command, and thus the execution speed of the command operation of the memory system and efficiency of the command operation can be improved.

The memory system, data processing system, and methods of driving them according to an embodiment of the disclosure can improve map data management by changing a value of state information of map data stored in the memory system, which state information is conveniently represented in a bitmap form, a flag form, a table form or a list form, when a physical address of data stored in the memory system is changed, and writing whether the physical address of data corresponding to a given logical address has been changed and an invalid physical address.

The memory system, data processing system, and methods of driving them according to an embodiment of the disclosure can improve the speed of an operation of determining the validity of a physical address because the memory system determines the validity of a physical address, received from an external device along with a command, based on state information of map data without separate map data retrieval, and thus the speed of a command operation can be improved.

According to the present embodiments, the memory system and the method for controlling temperature thereof can induce a rise or drop in the temperature of the memory cell array by controlling the map download and/or the map upload when the temperature of the memory device is outside of the normal temperature range, thereby improving the performance and data reliability of the memory device.

Furthermore, the memory system and the method for controlling temperature thereof may differently set the performance condition of the map download or the map upload according to the temperature of the memory device, such that the temperature of the memory device is maintained in, or returns to, the normal temperature range. Therefore, the memory system can avoid the degradation in performance and data reliability of the memory device.

Furthermore, when the temperature of the memory device is within the low temperature range, the memory system and the method for controlling temperature thereof may additionally perform the map download or the map upload or advance the performance time of the map download or the map upload, and thus raise the temperature of the memory device such that the temperature of the memory device returns to the temperature range in which the memory system can normally operate. Thus, the memory system can effectively improve the performance and data reliability of the memory device.

Furthermore, the memory system can control the internal temperature thereof even in an environment where the ambient temperature tends to rise like in a data center where a large amount of data is stored and processed, or in an environment where high temperature of an outside environment may change like in a vehicle, thereby maintaining the operation stability of the memory system.

Furthermore, the memory system, the data processing system and the method for controlling temperature thereof can generate and update the state information of the map data for each map segment of the map data, thereby improving the efficiency of the map data management.

Furthermore, in the memory system, the data processing system and the method for controlling temperature thereof, the memory device can perform a command operation in response to a physical address received with a command from an external device, thereby reducing overhead of the memory system which is caused by unnecessary L2P translation. Therefore, the performance speed of the command operation of the memory system and the efficiency of the command operation can be improved.

Furthermore, when the physical address of data stored in the memory system is changed, the memory system, the data processing system and the method for controlling temperature thereof can change the value of the state information of the map data which are stored in the memory system and configured in the form of a bitmap, flag, table or list, and write information on whether the physical address of data for a specific logical address has been changed and invalid address information, thereby improving map data management.

Furthermore, the memory system, the data processing system and the method for controlling temperature thereof can determine the validity of a physical address received with a command from an external device using the state information of the map data without separate map data search. Therefore, the speed of the validity determination operation for the physical address can be improved, and the speed of the command operation can be improved.

Furthermore, the memory system, the computing device or the data processing system including the host can efficiently control the map upload, thereby reducing overhead which may occur during data transmission between the memory system and the computing device within the data processing device or between the hosts.

While the disclosure has been described with respect to the specific embodiments, it will be apparent to those skilled in the art that various changes and modifications may be made without departing from the spirit and scope of the invention as defined in the following claims.

What is claimed is:

1. A memory system, comprising:
a memory device configured to store a piece of data in a location which is distinguished by a physical address; and
a controller configured to generate map data, each piece of map data associating a logical address, inputted along with a request from an external device, with the physical address, to select a piece of map data among the map data based on a status regarding the piece of map data, and to transfer selected map data to the external device,
wherein the status regarding the piece of map data includes a transmission priority determined based on a miss count indicating how many times at least one read request with no physical address and how many times an invalid physical address is inputted.

2. The memory system according to claim 1, wherein the status regarding the piece of map data shows whether the piece of map data is released, or deleted, in a map cache managed according to one of cache replacement policies employed by the controller.

3. The memory system according to claim 1, wherein the transmission priority is further determined based on: a read count indicating how many times data associated with the logical address included in the piece of map data is accessed based on at least the one read request inputted from the external device; and a provision count indicating how many times the controller transfers the piece of map data to the external device.

4. The memory system according to claim 3, wherein the controller is configured to adjust a threshold corresponding to the read count, which is used for determining the transmission priority, based on the miss count and the provision count.

5. The memory system according to claim 1, wherein the controller is further configured to monitor the status regarding the piece of map data which is transferred to the external device,
wherein the status includes dirty information and access information regarding the piece of map data.

6. The memory system according to claim 5, wherein the controller is further configured to determine a transmission priority based at least on the dirty information and the access information and to select the piece of map data among the map data based on the transmission priority.

7. The memory system according to claim 1, wherein, the controller is further configured to measure a temperature of the memory device and to determine a timing of loading the map data stored in the memory device based on the temperature.

8. The memory system according to claim 1, wherein the controller is configured to generate an identifier regarding the piece of map data based on application data associated with the logical address included in the piece of map data, to group the map data into at least one list based on the identifier, and to either store the at least one list in the memory device or transmit the at least one list as the selected map data to the external device.

9. The memory system according to claim 8, wherein the application data includes a name and a version of application which generate data associated with the logical address, and the controller is further configured to apply a hash function to the name and the version of the application to generate the identifier.

10. The memory system according to claim 1, wherein the controller is further configured to receive the request, the logical address and the physical address which are inputted from the external device, to determine a type of access operations which are associated with the request, the logical address and the physical address, and to store, or access, the piece of map data in the memory device, based on the type of access operation.

11. The memory system according to claim 10, wherein the controller is further configured, when plural logical addresses and plural physical addresses corresponding to plural requests are individually sequential with each other, to sequentially store, or access, pieces of map data associating the plural logical addresses with the plural physical addresses in the memory device.

12. A controller operating between plural devices, each device including an independent address scheme to indicate a location in which a piece of data is stored, wherein the controller is configured to perform an operation in response to a request inputted from one of the plural devices, to generate map data, each piece of map data associating a logical address with a physical address used in the plural devices, to select a piece of map data among the map data based on a status regarding the piece of map data, and to transfer selected map data to the external device, wherein the status regarding the piece of map data includes a transmission priority determined based on a miss count indicating how many times at least one read request with no physical address and how many times an invalid physical address is inputted.

13. The controller according to claim 12, wherein the status regarding the piece of map data shows whether the piece of map data is released, or deleted, in a map cache managed according to one of cache replacement policies employed by the controller.

14. The controller according to claim 12, wherein the transmission priority is further determined based on: a read count indicating how many times data associated with the logical address included in the piece of map data is accessed based on the at least one read request inputted from the external device; and a provision count indicating how many times the controller transfers the piece of map data to the external device.

15. The controller according to claim 12, wherein the controller is further configured to monitor the status regarding the piece of map data which is transferred to the external device,
wherein the status includes dirty information and access information regarding the piece of map data.

16. The controller according to claim 12, wherein the controller is further configured to measure a temperature of the memory device and to determine a timing of loading the map data stored in the memory device based on the temperature.

17. The controller according to claim 12, wherein the controller is configured to generate an identifier regarding the piece of map data based on application data associated with the logical address included in the piece of map data, to group the map data into at least one list based on the identifier, and to either store the at least one list in the memory device or transmit the at least one list as the selected map data to the external device.

18. The controller according to claim 12, wherein the controller is further configured to receive the request, the logical address and the physical address which are inputted from the external device, to determine a type of access operations which are associated with the request, the logical address and the physical address, and to store, or access, the piece of map data in the memory device, based on the type of access operations.

19. A method for operating a memory system including a memory device configured to store a piece of data in a location which is distinguished by a physical address, comprising:
generating map data, each piece of map data associating a logical address, inputted along with a request from an external device, with the physical address;
selecting a piece of map data among the map data based on a status regarding the piece of map data; and
transferring selected map data to the external device,
wherein the status regarding the piece of map data includes a transmission priority determined based on a miss count indicating how many times at least one read request with no physical address and how many times an invalid physical address is inputted.

20. The method according to claim 19, wherein the status regarding the piece of map data shows whether the piece of map data is released, or deleted, in a map cache managed according to one of cache replacement policies employed by the controller, and
wherein the transmission priority is further determined based on: a read count indicating how many times data associated with the logical address included in the piece of map data is accessed based on the at least one read request inputted from the external device; and a provision count indicating how many time the controller transfers the piece of map data to the external device.

* * * * *